(12) United States Patent
Henderson

(10) Patent No.: US 8,631,387 B2
(45) Date of Patent: Jan. 14, 2014

(54) SYSTEM AND METHOD FOR THE STRUCTURING AND INTERPRETATION OF ORGANIC COMPUTER PROGRAMS

(75) Inventor: Charles E. Henderson, Lexington, VA (US)

(73) Assignee: Coral Networks, Inc., Arlington, VA (US)

( * ) Notice: Subject to any disclaimer, the term of this patent is extended or adjusted under 35 U.S.C. 154(b) by 51 days.

(21) Appl. No.: 13/437,733

(22) Filed: Apr. 2, 2012

(65) Prior Publication Data

US 2012/0254842 A1  Oct. 4, 2012

Related U.S. Application Data

(60) Provisional application No. 61/470,198, filed on Mar. 31, 2011.

(51) Int. Cl.
*G06F 9/44* (2006.01)
*G06F 9/45* (2006.01)

(52) U.S. Cl.
USPC .......................... 717/108; 717/116; 717/131

(58) Field of Classification Search
None
See application file for complete search history.

(56) References Cited

U.S. PATENT DOCUMENTS

| | | | |
|---|---|---|---|
| 5,680,619 A * | 10/1997 | Gudmundson et al. | 717/108 |
| 5,872,973 A * | 2/1999 | Mitchell et al. | 719/332 |
| 6,002,874 A * | 12/1999 | Bahrs et al. | 717/157 |
| 6,789,252 B1 | 9/2004 | Burke et al. | |
| 6,966,033 B1 | 11/2005 | Gasser et al. | |
| 7,155,701 B1 | 12/2006 | Gongwer et al. | |
| 7,421,716 B1 | 9/2008 | Margulis et al. | |
| 7,529,763 B2 | 5/2009 | Hulse et al. | |
| 7,676,789 B2 | 3/2010 | Omiya et al. | |
| 2003/0069871 A1 | 4/2003 | Yucel | |
| 2003/0135850 A1 | 7/2003 | Miloushev et al. | |
| 2007/0261025 A1 | 11/2007 | Seto et al. | |
| 2008/0270979 A1 | 10/2008 | McCool et al. | |
| 2008/0288950 A1 | 11/2008 | Hammer et al. | |
| 2009/0007066 A1 | 1/2009 | Grechanik | |
| 2010/0185940 A1 | 7/2010 | Popp et al. | |

OTHER PUBLICATIONS

The Notification of Transmittal of the International Search Report and the Written Opinion of the International Searching Authority, or the Declaration dated Aug. 16, 2012 issued in the corresponding PCT Application No. PCT/US2012/031889.

* cited by examiner

*Primary Examiner* — Chuck Kendall
(74) *Attorney, Agent, or Firm* — McGuireWoods, LLP; Charles J. Gross

(57) ABSTRACT

In various aspects, a system and method for structuring and interpreting organic computer programs may provide for programs to expand, grow and evolve analogous to the way plants, animals, and organisms in nature grow and evolve. The organic computing system and method may unify program design time and program run time, may provide for program structure and program state to change at run time, and may provide for programs to continuously change and evolve through the addition of member functions, inputs, and outputs as the program is running. The organic computing system provides continuous means of differentiation, creating asymmetries and the opportunity for competition, and integration, creating symmetries and the opportunity for cooperation. Together, these factors provide a programming system wherein normalization occurs over time through the exchange and integration of differences and evolution and diversification through the creation of new differences, thereby introducing a differential form of computer science.

96 Claims, 118 Drawing Sheets

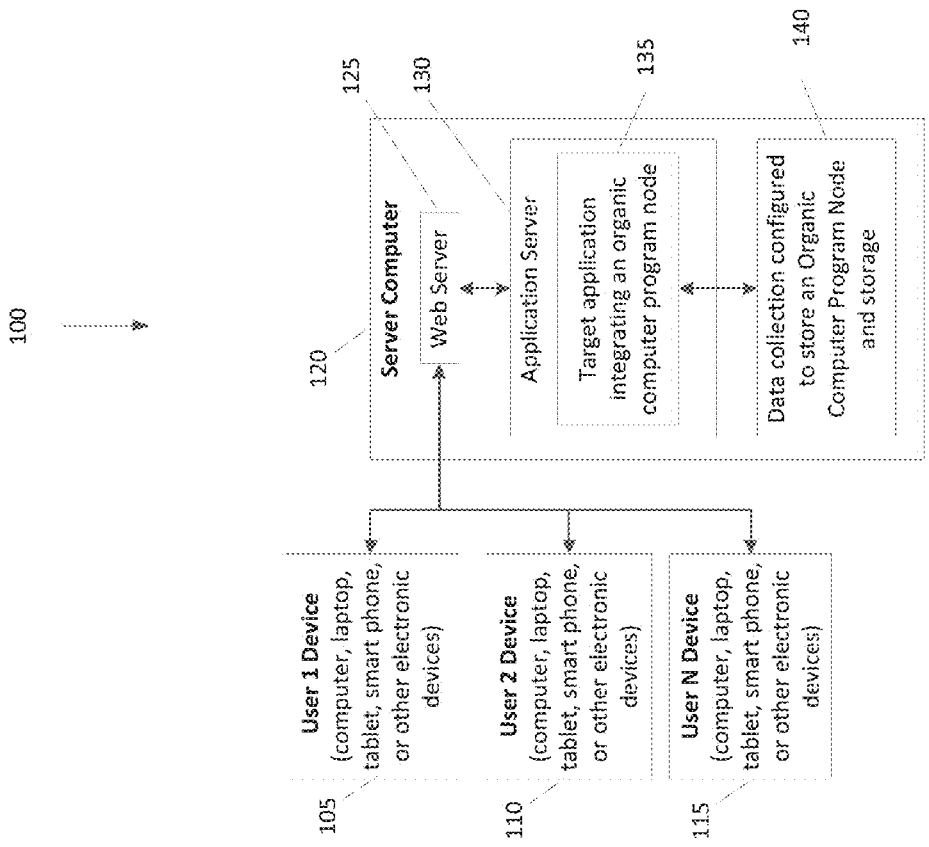
Figure 1. Architecture of a First Example System Incorporating a System and Method for Structuring and Interpreting Organic Computer Programs

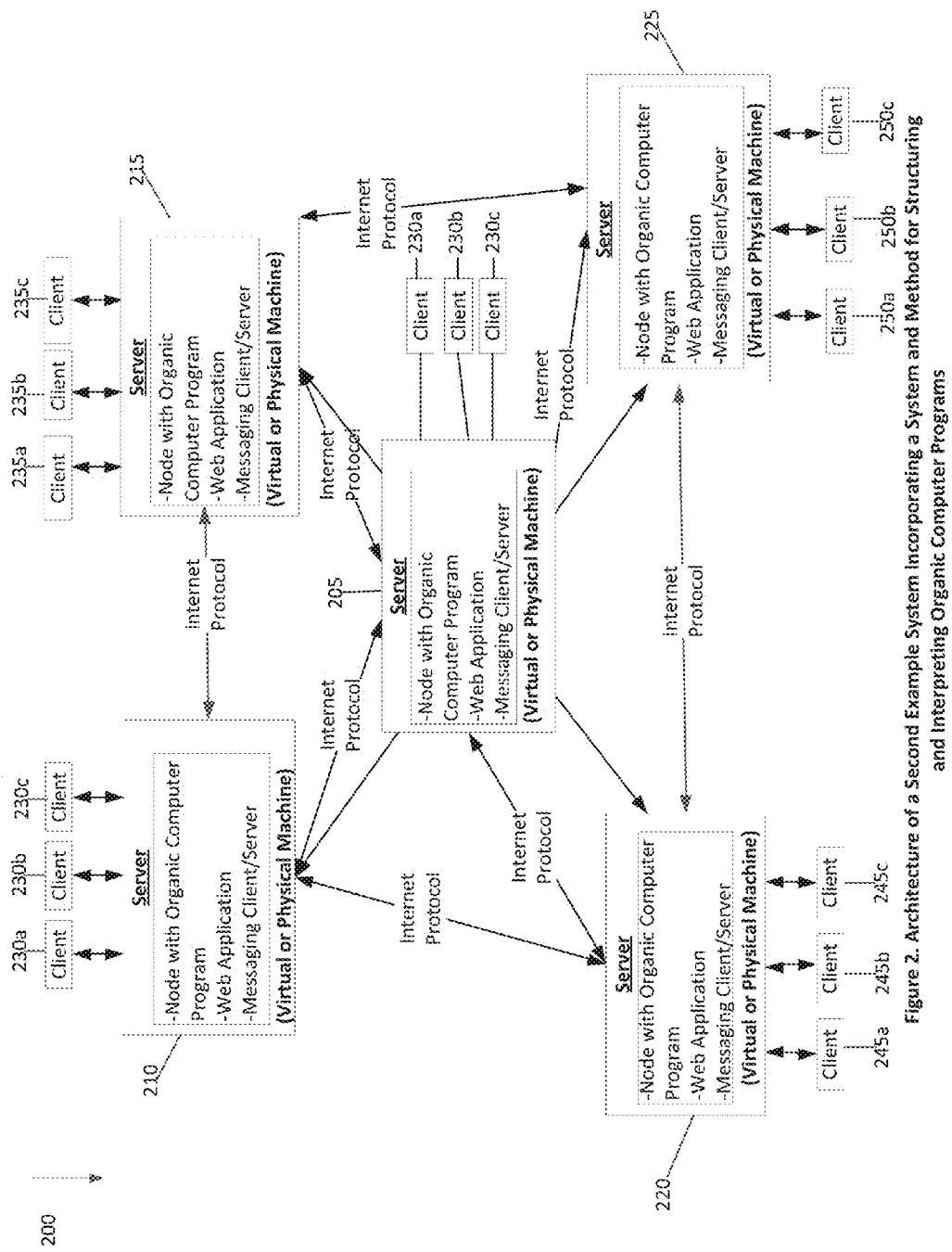
Figure 2. Architecture of a Second Example System Incorporating a System and Method for Structuring and Interpreting Organic Computer Programs

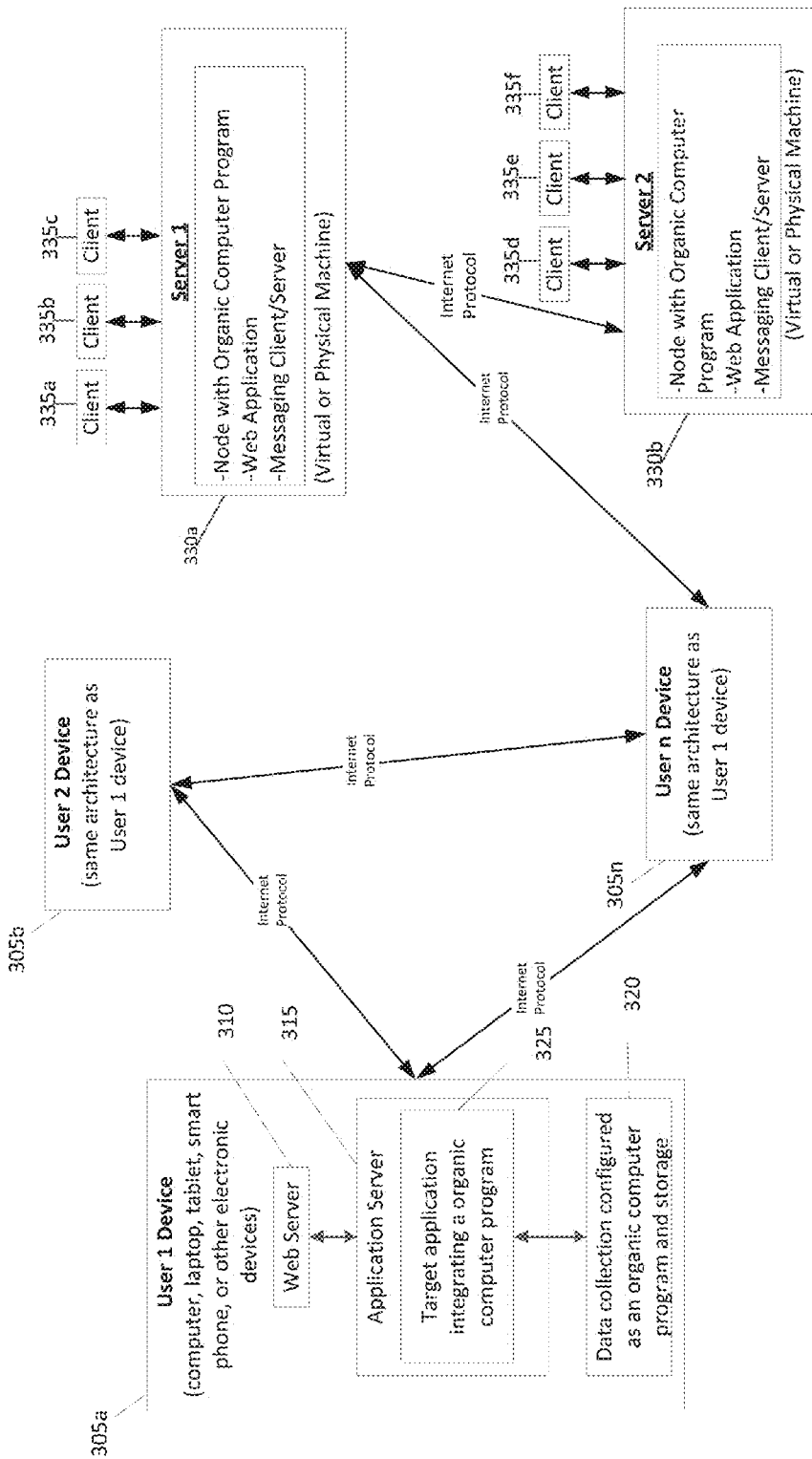
Figure 3. Architecture of a Third Example System Incorporating a System and Method for Structuring and Interpreting Organic Computer Programs

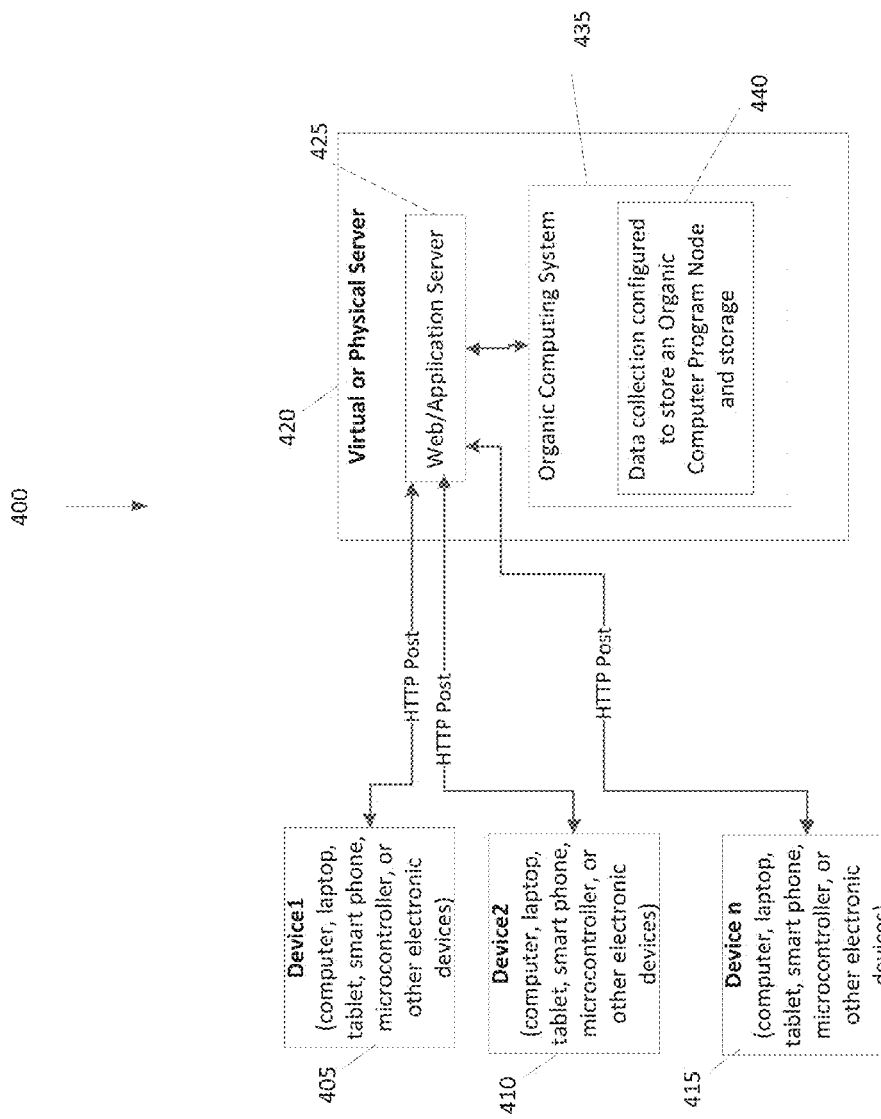
Figure 4. Architecture of a Fourth Example System Incorporating a System and Method for Structuring and Interpreting Organic Computer Programs

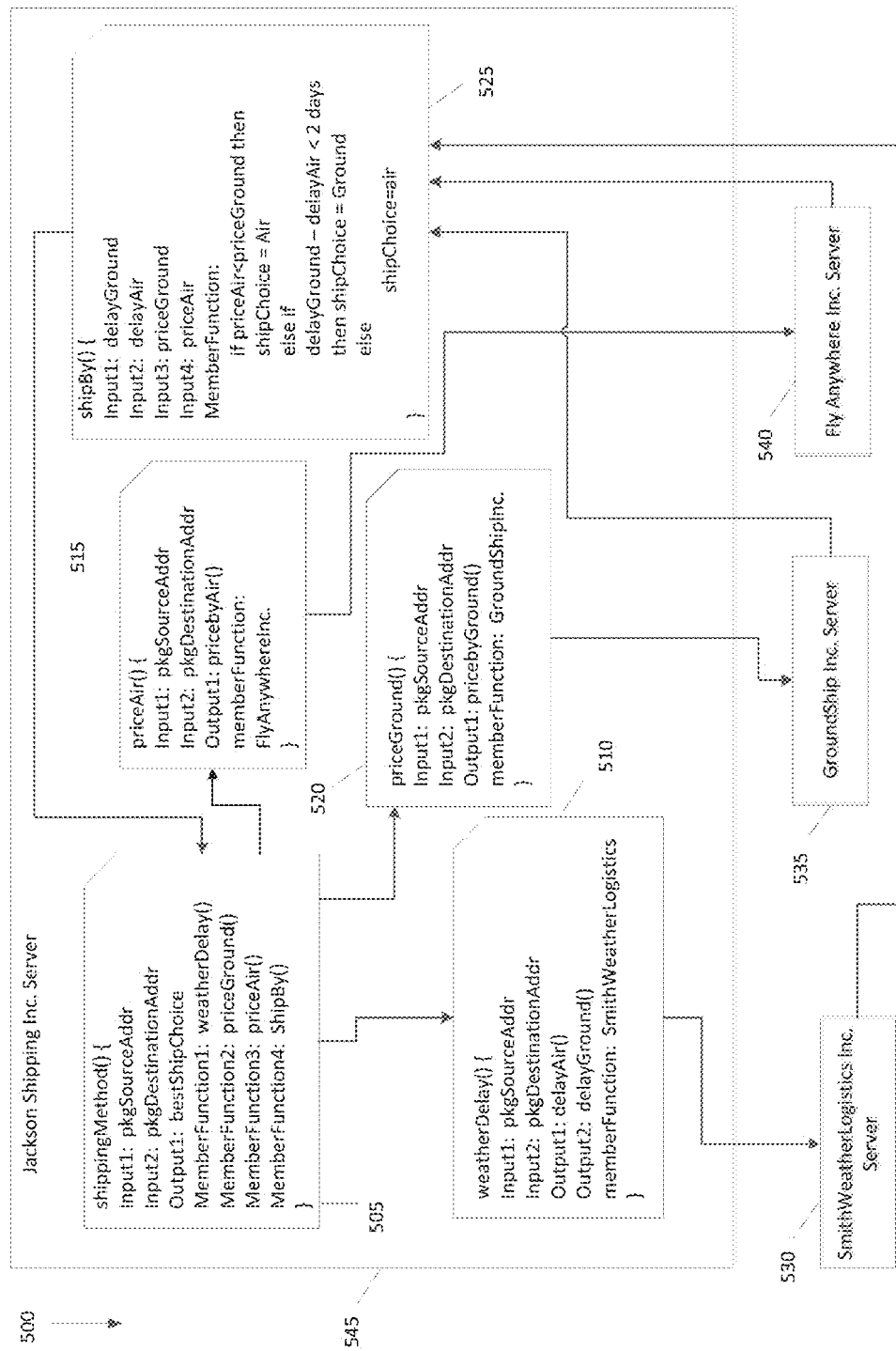
Figure 5. Example Organic Computer Program

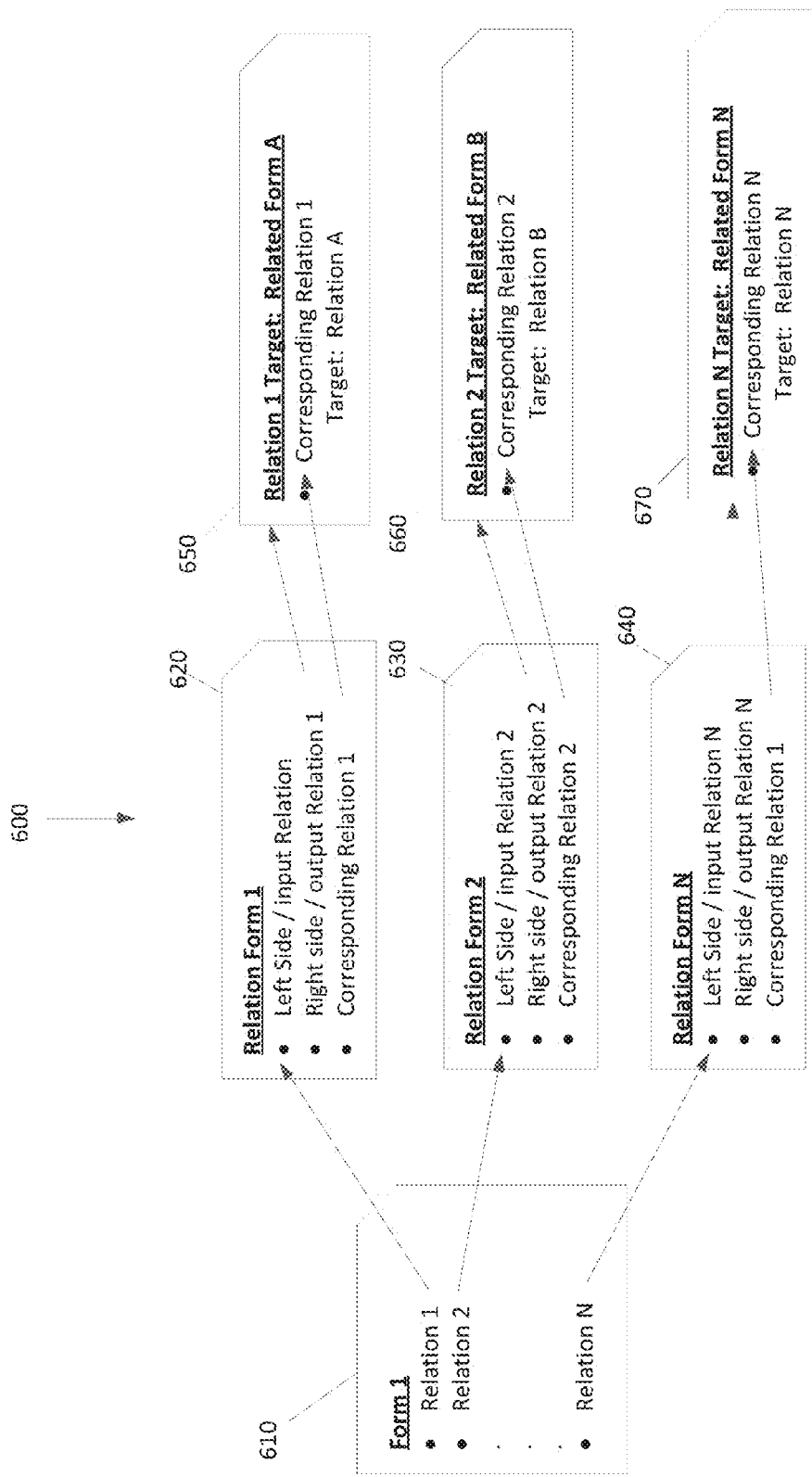
Figure 6. Forms, Relations, and Corresponding Relations

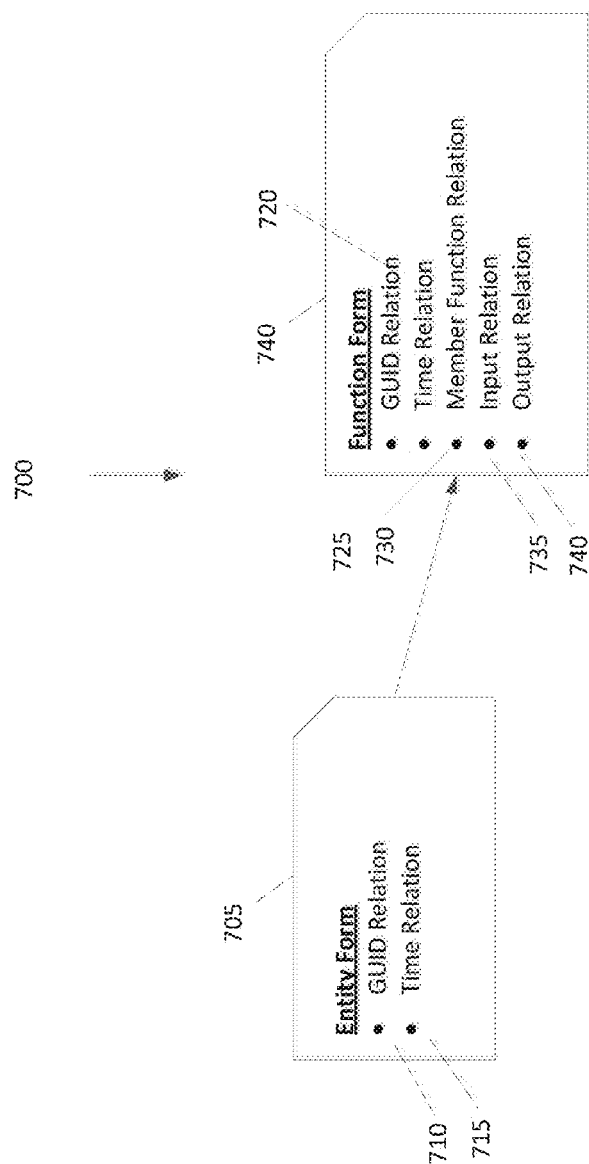
Figure 7. Simplified Example of Form Inheritance and Subclassing

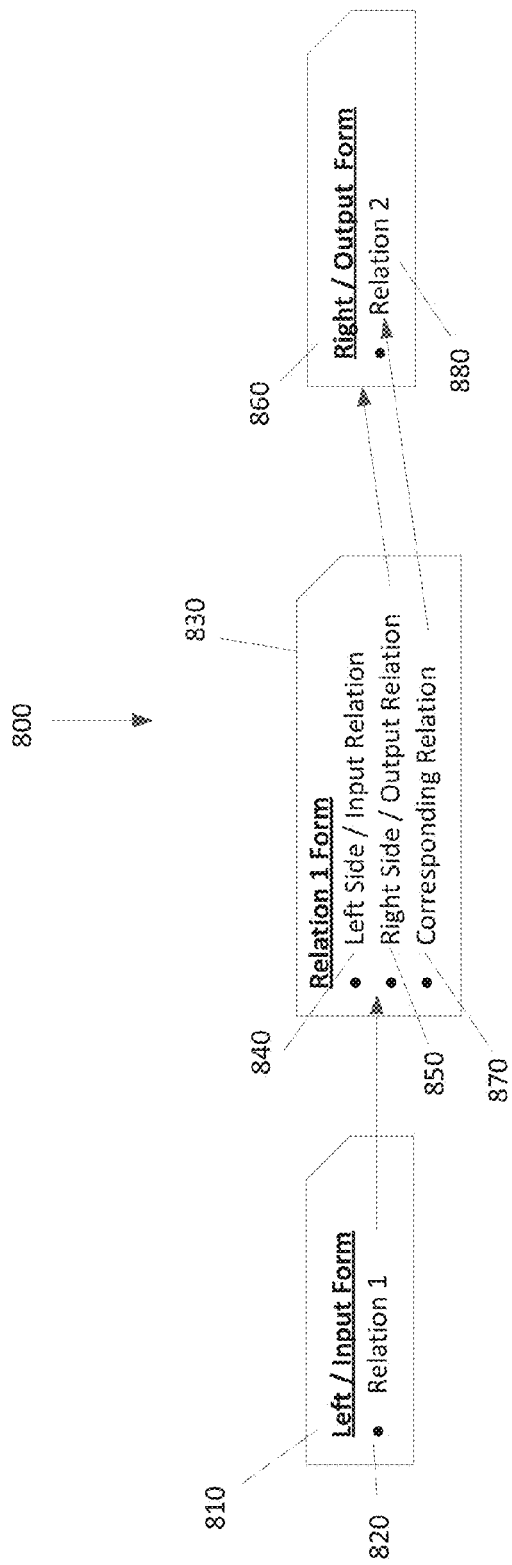
Figure 8. Relation Form

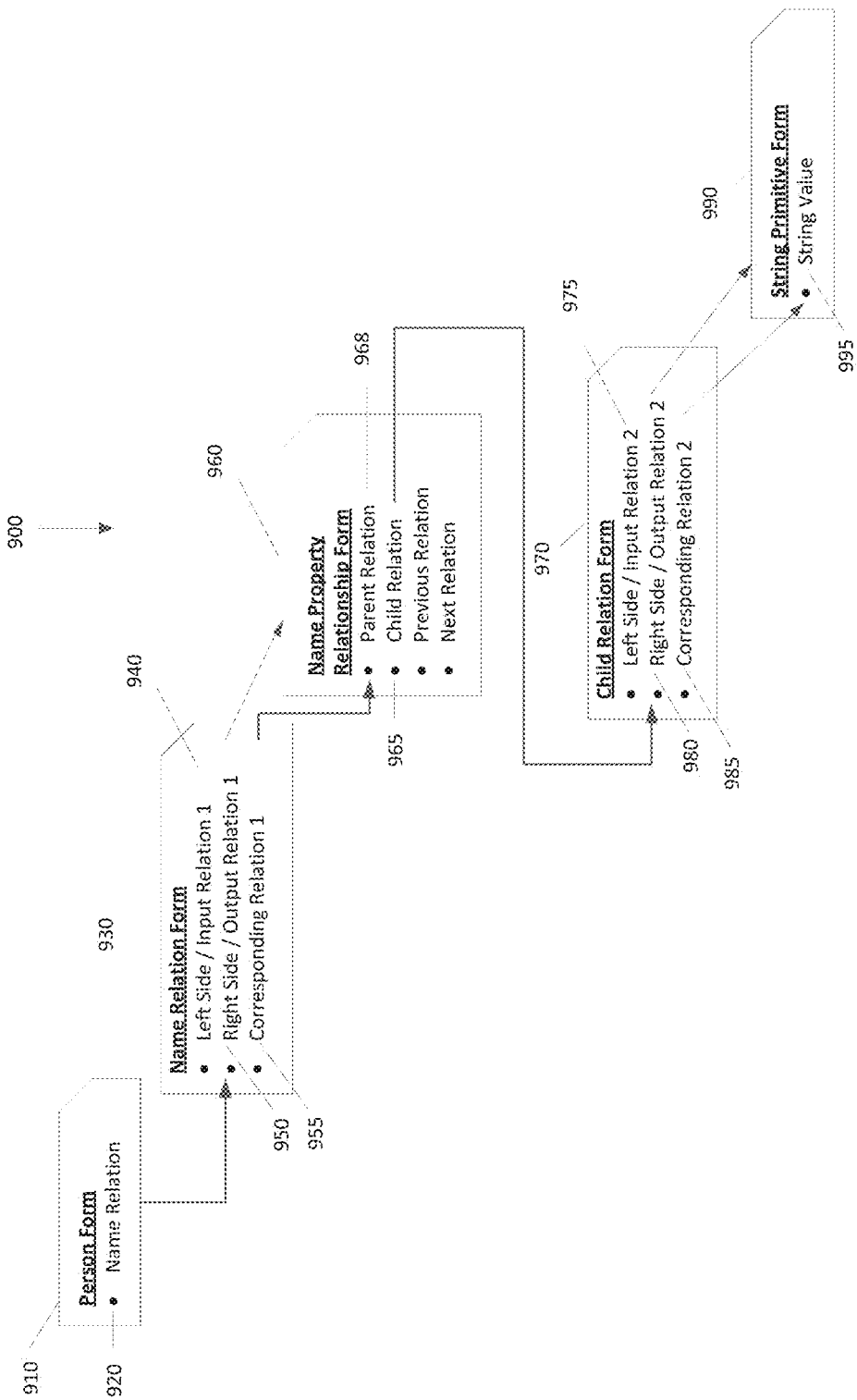
Figure 9. Example Name Relation Form with Left Side Relation and Right Side Relation

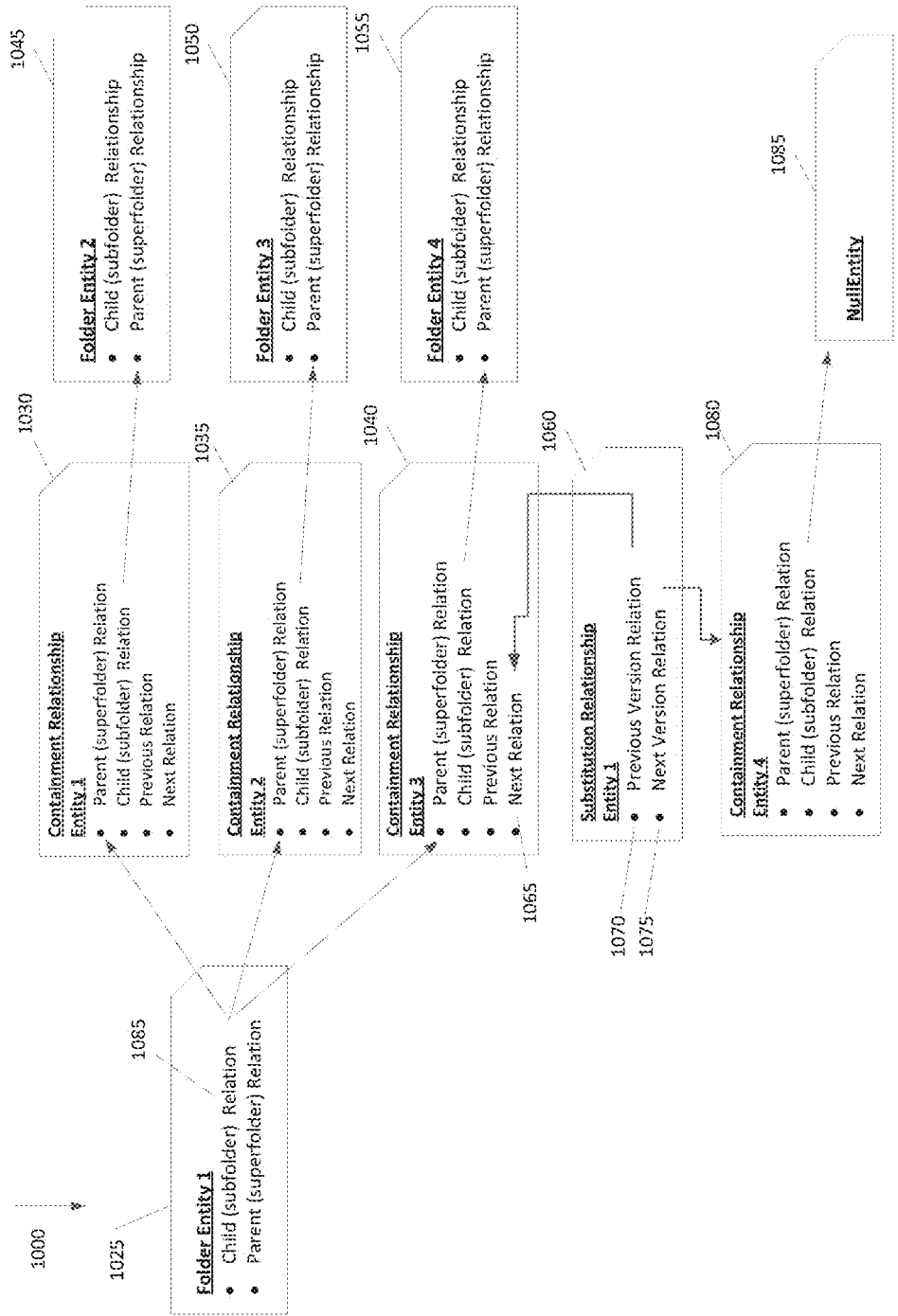
Figure 10. Relationship Entity Signifying Change to a Relation

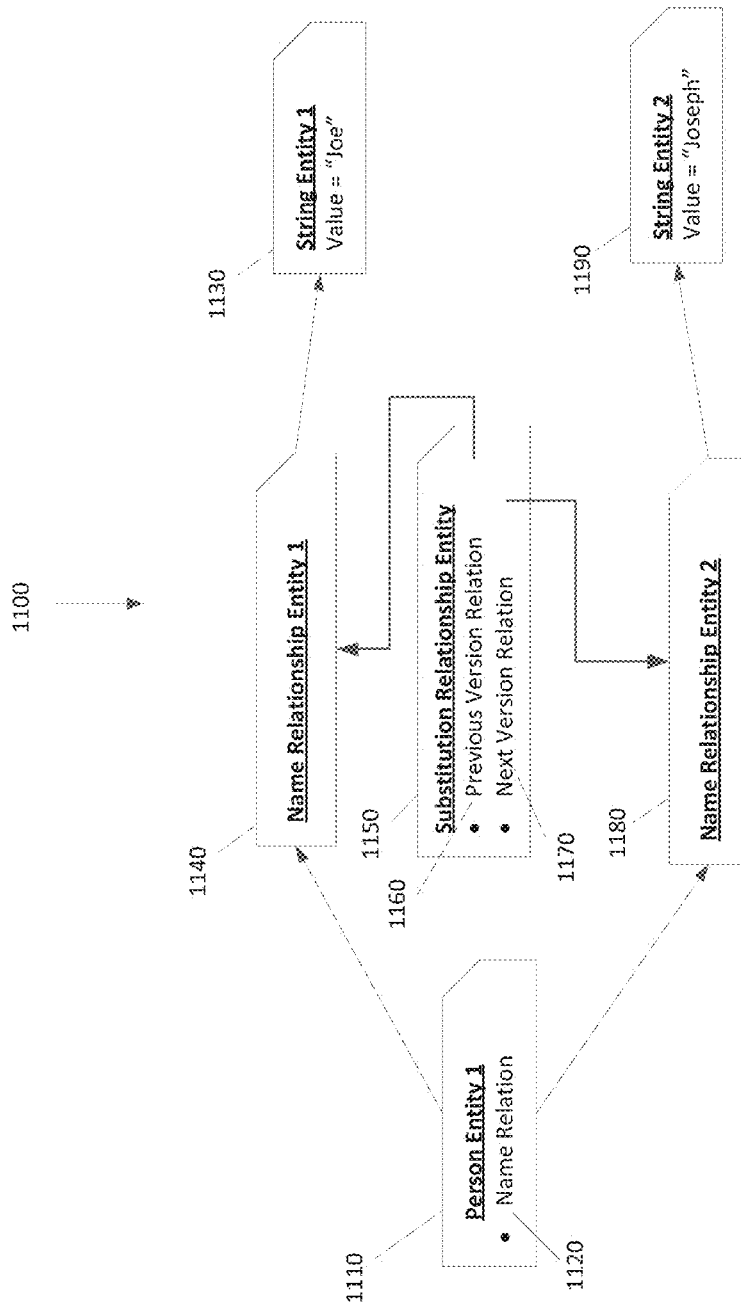
Figure 11. Example Substitution

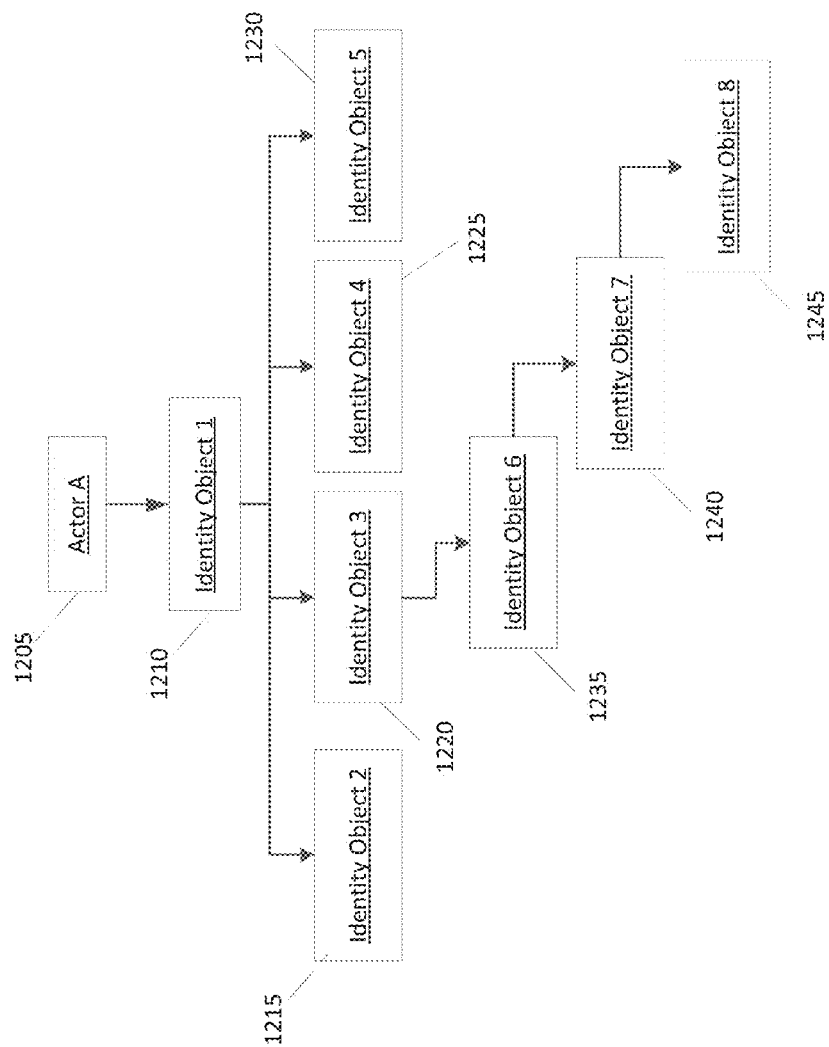
Figure 12. Example Identity Object Derivation

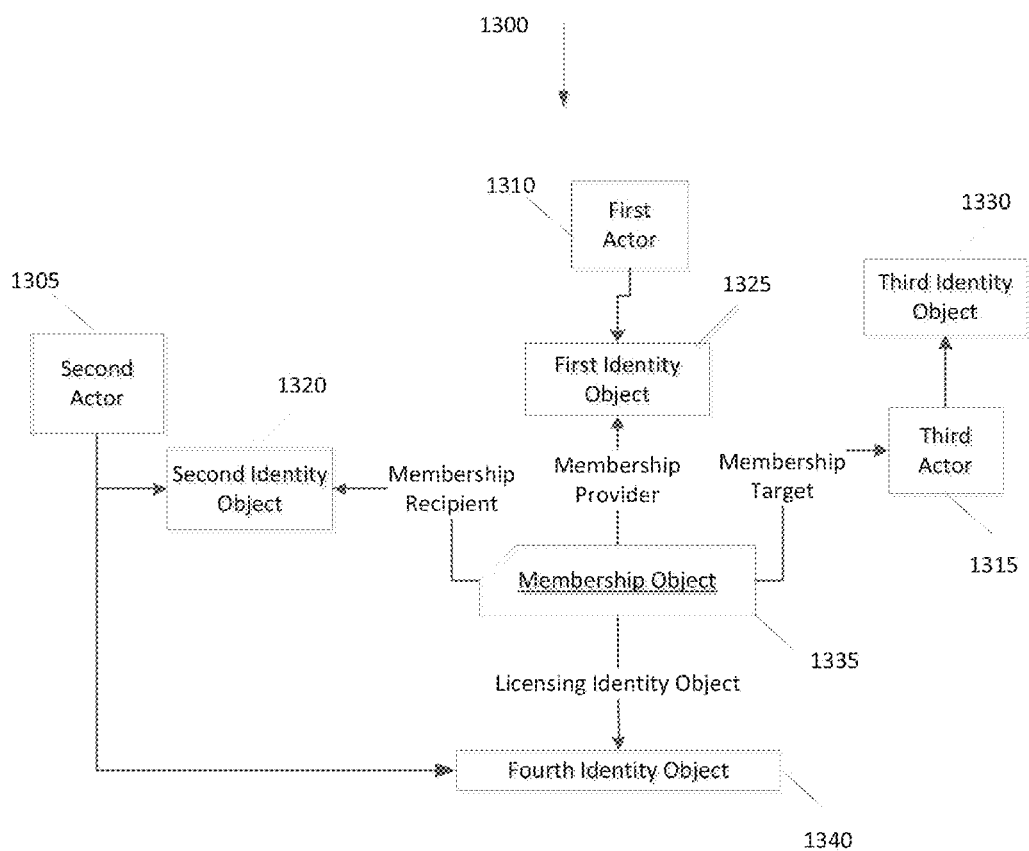
Figure 13. Membership Overview

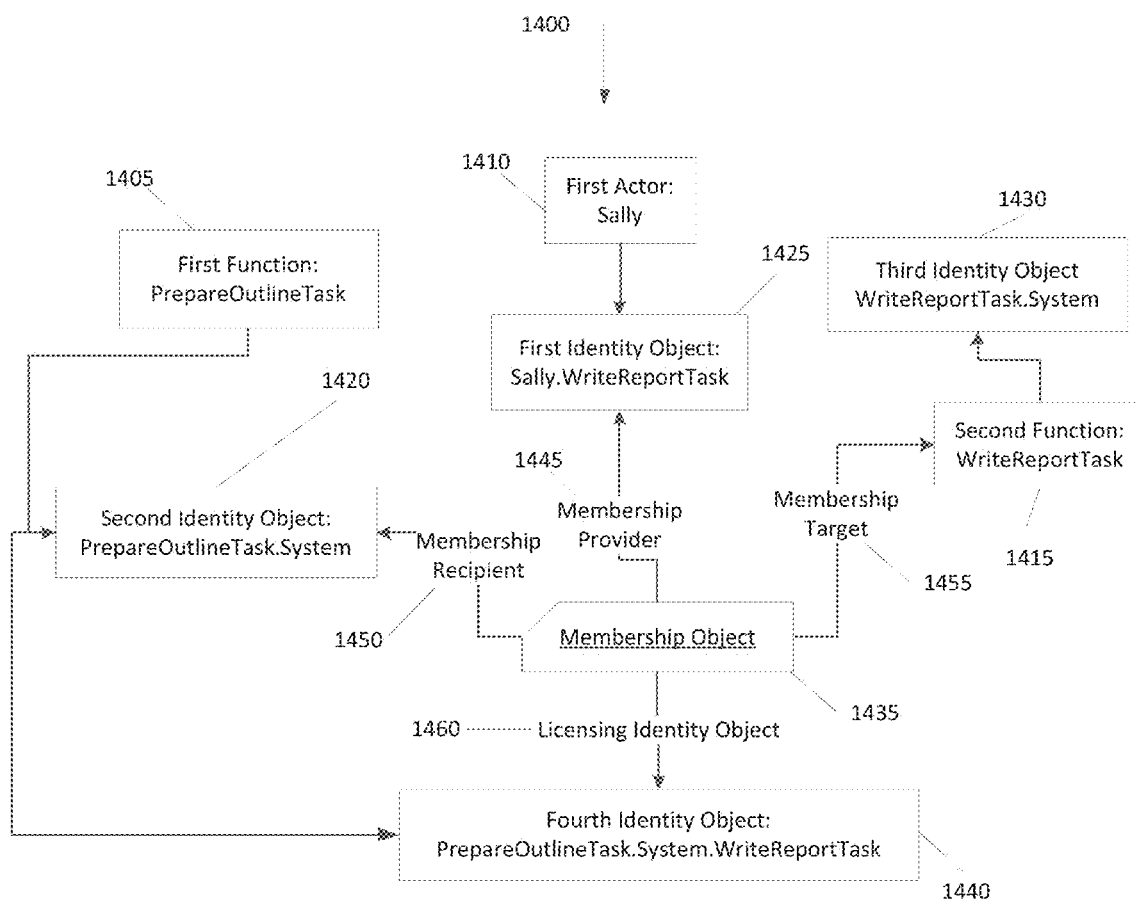
Figure 14. Membership Example – Functions as Tasks

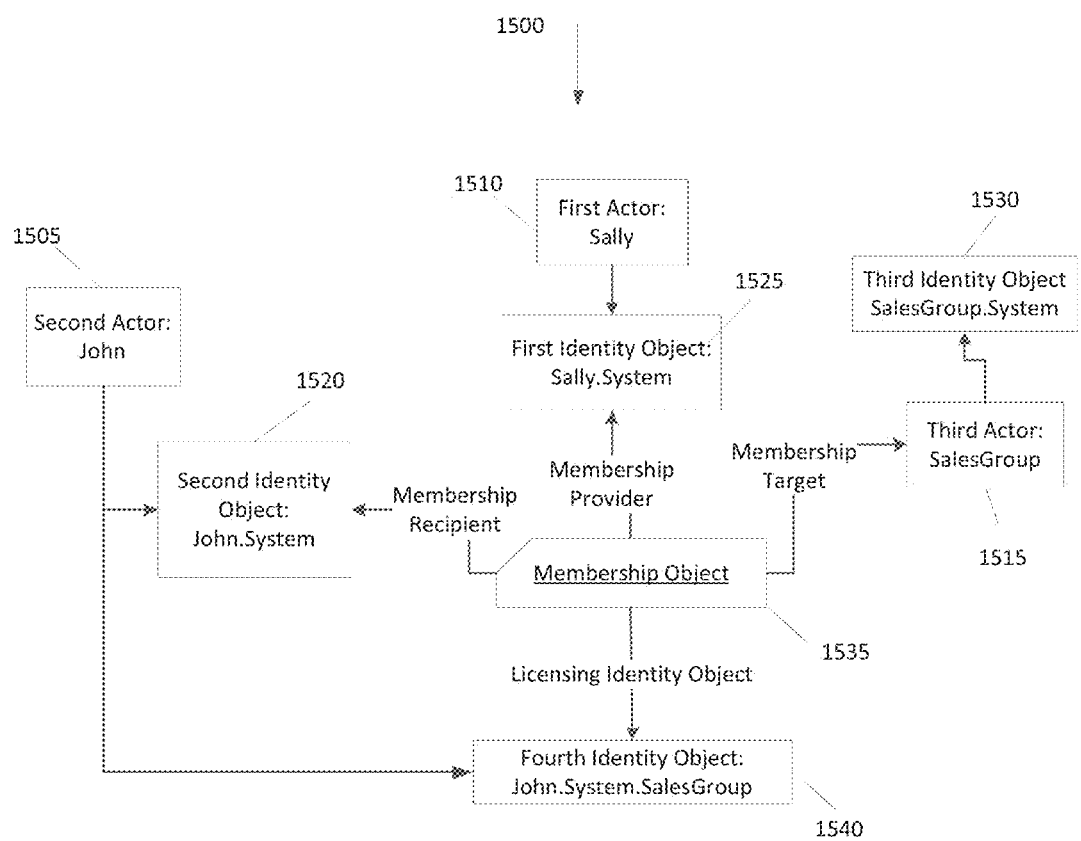
Figure 15. Membership Example – User and Group

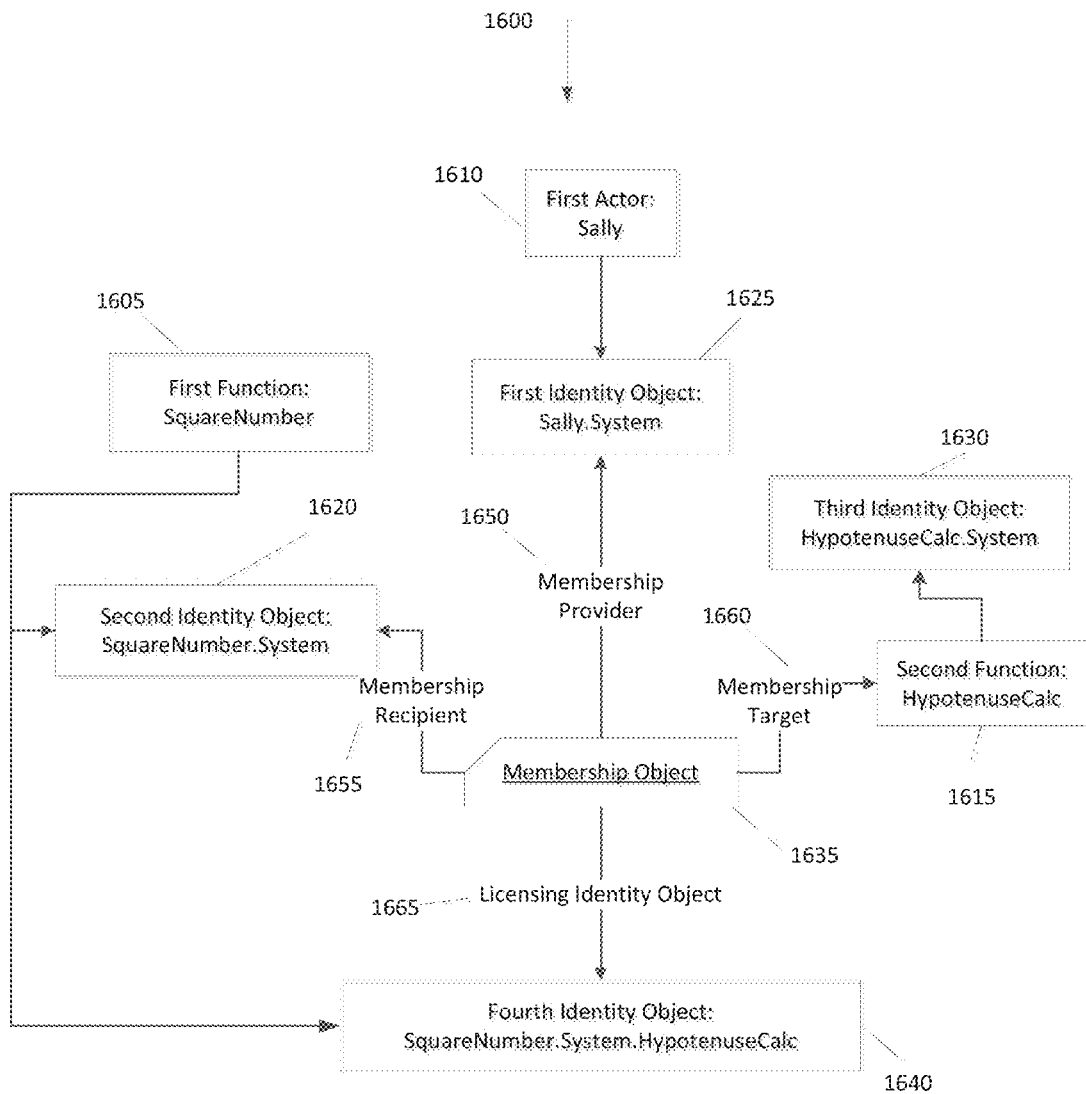
Figure 16. Membership Example – Functions as Computations

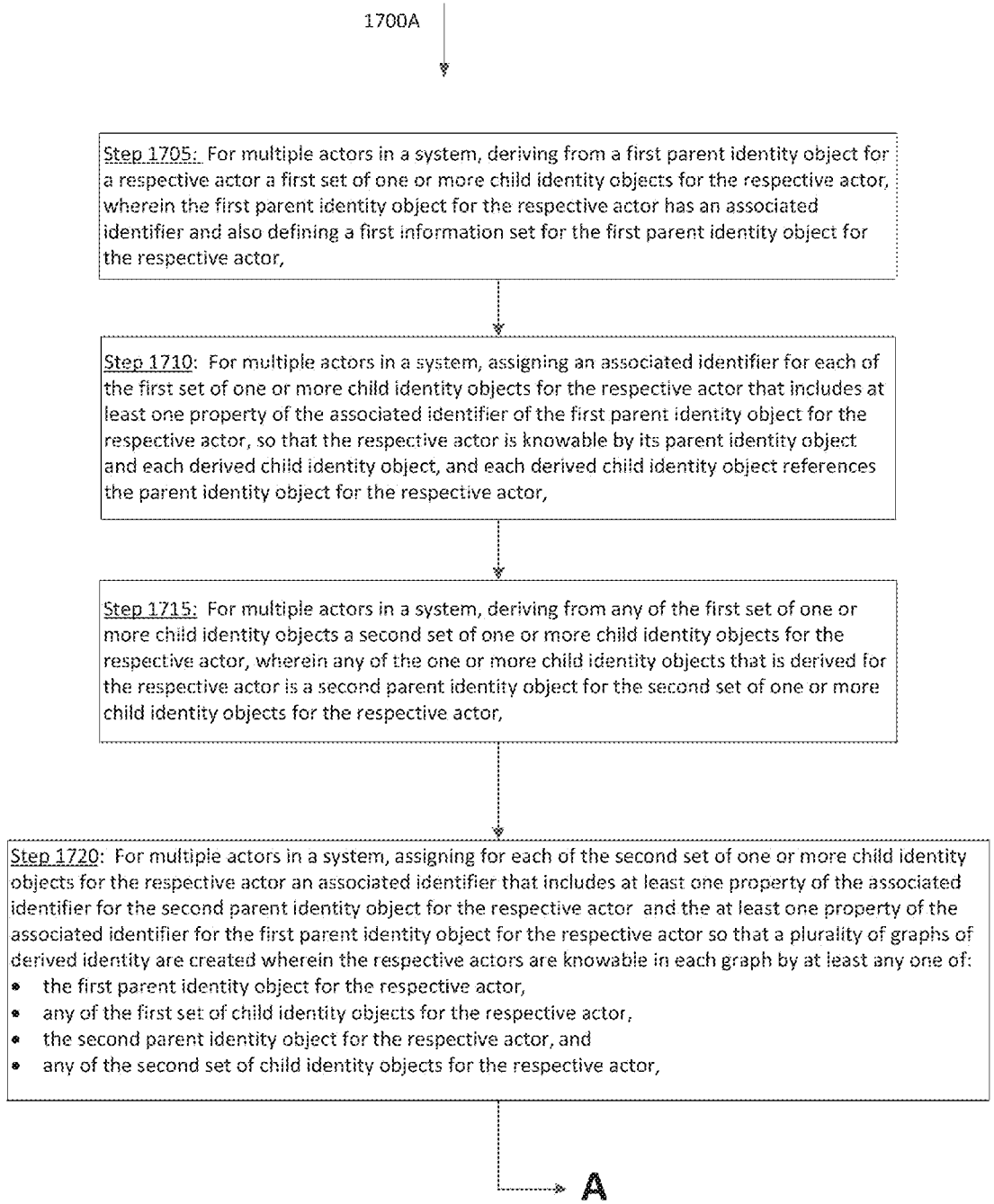
Figure 17A. Exemplary Process Flow for Creating Membership

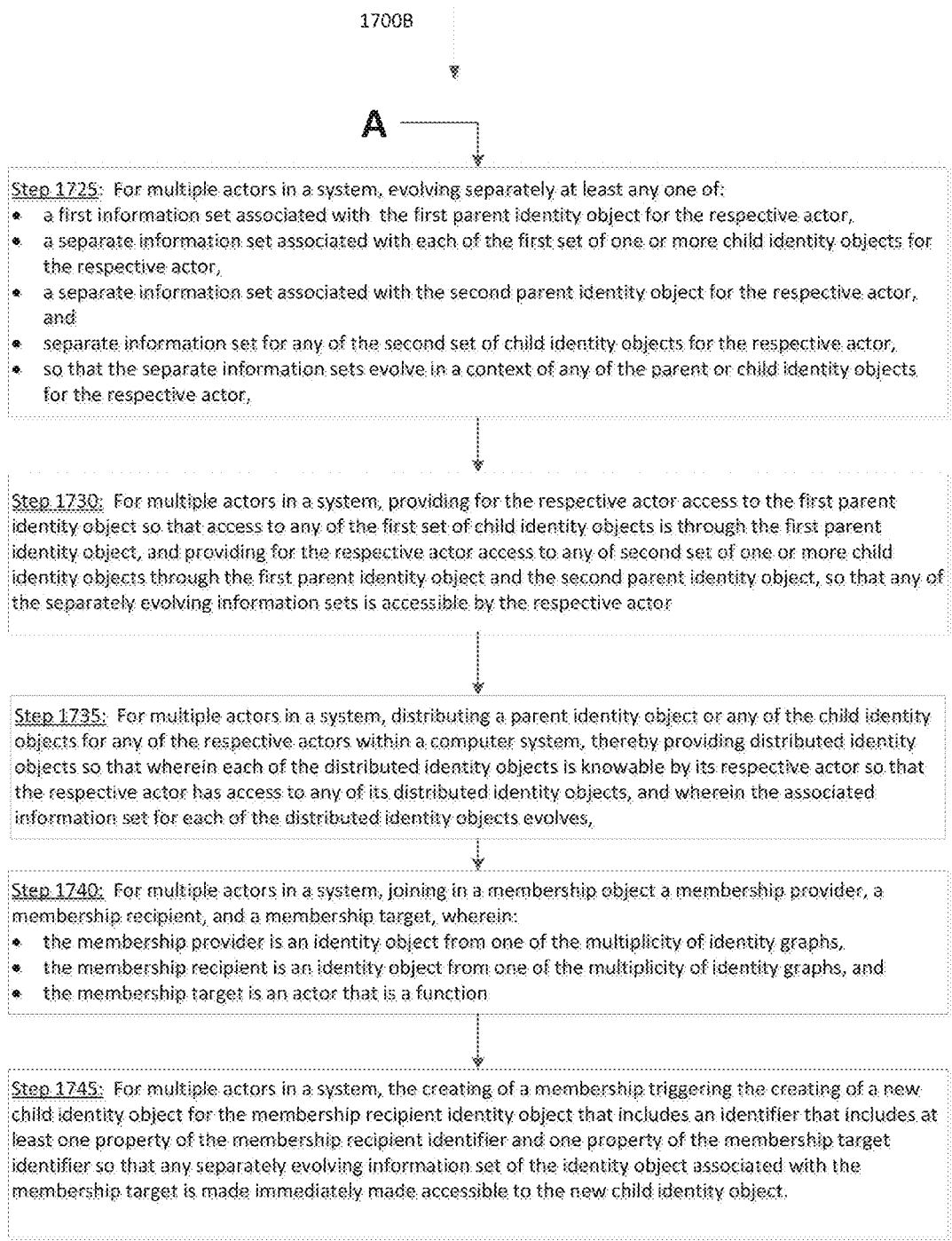
Figure 17B. Exemplary Process Flow for Creating Membership - continued

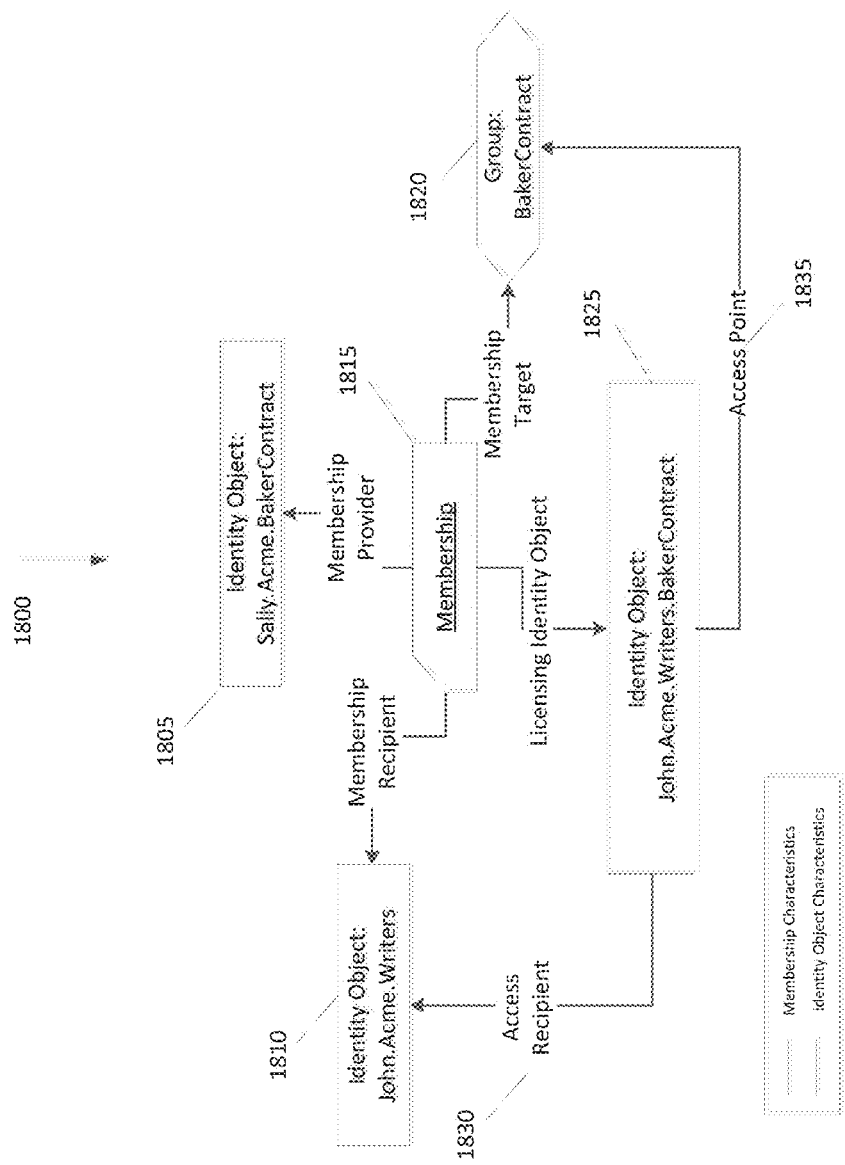
Figure 18. Persona and Membership

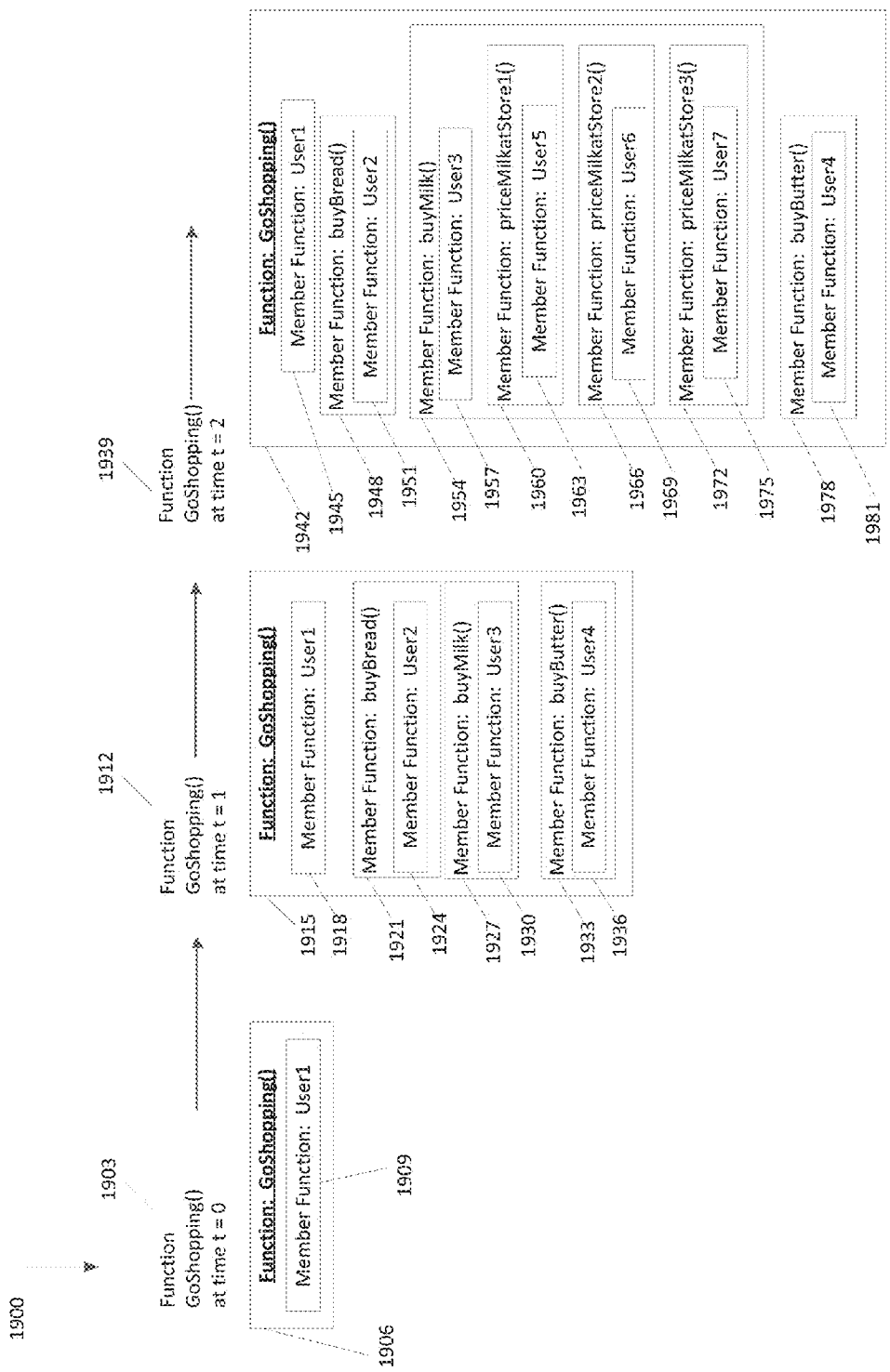
Figure 19. Example of Program Structure Changes Over Time During Runtime

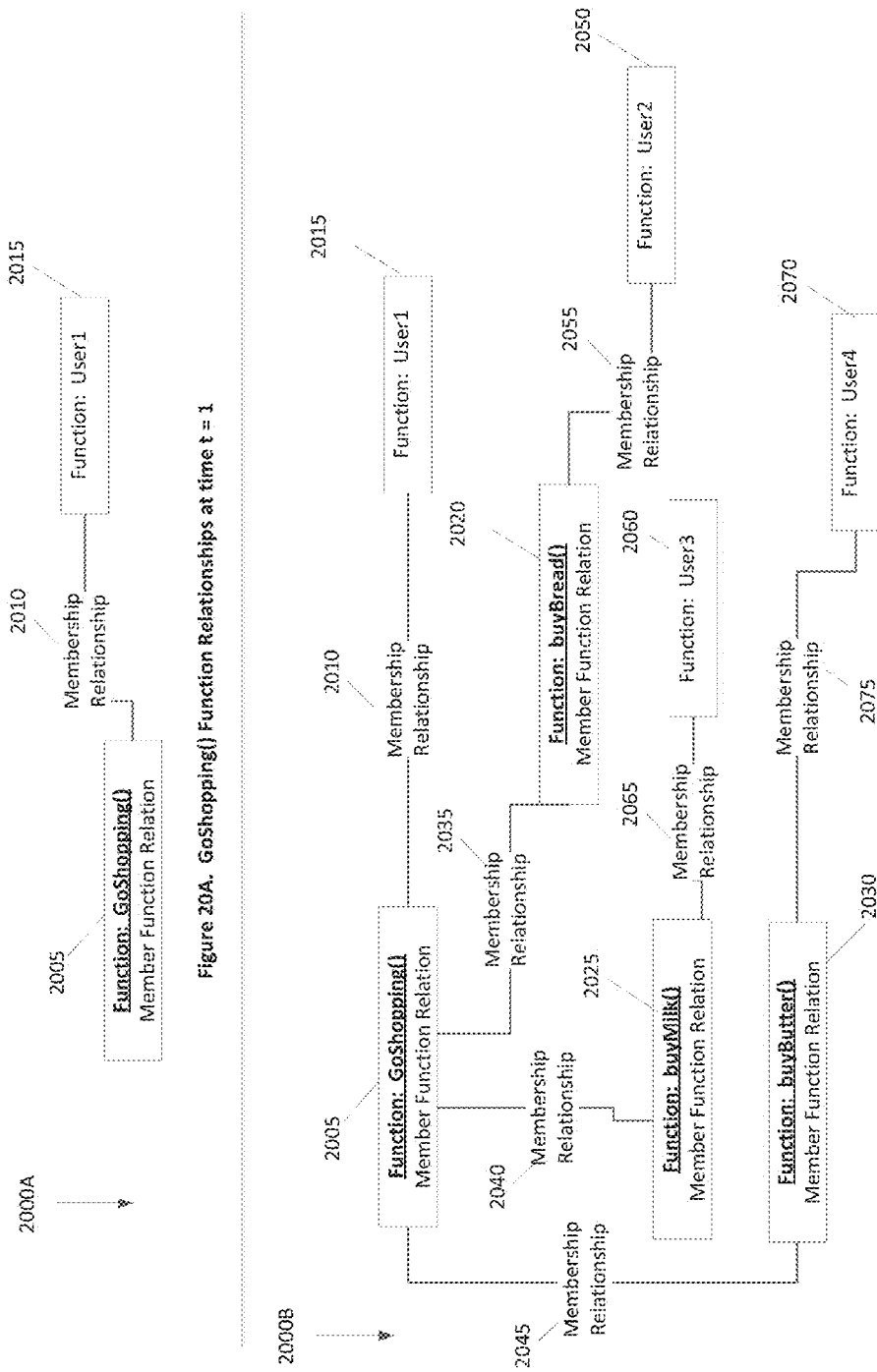

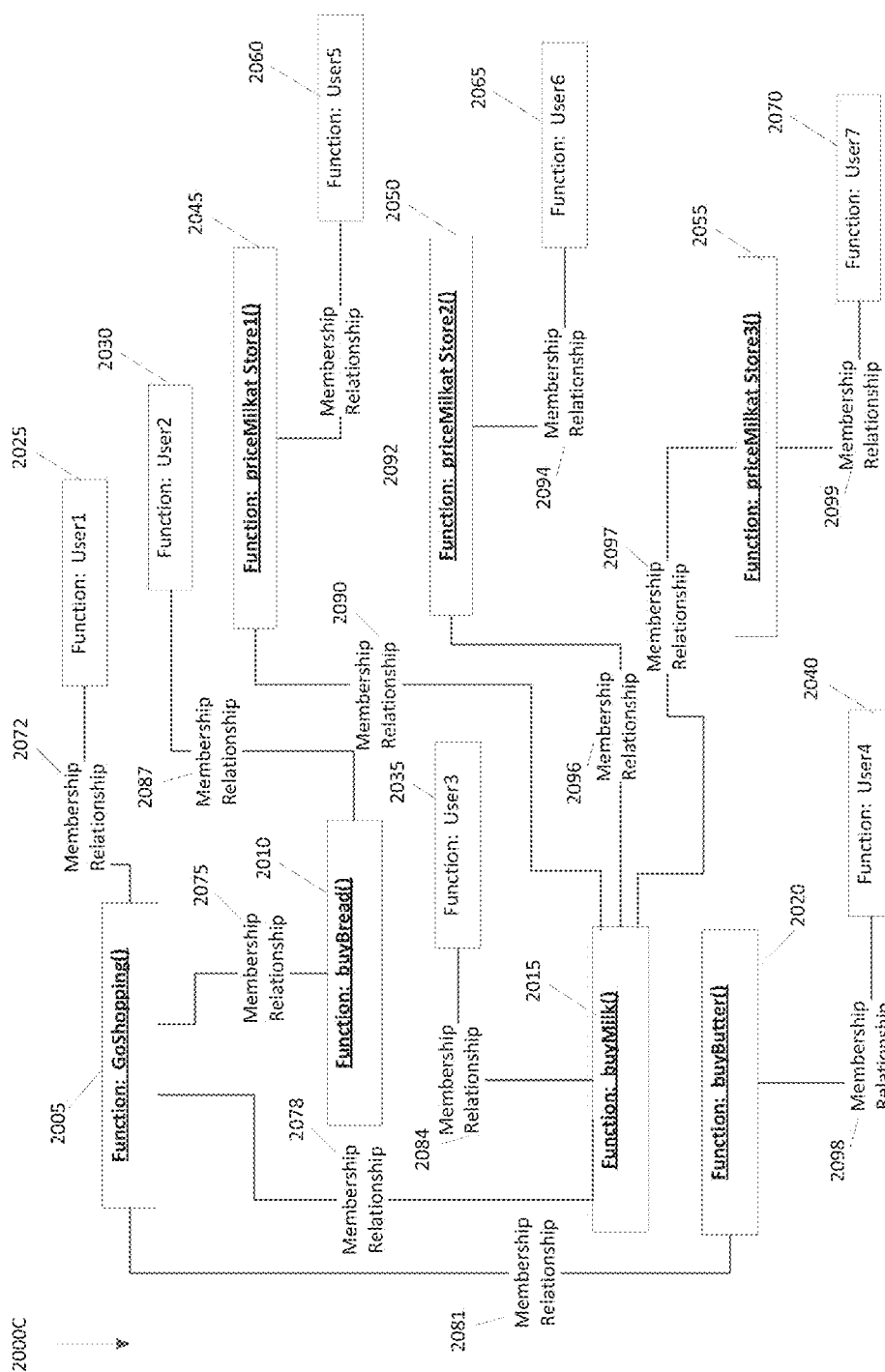
Figure 20C. GoShopping() Function Relationships at time t = 3

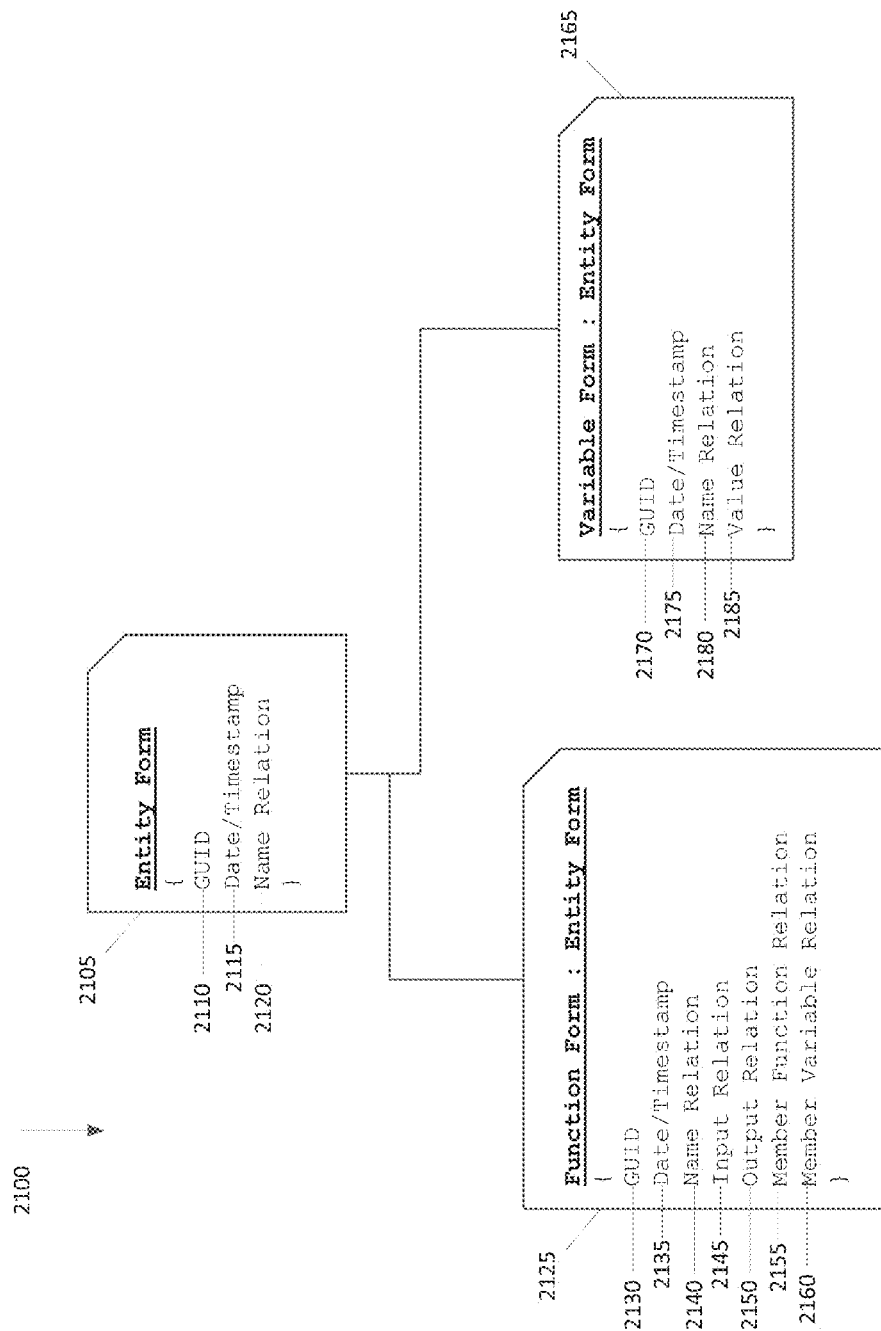
Figure 21. Example Derivation for a Function Form and a Variable Form

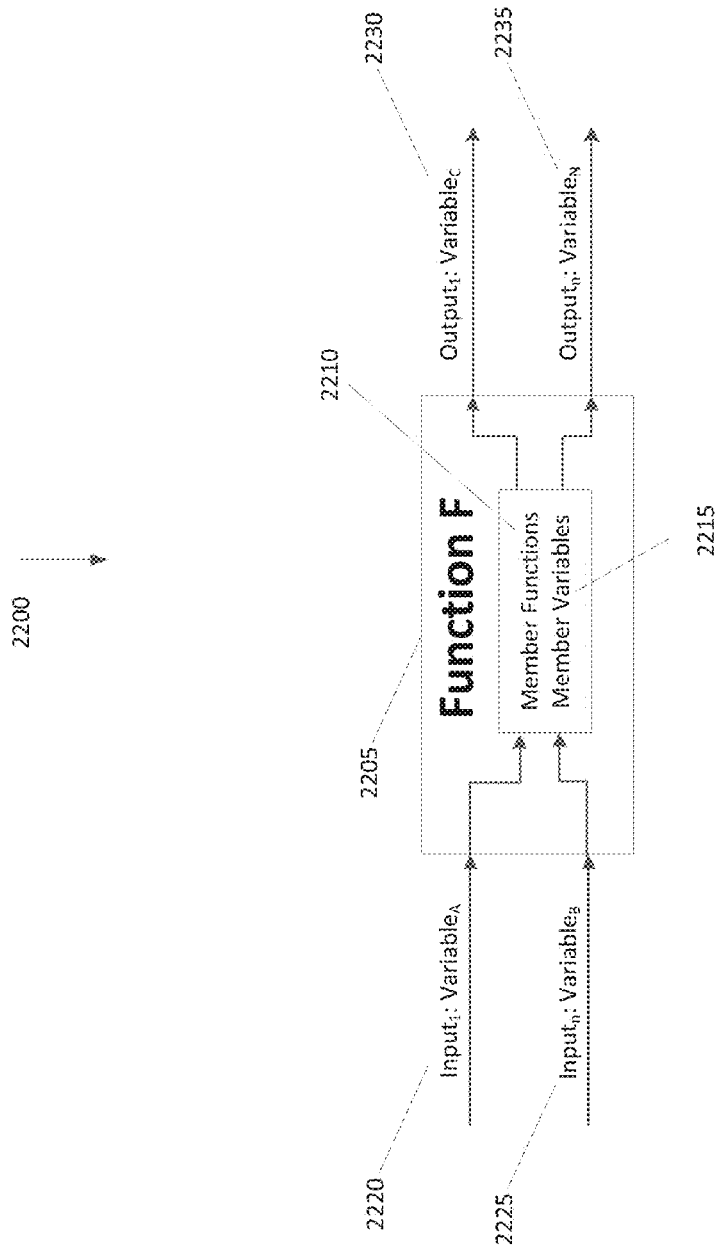
Figure 22. Example Function F

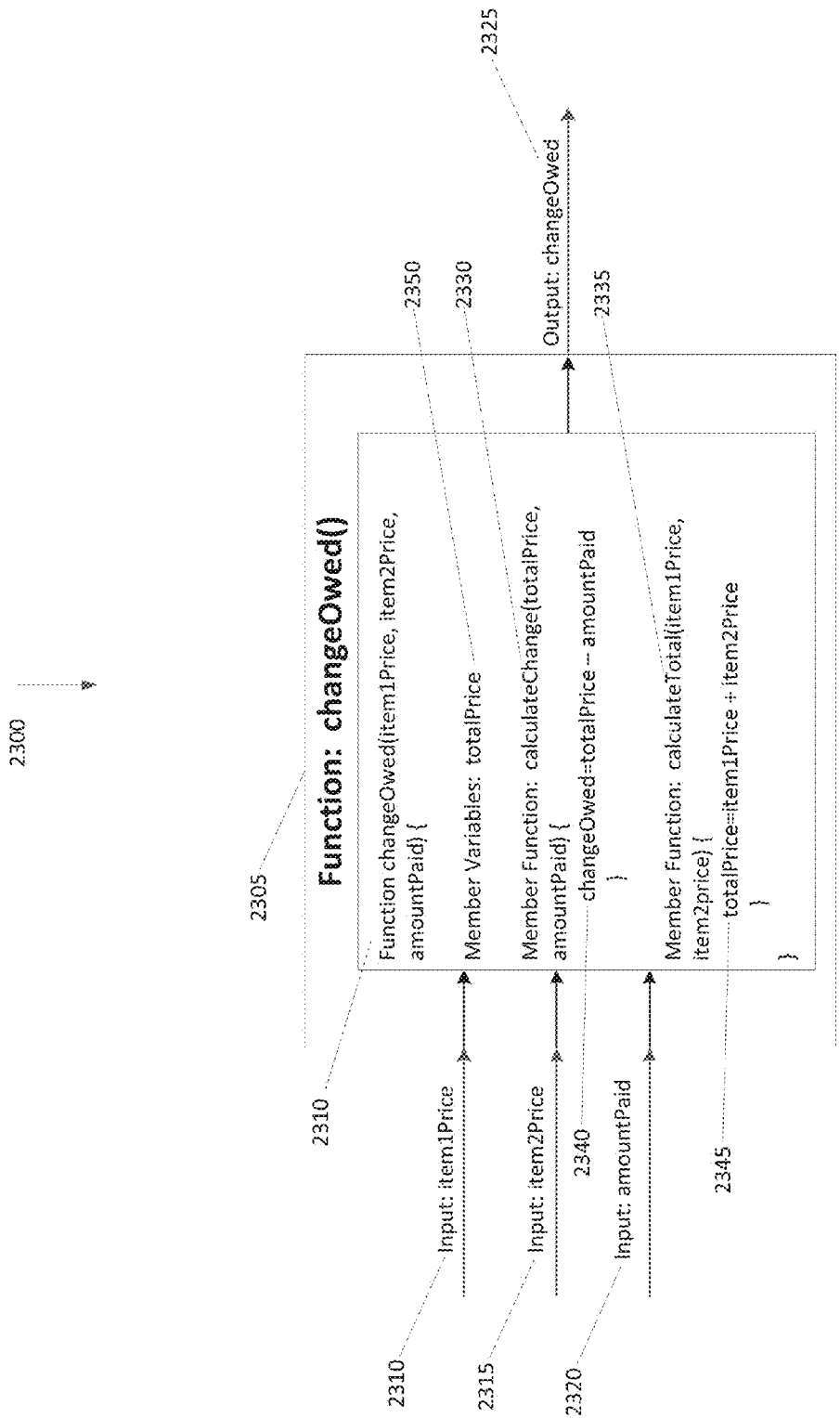
Figure 23. Example Change Owed() Function

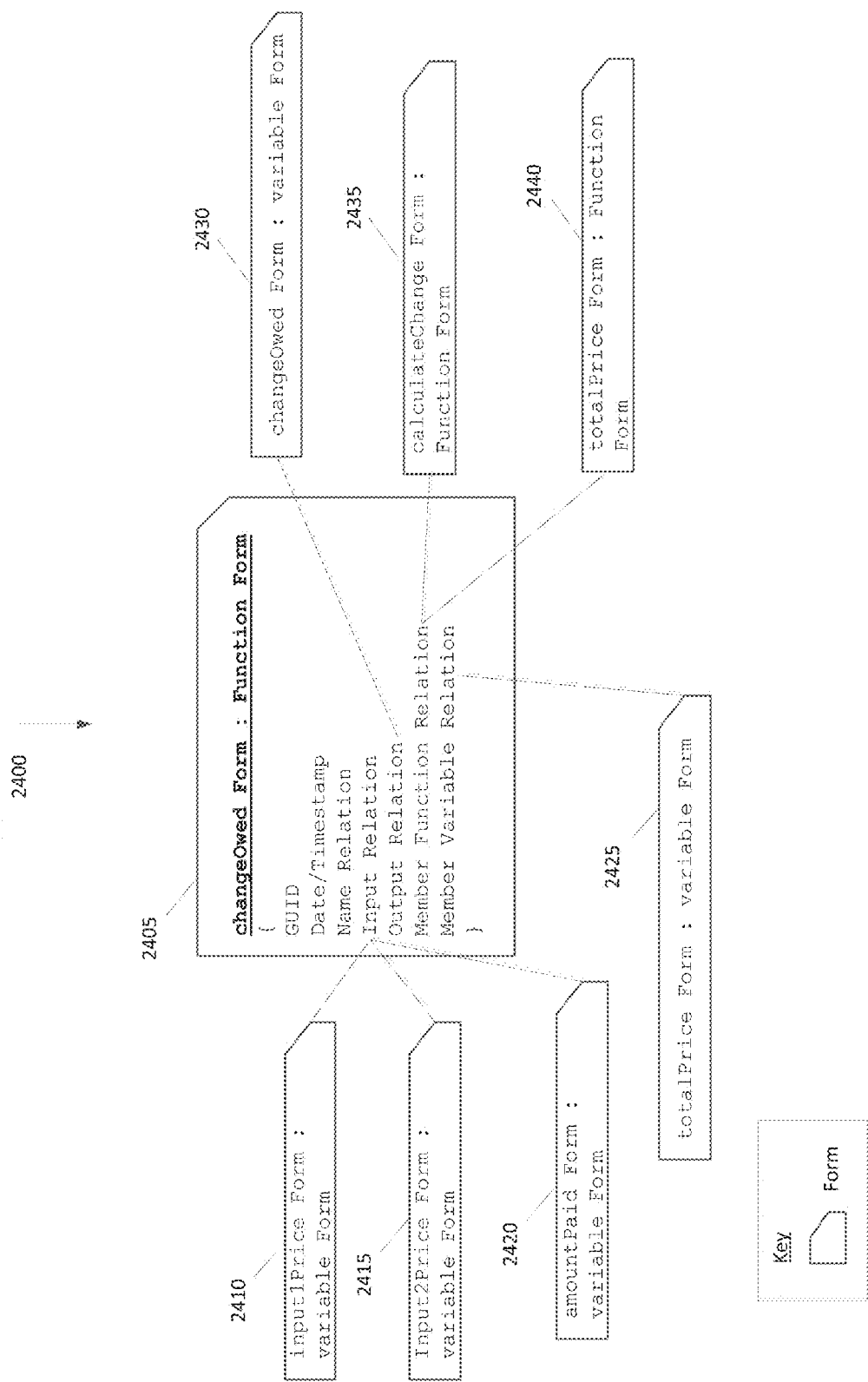
Figure 24. Example Forms Associated with the ChangeOwed() Function

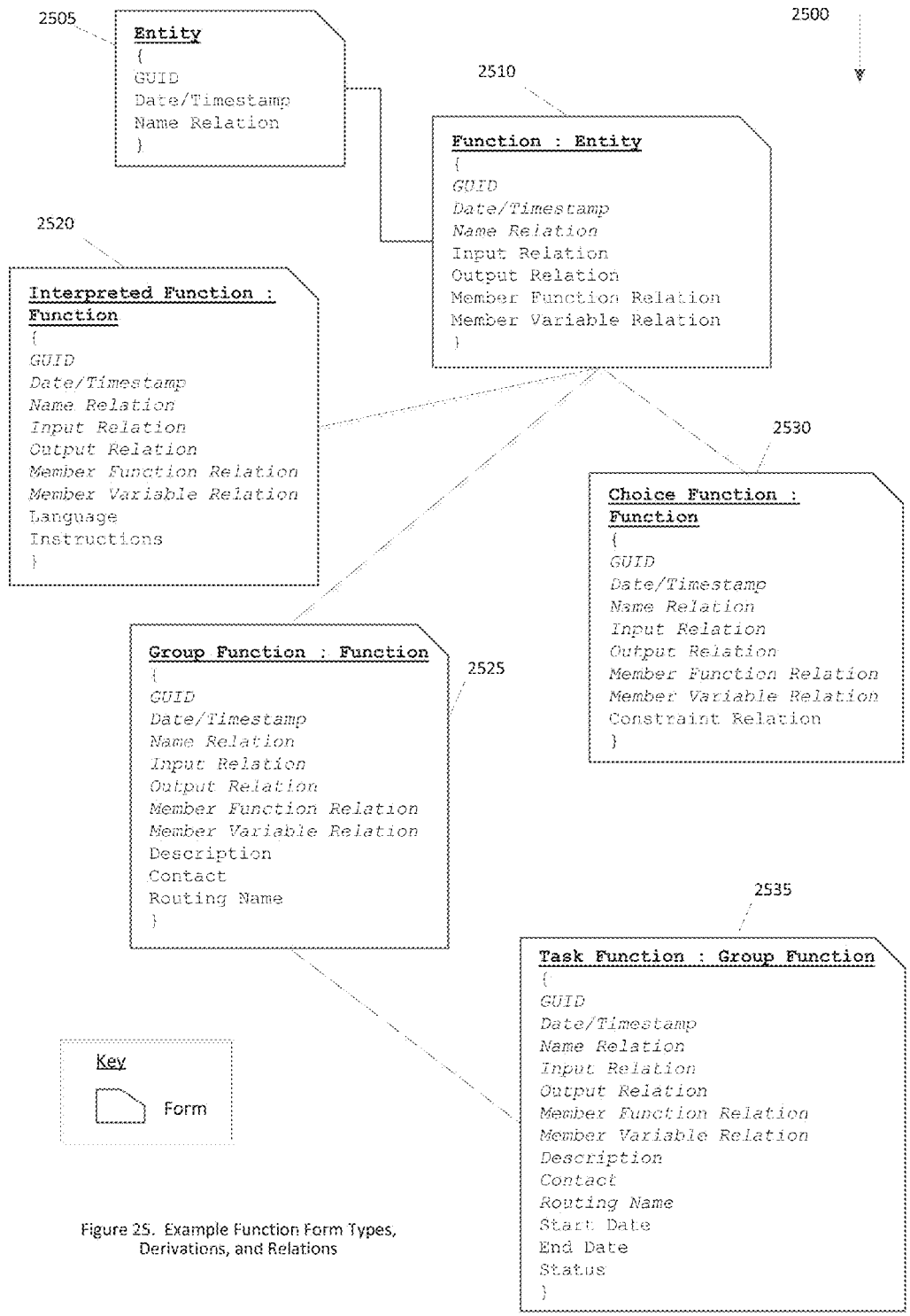
Figure 25. Example Function Form Types, Derivations, and Relations

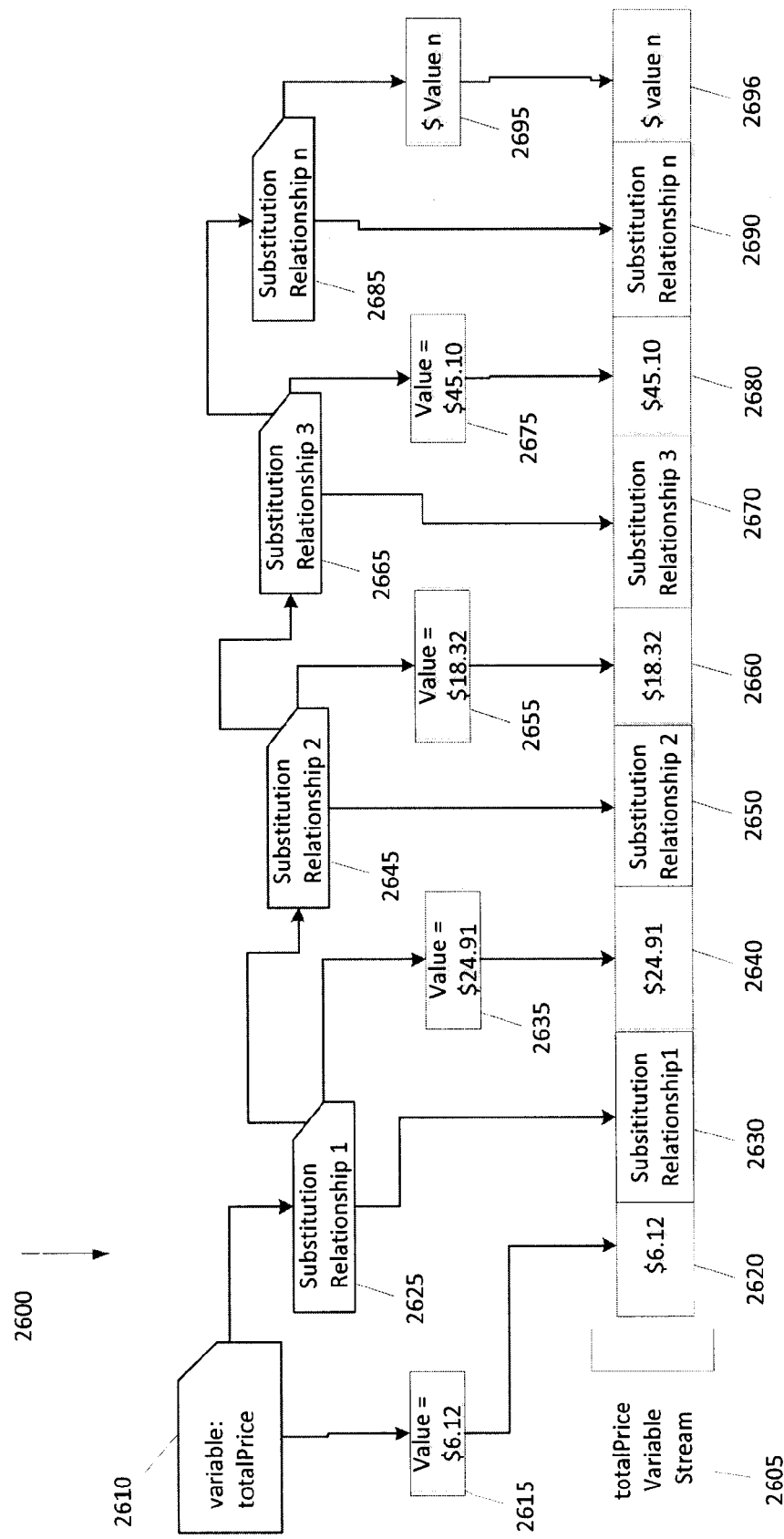
Figure 26. Example Variable Stream

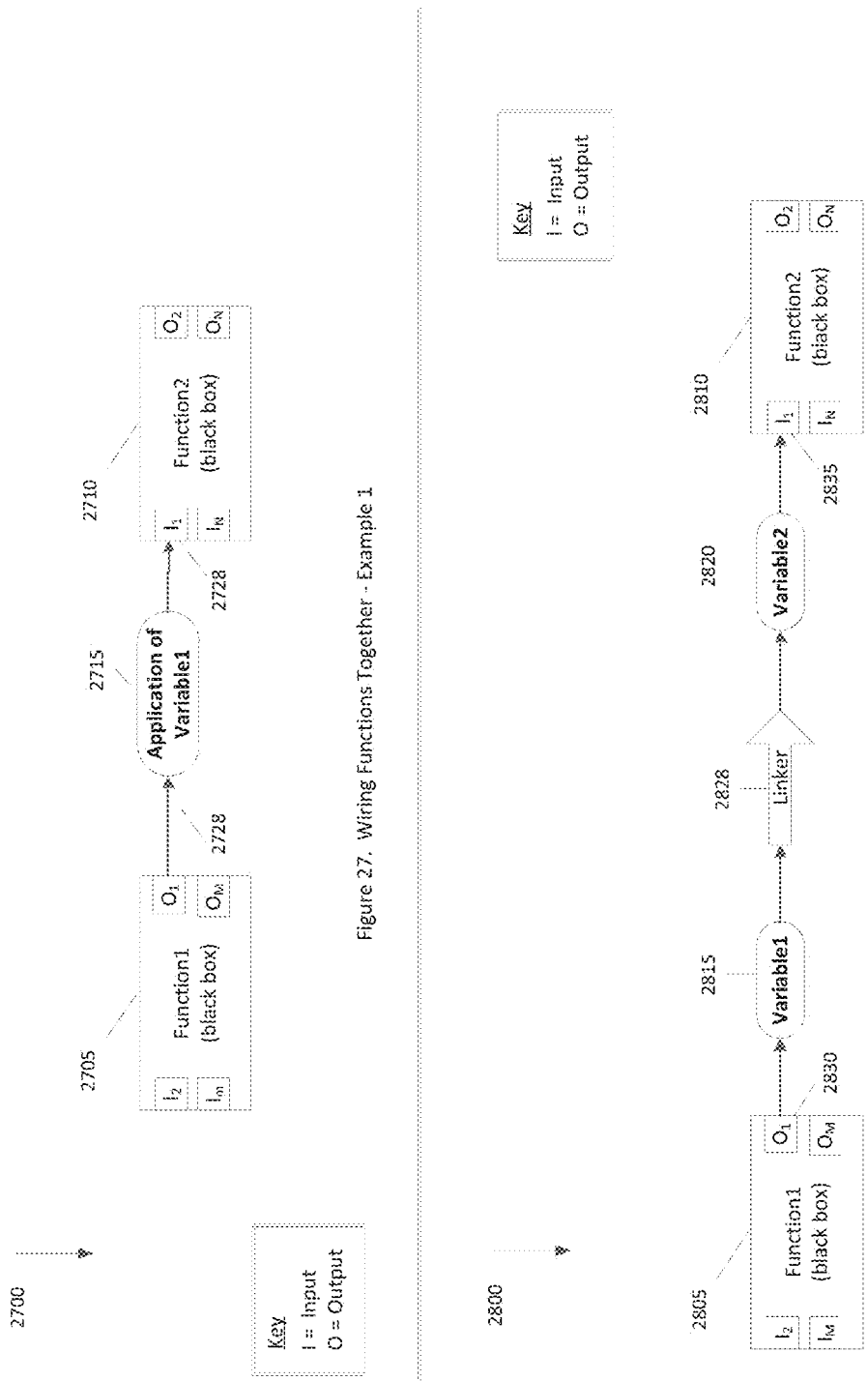

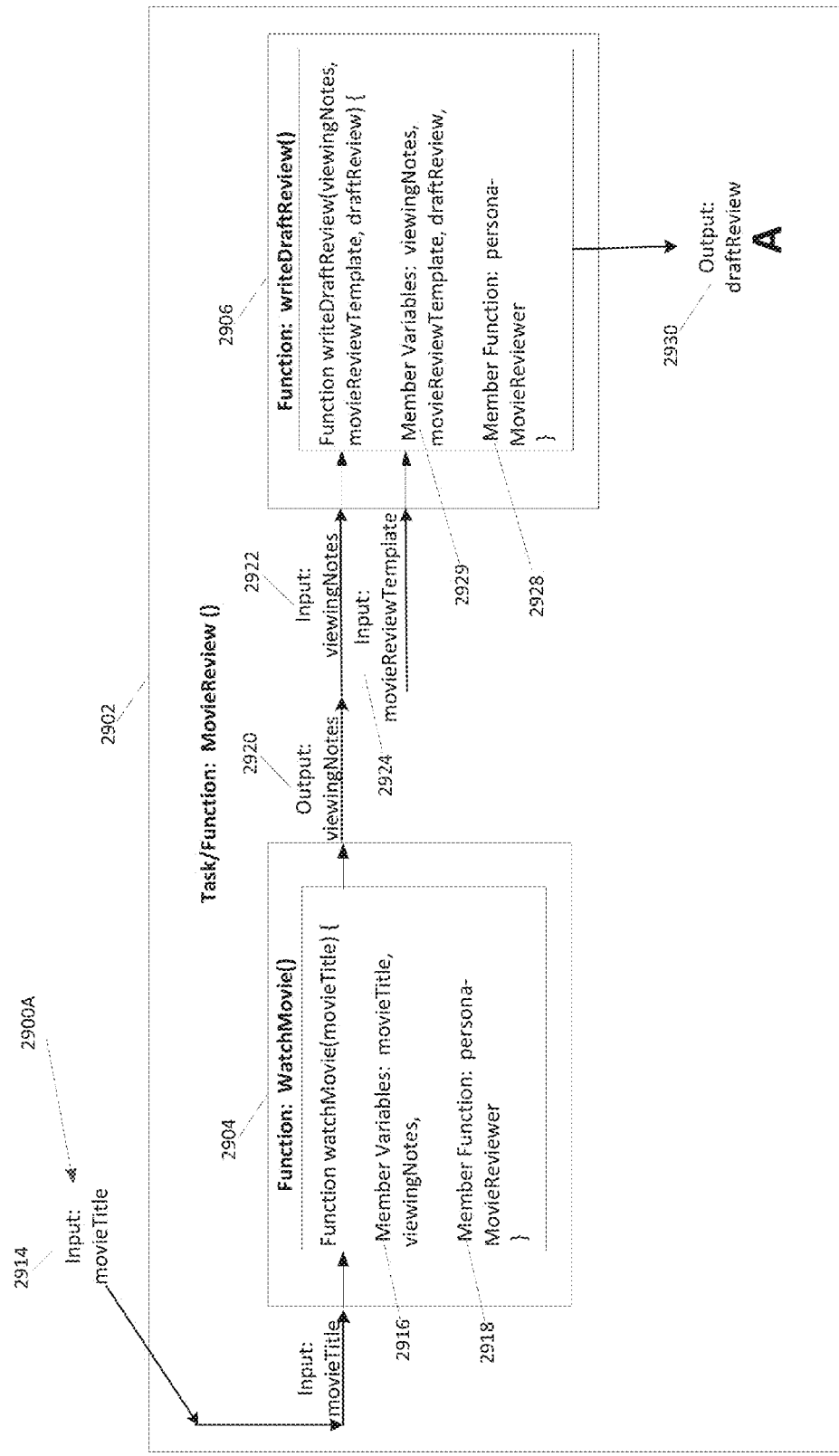
Figure 29A. Function Decomposition for an Example Movie Review

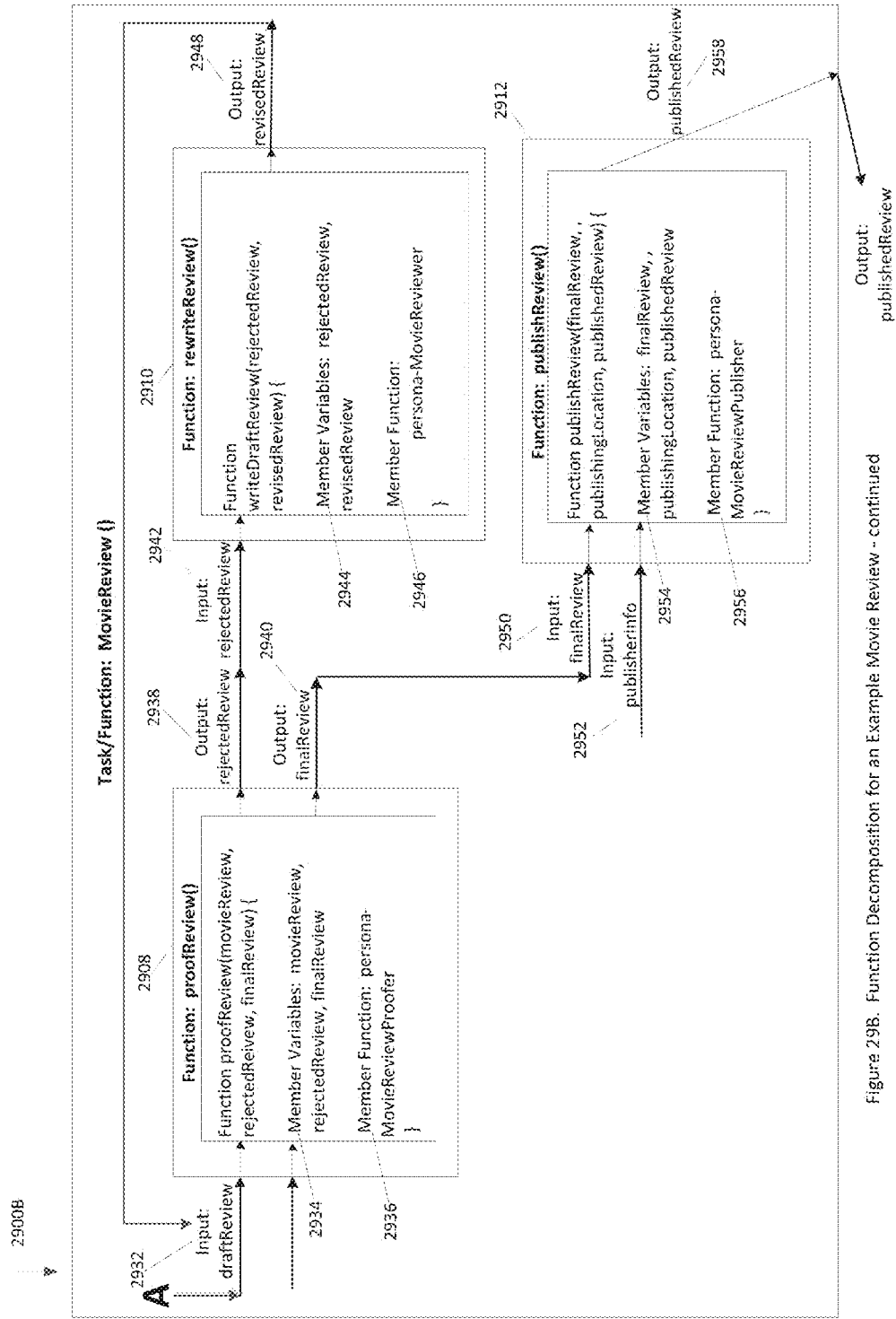
Figure 29B. Function Decomposition for an Example Movie Review - continued

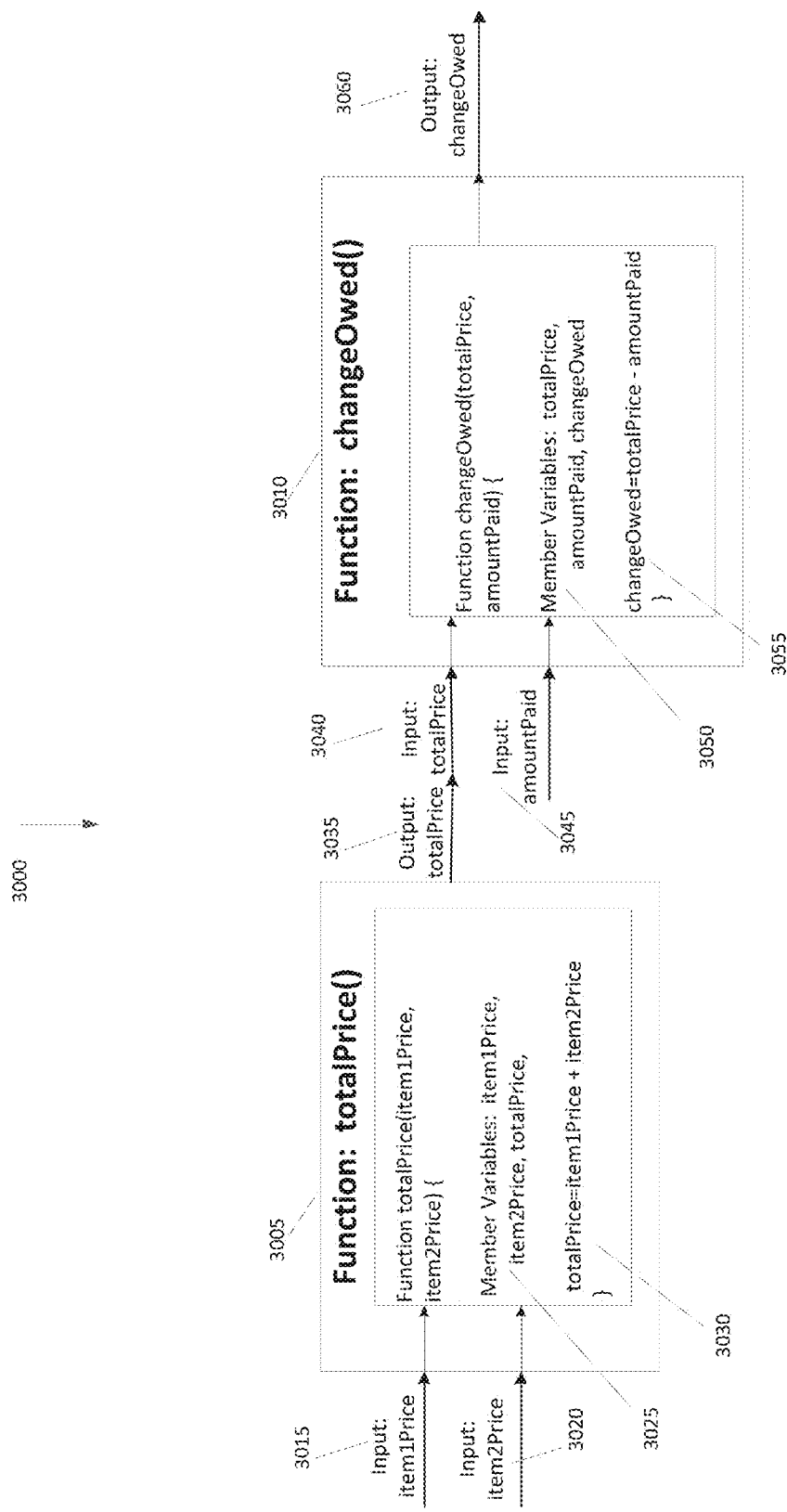
Figure 30. Alternative implementation of totalPrice() and changeOwed() Functions

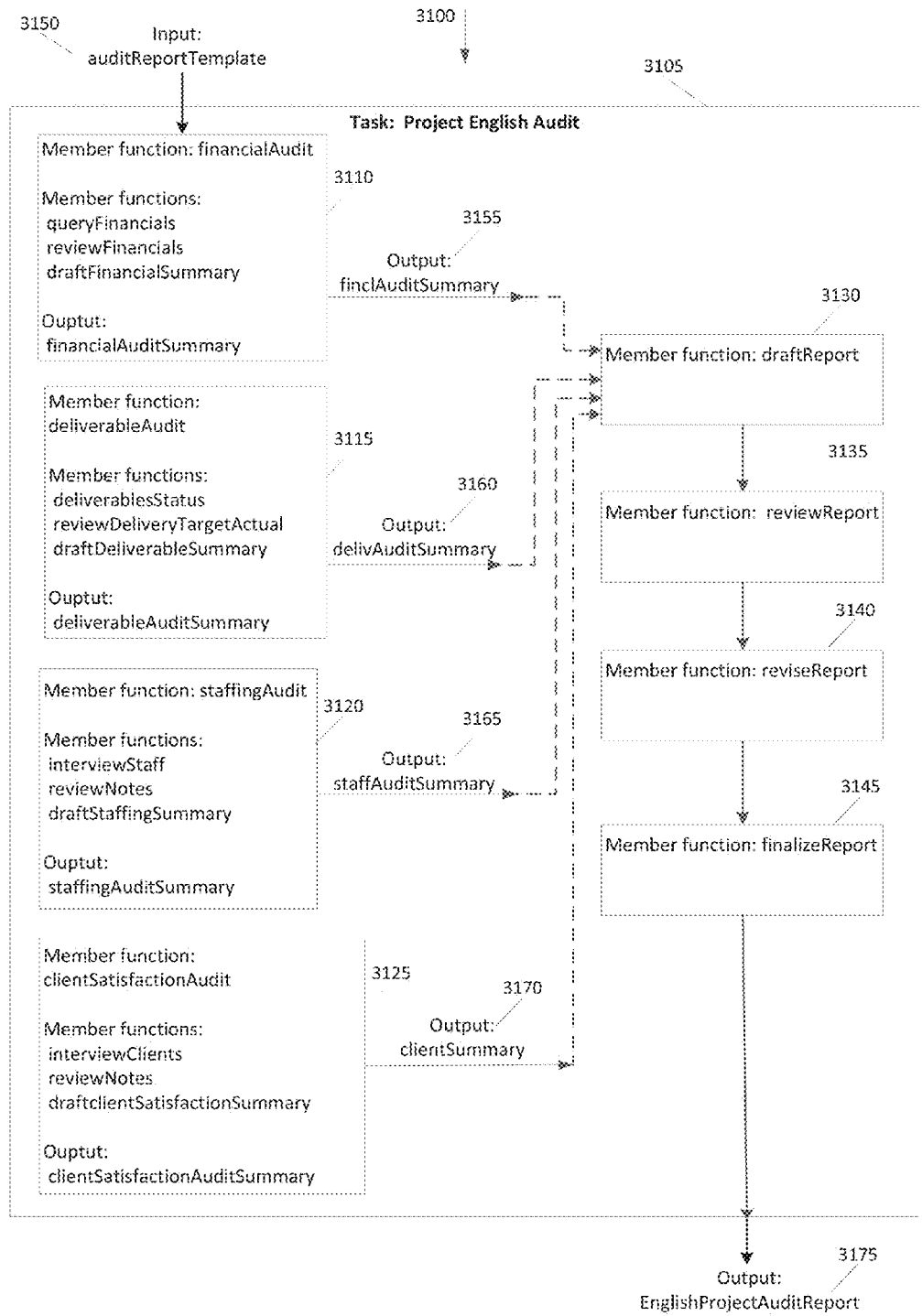
Figure 31. Task Decomposition and Serial/Parallel Execution

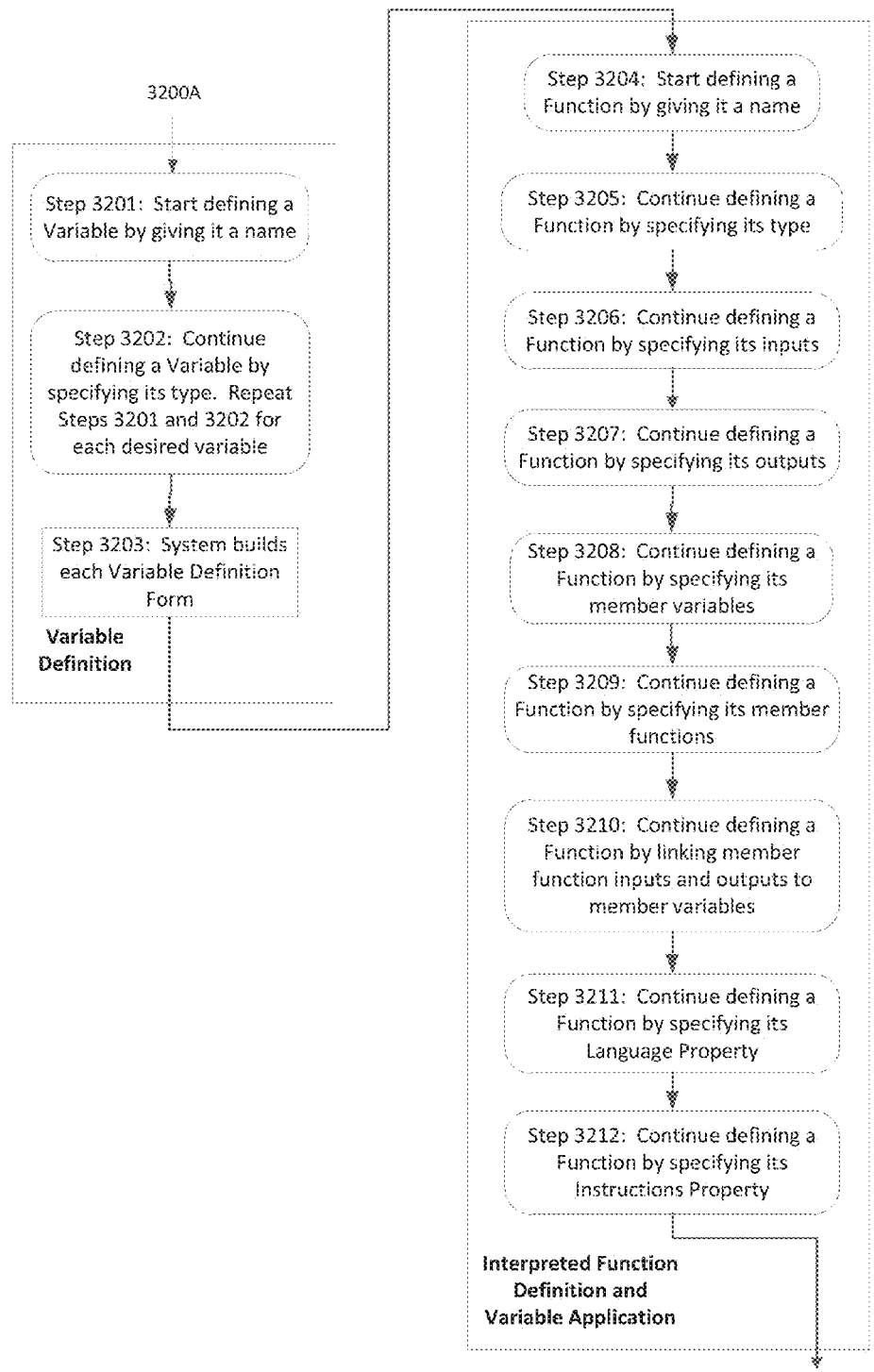
Figure 32A. Example Variable and Function Definition, Application, and Instantiation

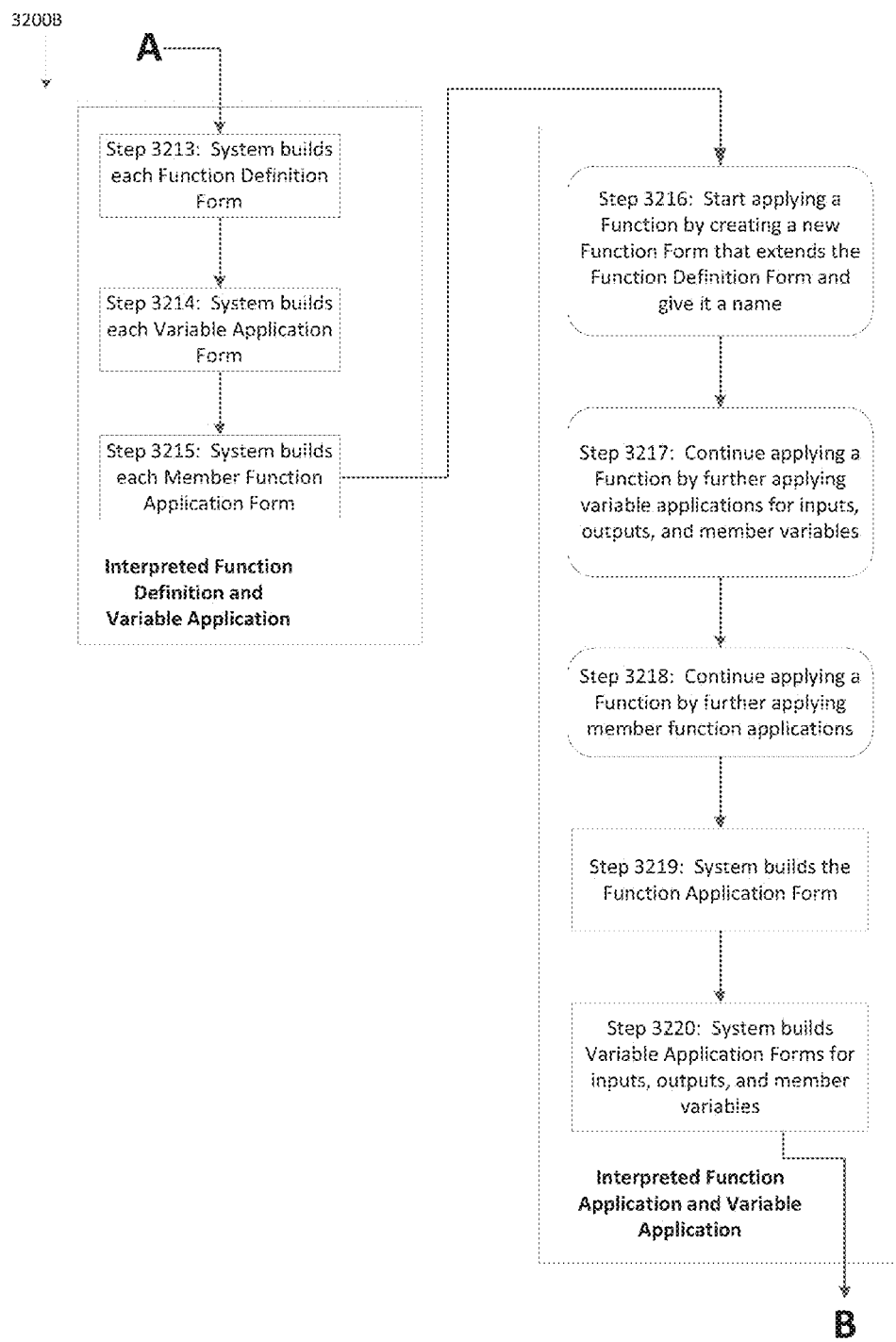
Figure 32B. Example Variable and Function Definition, Application, and Instantiation - continued

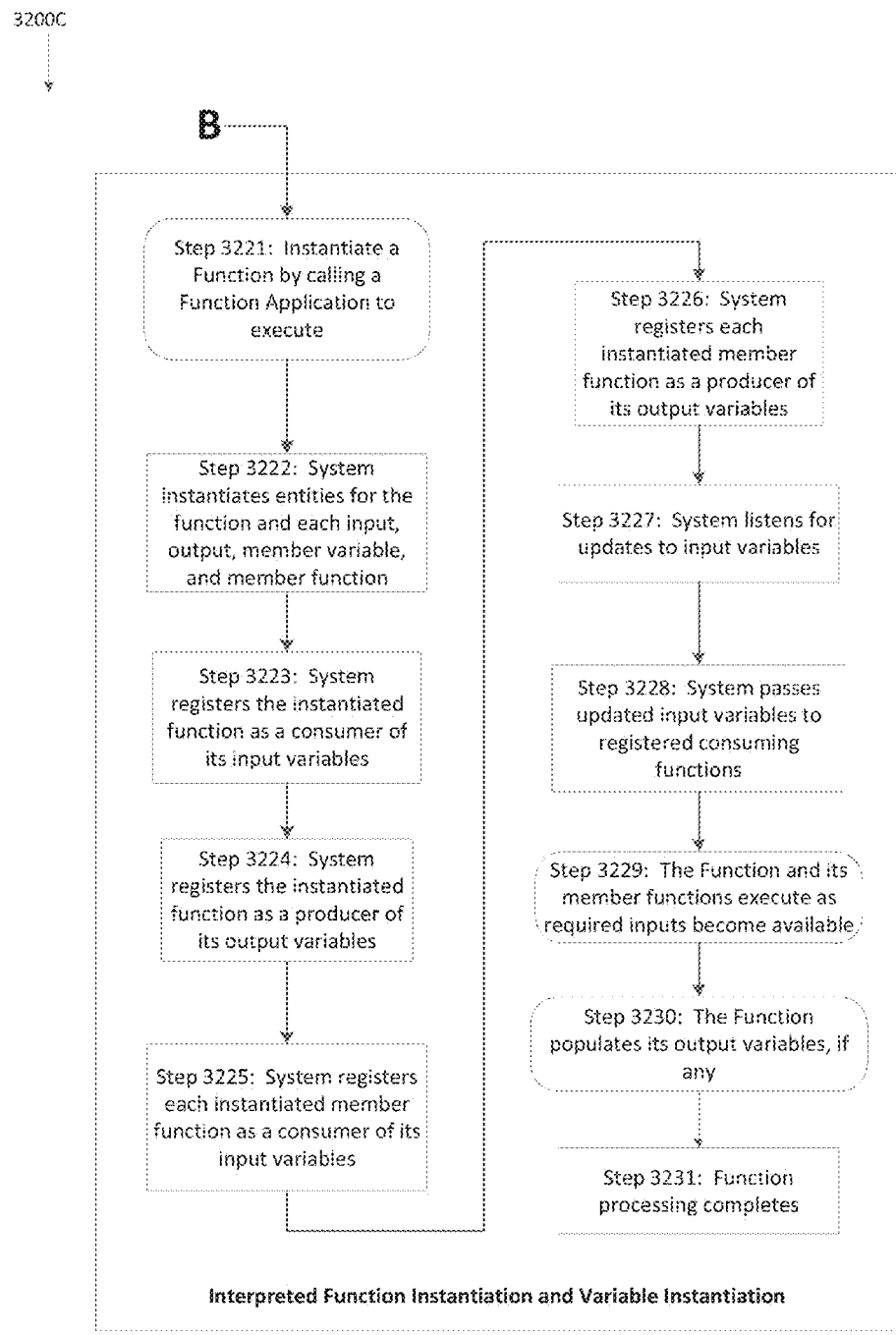
Figure 32C. Example Variable and Function Definition, Application, and Instantiation - continued

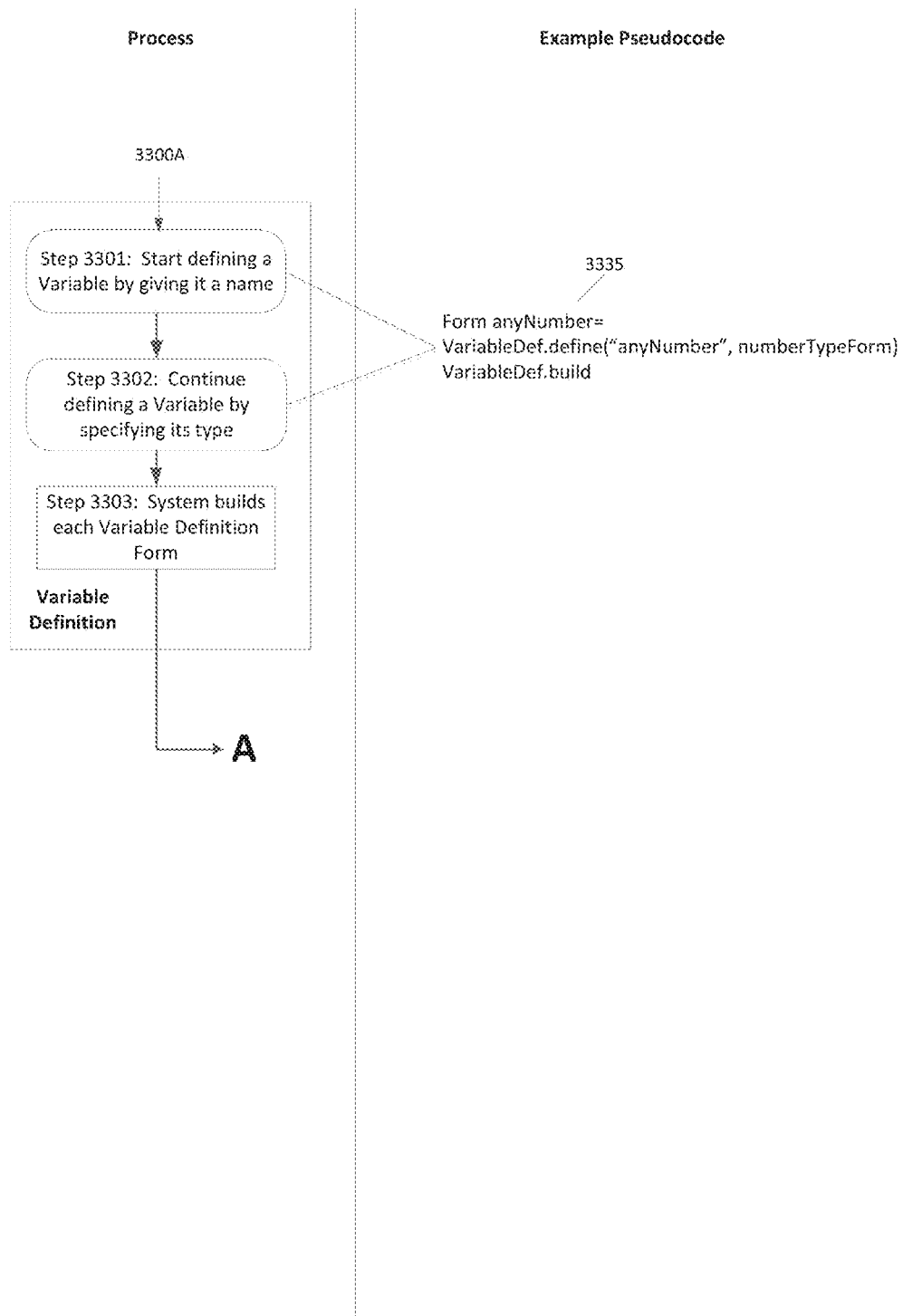
Figure 33A. Example Variable and Function Definition, Application, and Instantiation

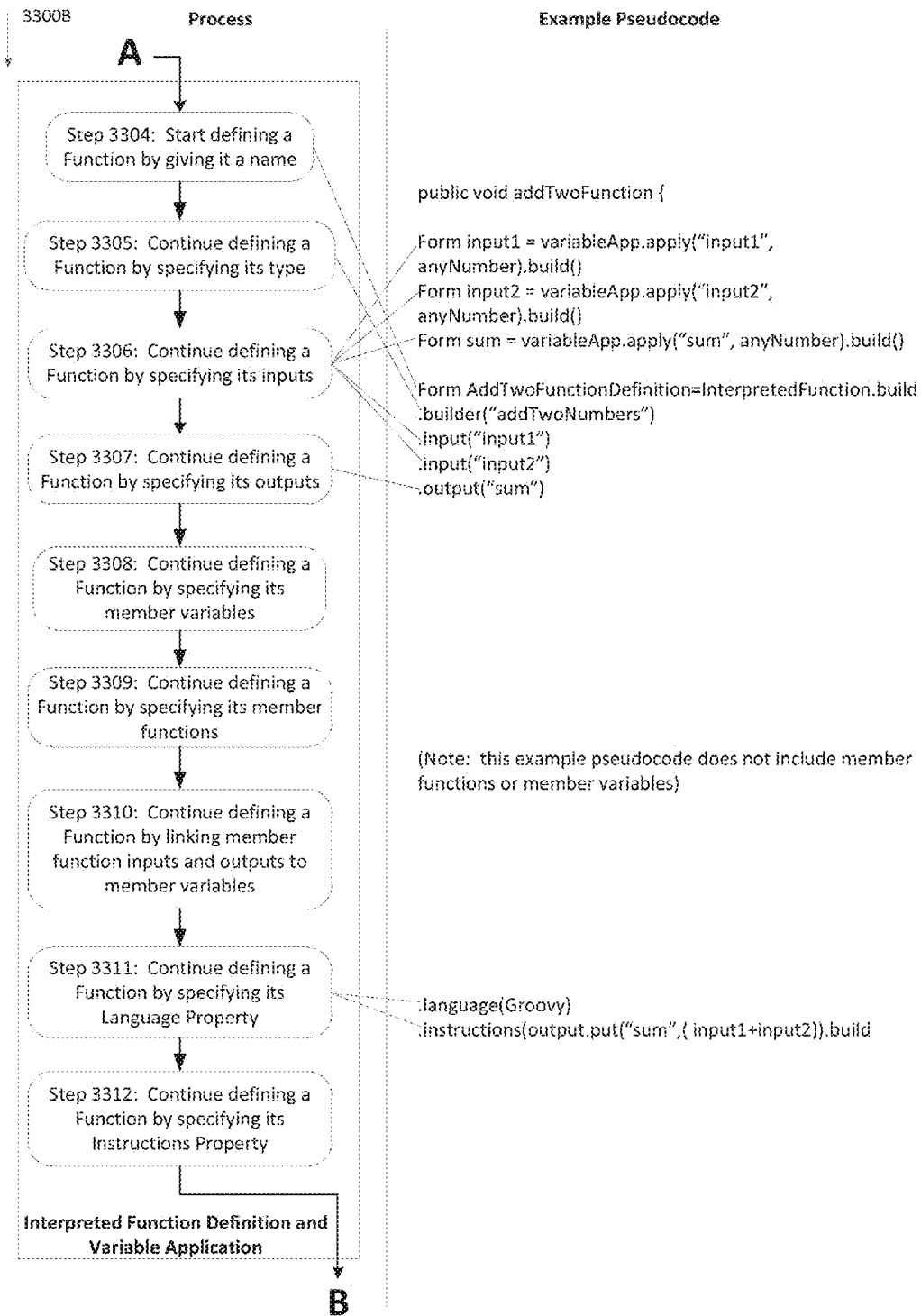
Figure 33B. Example Variable and Function Definition, Application, and Instantiation - continued

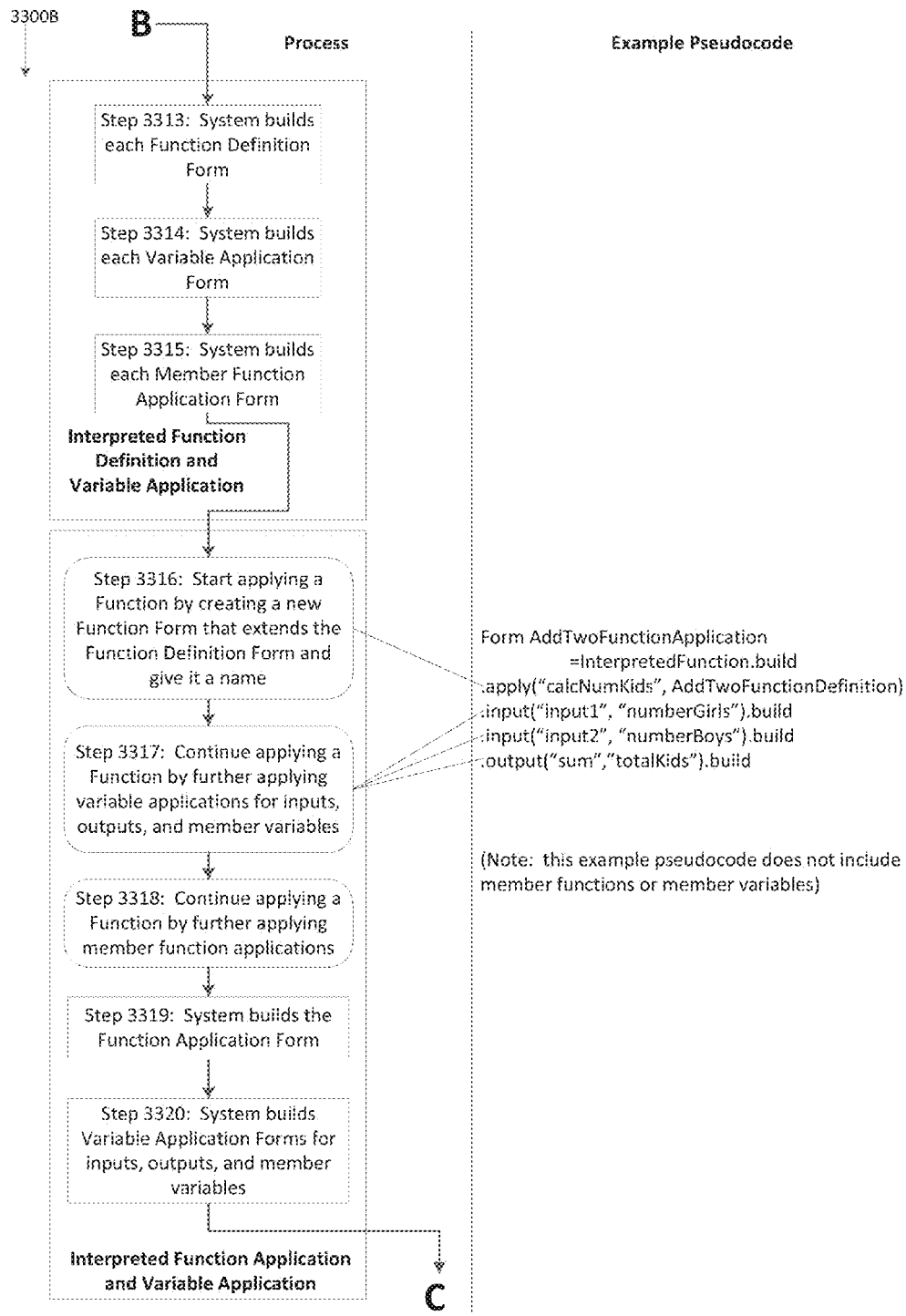
Figure 33C. Example Variable and Function Definition, Application, and Instantiation - continued

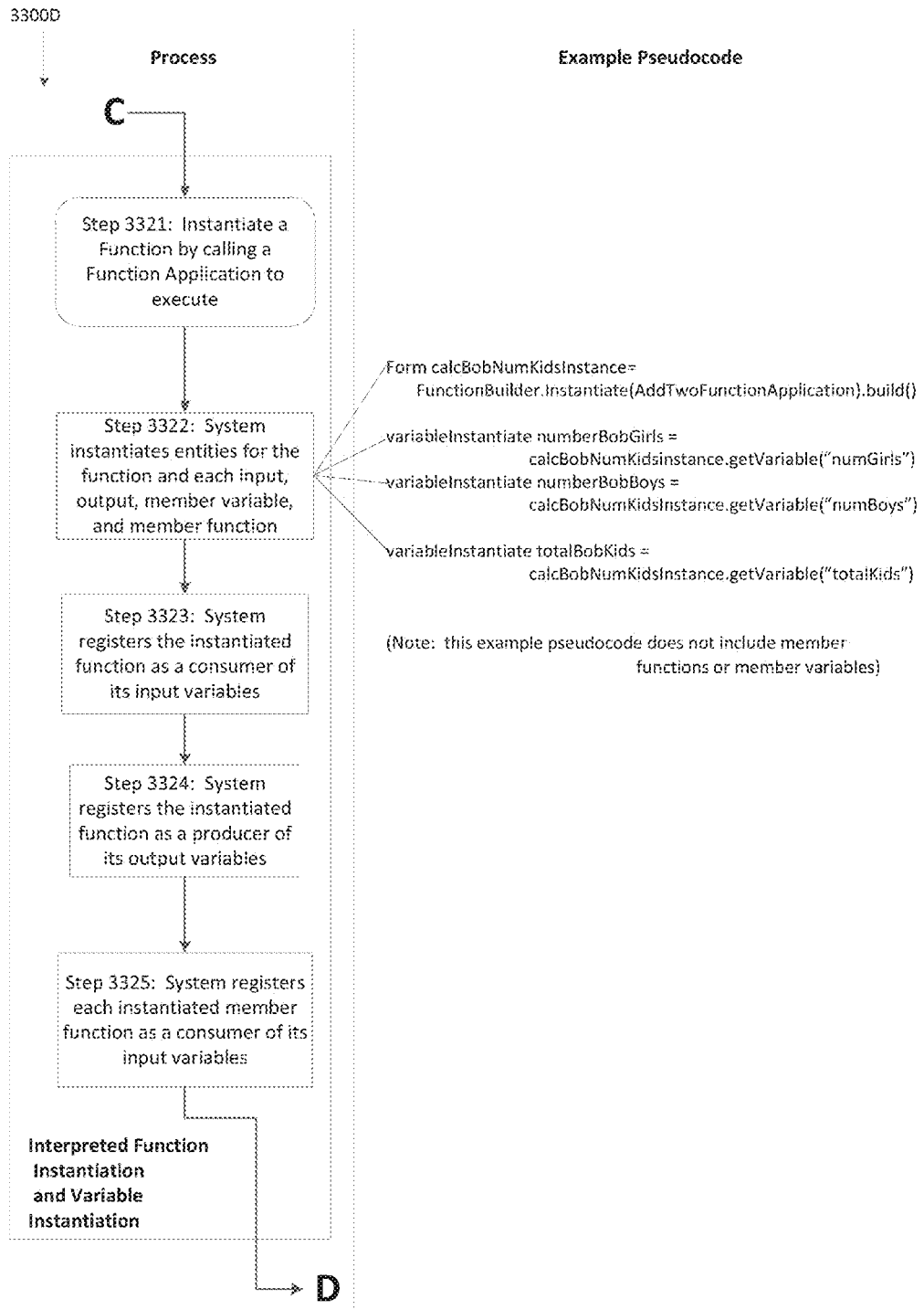
Figure 33D. Example Variable and Function Definition, Application, and Instantiation - continued

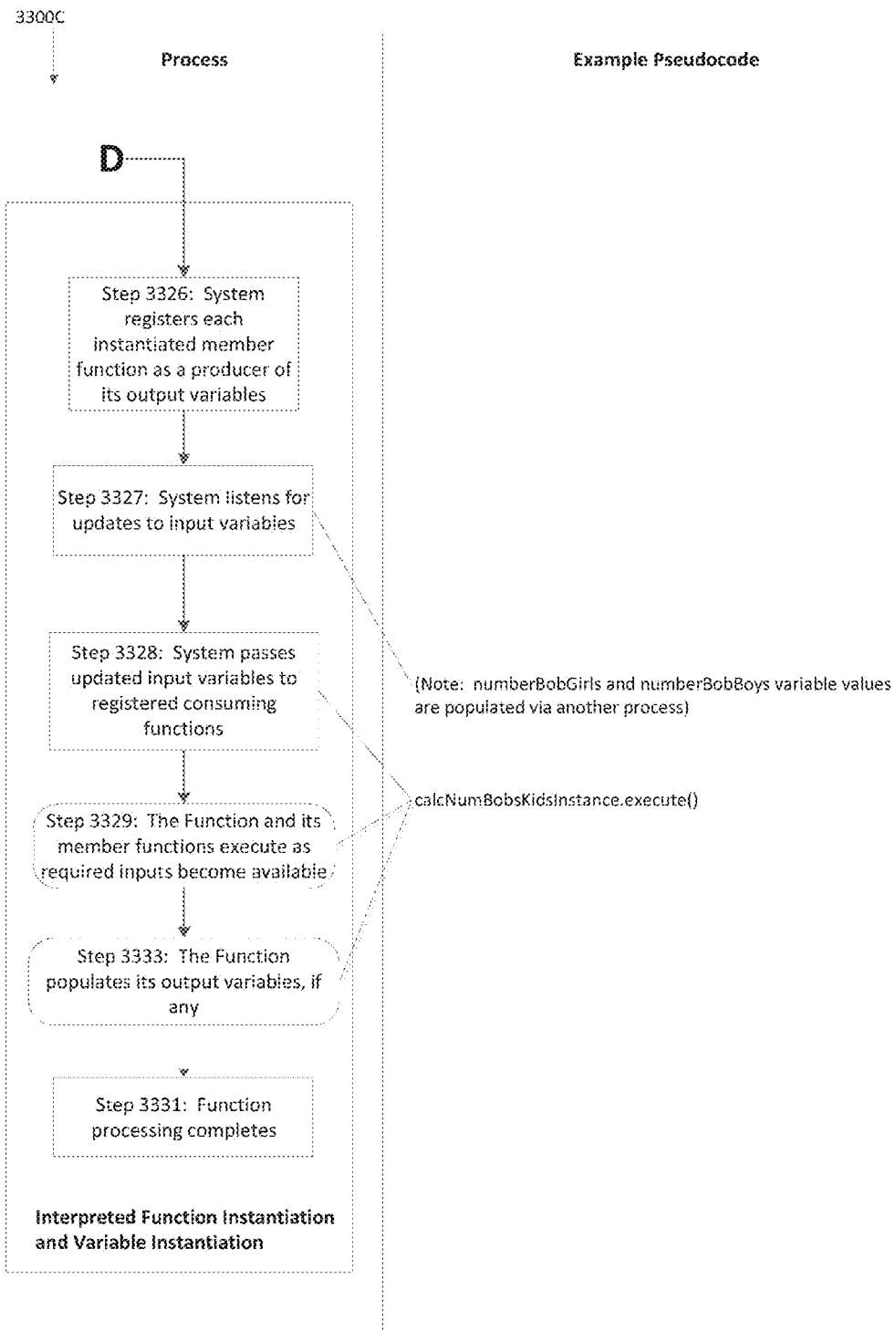
Figure 33E. Example Variable and Function Definition, Application, and Instantiation - continued

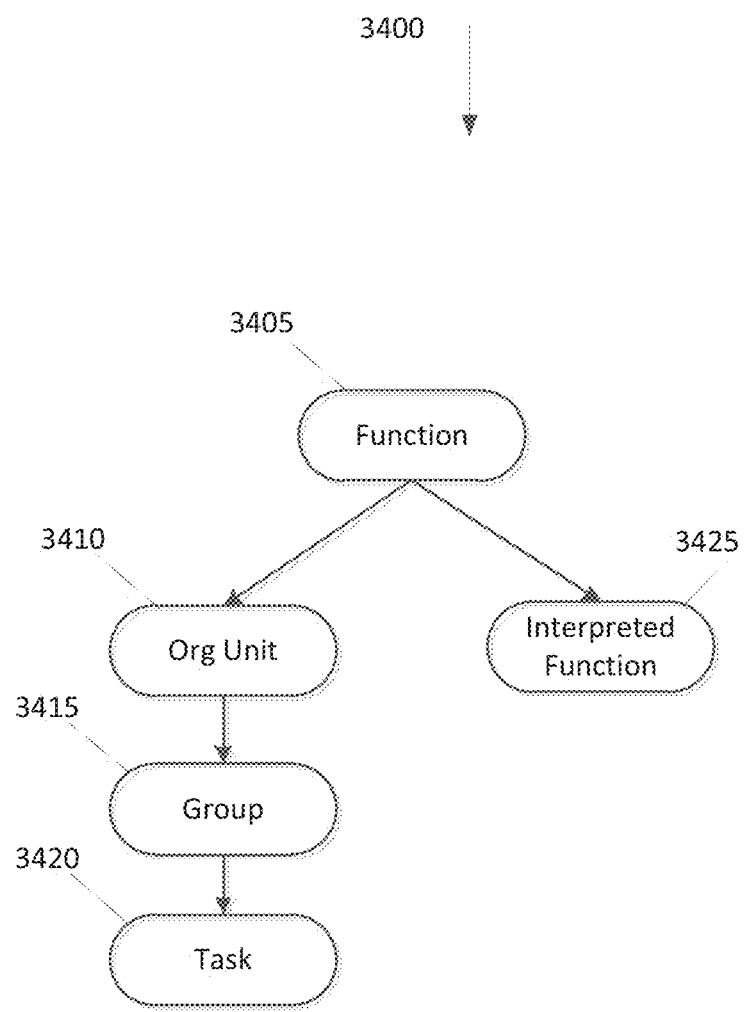
Figure 34. Derivation Hierarchy for Task

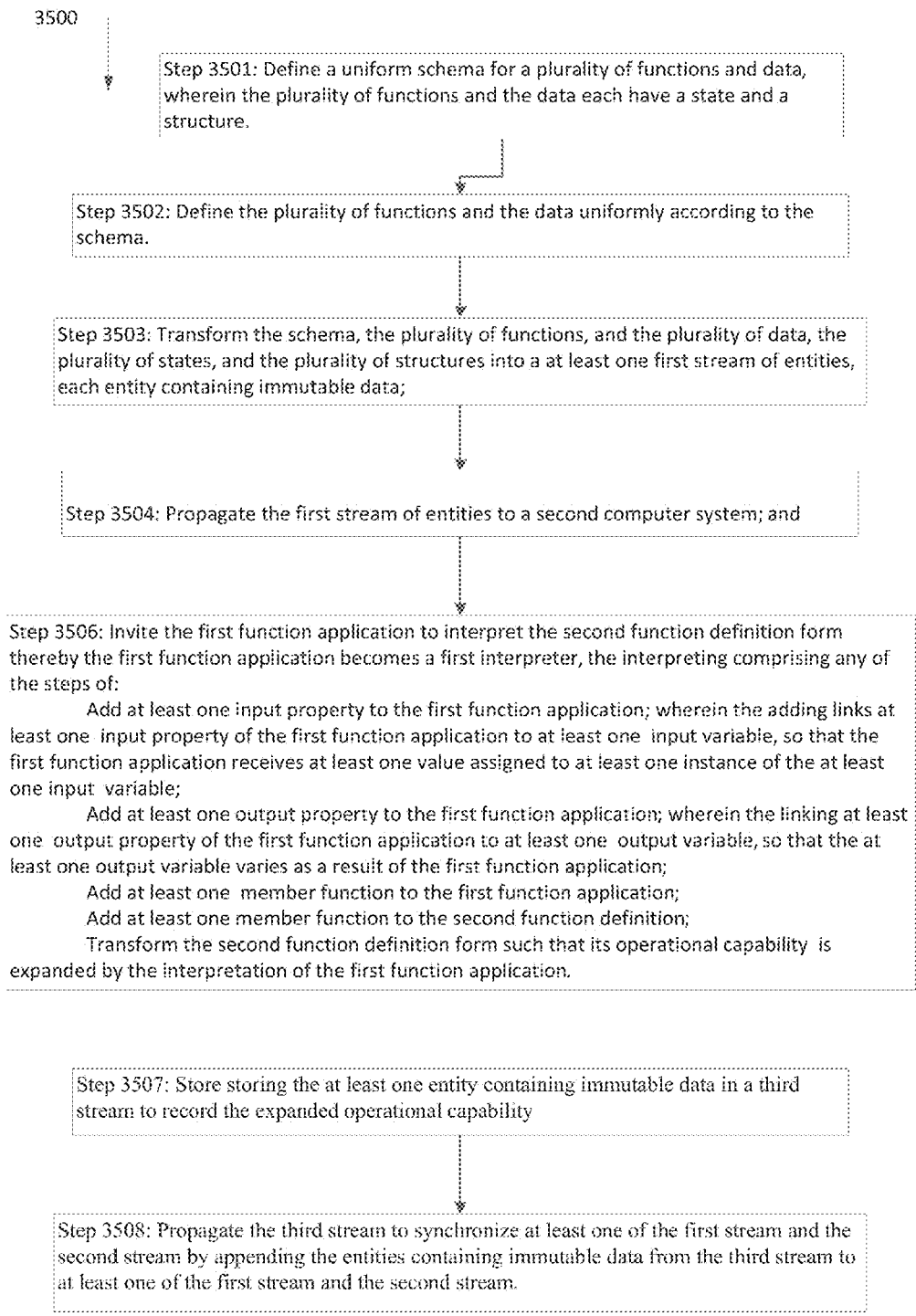
Figure 35. Differentiating Functions as Streams

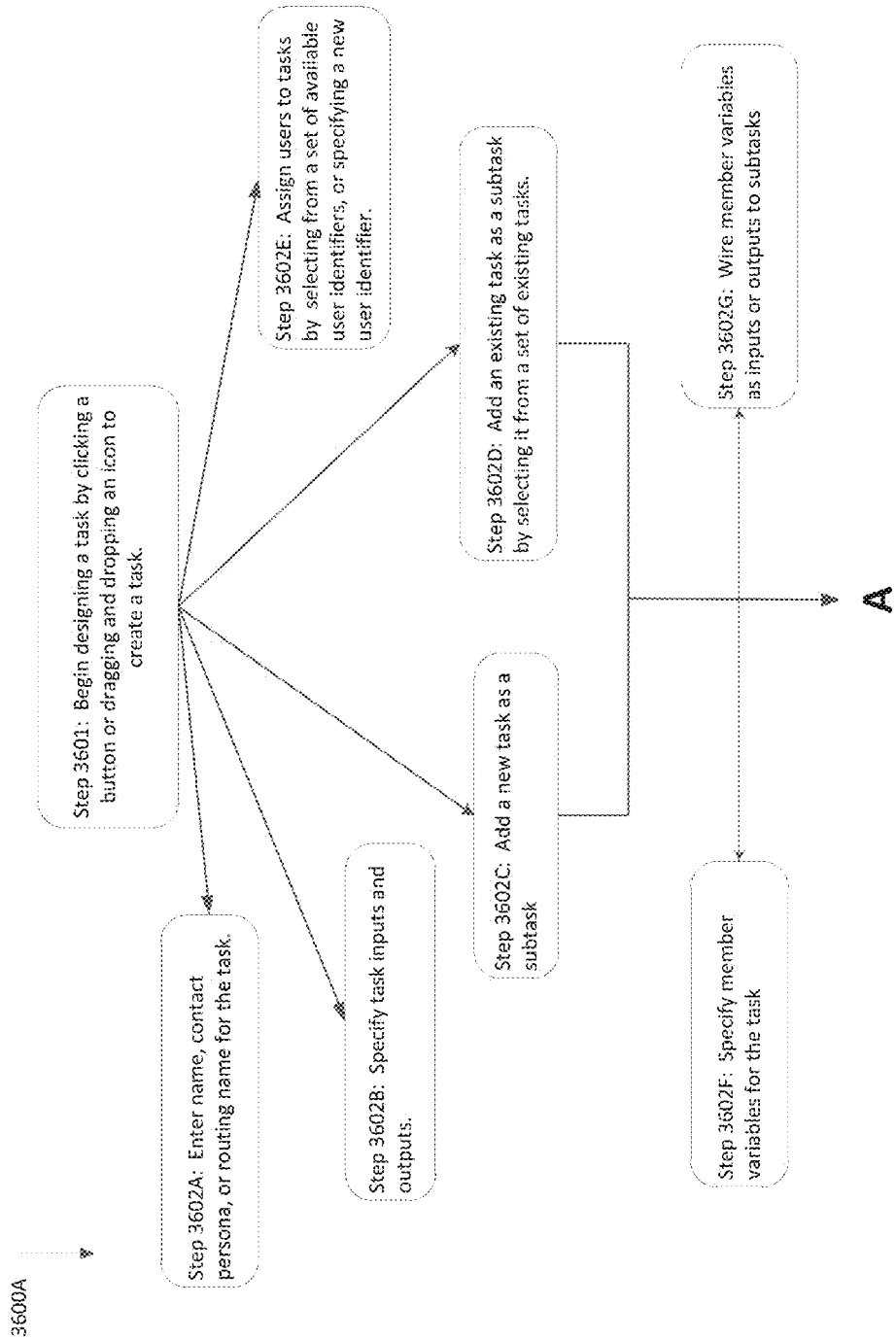
Figure 36A. Example Task Definition, Application, Instantiation Flow

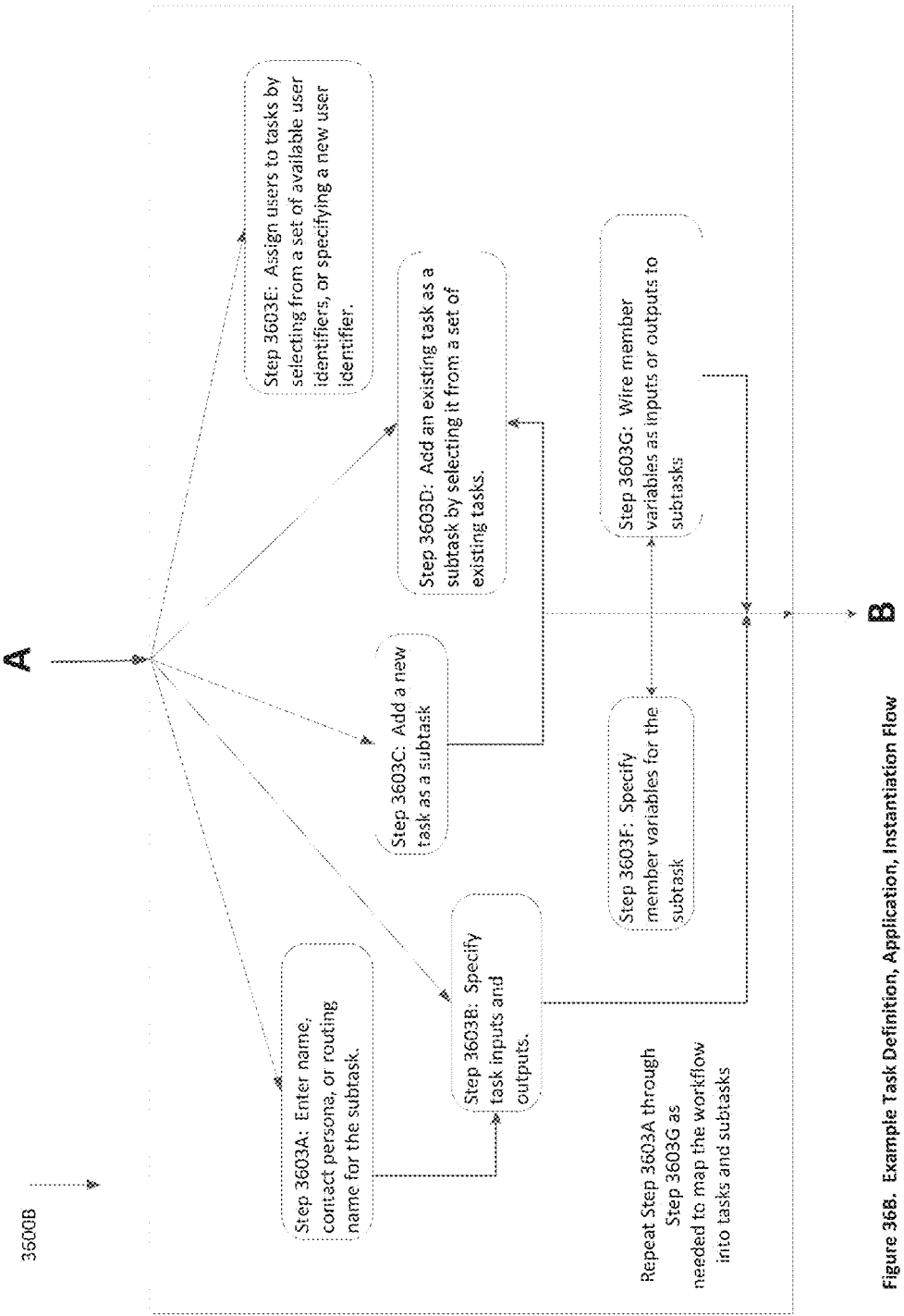
Figure 36B. Example Task Definition, Application, Instantiation Flow

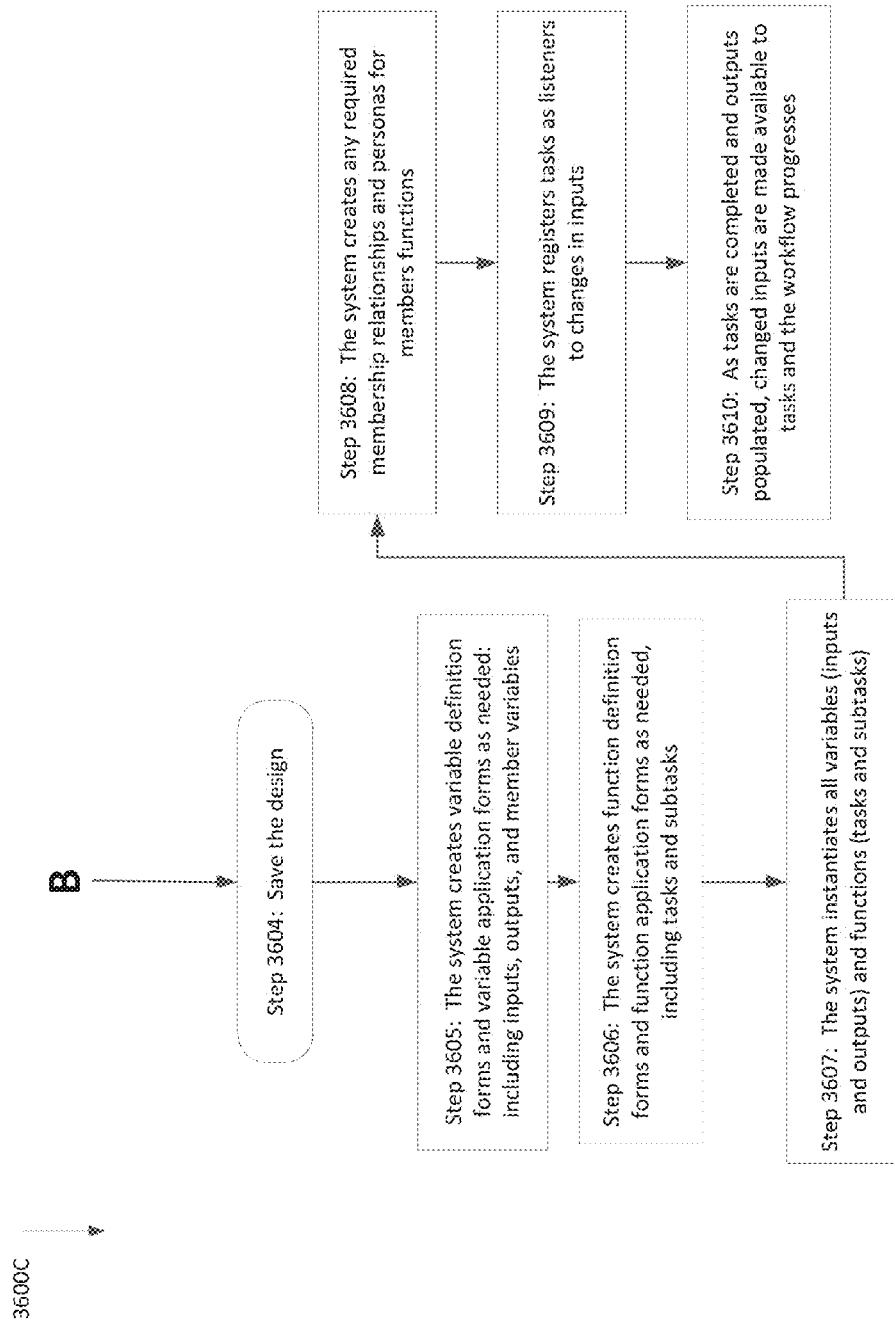
Figure. 36C. Example Task Definition, Application, Instantiation Flow

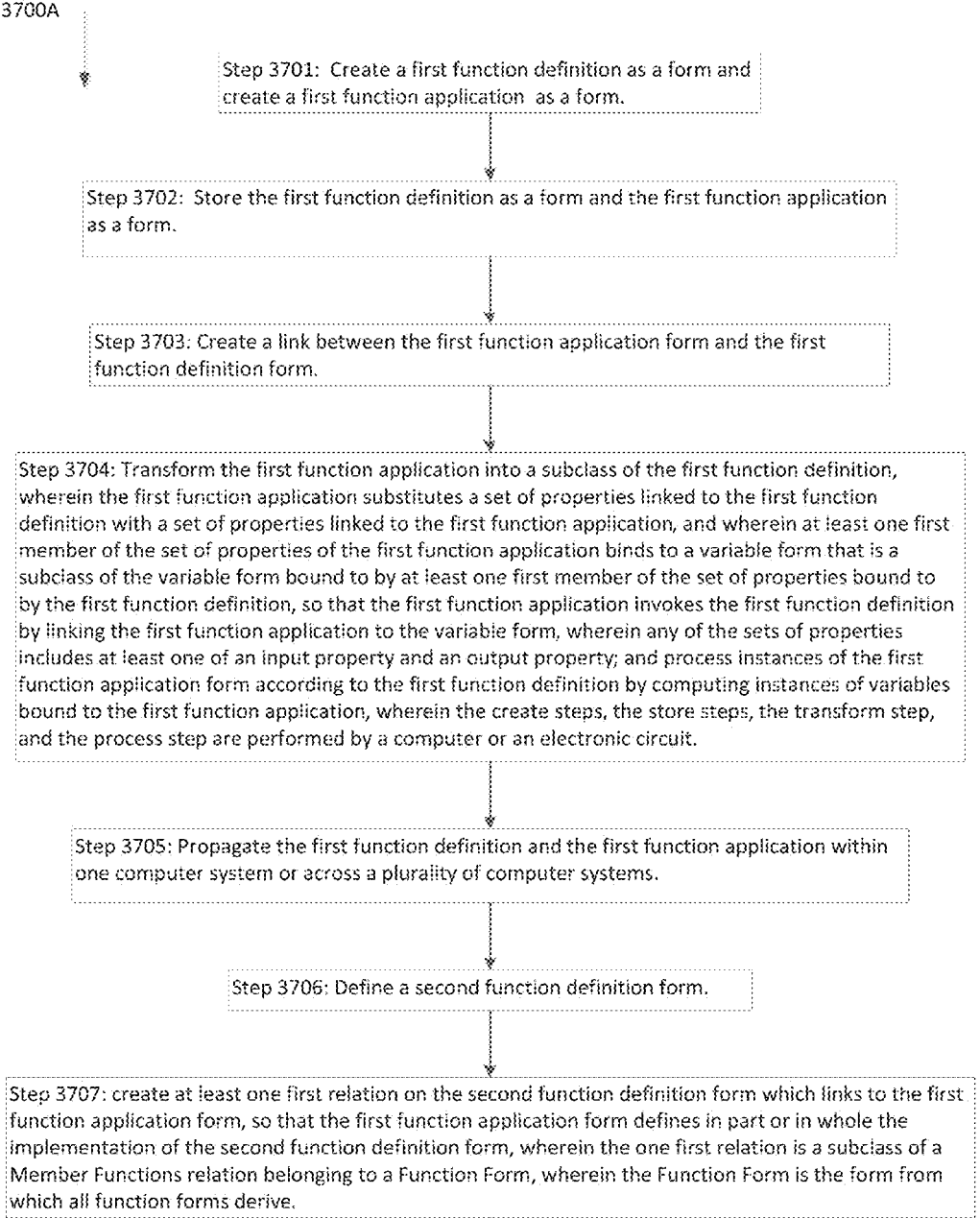
Figure 37A. Uniform Representation of Program Structure as Forms and Implementing as Multiple Entity Instances

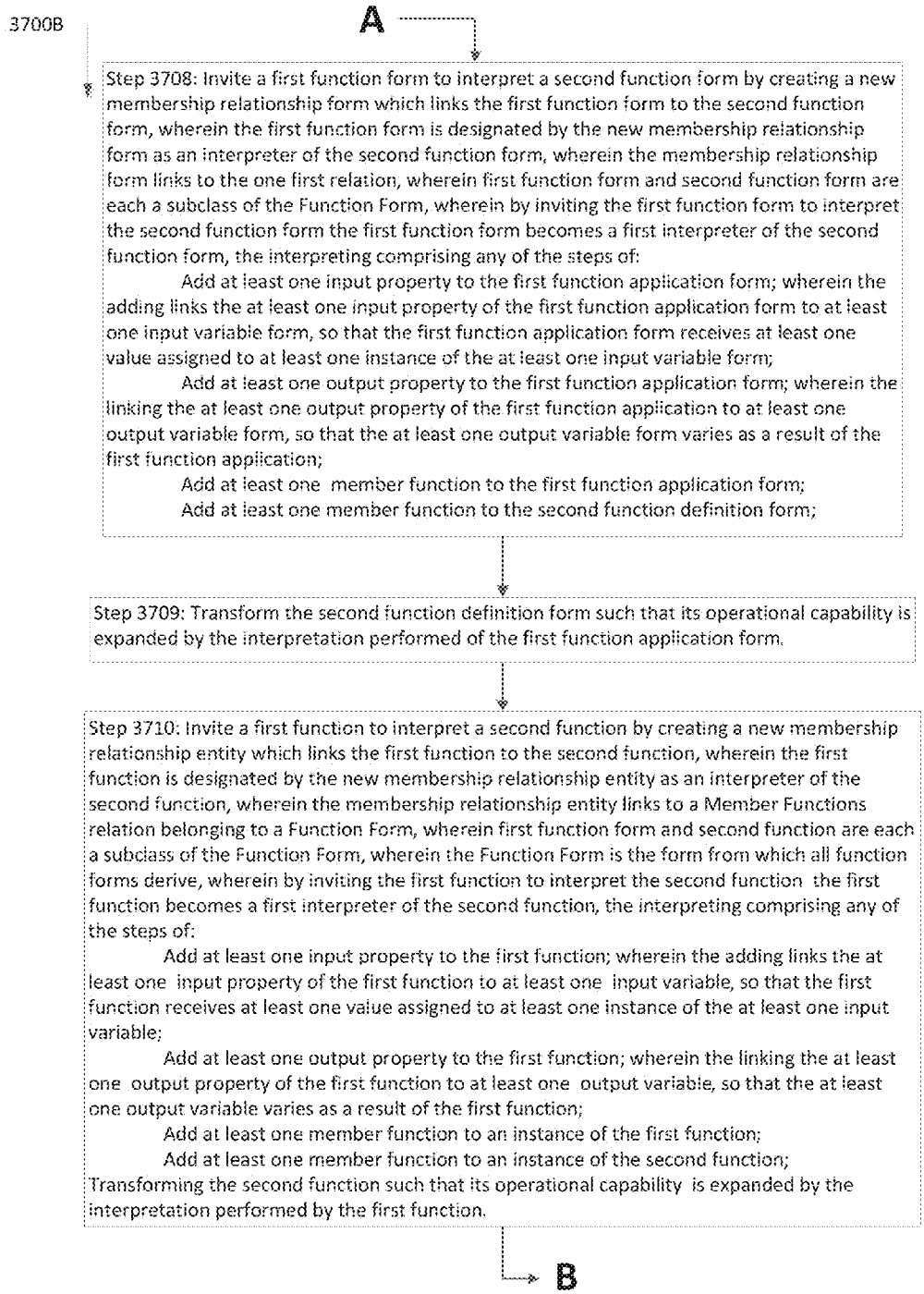
Figure 37B. Uniform Representation of Program Structure as Forms and Implementing as Multiple Entity Instances - continued

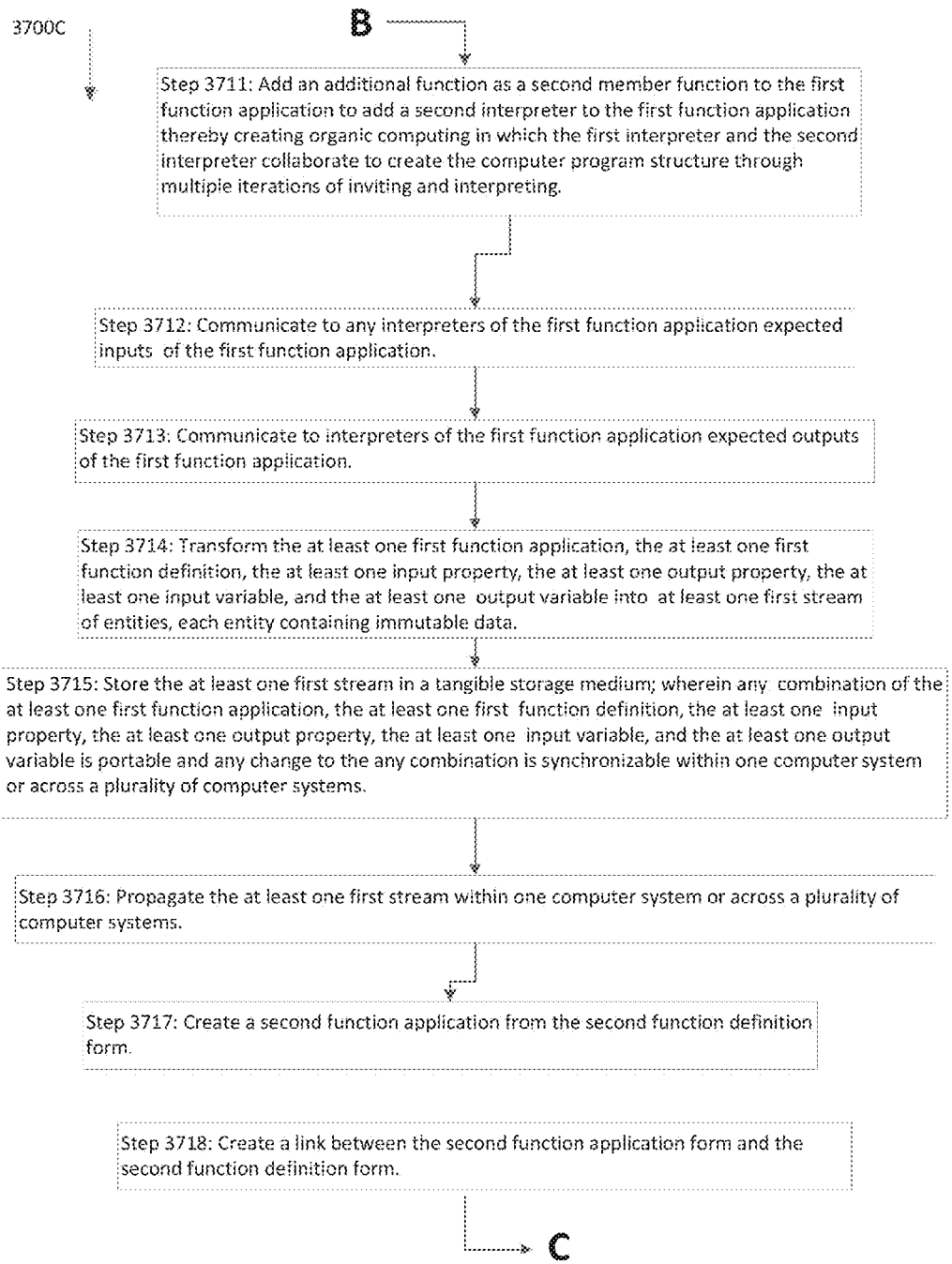
Figure 37C. Uniform Representation of Program Structure as Forms and Implementing as Multiple Entity Instances - continued

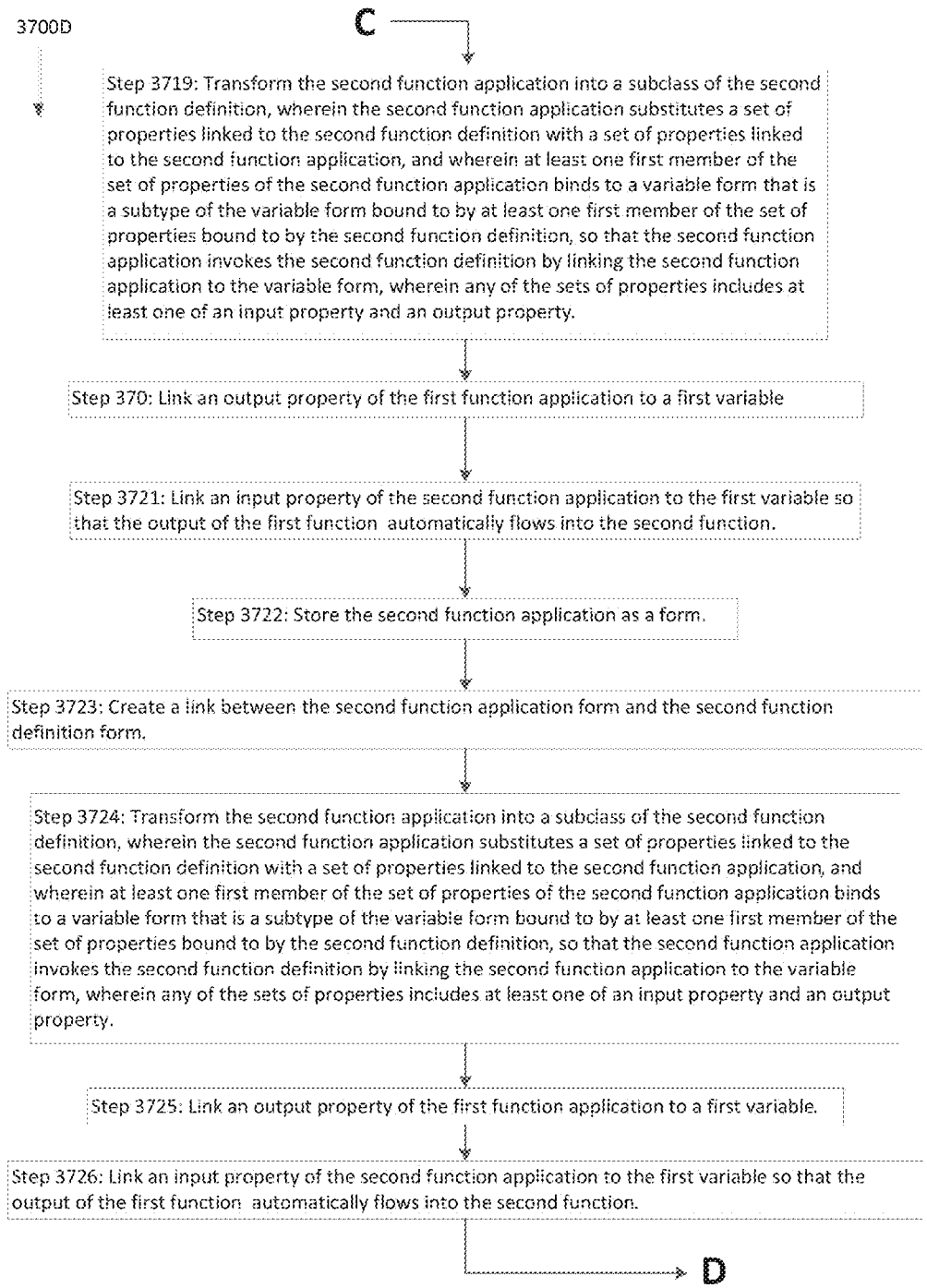
Figure 37D. Uniform Representation of Program Structure as Forms and Implementing as Multiple Entity Instances - continued

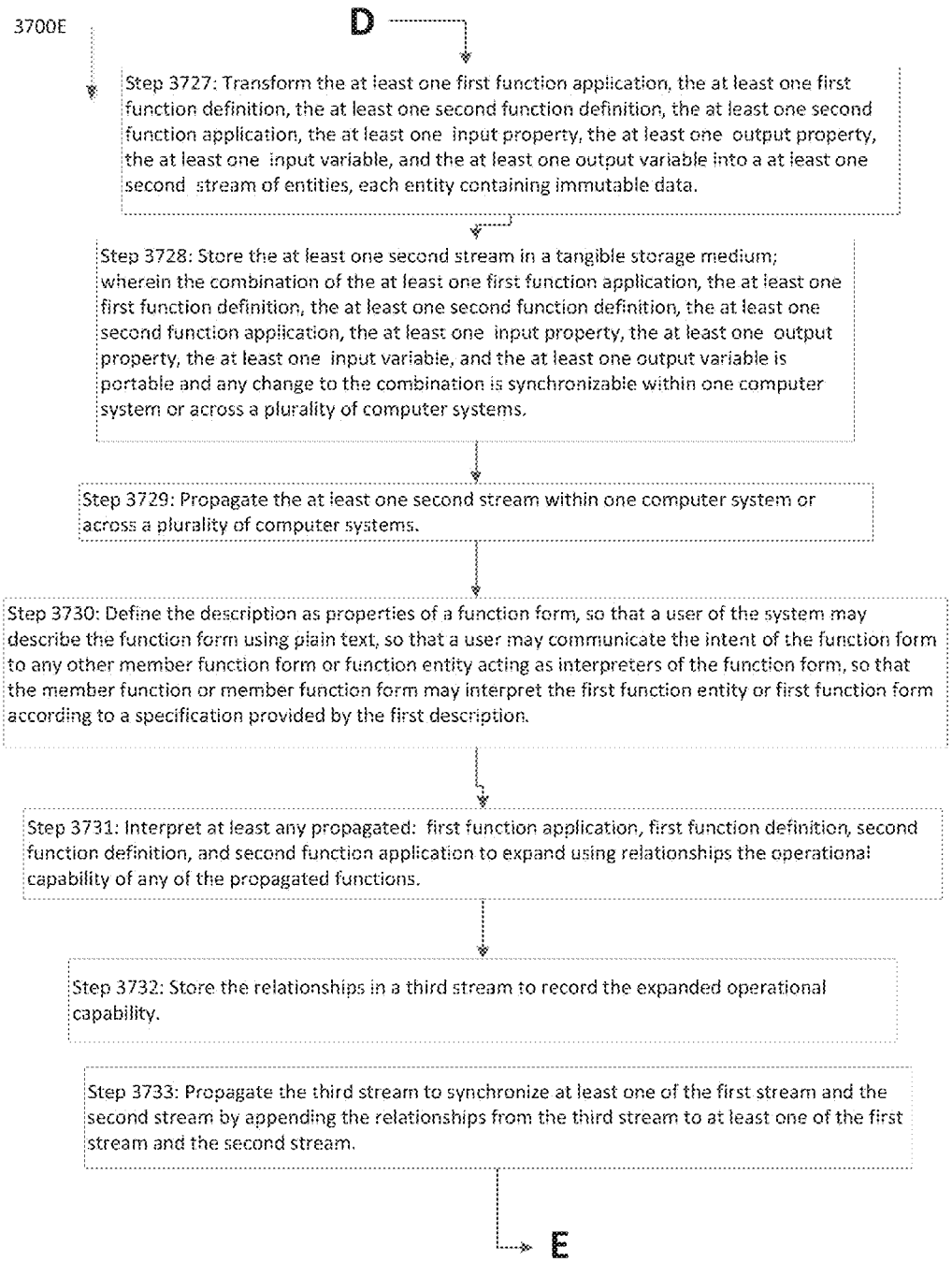
Figure 37E. Uniform Representation of Program Structure as Forms and Implementing as Multiple Entity Instances - continued

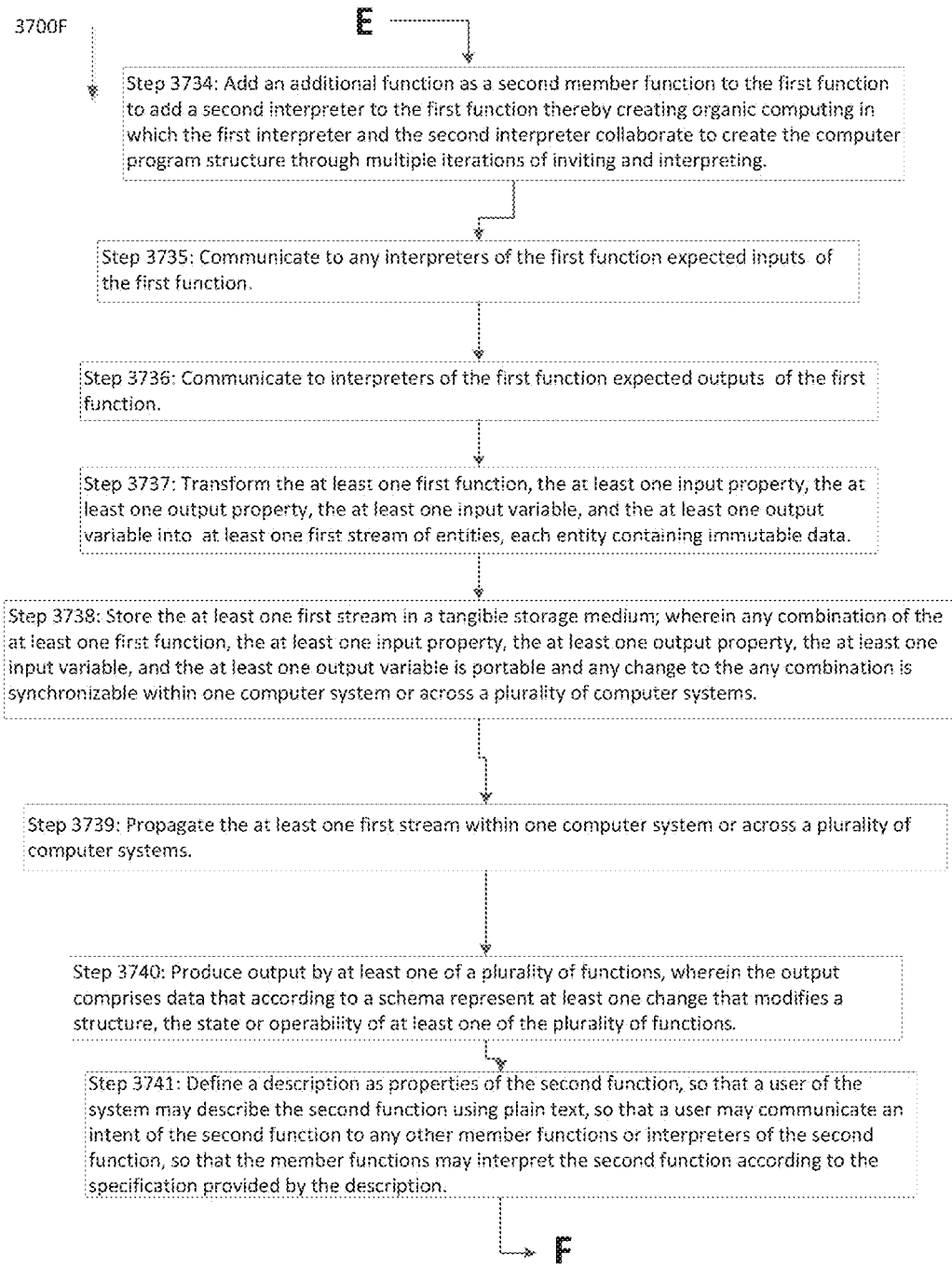
Figure 37F. Uniform Representation of Program Structure as Forms and Implementing as Multiple Entity Instances - continued

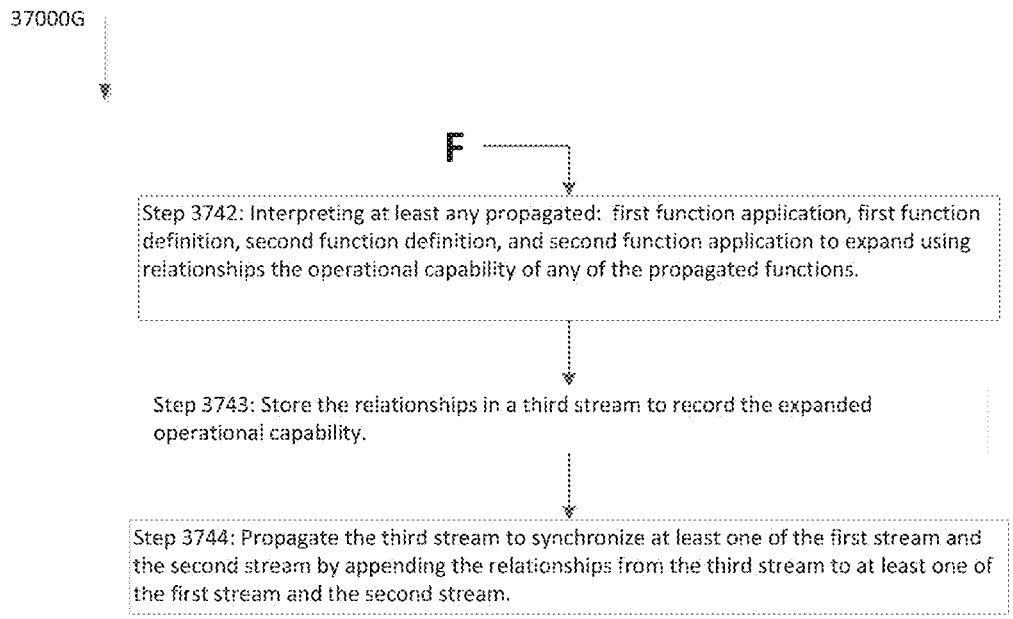
Figure 37G. Uniform Representation of Program Structure as Forms and Implementing as Multiple Entity Instances - continued

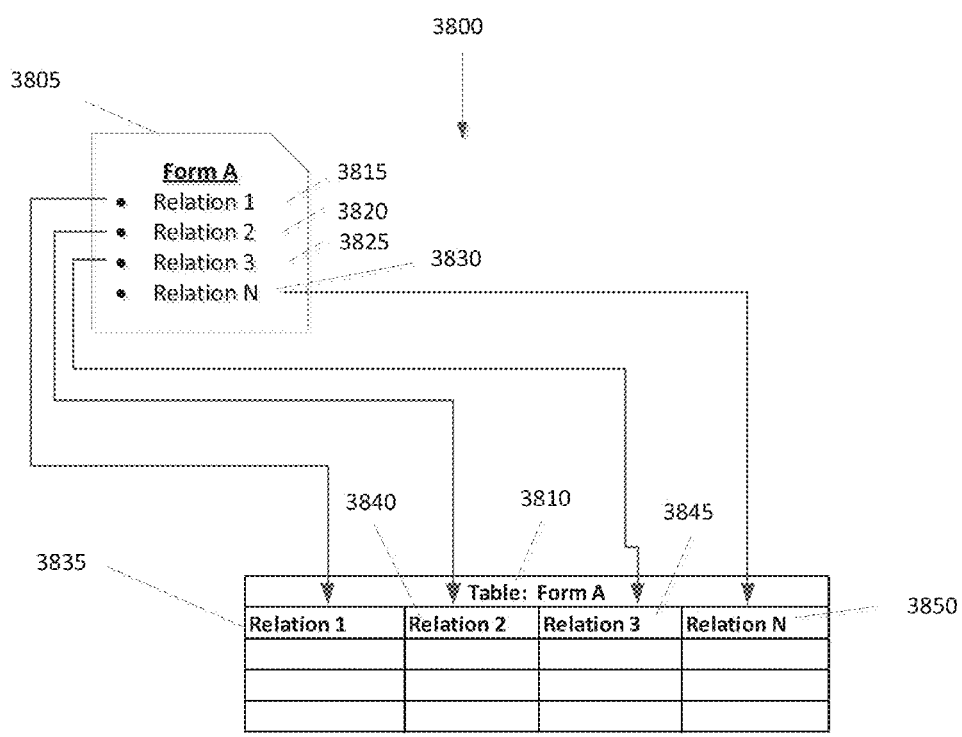
Figure 38. Mapping a Form with Invariant Relations to a Database

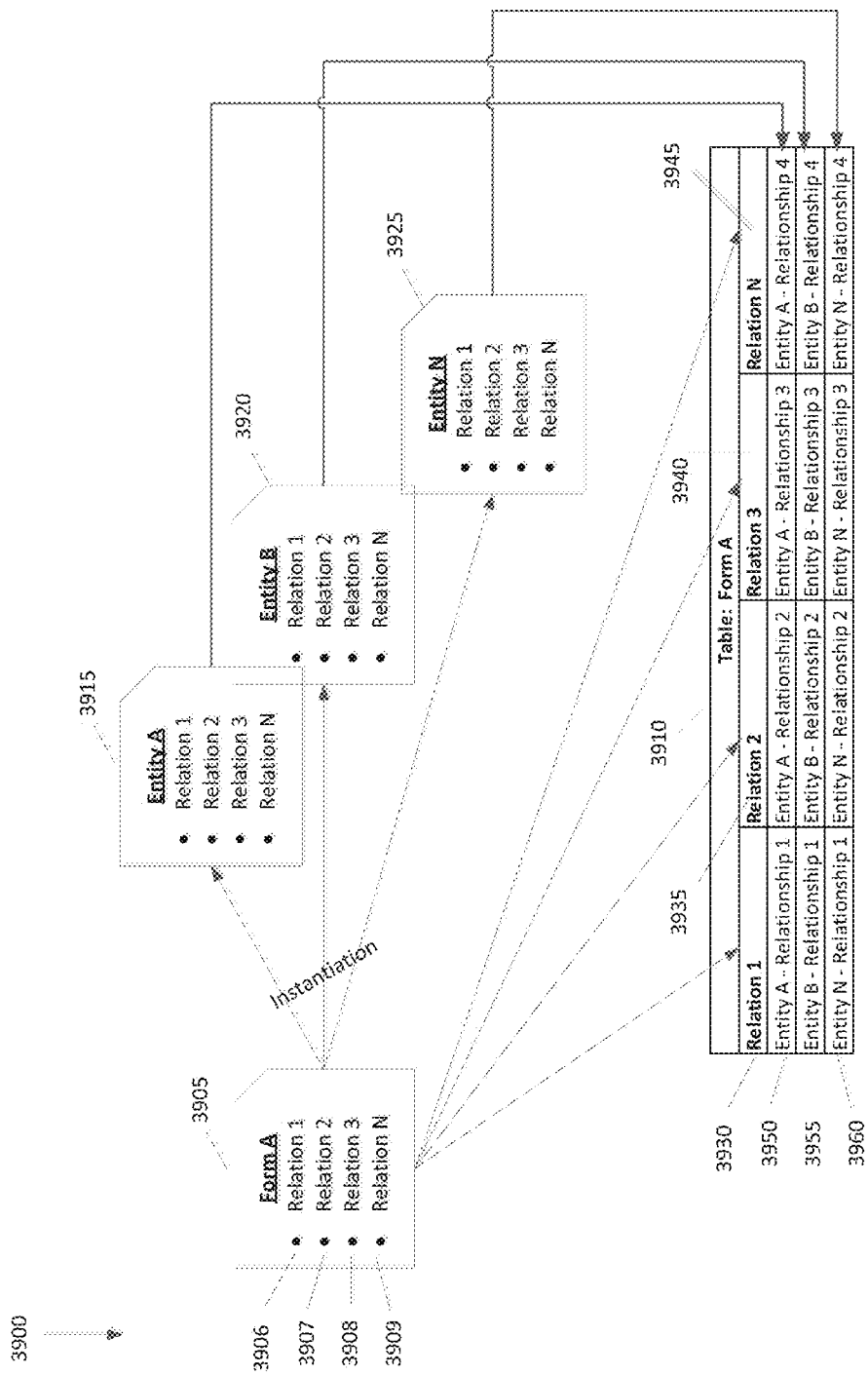
Figure 39. Mapping Invariant Relations of an Entity to a Database Table.

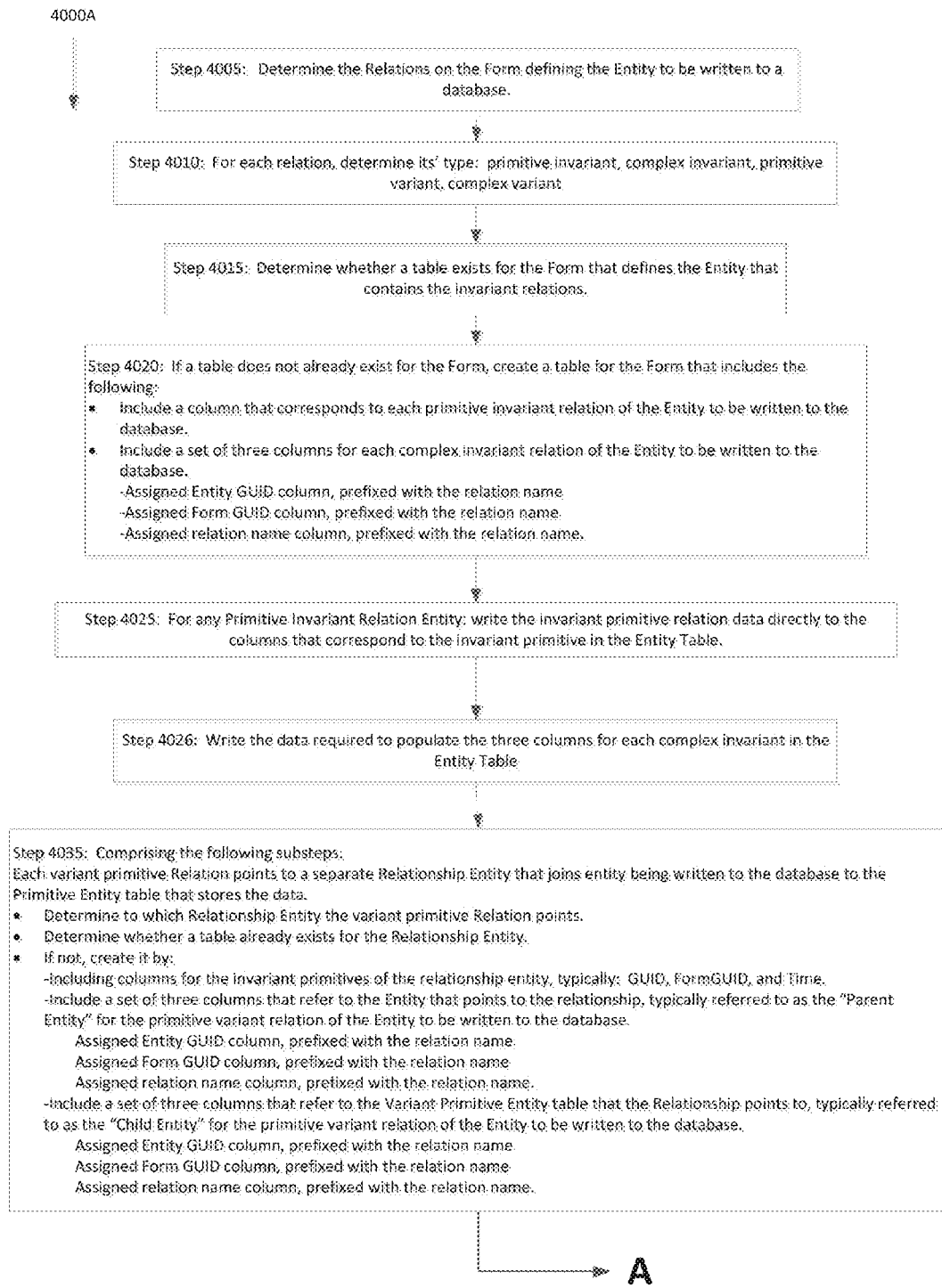
Figure 40A. Process Flow for Writing Entities to a Database

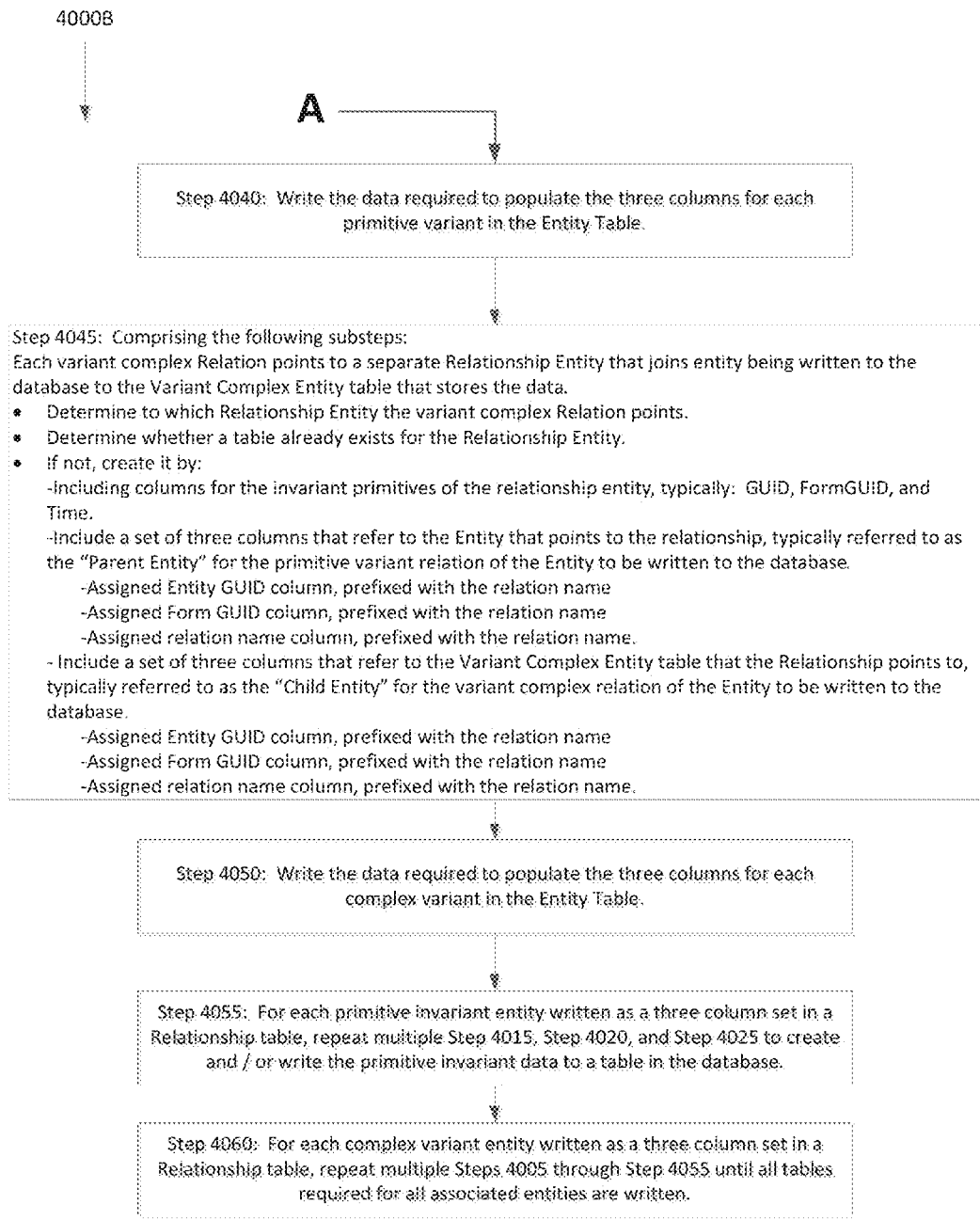
Figure 40B. Process Flow for Writing Entities to a Database - continued

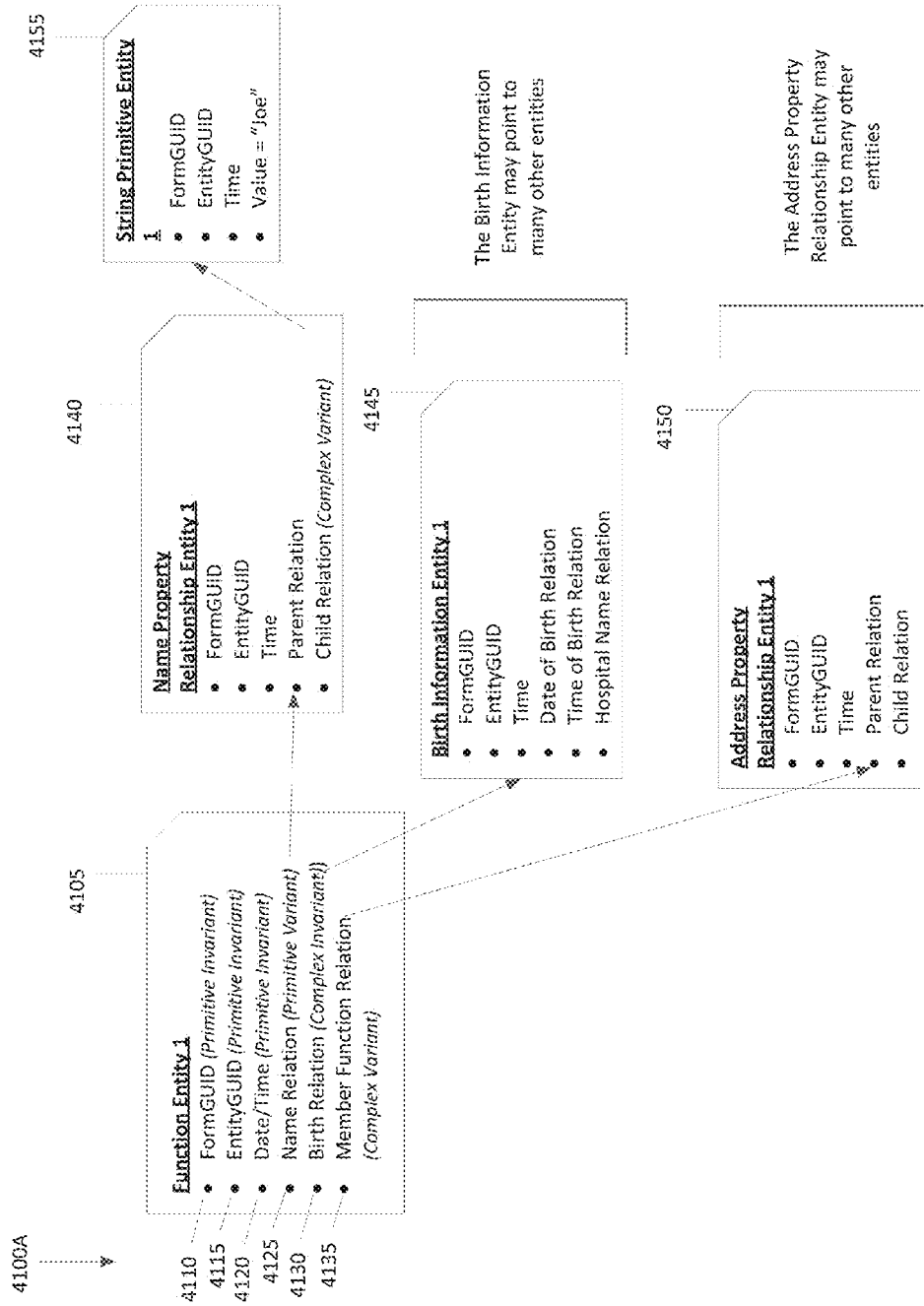
Figure 41A. Person Entity and Referenced Entities, Including Several Relation Types

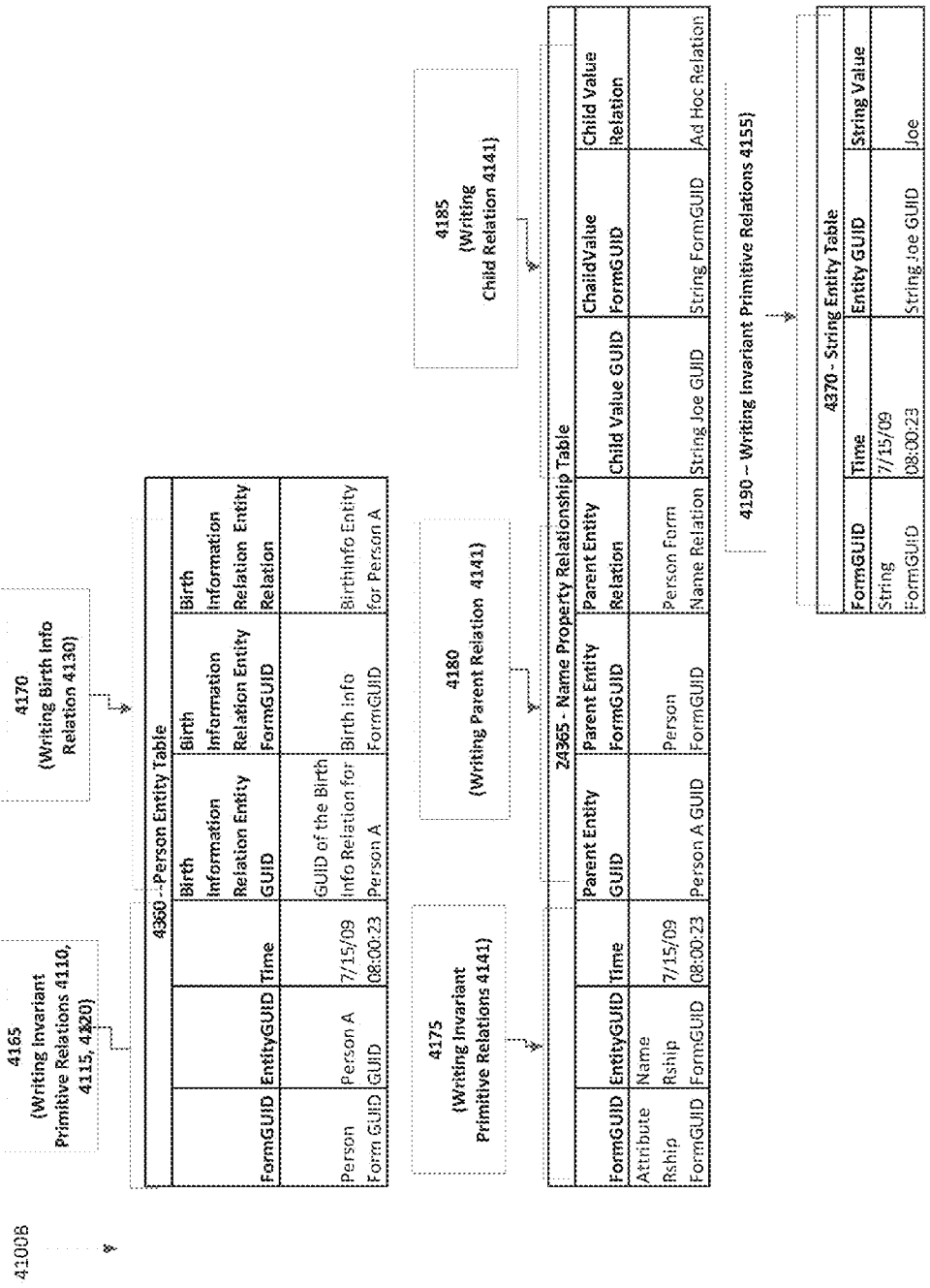
Figure 41B. Example Writing of Several Entity Types to a Table in a Database

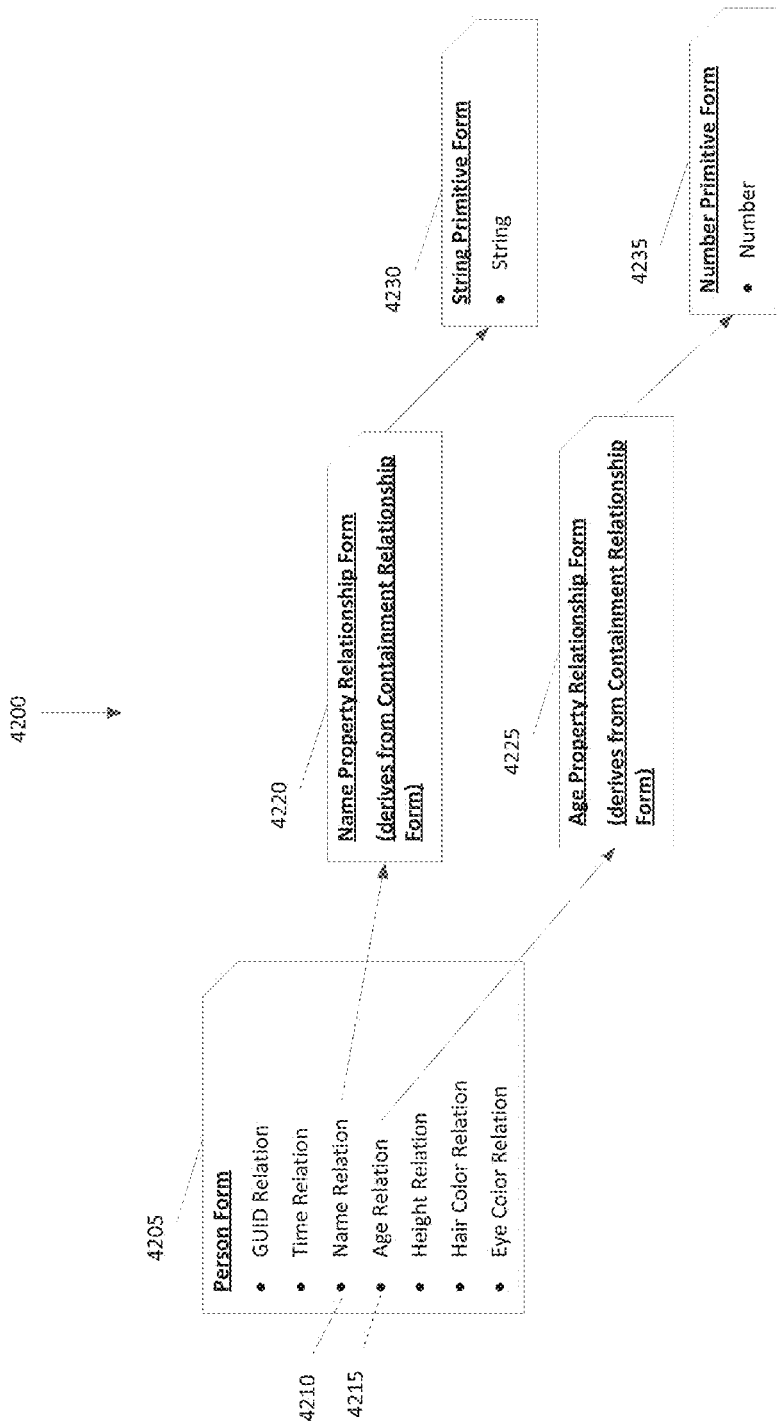
Figure 42. Example of Static Typing

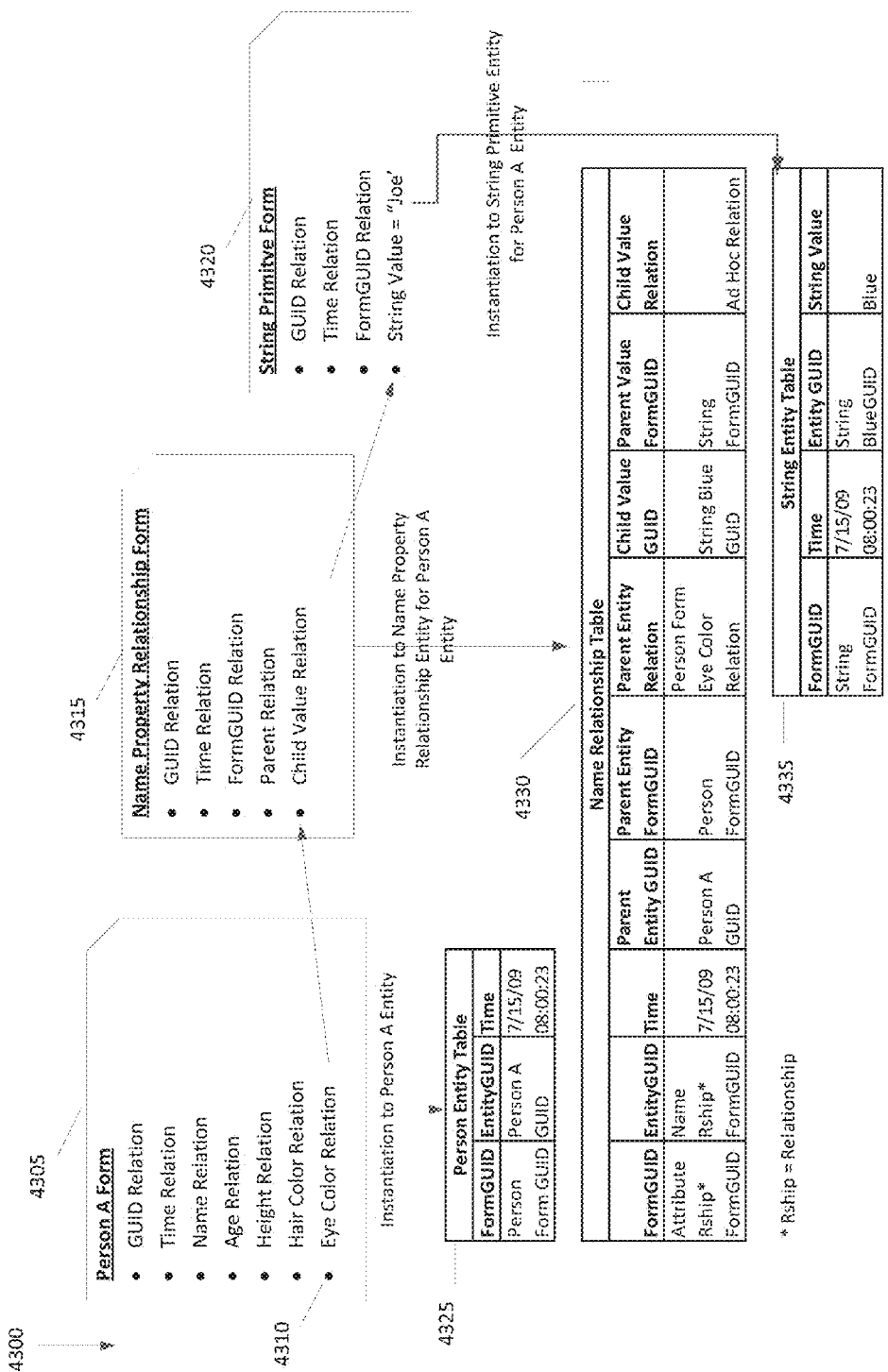
Figure 43. Example of Mapping a Statically Typed Invariant Property to a Tuplebase

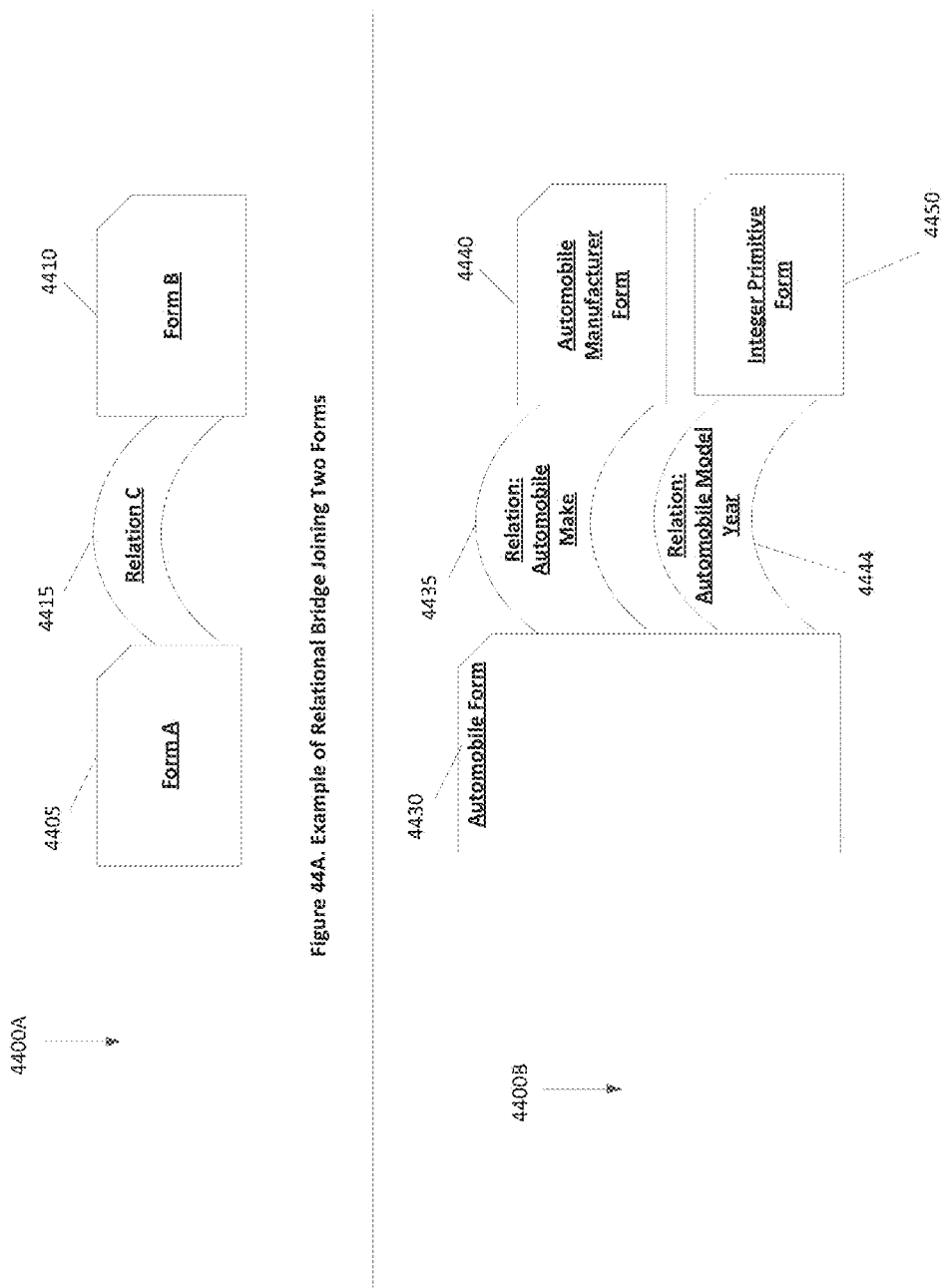
Figure 44A. Example of Relational Bridge Joining Two Forms
Figure 44B. Example Relational Bridge Joining Three Forms through Two Invariant Relation

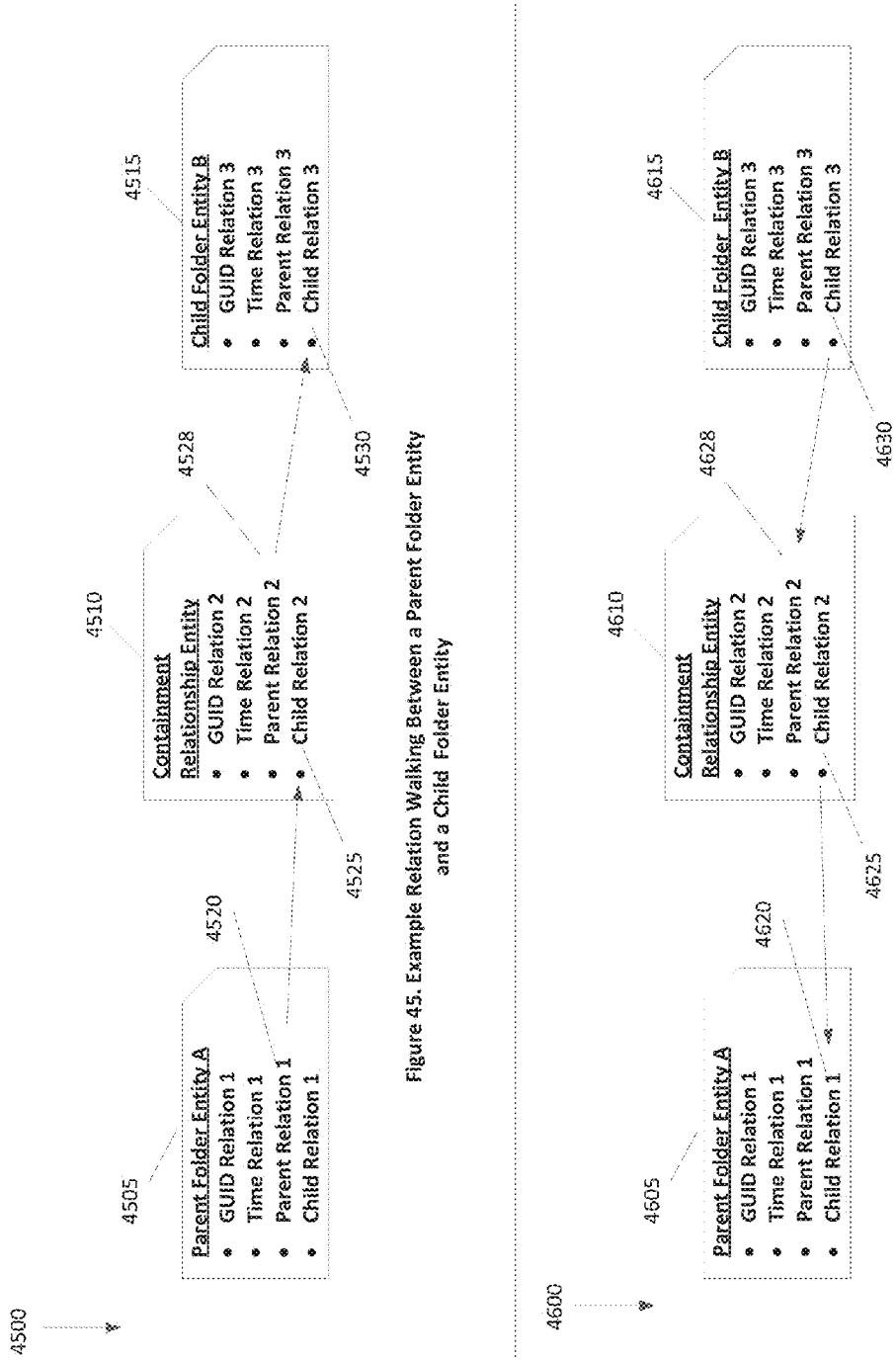

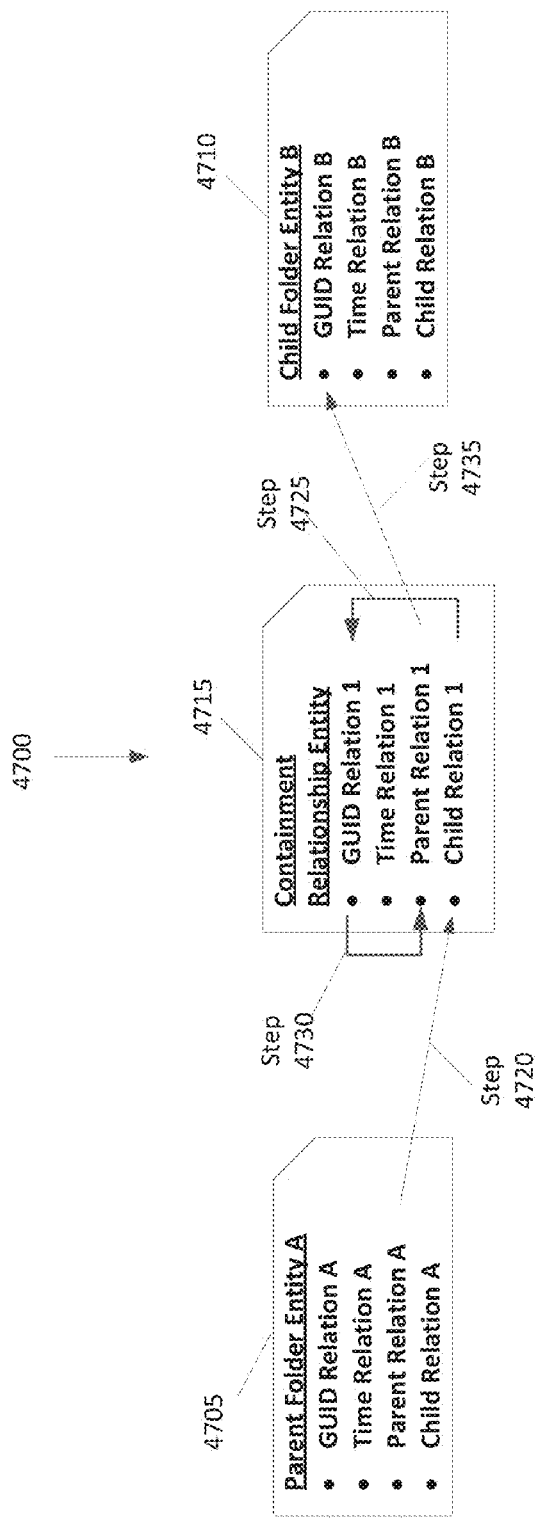
Figure 47. Additional Example of Relation Walking Between a Parent Folder Entity and a Child Folder Entity

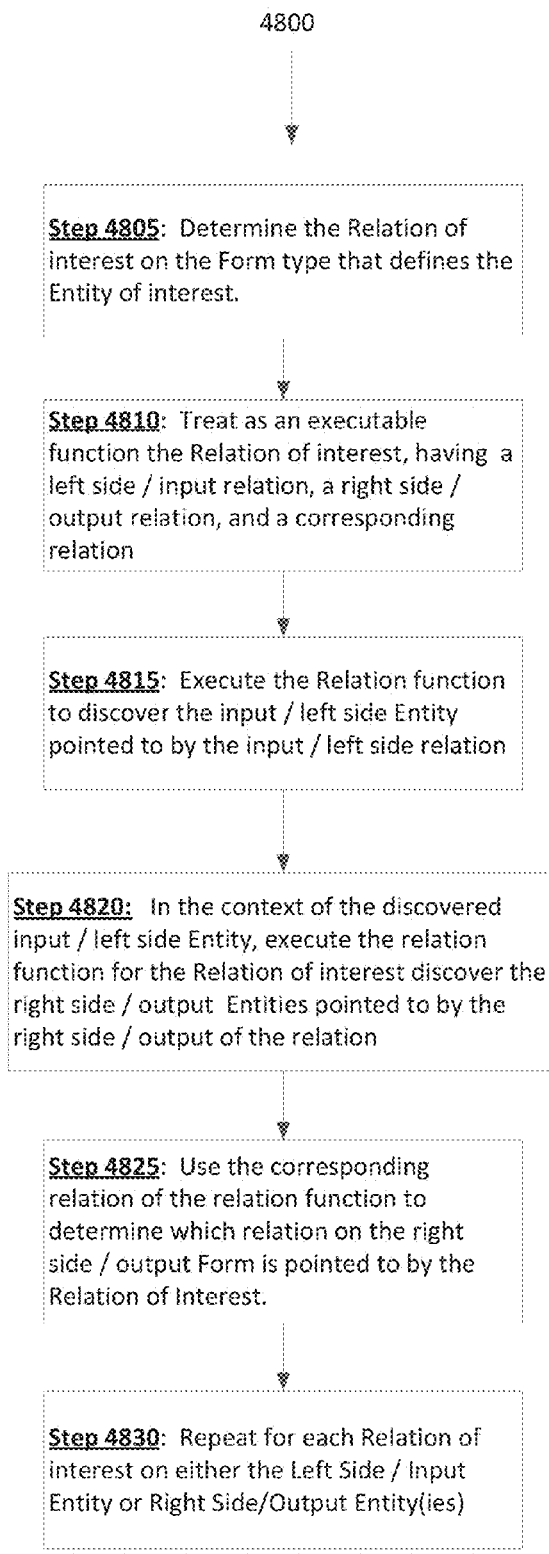
Figure 48. Conceptual Overview of the Process Flow For Traversing Relations

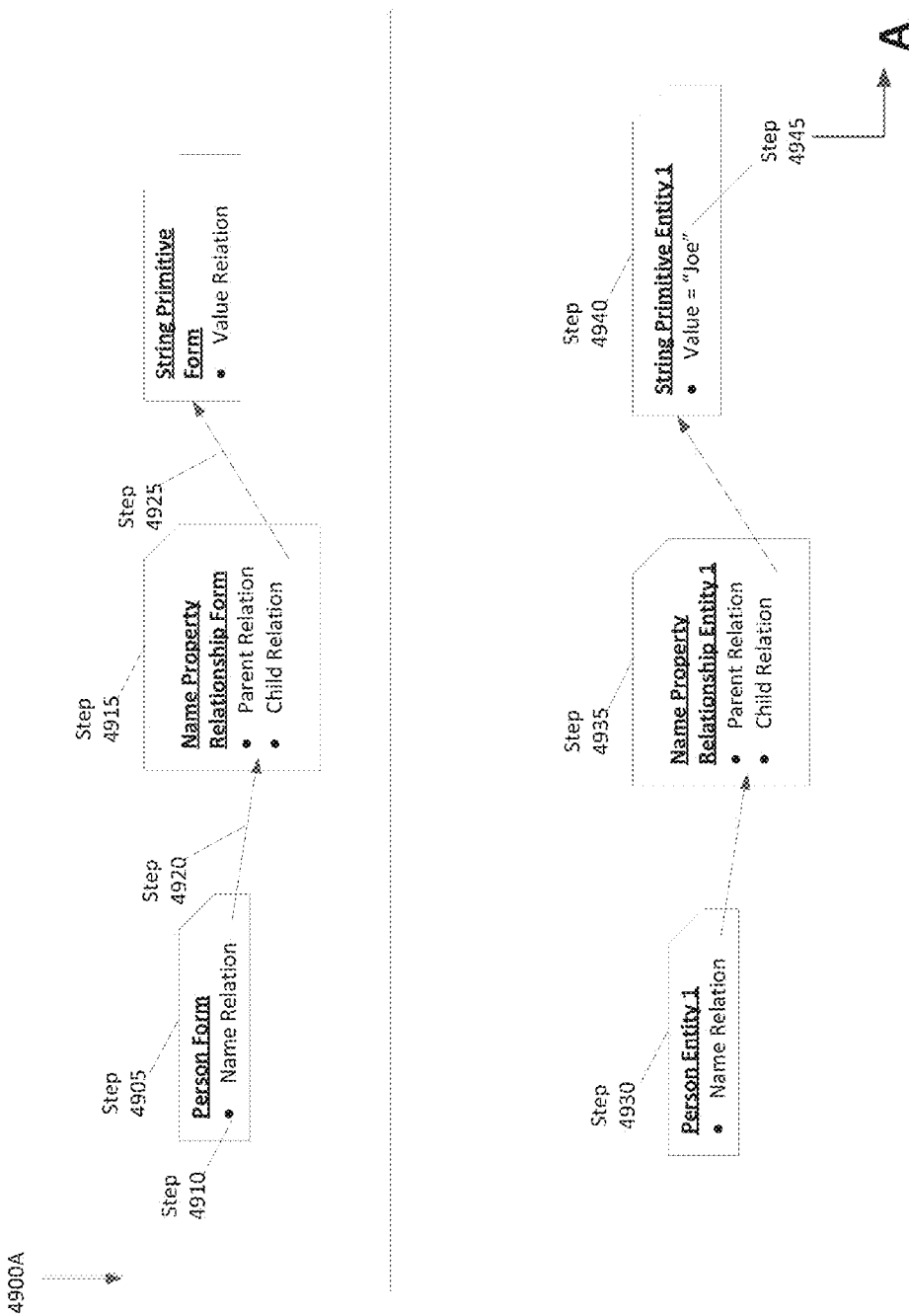
Figure 49A. Substitution Process Flow Example: Step 4905 through – Step 4945

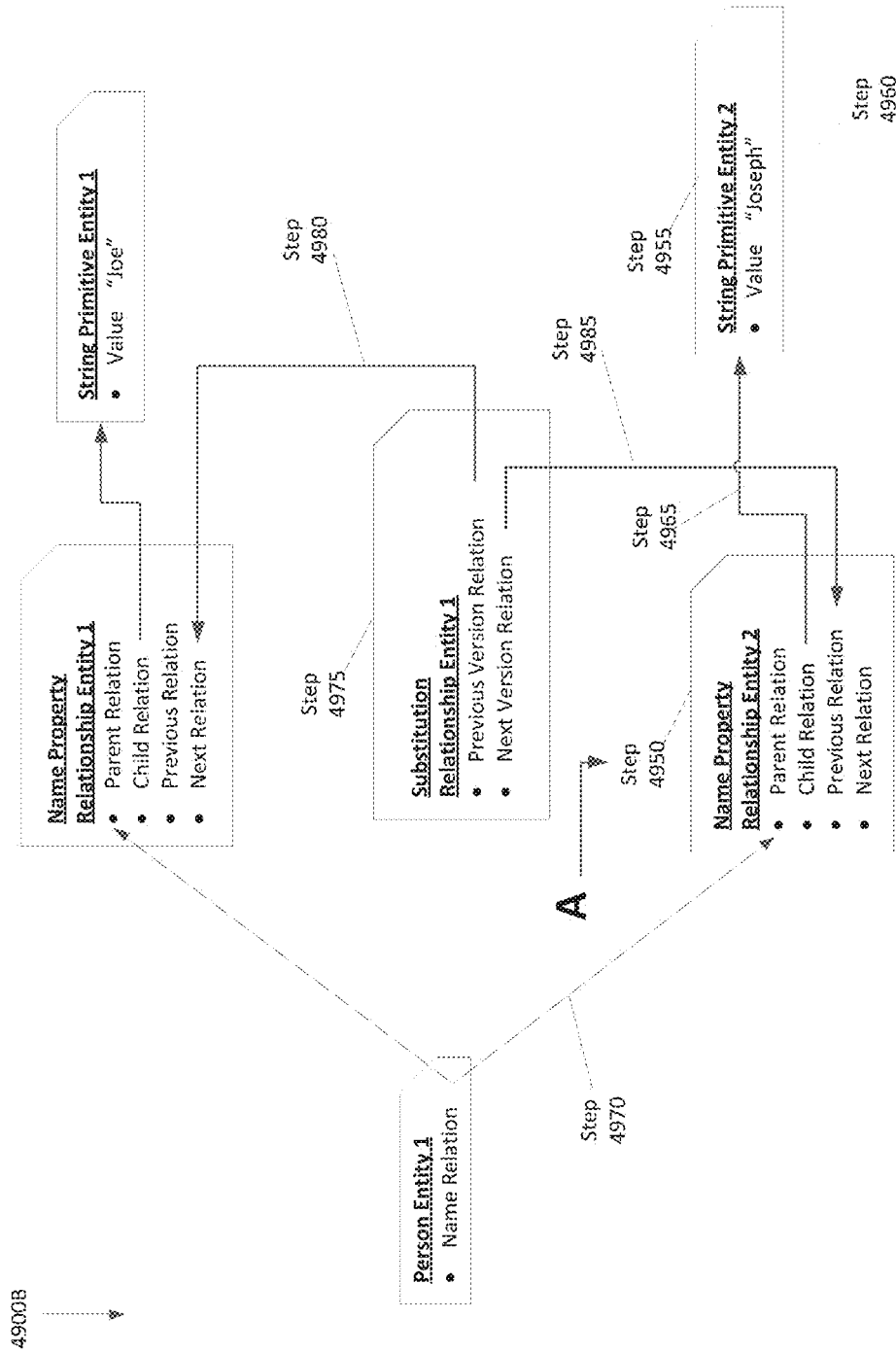
Figure 49B. Substitution Process Flow Example: Step 4949 through – Step 4980

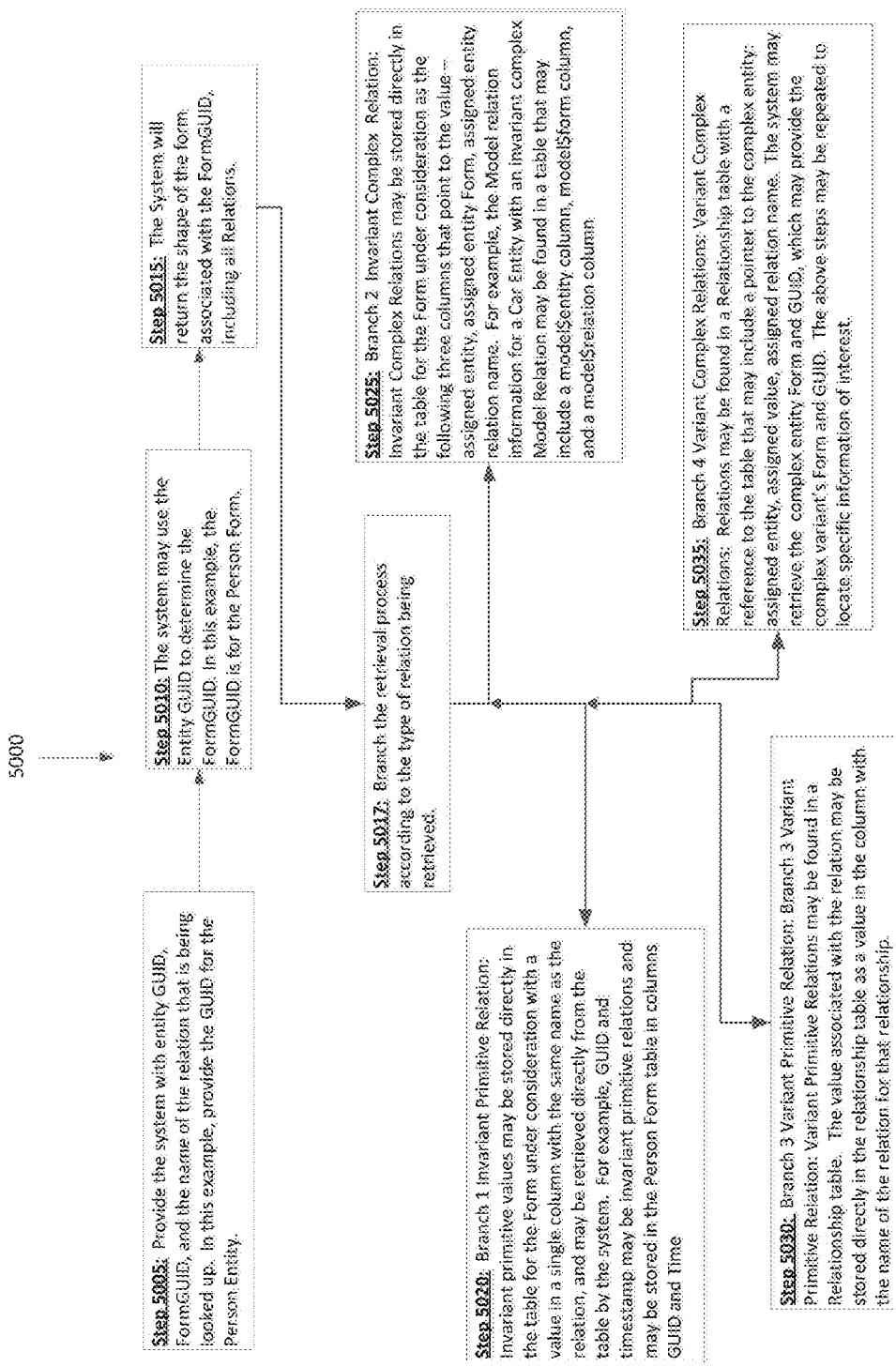
Figure 50. Example Process Flow for Retrieving Entity State

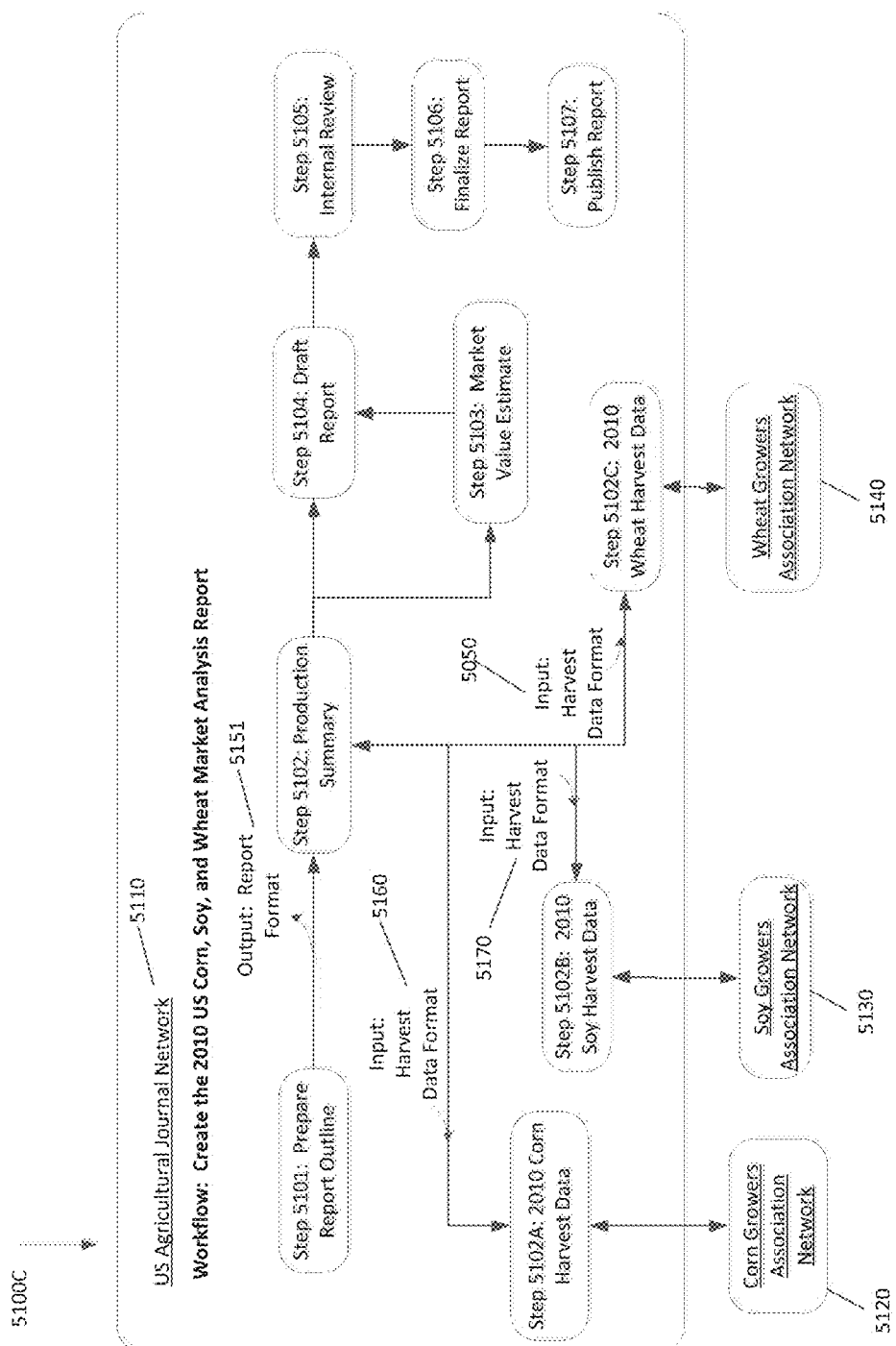
Figure 51. Example Distributed Work Flow -- Create the 2011 US Corn, Soy, and Wheat Market Analysis Report

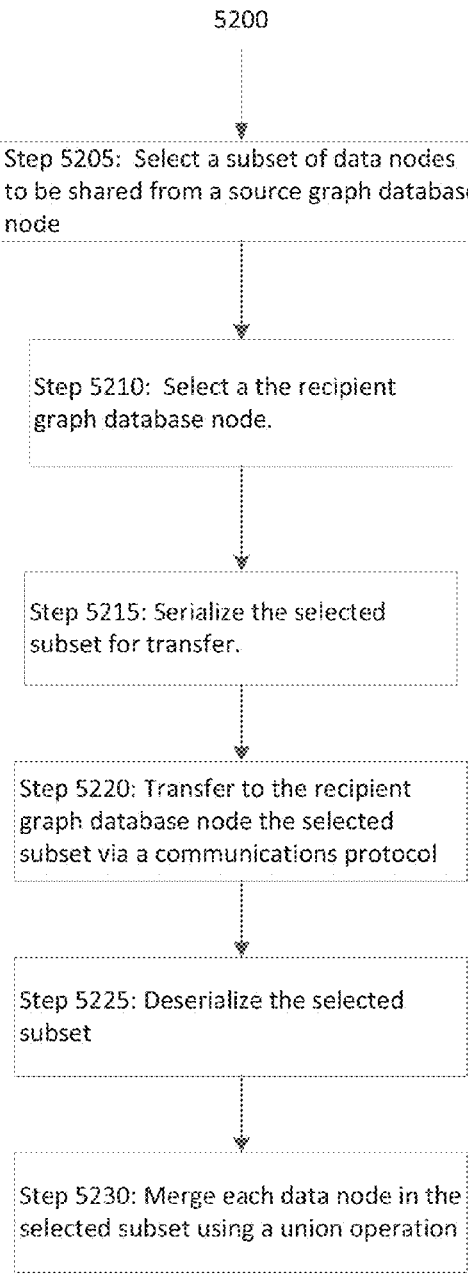
Figure 52. Sharing and Merging a Subset of a Source Graph Database Node with a Recipient Graph Database Node

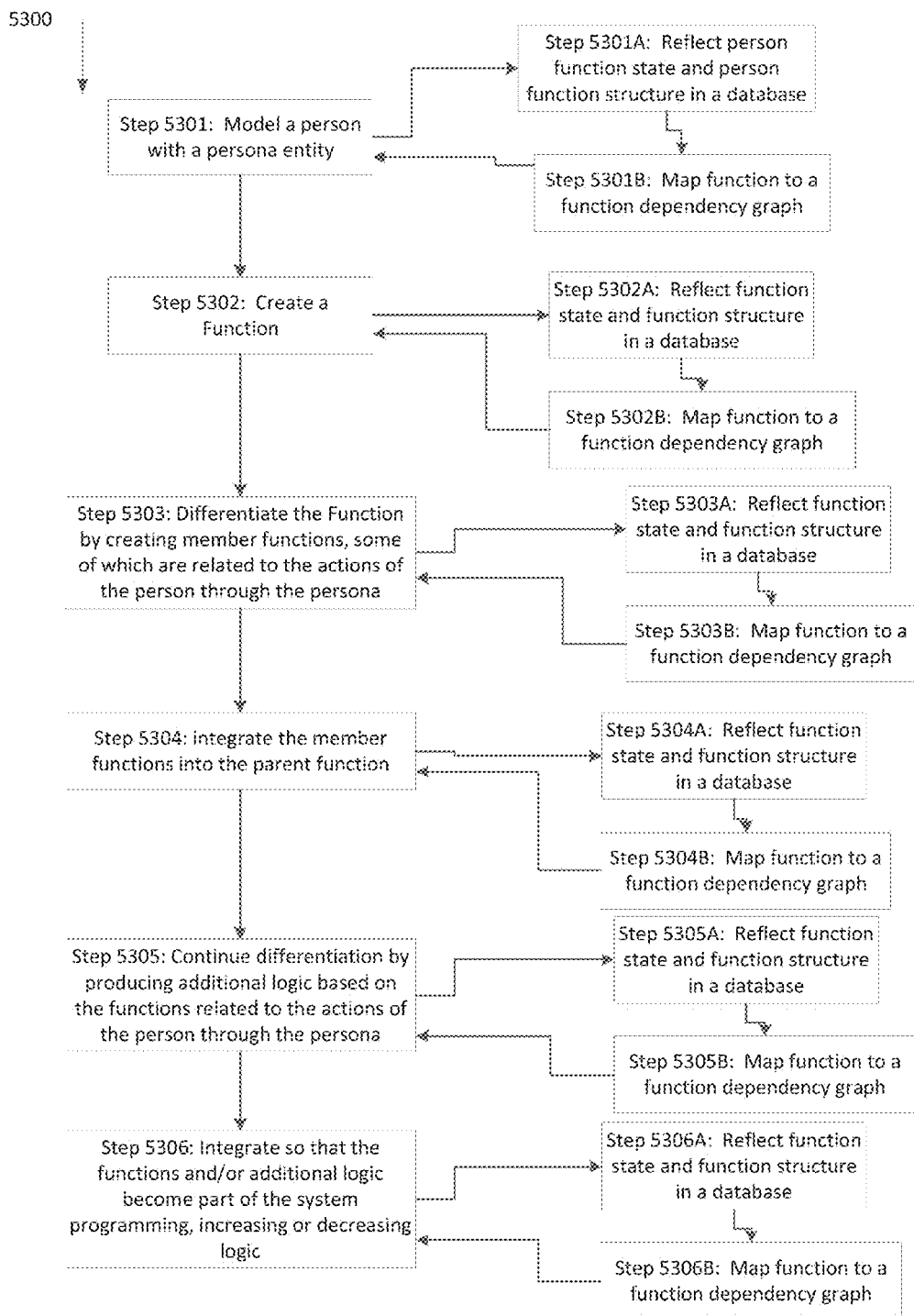
Figure 53. Flow Diagram of Exemplary Process to Generate Functions from Functions

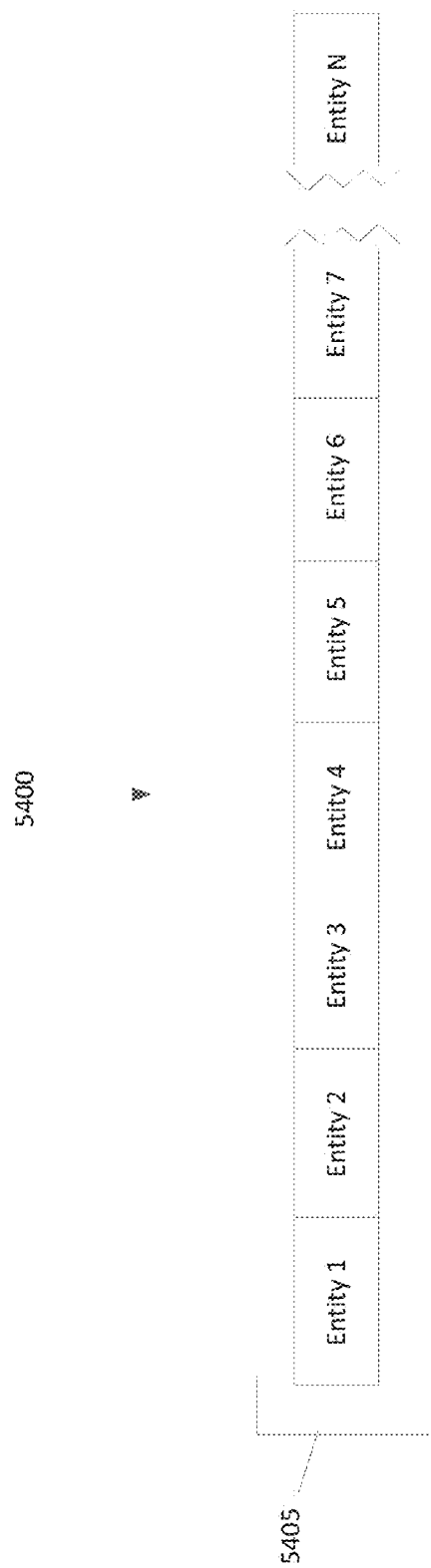
Figure 54. Information Stream

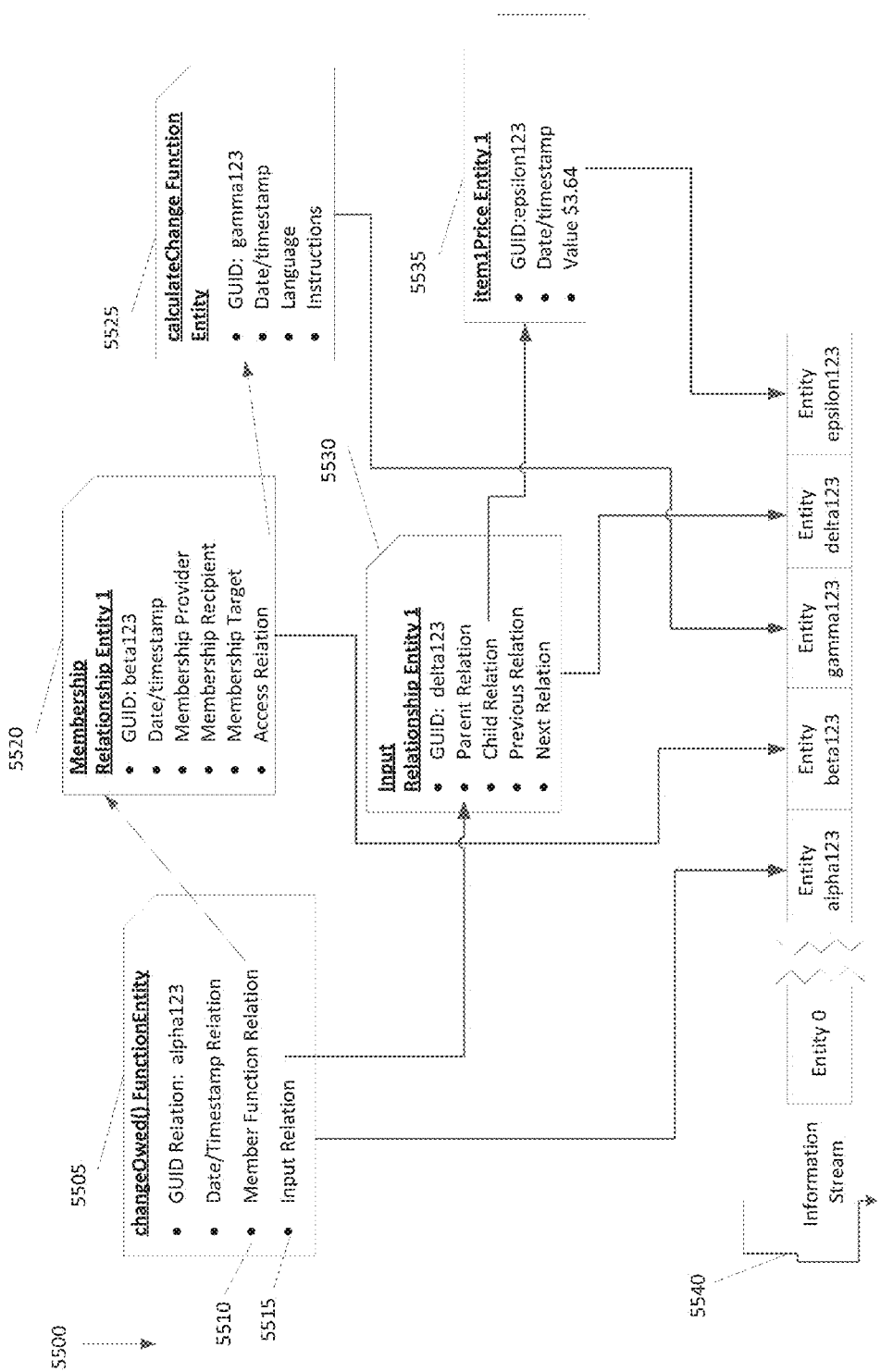
Figure 55. Simplified Conceptual View of Writing Person Entity and Related Entities to an Information Stream

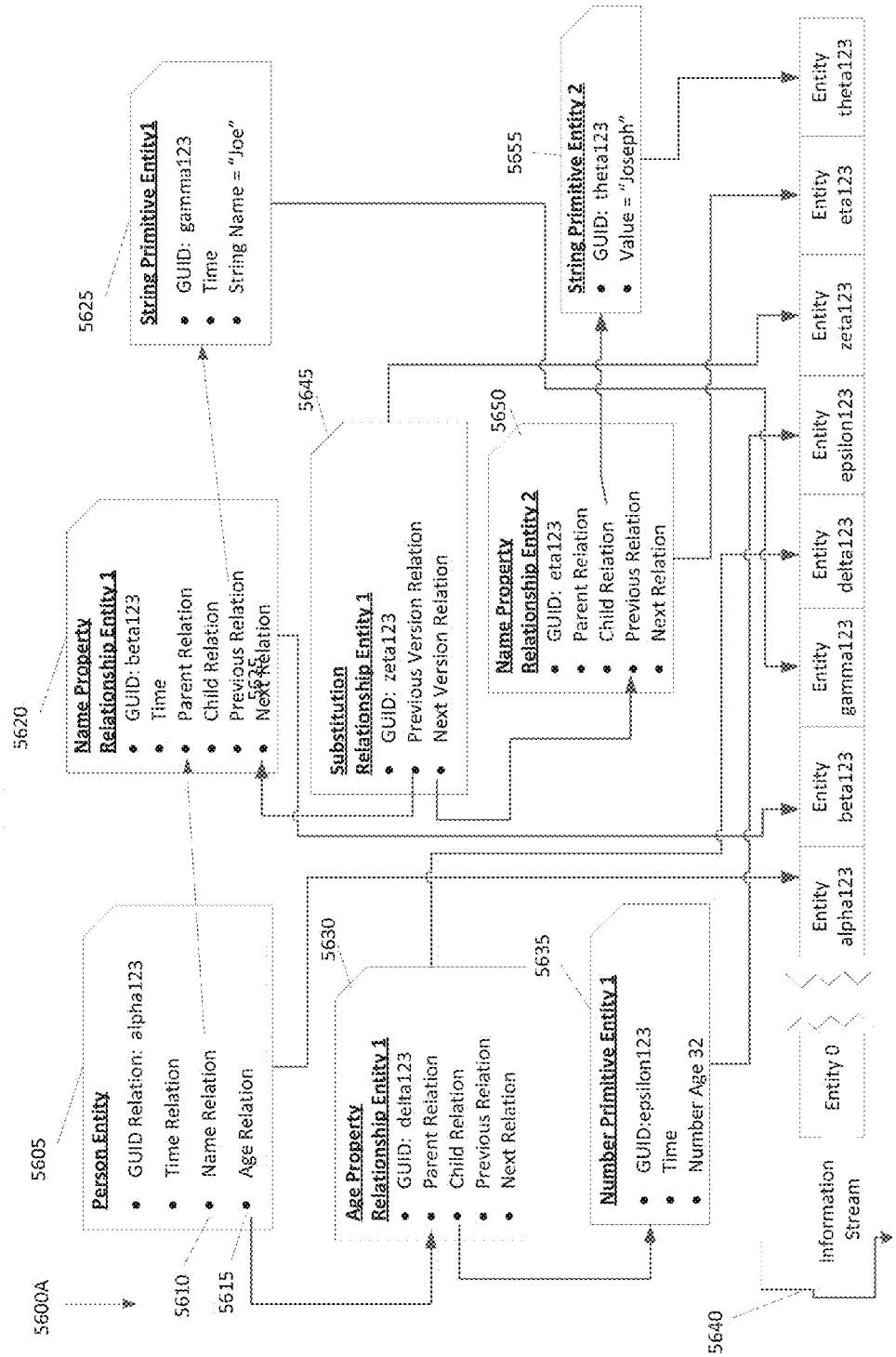
Figure 56A. Appending Substitution Relationship Entities to an Information Stream

5600B

Step 5660: Creating an information stream, the stream including at least one entity and at least one relationship entity wherein the relationship entity signifies a change with respect to at least one other entity or signifies a change to at least one other relationship entity, wherein a relationship entity is also a type of entity Step 5670: Reflecting a change in a state of the information stream by addition of a new entity to the information stream, wherein every entity includes immutable data.

Figure 56B. Process Flow for Creating Information Streams and Reflecting Change in State by the Addition of New Entities

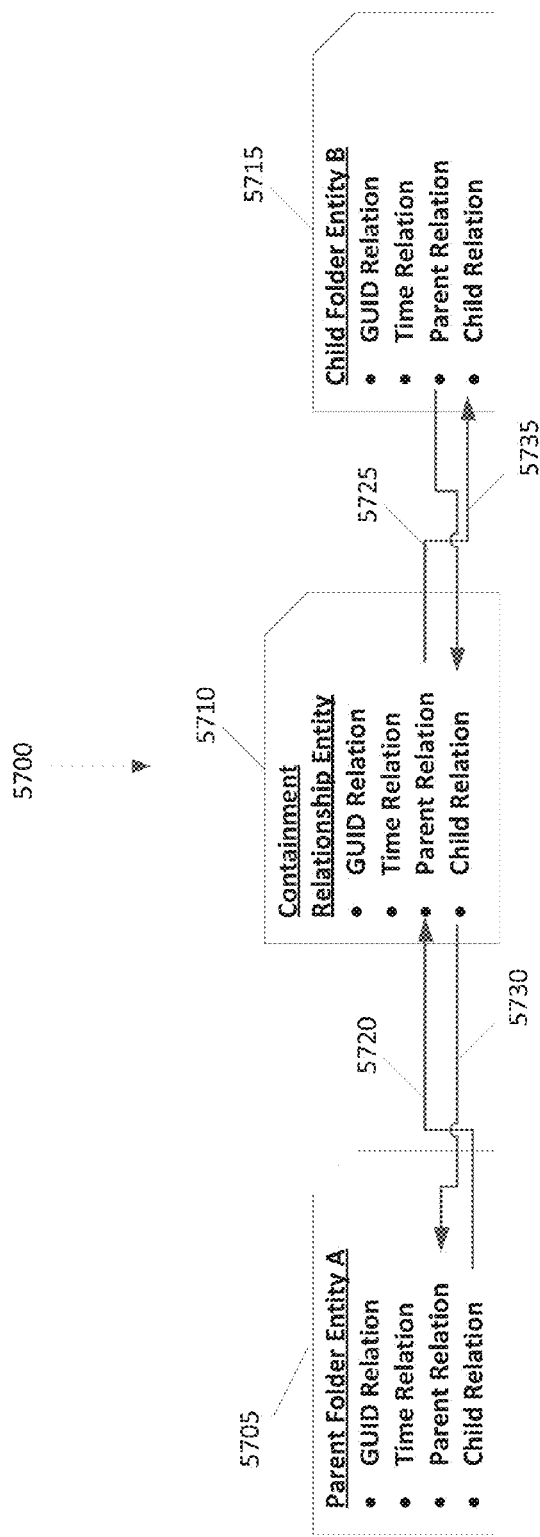
Figure 57. Example of Writing Streams for Single Containment Relationship Figure 58.** Table 4. Folder Entity and Multiple Stream Writing
 **numbers in parenthesis refer to elements in Figure 57

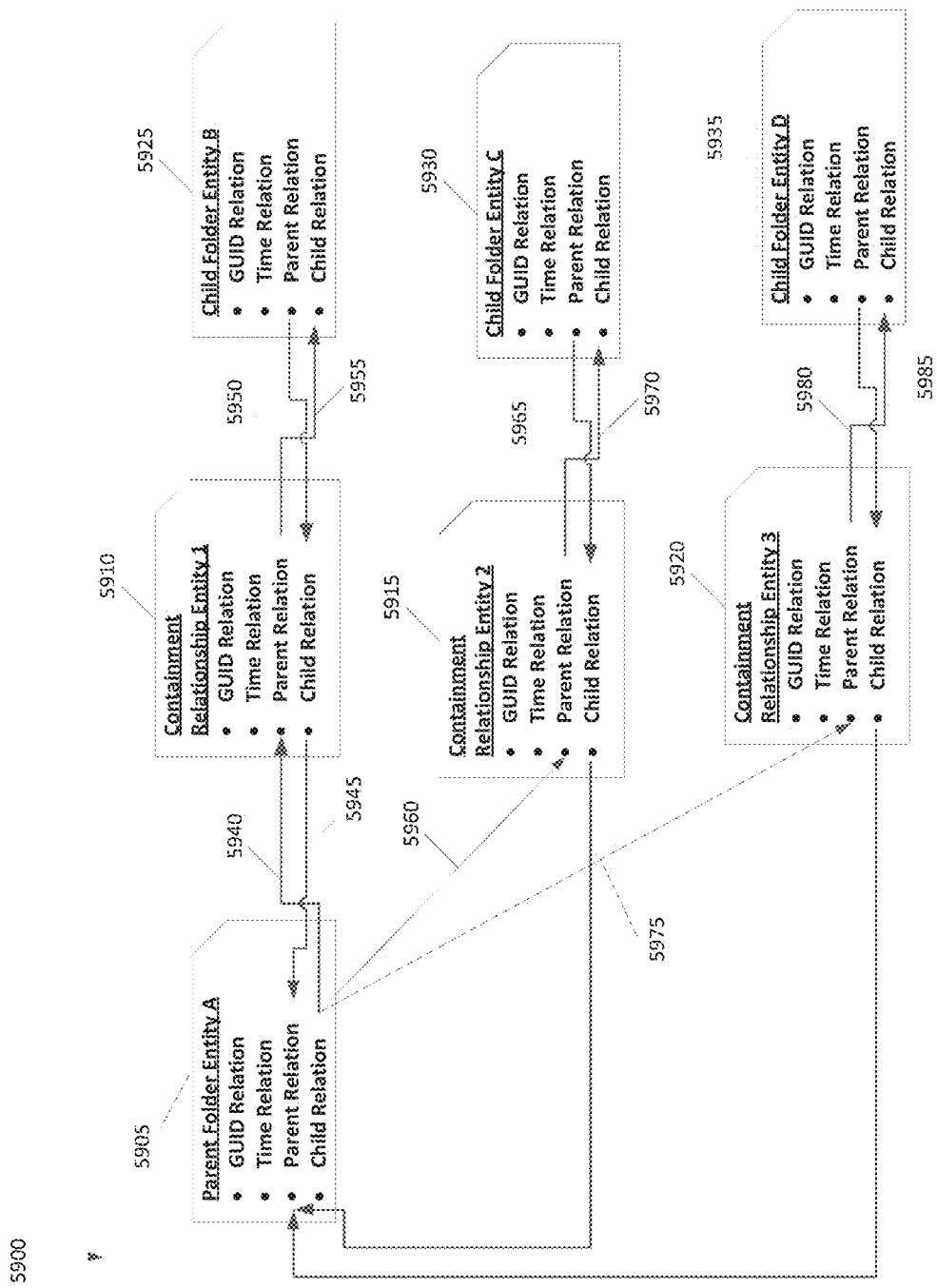
Figure 59. Example of Writing Streams for Multiple Containment Relationship

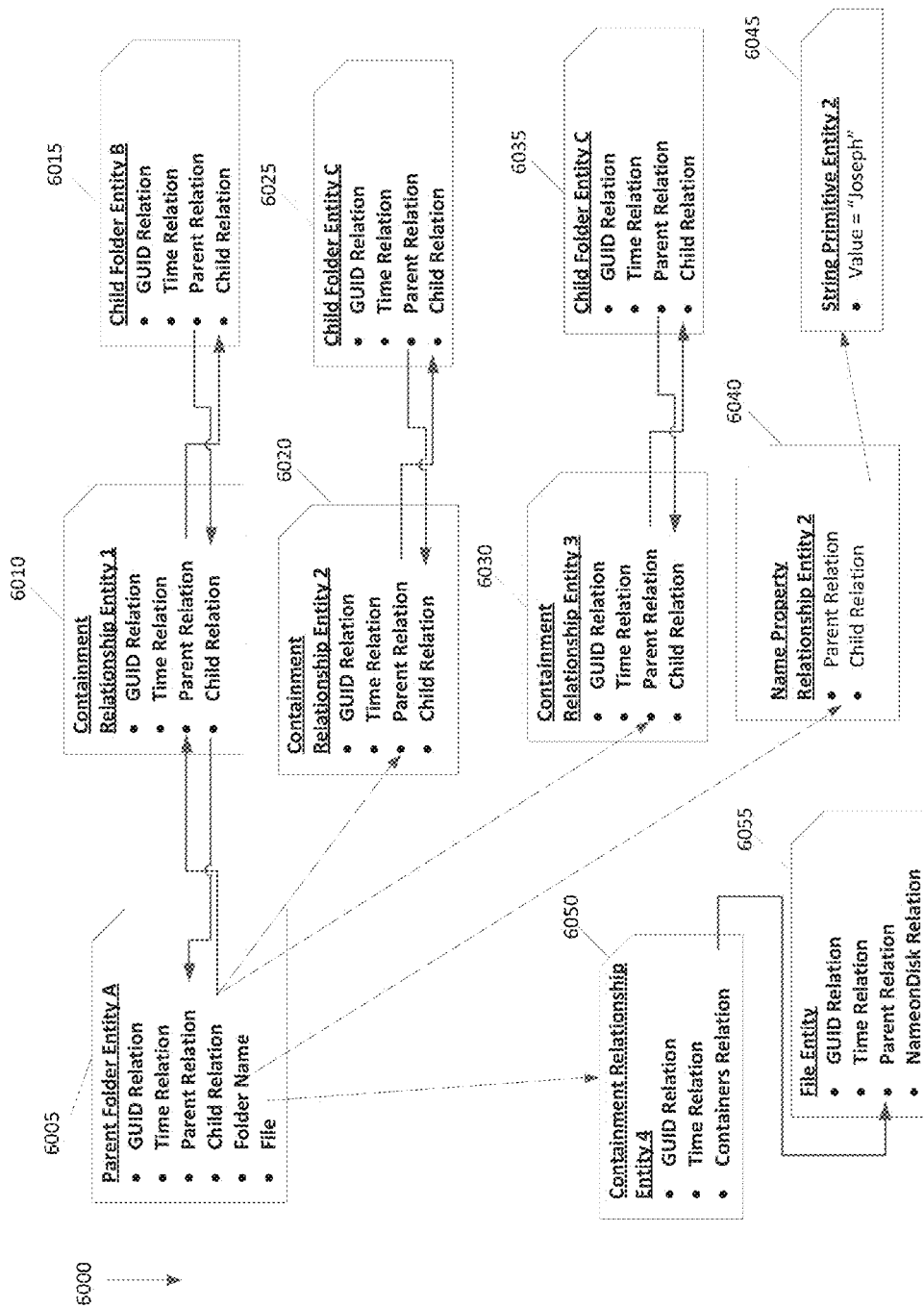
Figure 60. Example of Writing Streams for Multiple Containment and Other Relationships

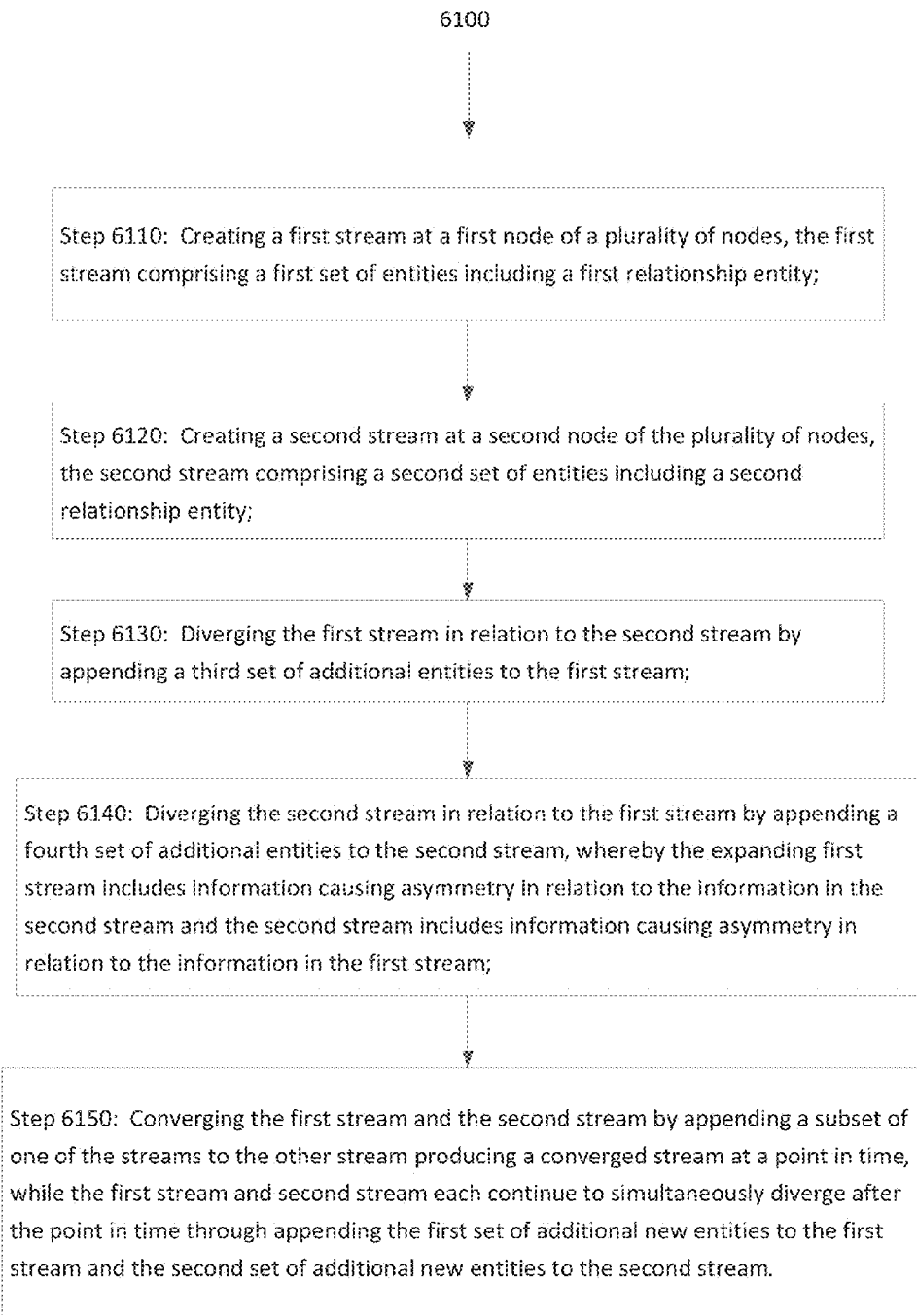
Figure 61. Process Flow for Diverging and Converging Streams

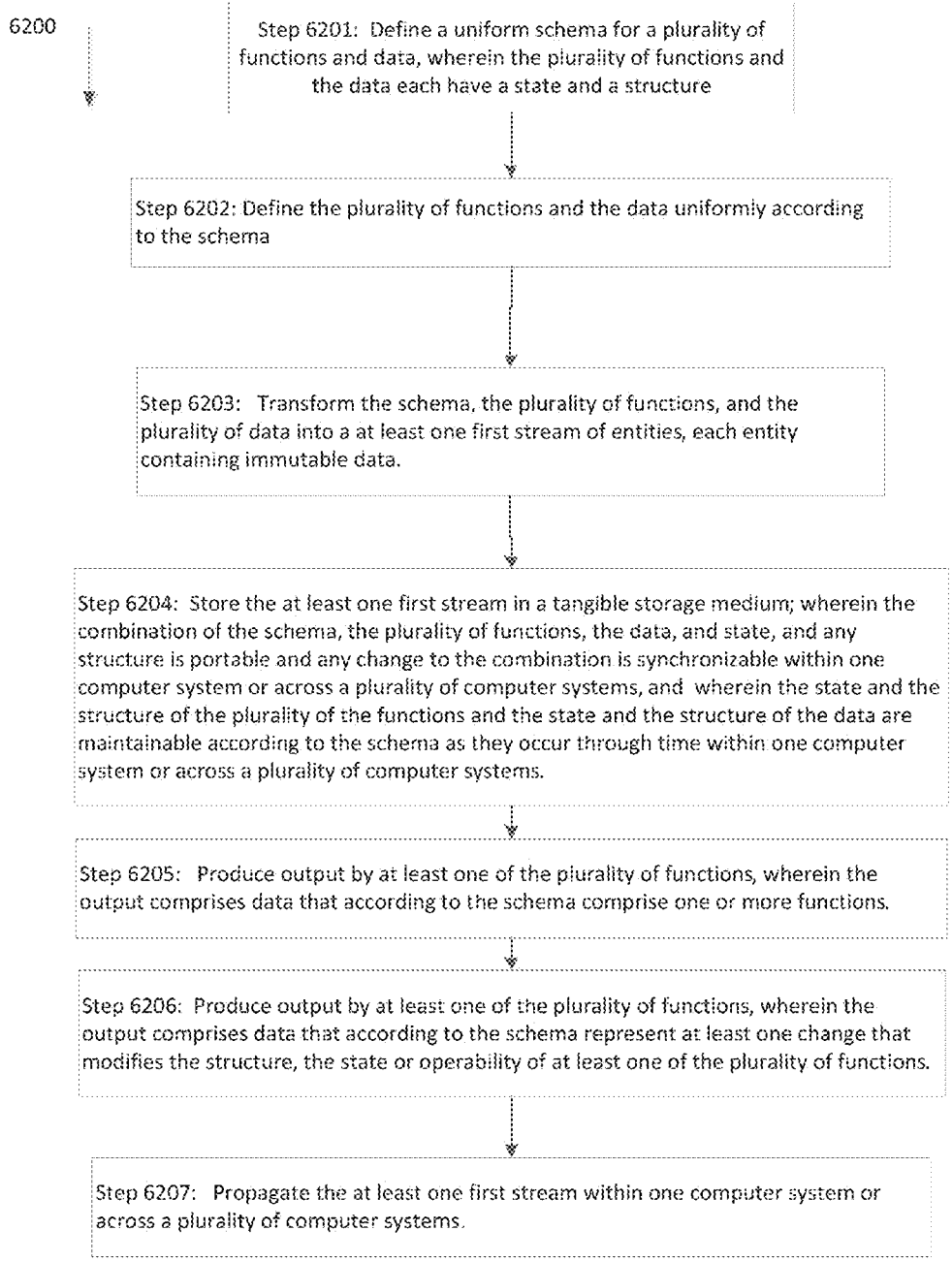
Figure 62. Representing a Functions as One or More Streams

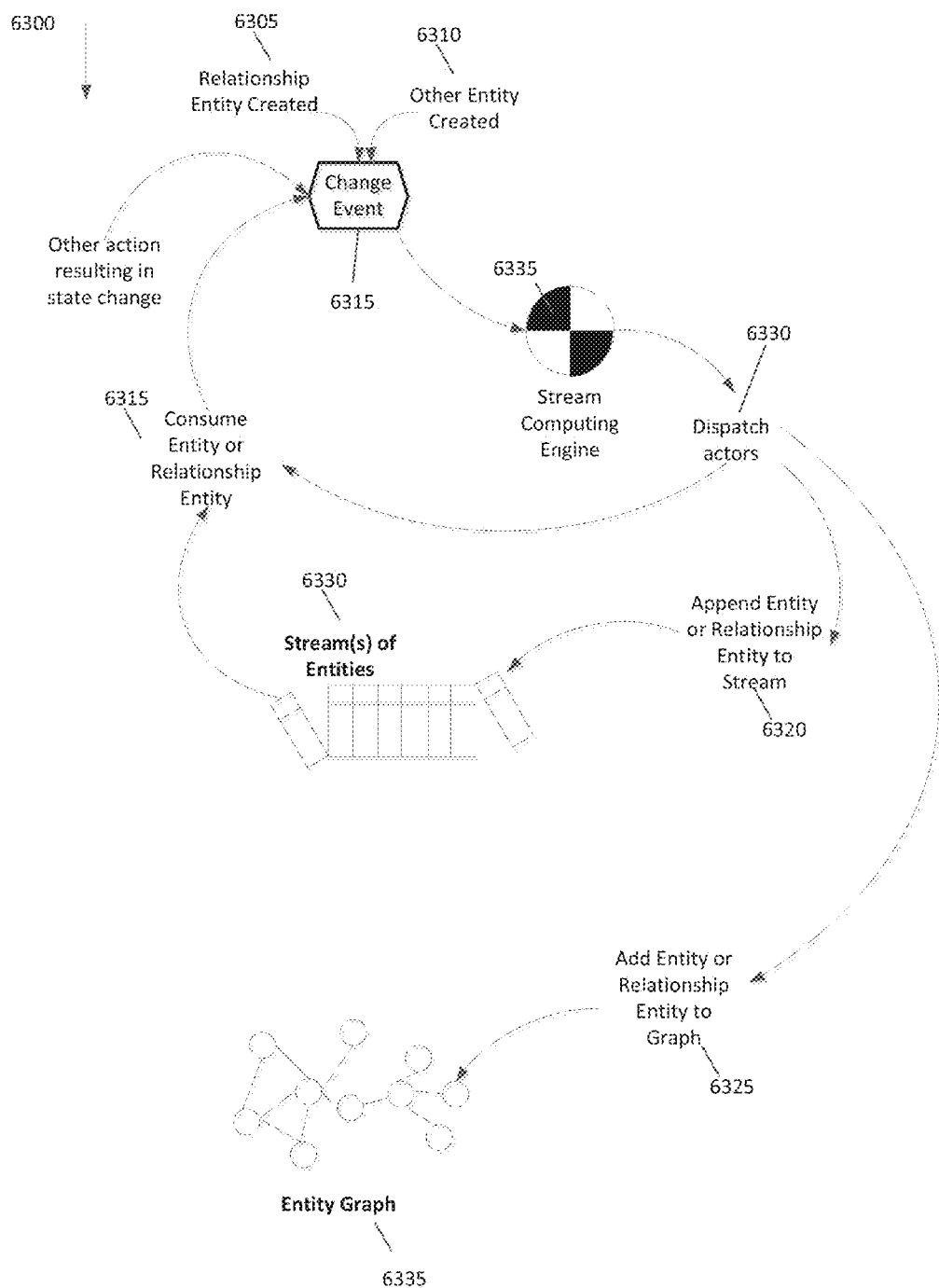
Figure 63. Generalized Stream Computing Engine Implementation

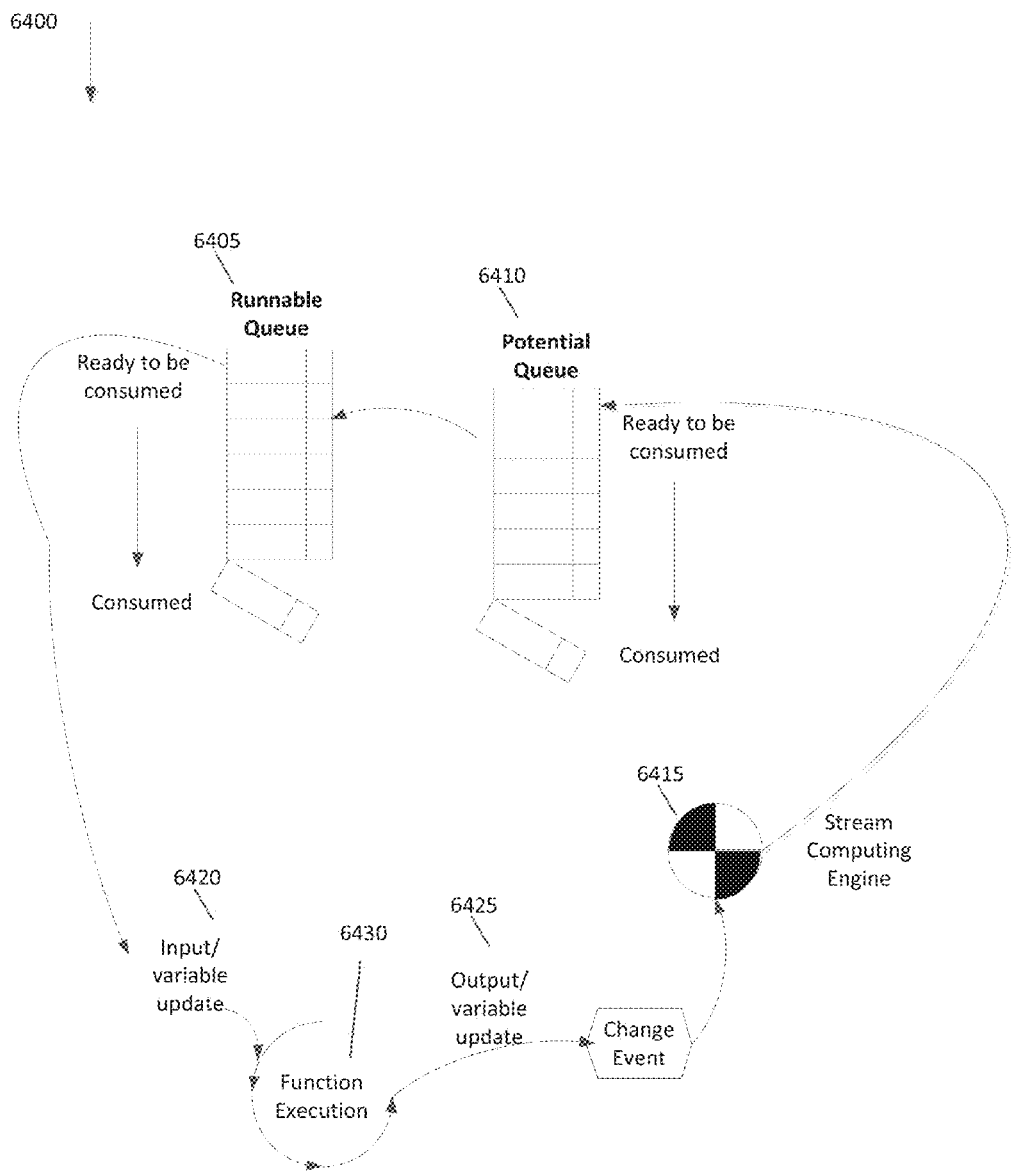
Figure 64. Another Stream Computing Implementation

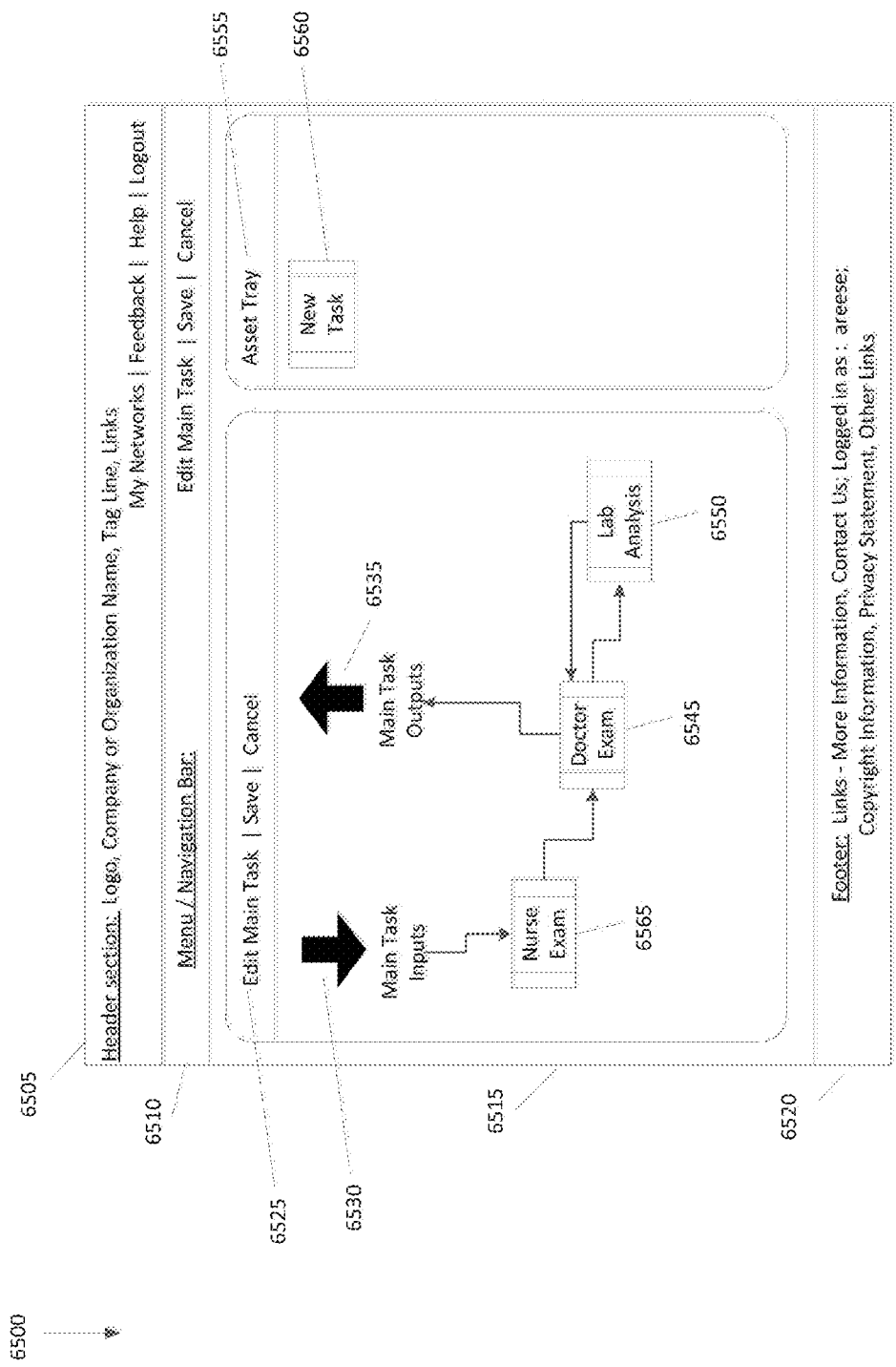
Figure 65. Doctor Visit Workflow

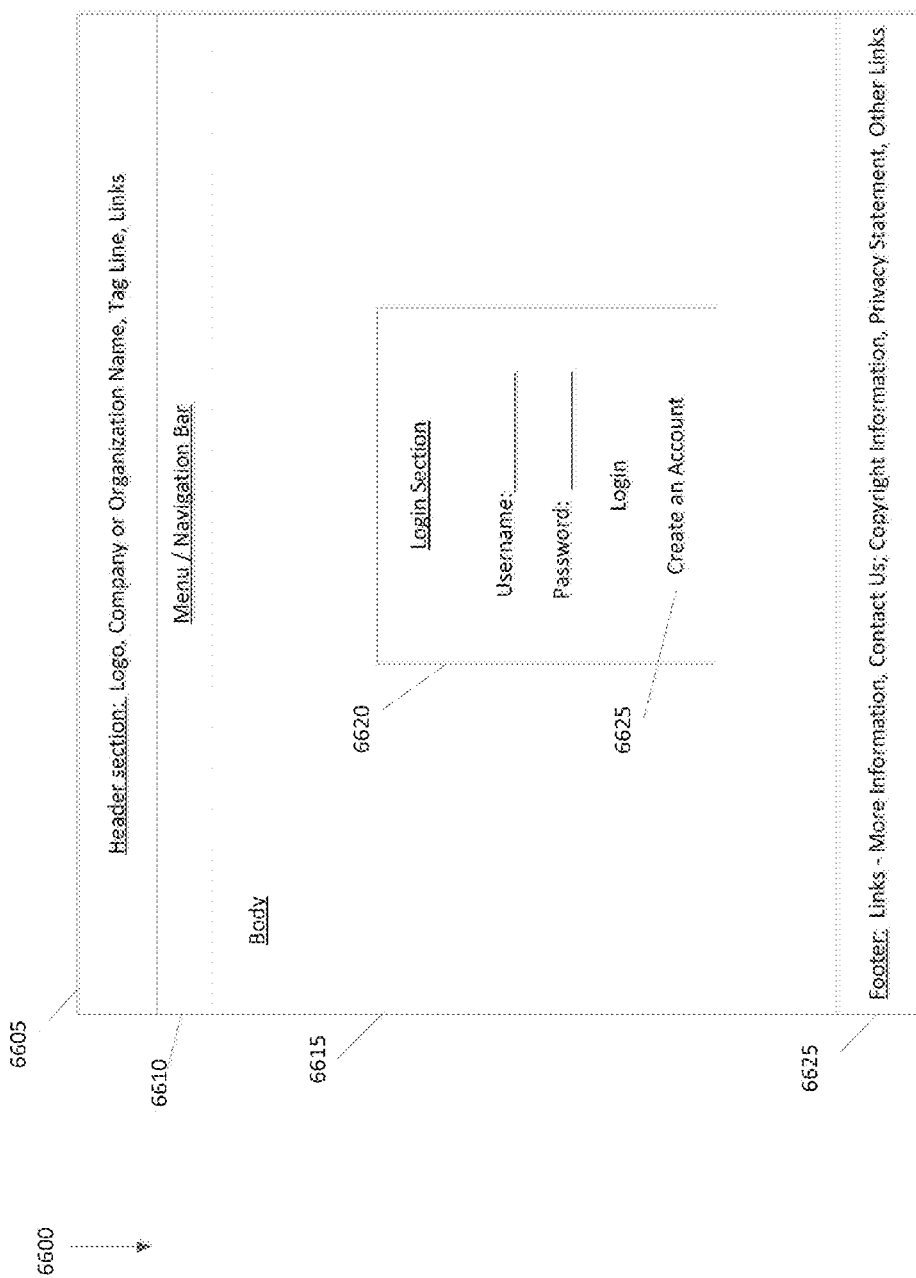
Figure 66. Login Page

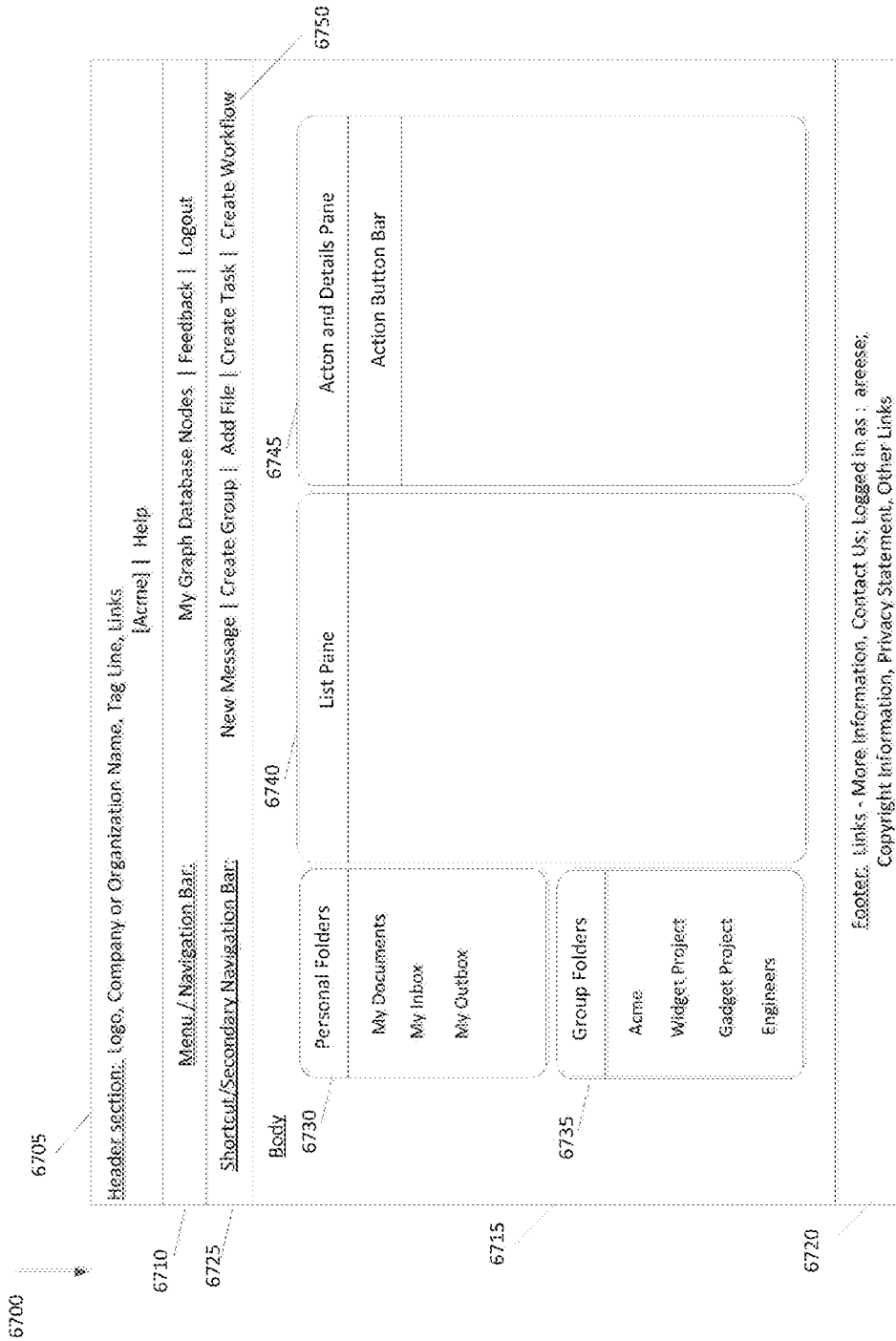
Figure 67. Example Application Home Page

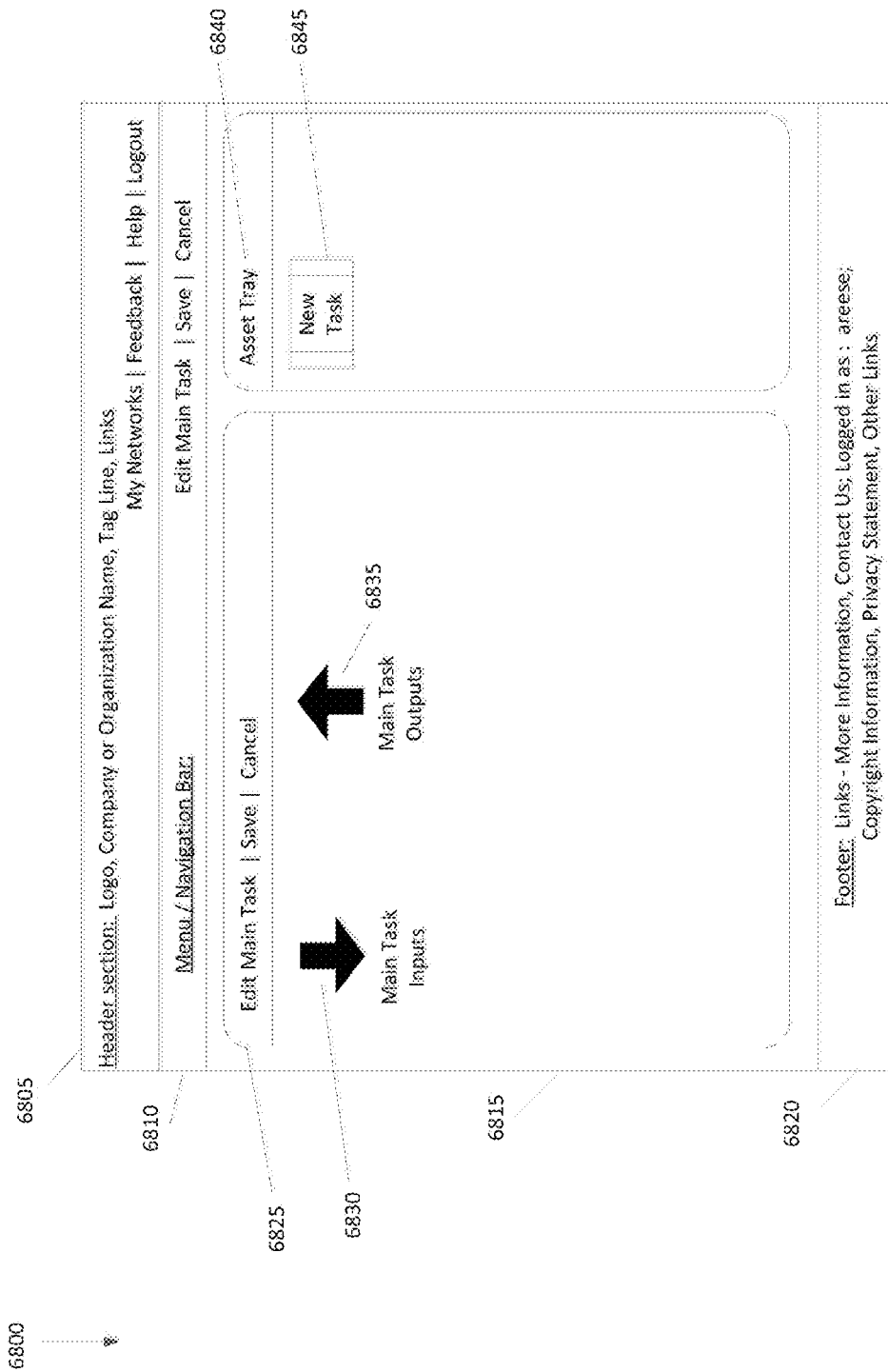
Figure 68. Create Workflow Interface

Figure 69. Edit Task Information

Task Actions

Add Input    Add Output    Save    Cancel

Task Name: _Doctor Visit_

Task Domain Name:
(CRM): _DoctorVist.physicianassoc.skai.net_

Task Contact: _Amanda Reese_

Status: _In progress_
Start Date: _2/08/12_
End Date: _2/15/12_
Inputs: _Appointment_
Outputs: _Referral | Diagnosis_

DESCRIPTION
Doctor visit work flow

Figure 70. Edit Doctor Visit (Parent Task) Information

Figure 71. Specify (Parent Task) Inputs

Figures 71, 72:
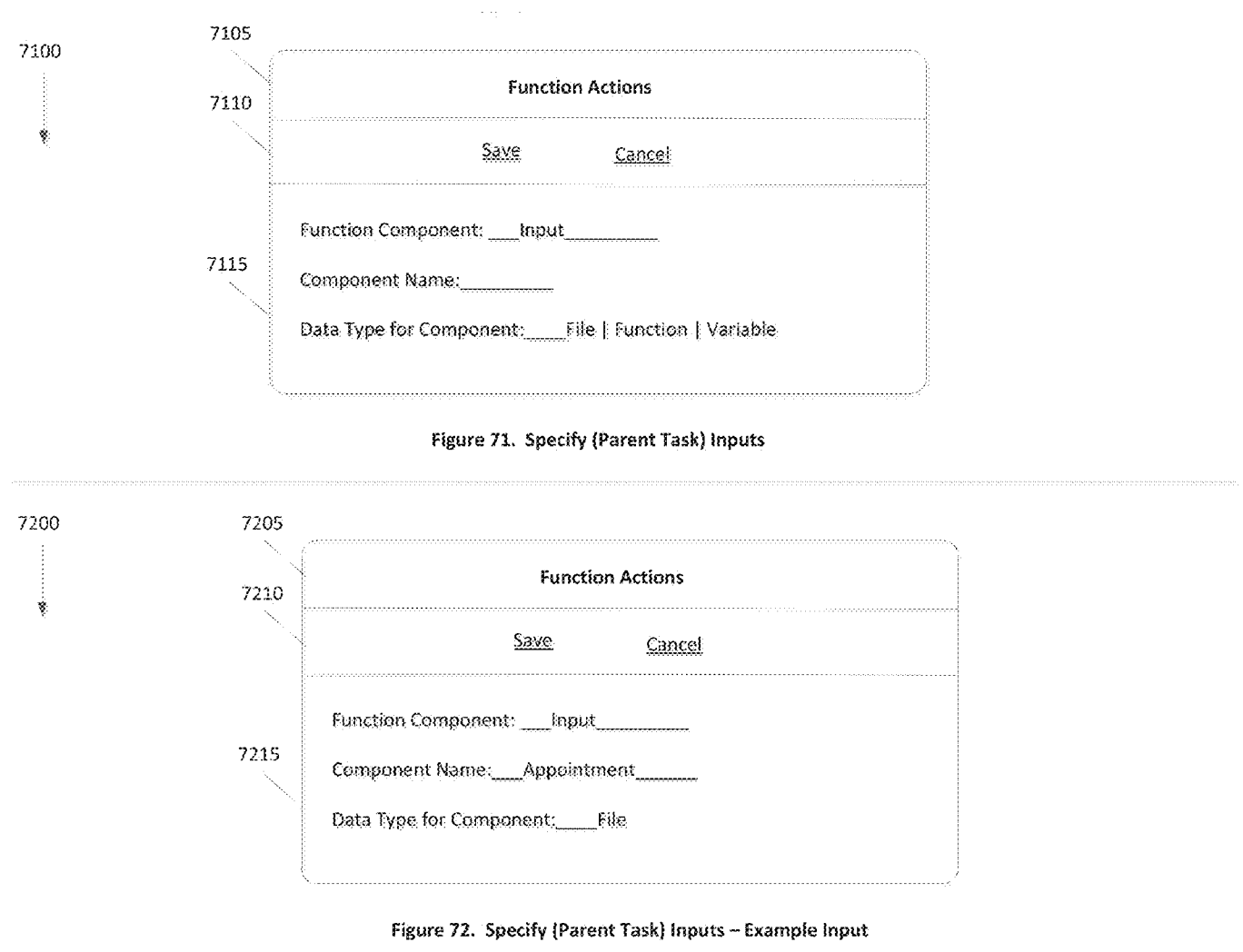

Figure 72. Specify (Parent Task) Inputs -- Example Input

Function Actions

Save    Cancel

Function Component: ___Output___
Component Name: _____
Data Type for Component: ___ File | Function | Variable Figure 73. Specify (Parent Task) Outputs

Function Actions

Save    Cancel

Function Component: ___Output___
Component Name: ___Diagnosis___
Data Type for Component: ___File___

Figure 74. Specify (Parent Task) Outputs – Example Output

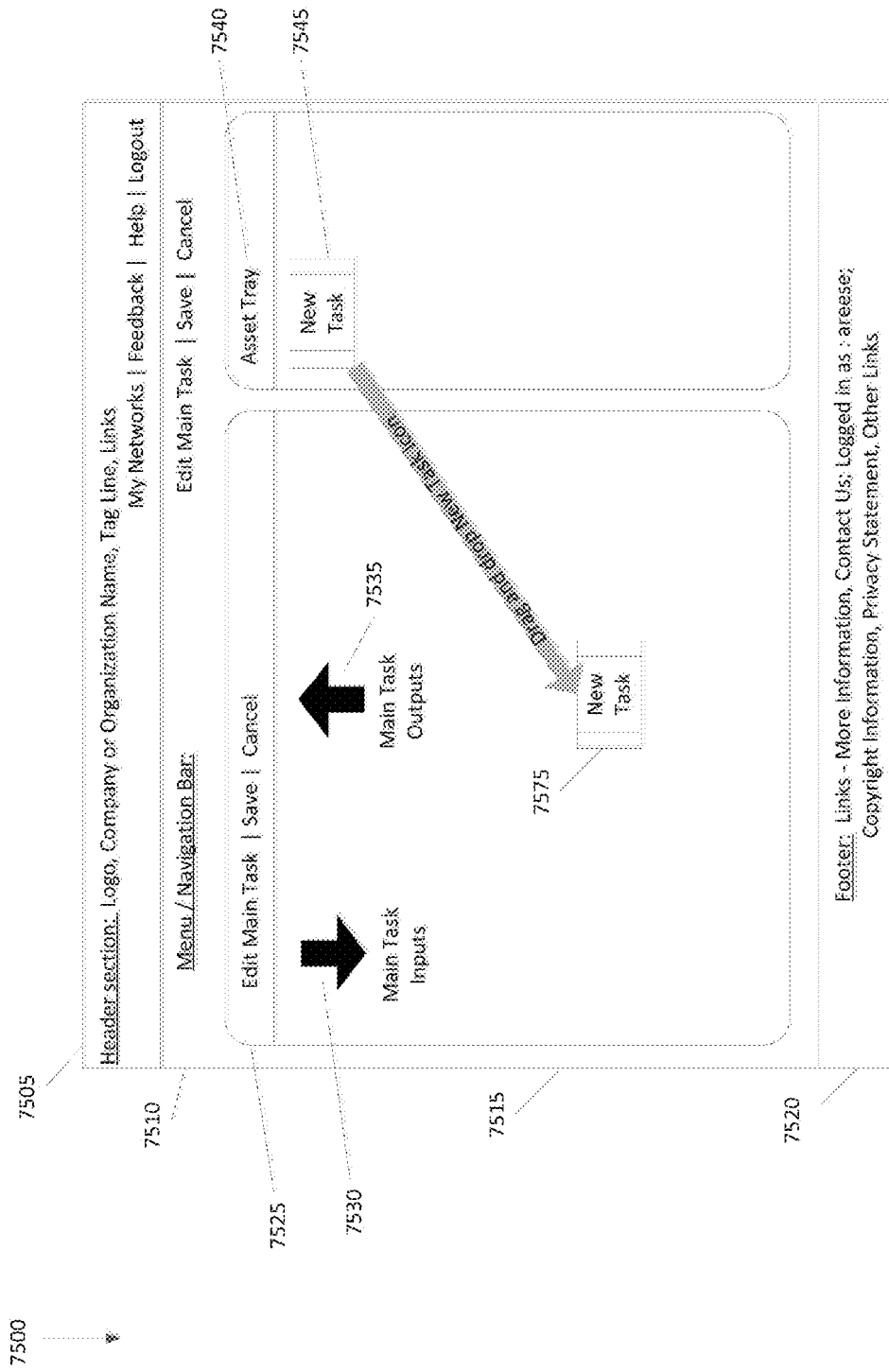
Figure 75. Add a Member Function to the Doctor Visit Task

Task Actions

Add Input    Add Output    Save    Cancel

Task Name: ___Nurse Exam___

Task Domain Name
(CRN): ___NurseExam.physicianassoc.skai.net___

Task Contact: ___Amanda Reesee Nelson___

Status: ___In progress___
Start Date: ___2/08/12___
End Date: ___2/15/12___
Inputs: ___Appt-info___
Outputs: ___Vitals___
DESCRIPTION Nurse exam task. Take the patient height, weight, blood pressure, and temperature. Ask reason for visit.

Figure 76. Add Nurse Exam Member Function Information

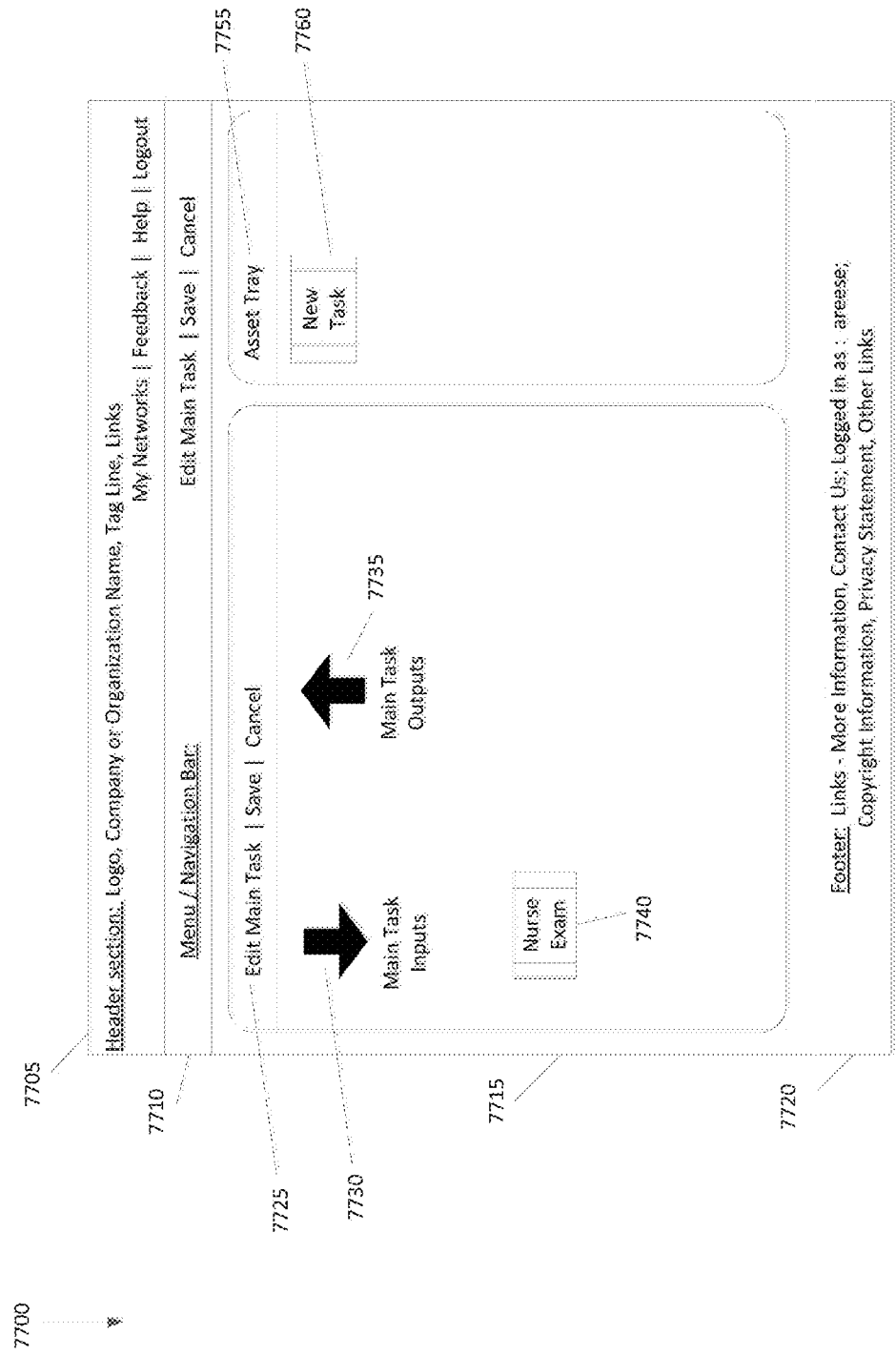
Figure 77. Doctor Visit Workflow with Nurse Exam Task Added

Task Actions

Add Input     Add Output     Save     Cancel

Task Name: _____Doctor Exam_____

Task Domain Name
(CRM): __jcDoctorExam.physicianassoc.skai.net__

Task Contact: _____Amanda Reese_____

Status: __In progress__
Start Date: __2/08/12__
End Date: __2/15/12__
Inputs: __Vitals__
Outputs: __Diagnosis | Referrals__

DESCRIPTION

Review patient stats, conduct exam, complete diagnosis

Figure 78. Add Doctor Exam Member Function Information

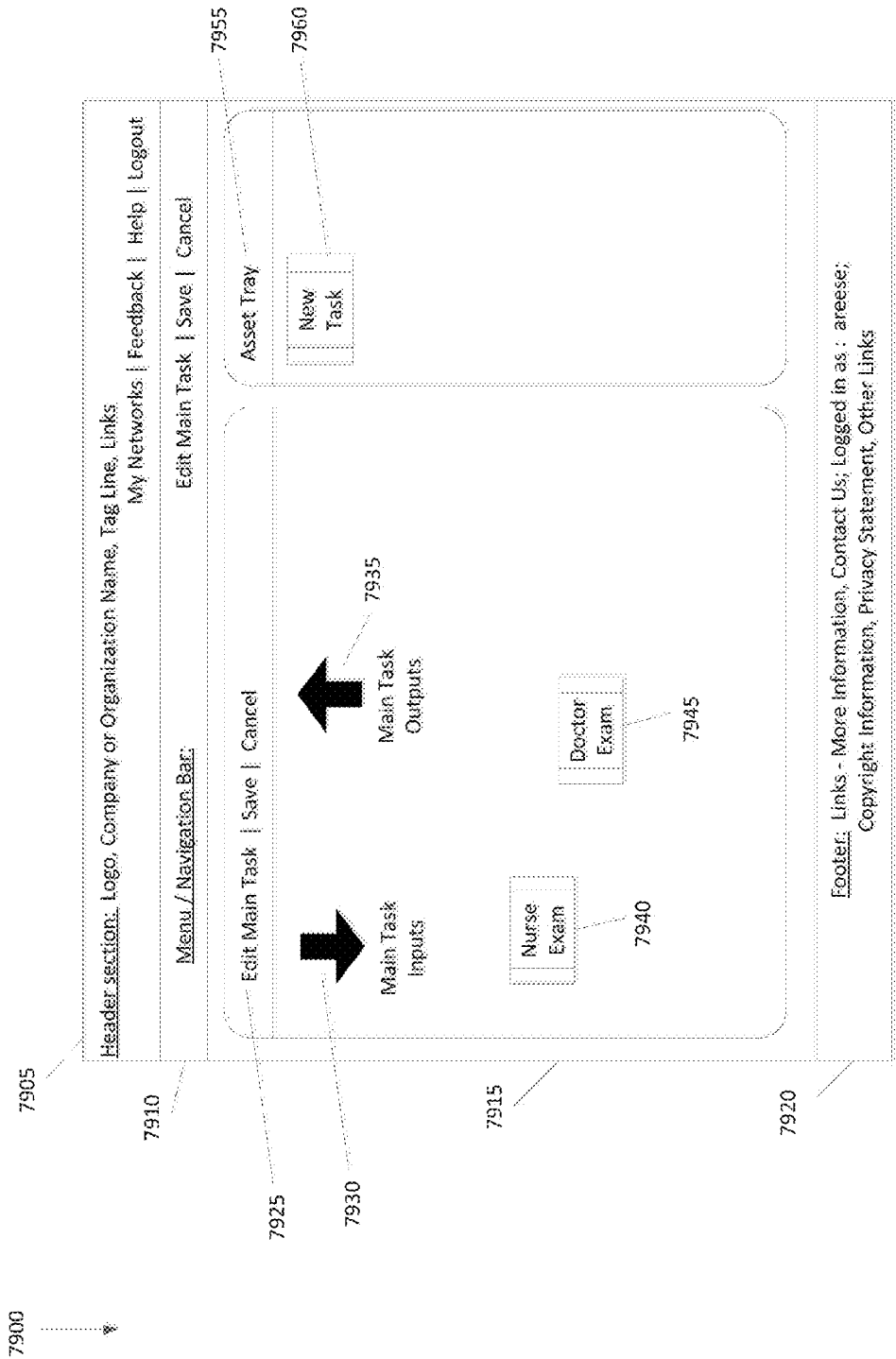
Figure 79. Doctor Visit Workflow with Doctor Exam Member Function Added

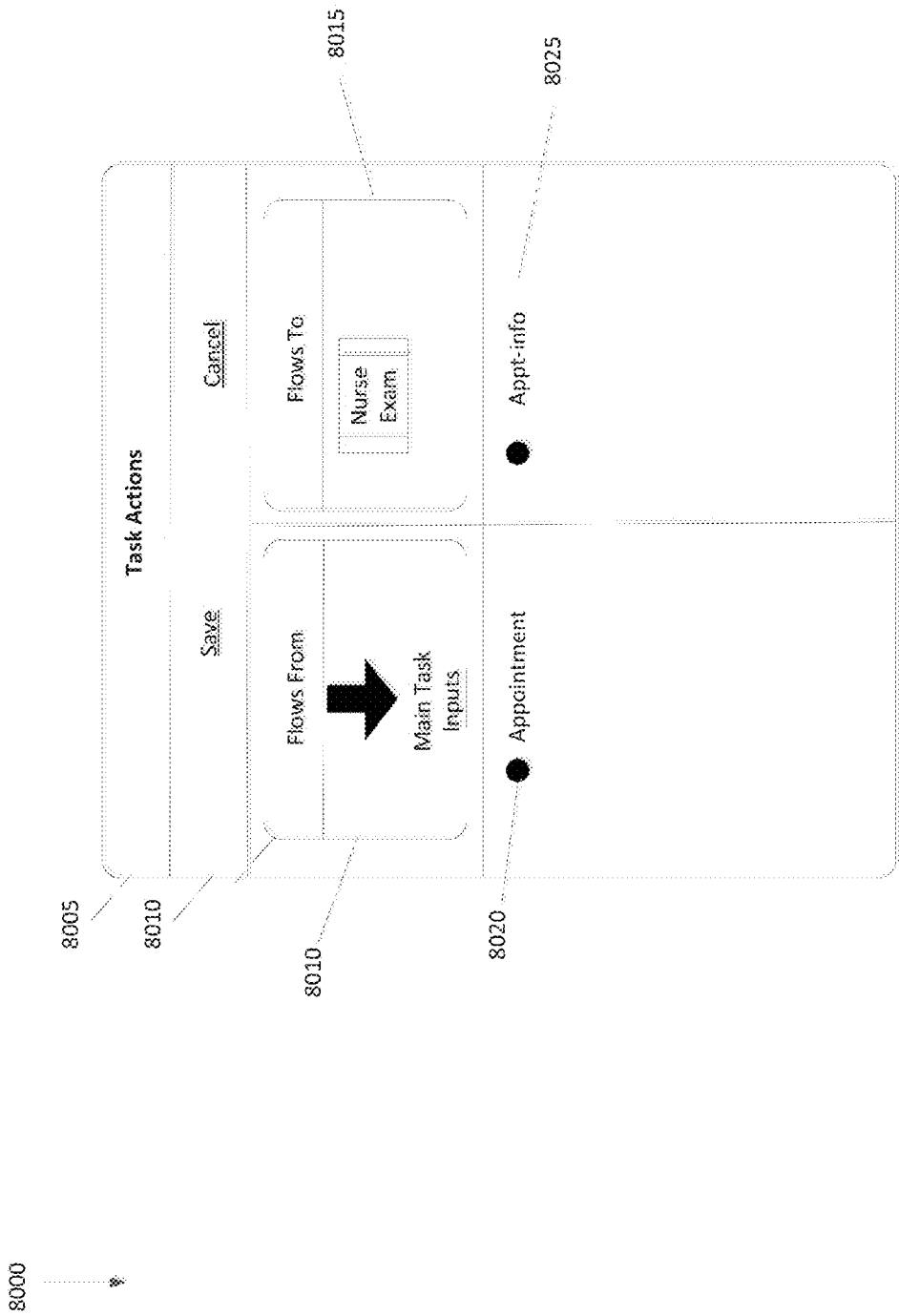
Figure 80. Wiring Parent Task Input to Nurse Exam Member Task Input

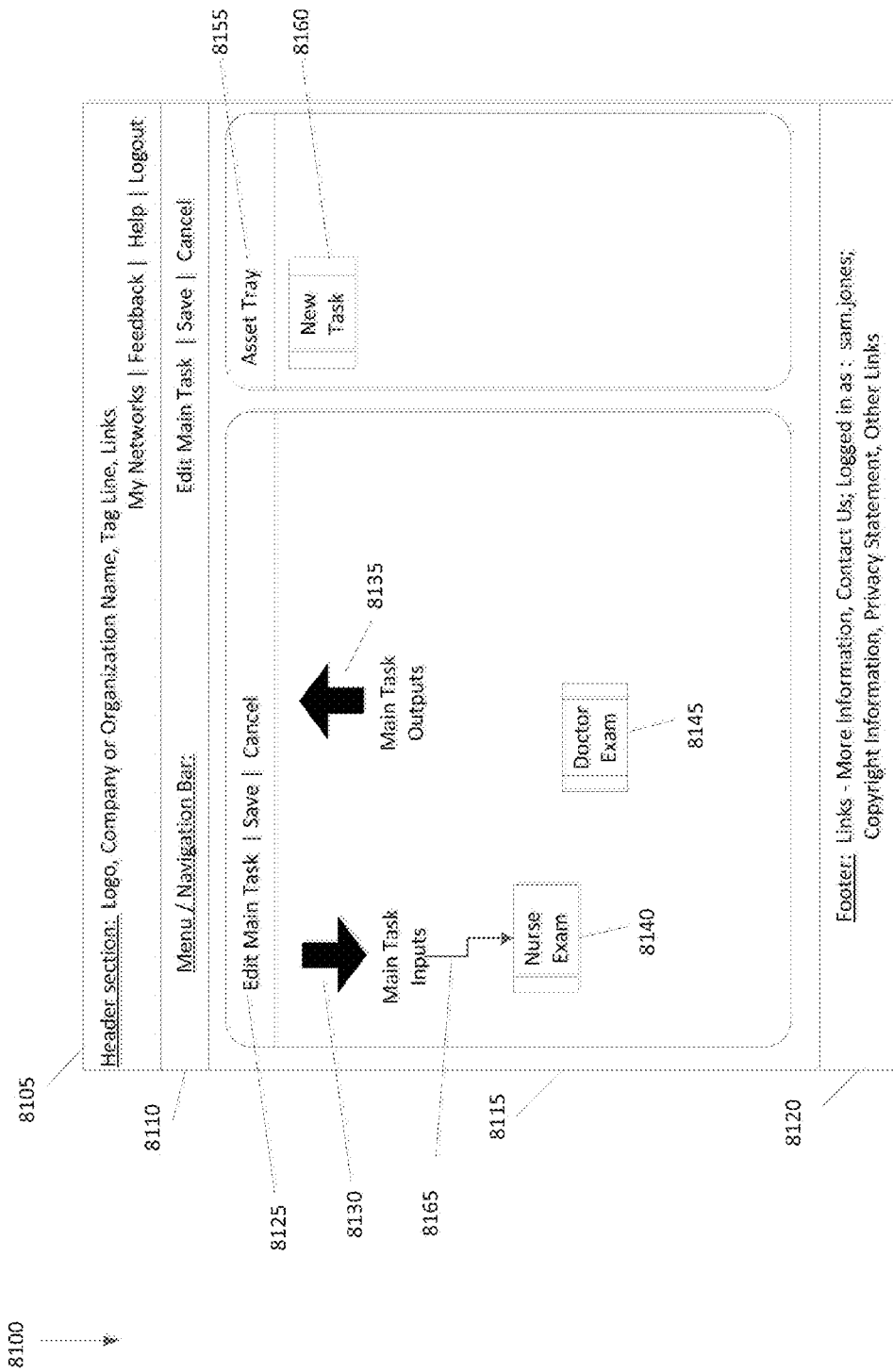
Figure 81. Doctor Visit Workflow with Doctor Exam Member Function Added

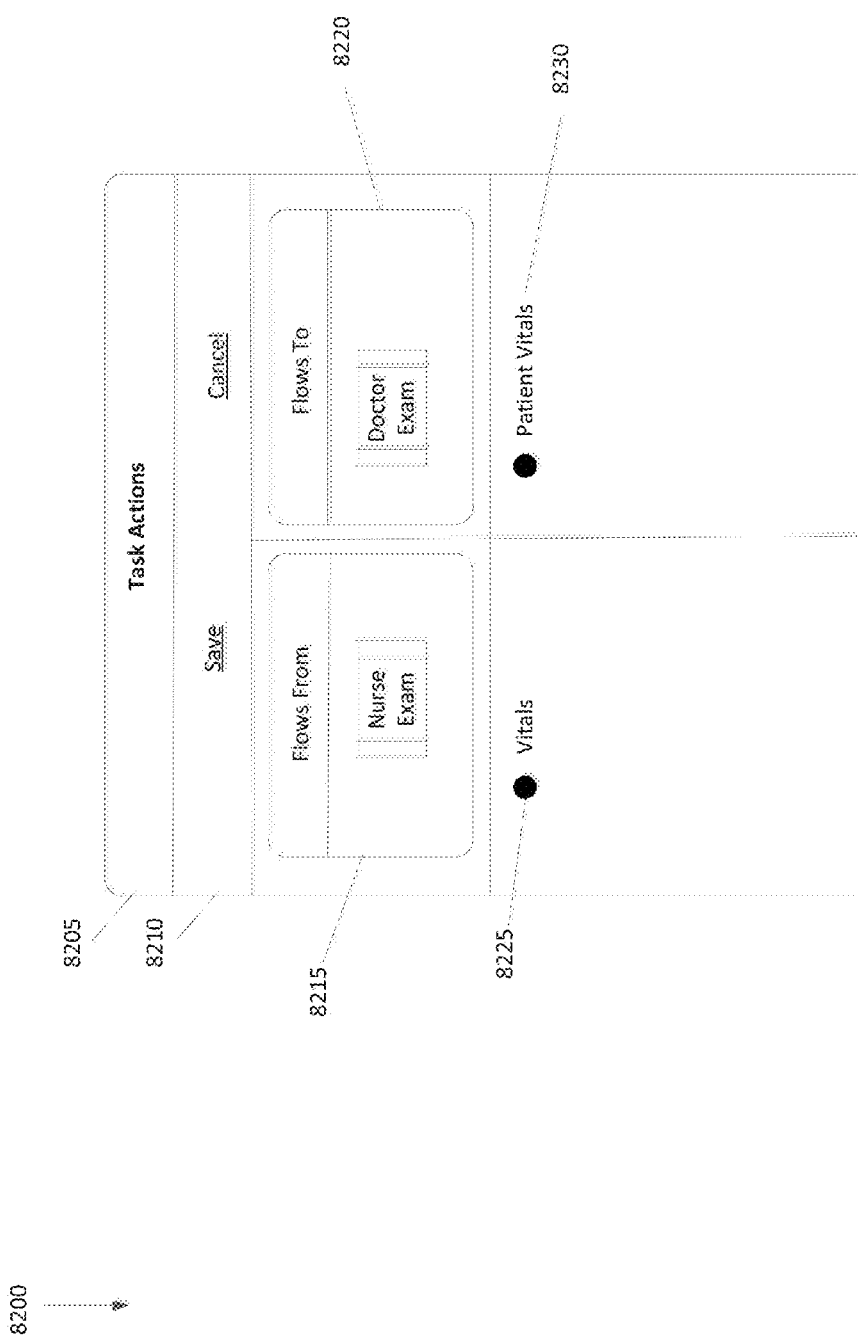
Figure 82. Wiring Nurse Exam Member Task Outputs to Doctor Exam Member Task Inputs

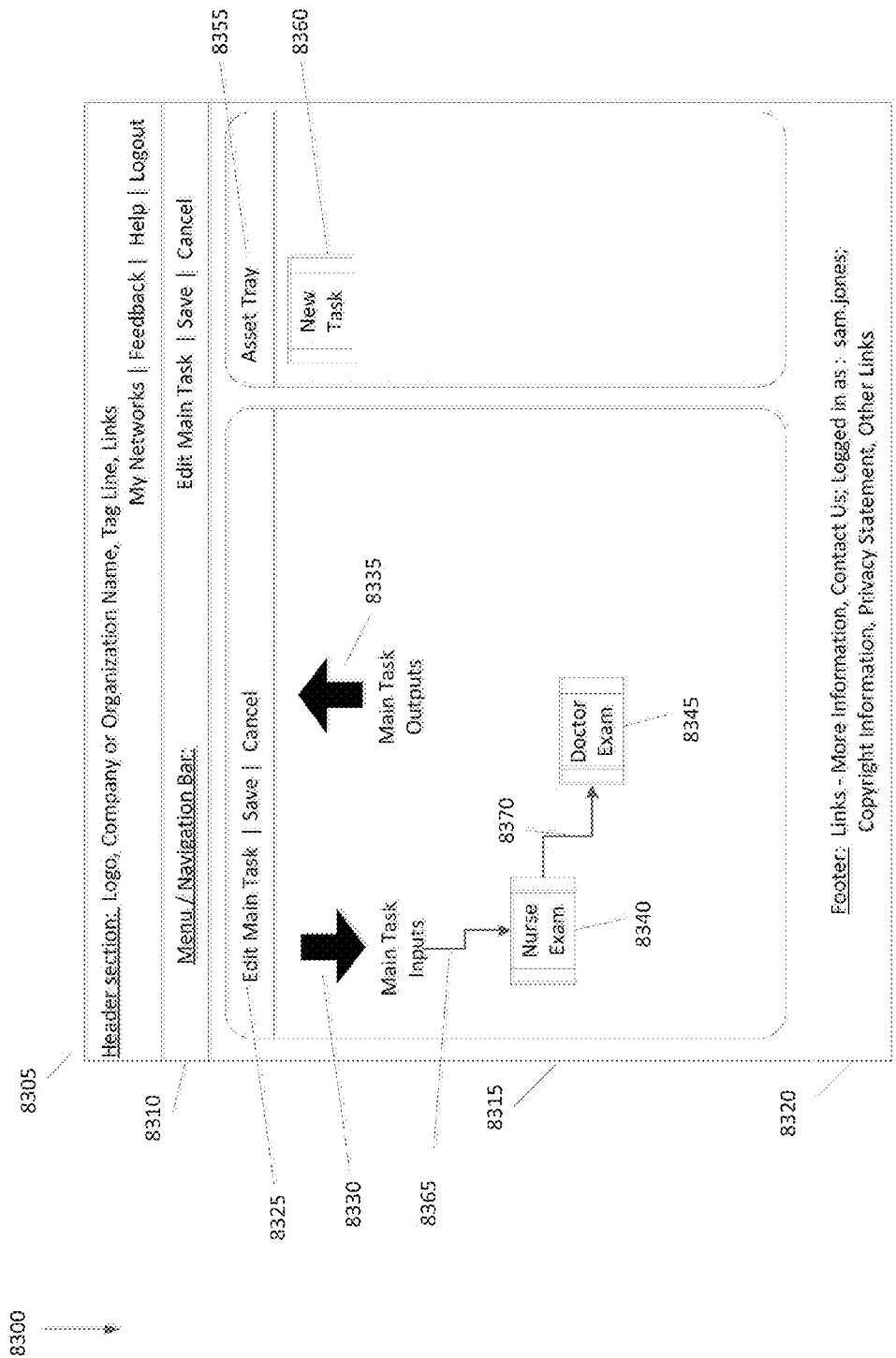
Figure 83. Doctor Visit Parent Task in Workflow with Doctor Exam Member Function Added

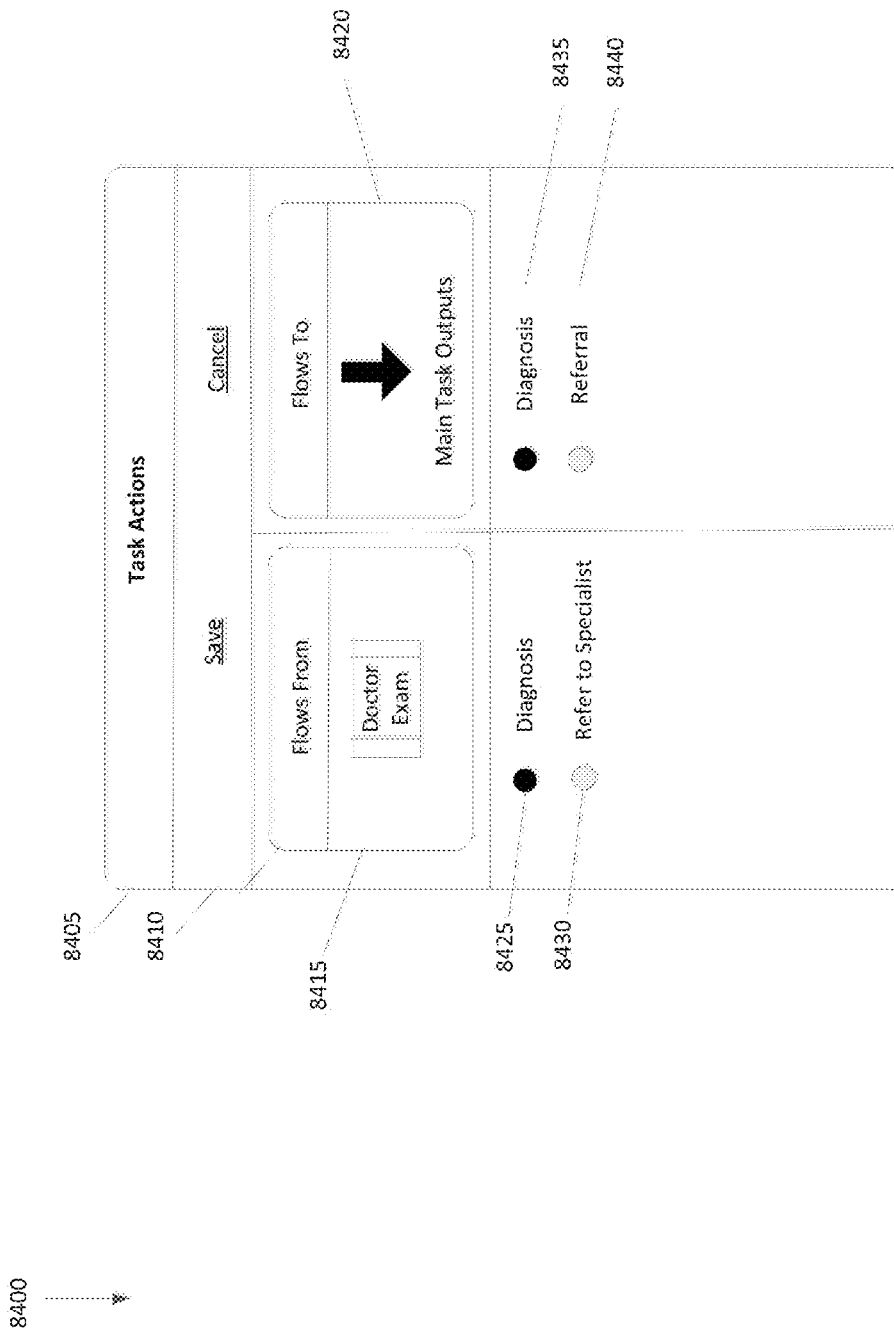
Figure 84. Wiring Doctor Exam Member Function Outputs to Doctor Visit (Parent Task) Outputs

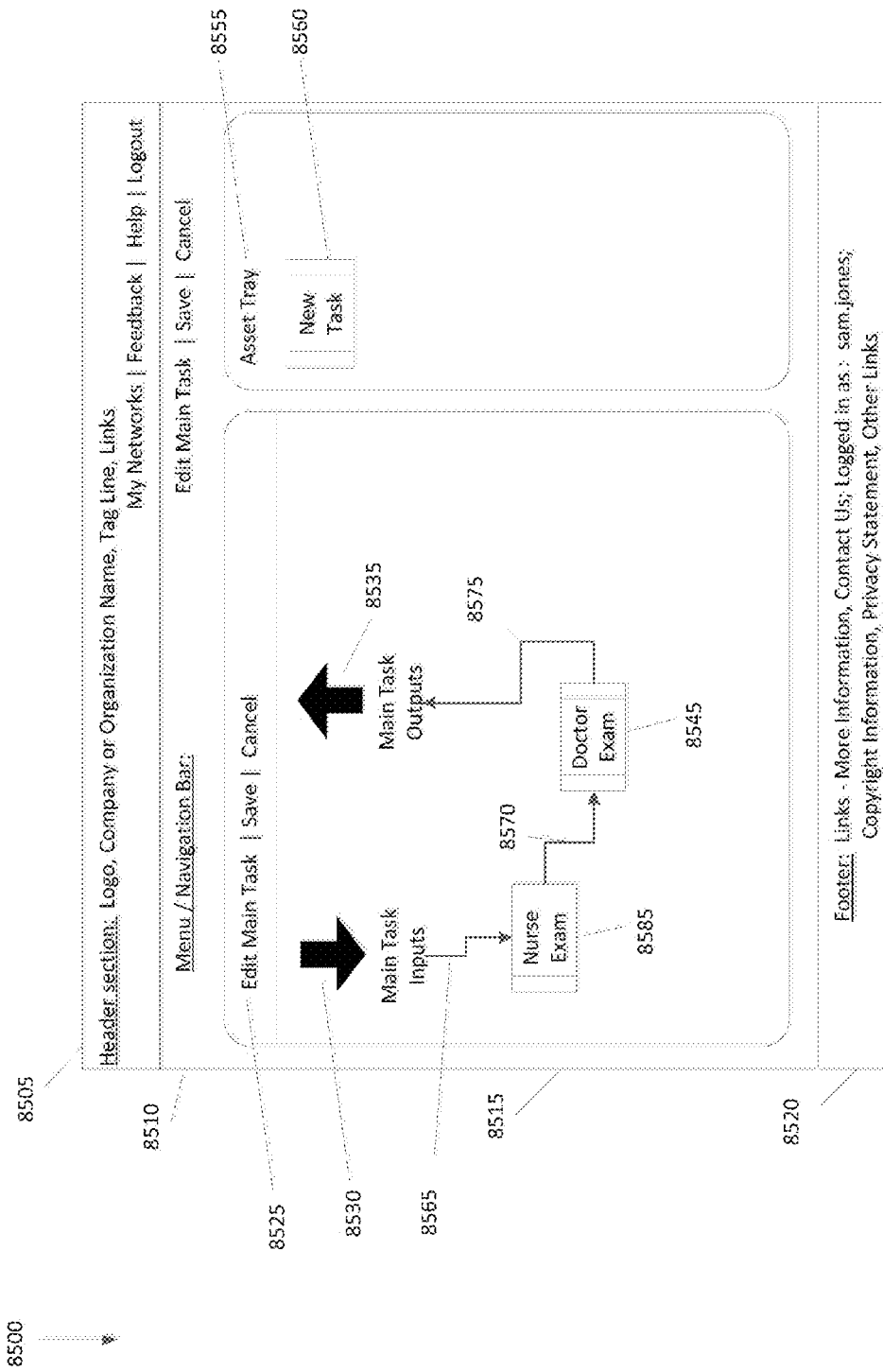
Figure 85. Doctor Visit Task with Doctor Exam Member Function Wired

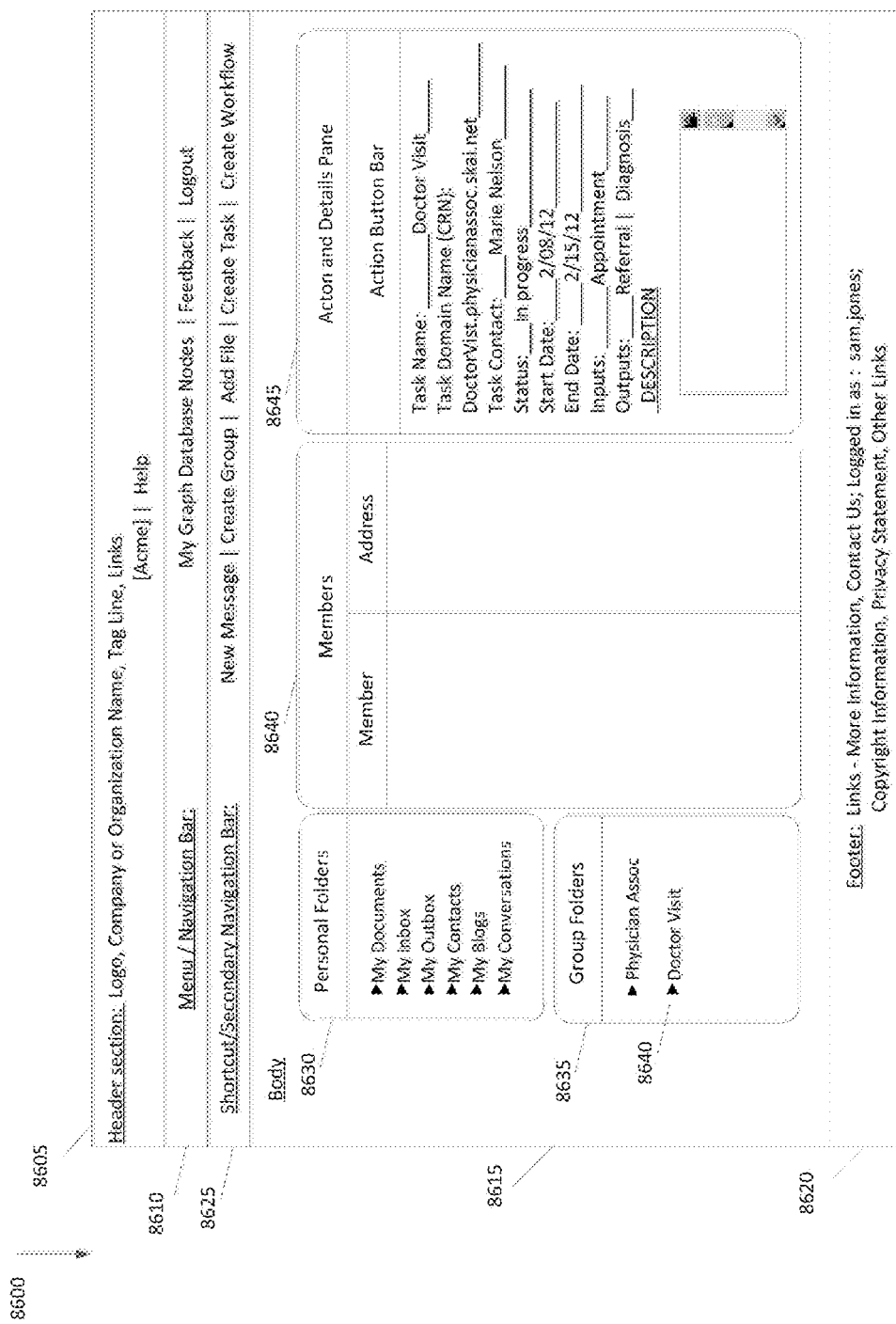
Figure 86. Example Interface with Doctor Visit Workflow Added to Group Folders Pane

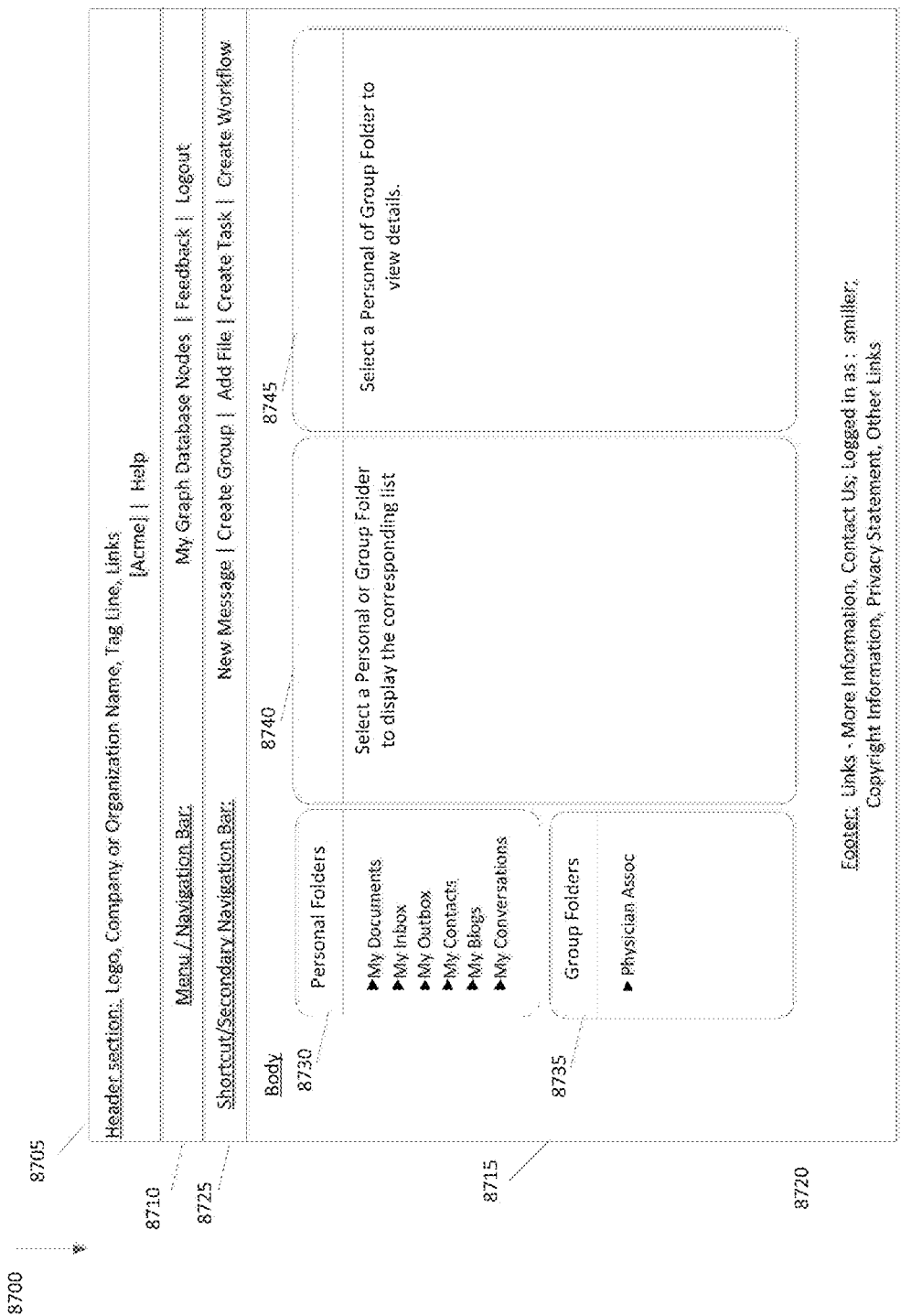
Figure 87. User View Before Being Assigned a Task in the Doctor Visit Workflow

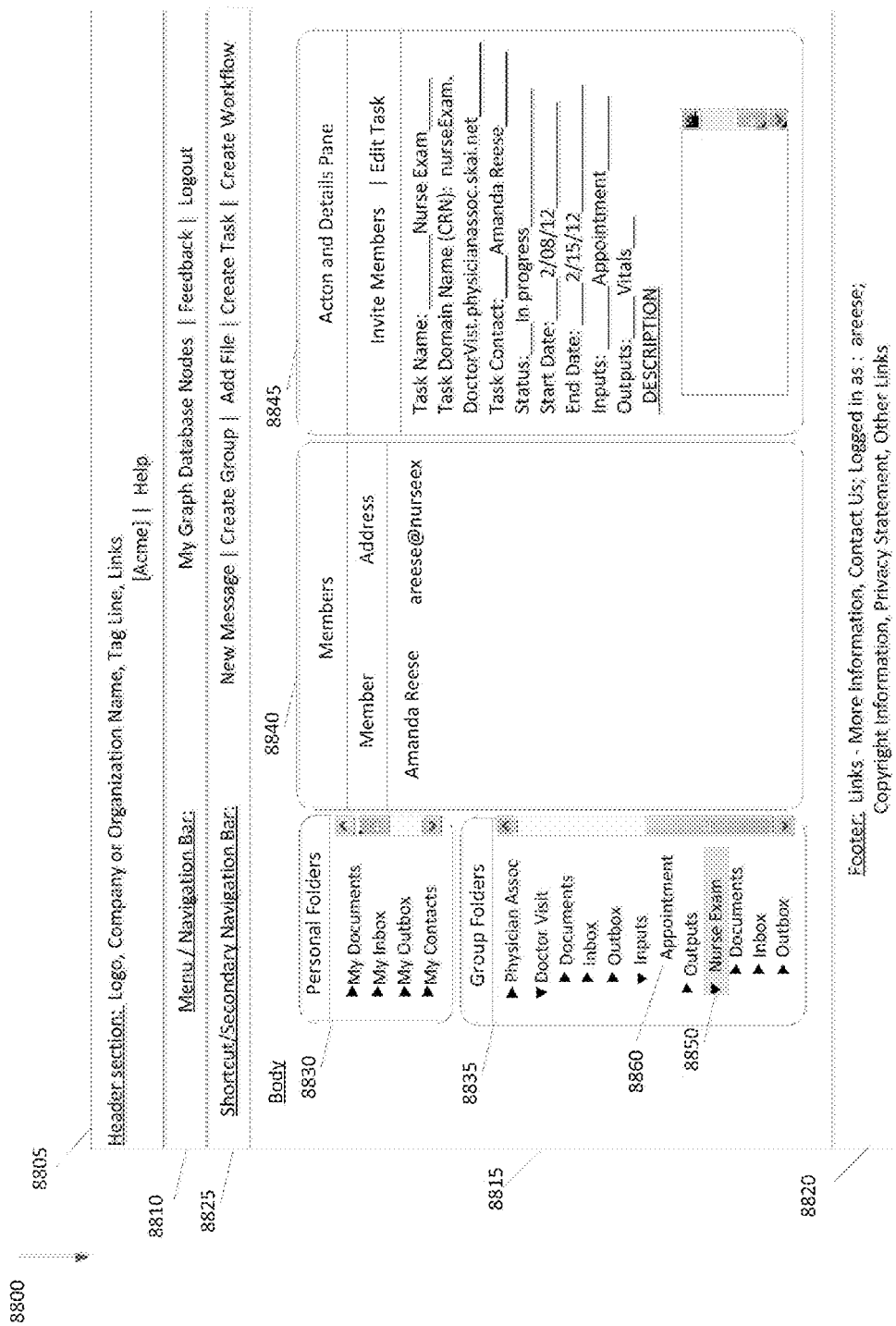
Figure 88. Nurse Exam Task Details

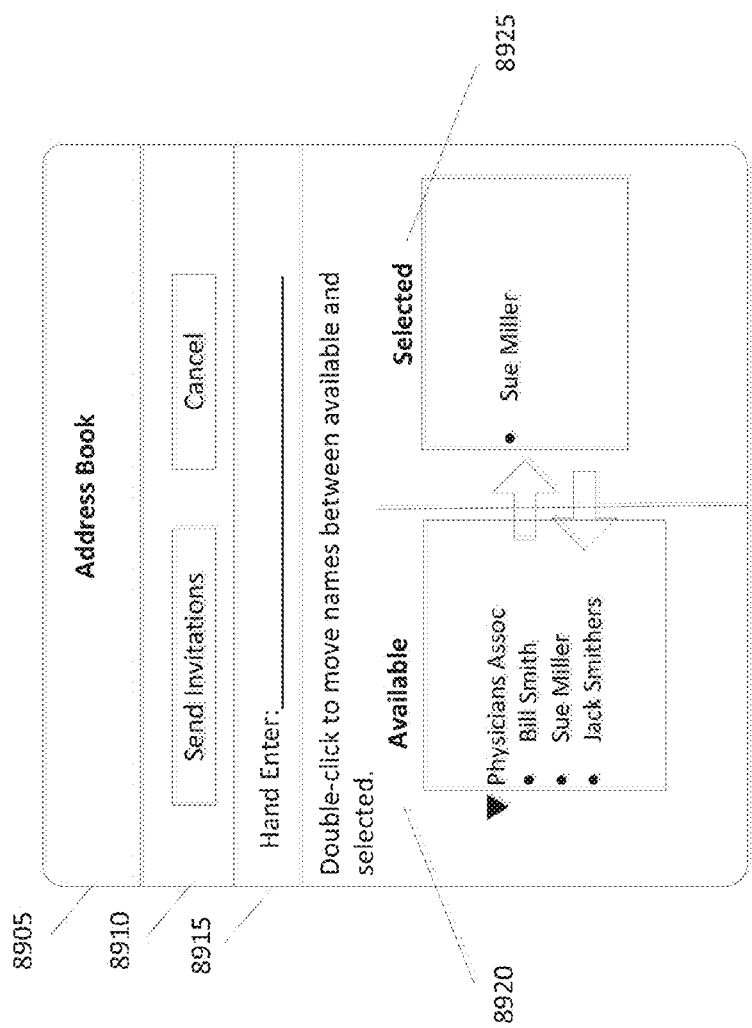
Figure 89. Select and Assign a User to the Nurse Exam Task

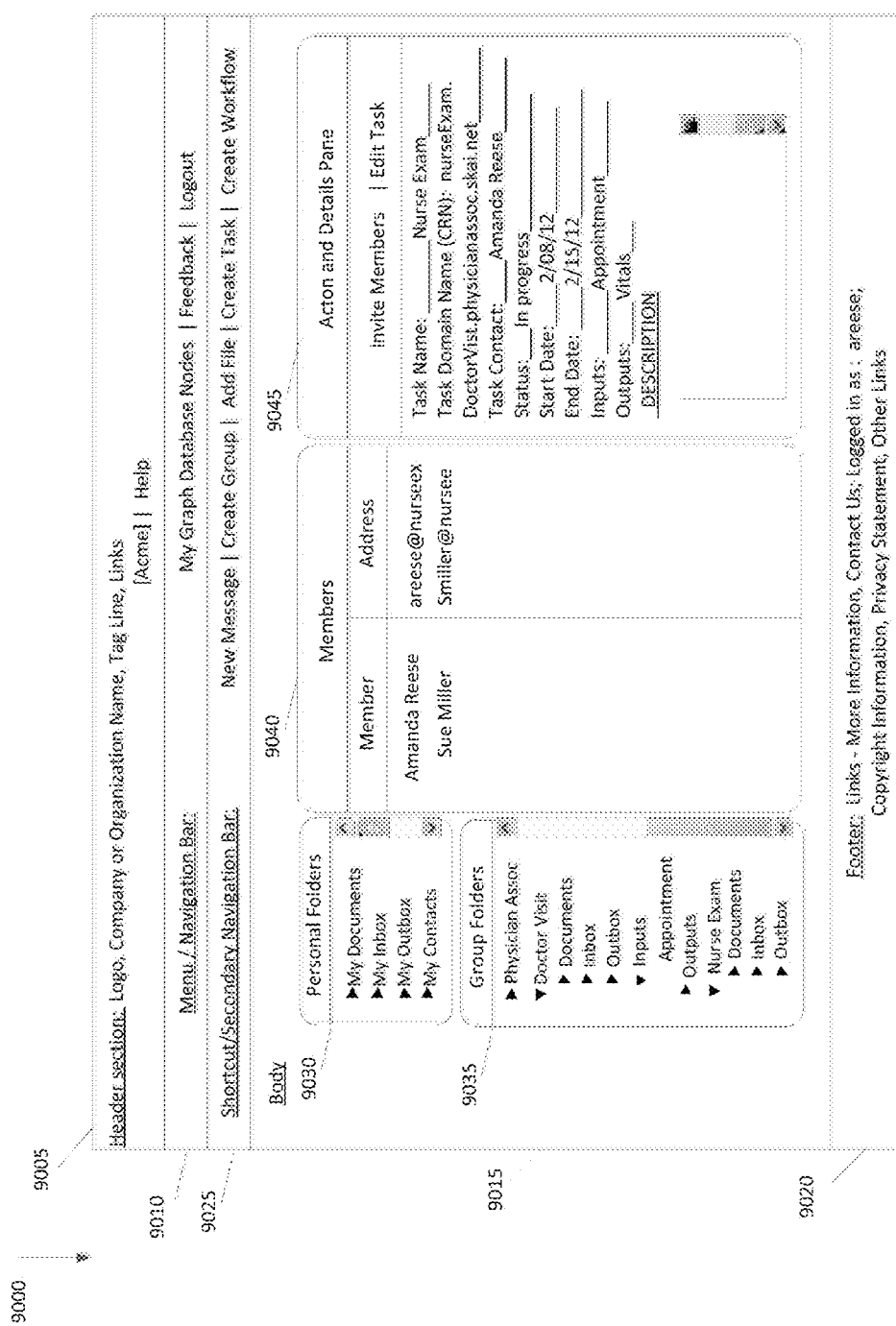
Figure 90. Nurse Exam Member Function with User "smiller" Assigned to Task

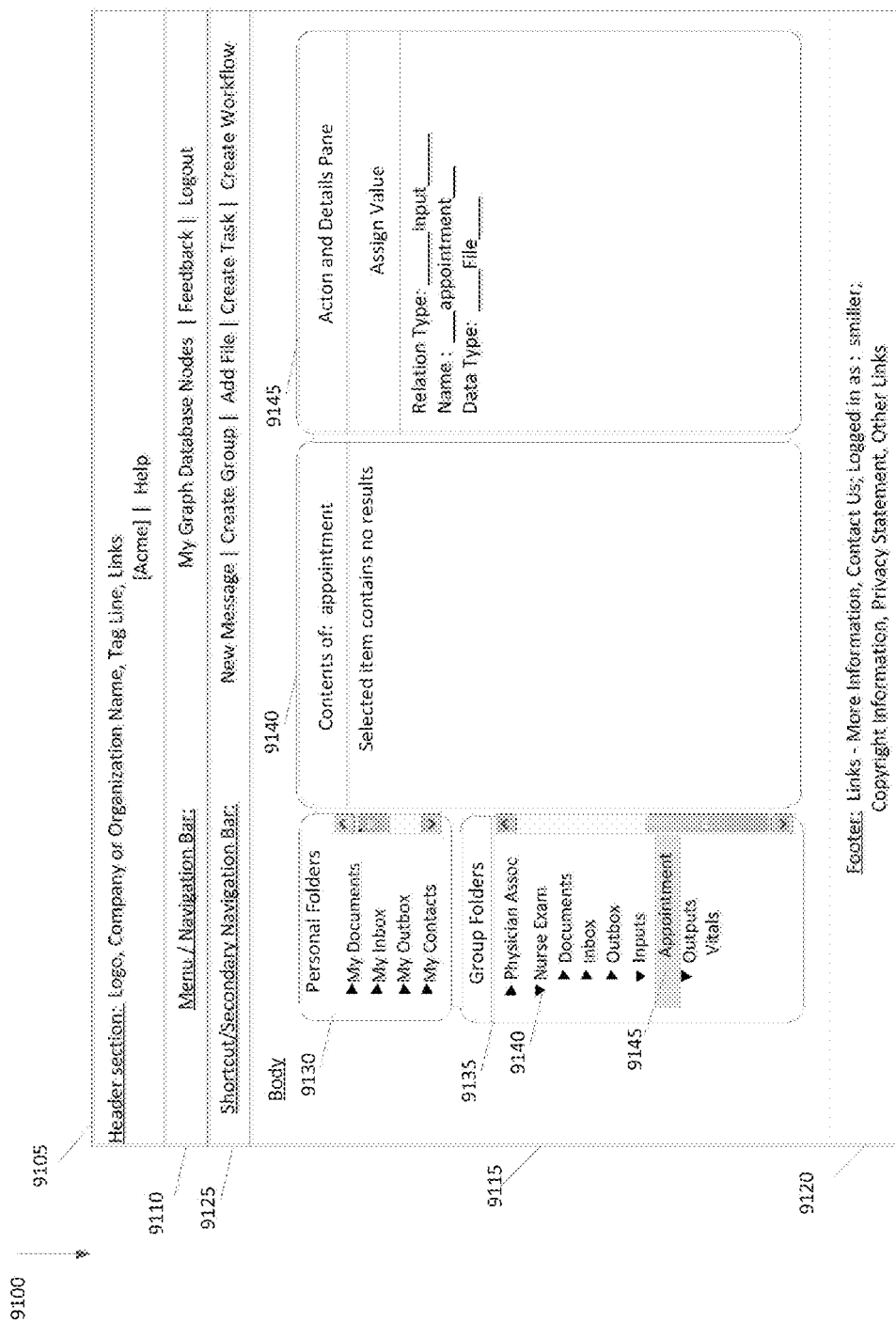
Figure 91. User smiller view after Being Assigned Nurse Exam Member Function

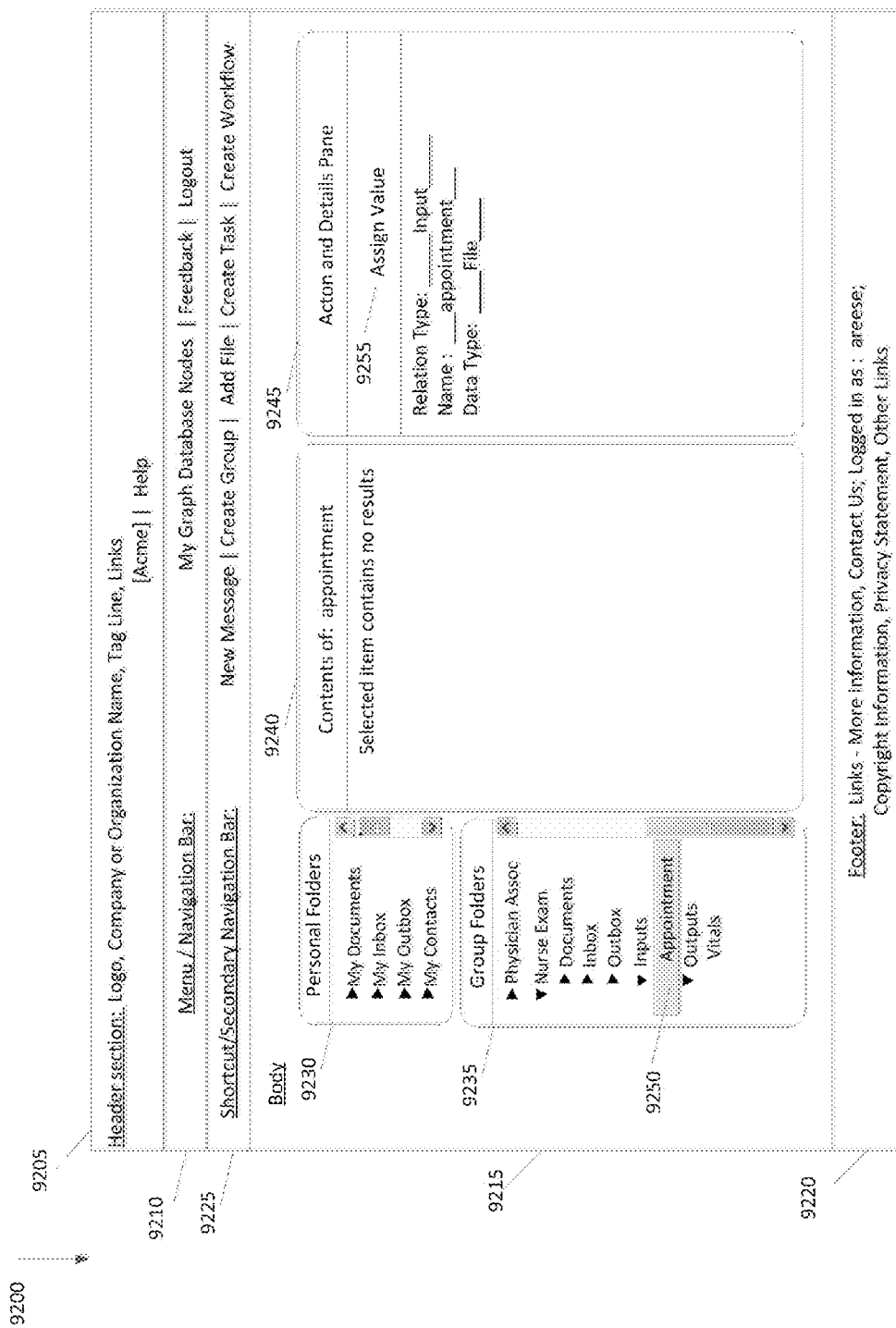
Figure 92. Blank Appointment Input

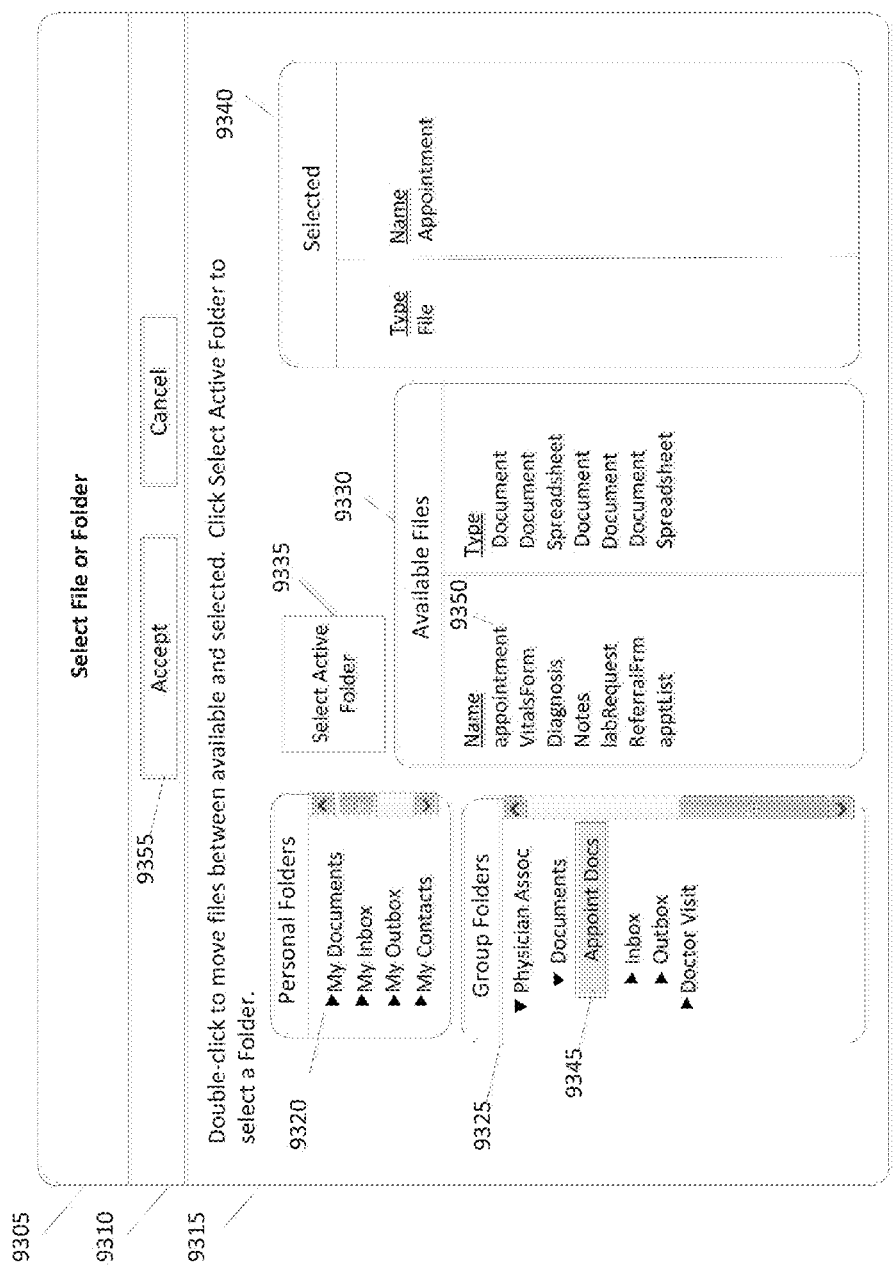
Figure 93. Populate Appointment Input

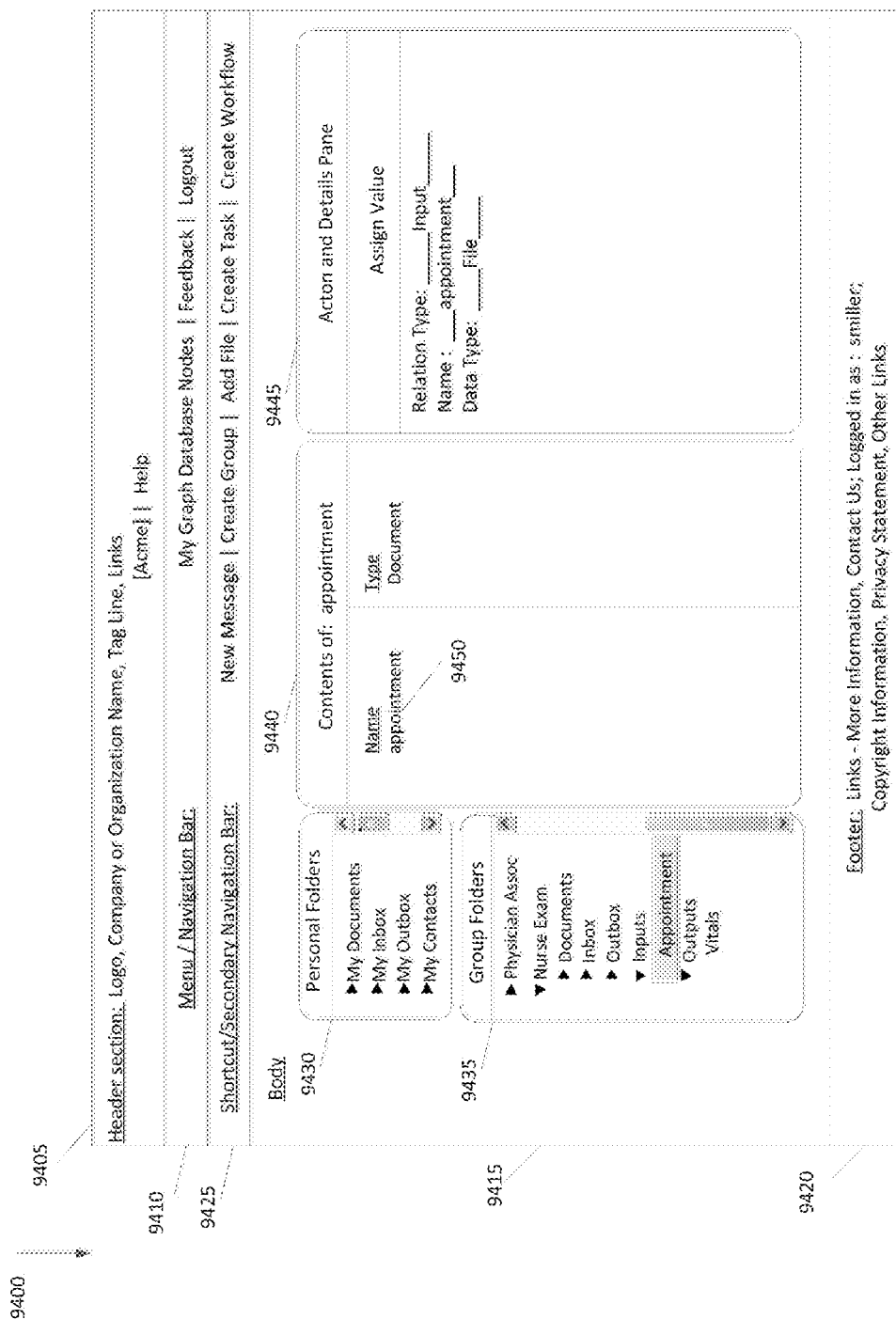
Figure 94. Nurse Exam Member Function with Input File

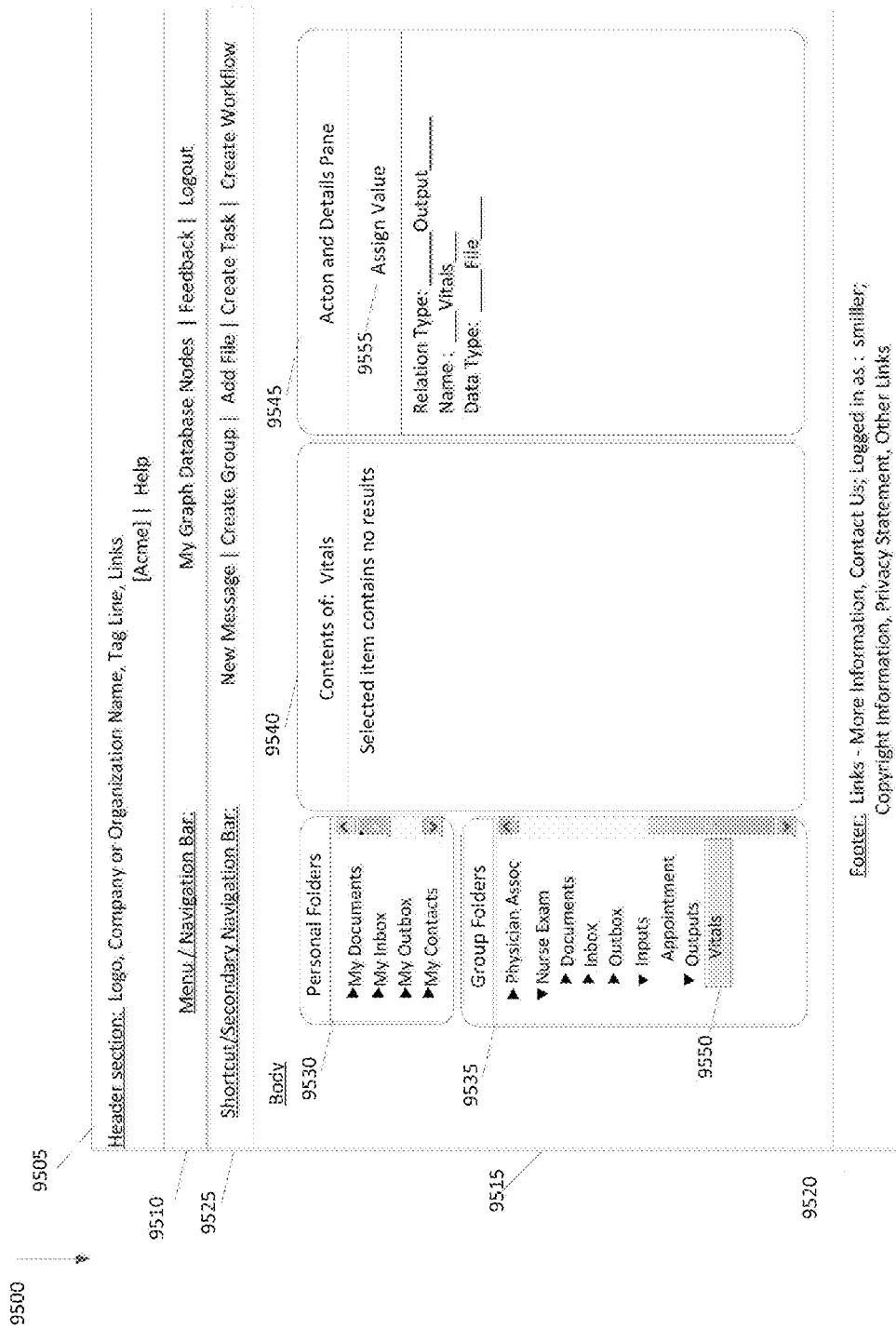
Figure 95. Nurse Exam Member Function Before Output File Populated

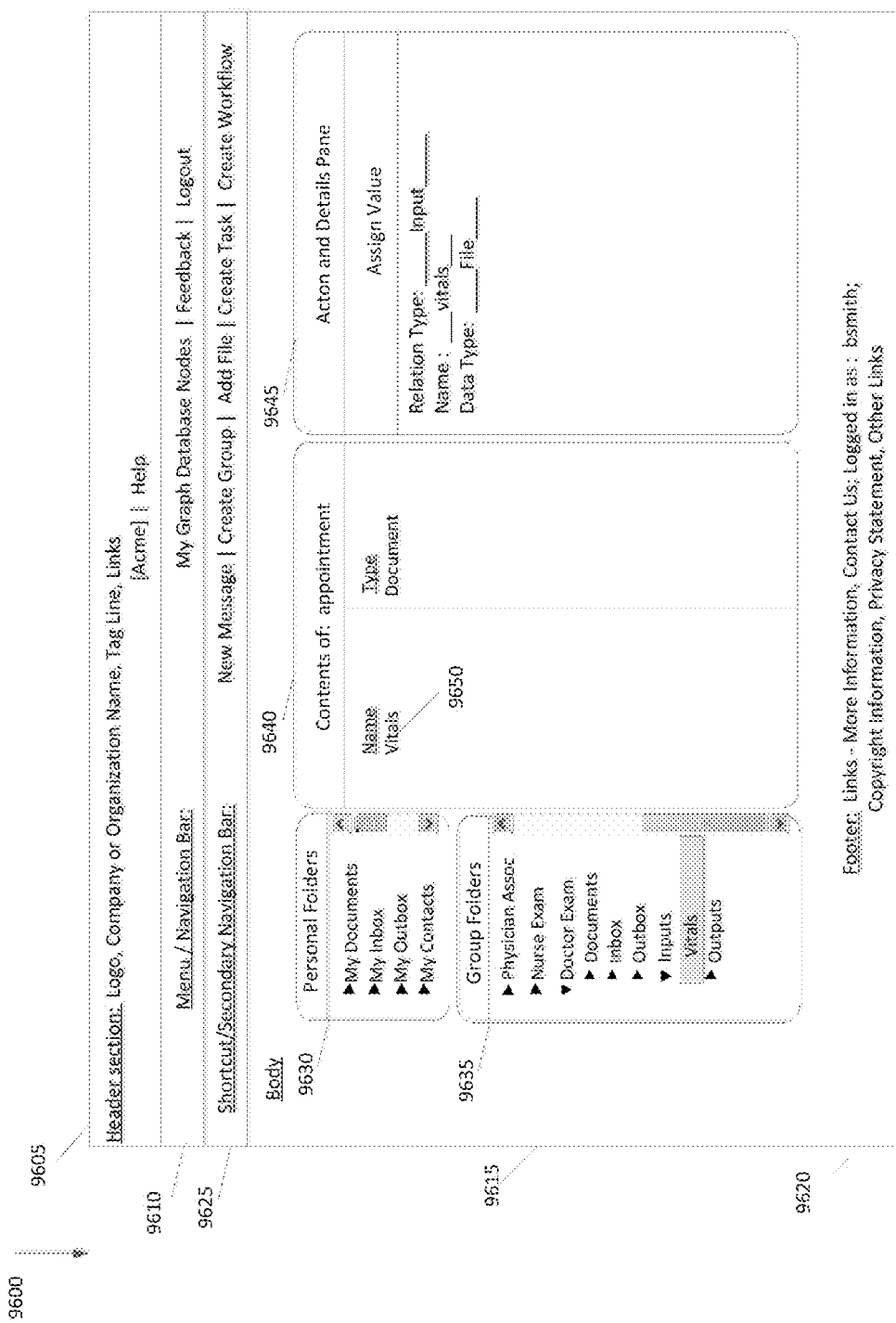
Figure 96. Doctor Exam Member Function with Streamed Input File

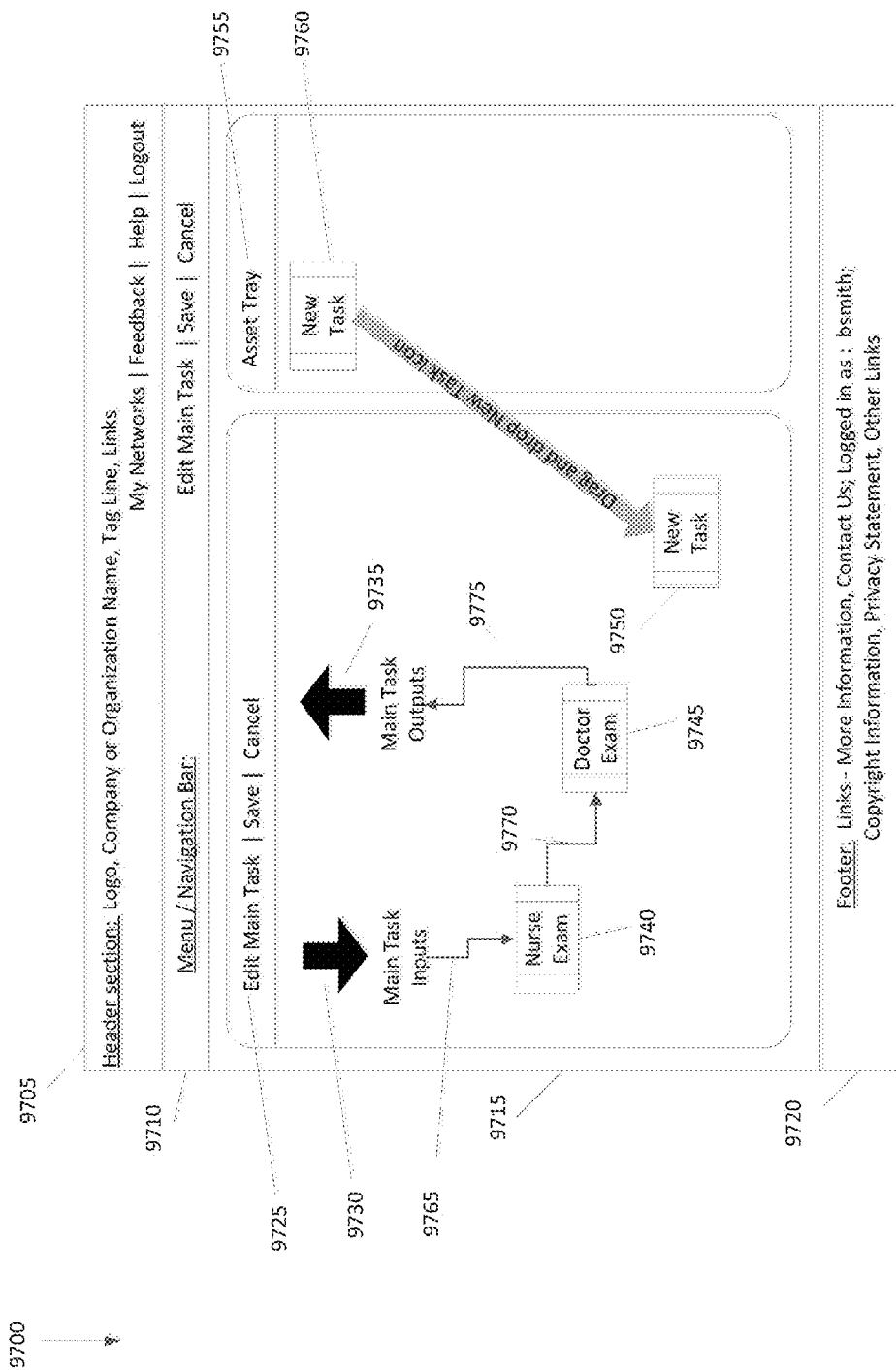
Figure 97. Modify a Member Function of a Parent Task During Run-Time

Task Actions

| Add Input | Add Output | Save | Cancel |

Task Name: ____Lab Analysis____

Task Domain Name
(CRN):____labAnalysis.physicianassoc.skai.net____

Task Contact: ____Bill Smith____

Status: ____In progress____
Start Date: ____2/08/12____
End Date: ____2/15/12____
Inputs: ____labReferral____
Outputs: ____lab results____

DESCRIPTION
Lab analysis request.

Figure 98. Add Lab Analysis Member Function Information

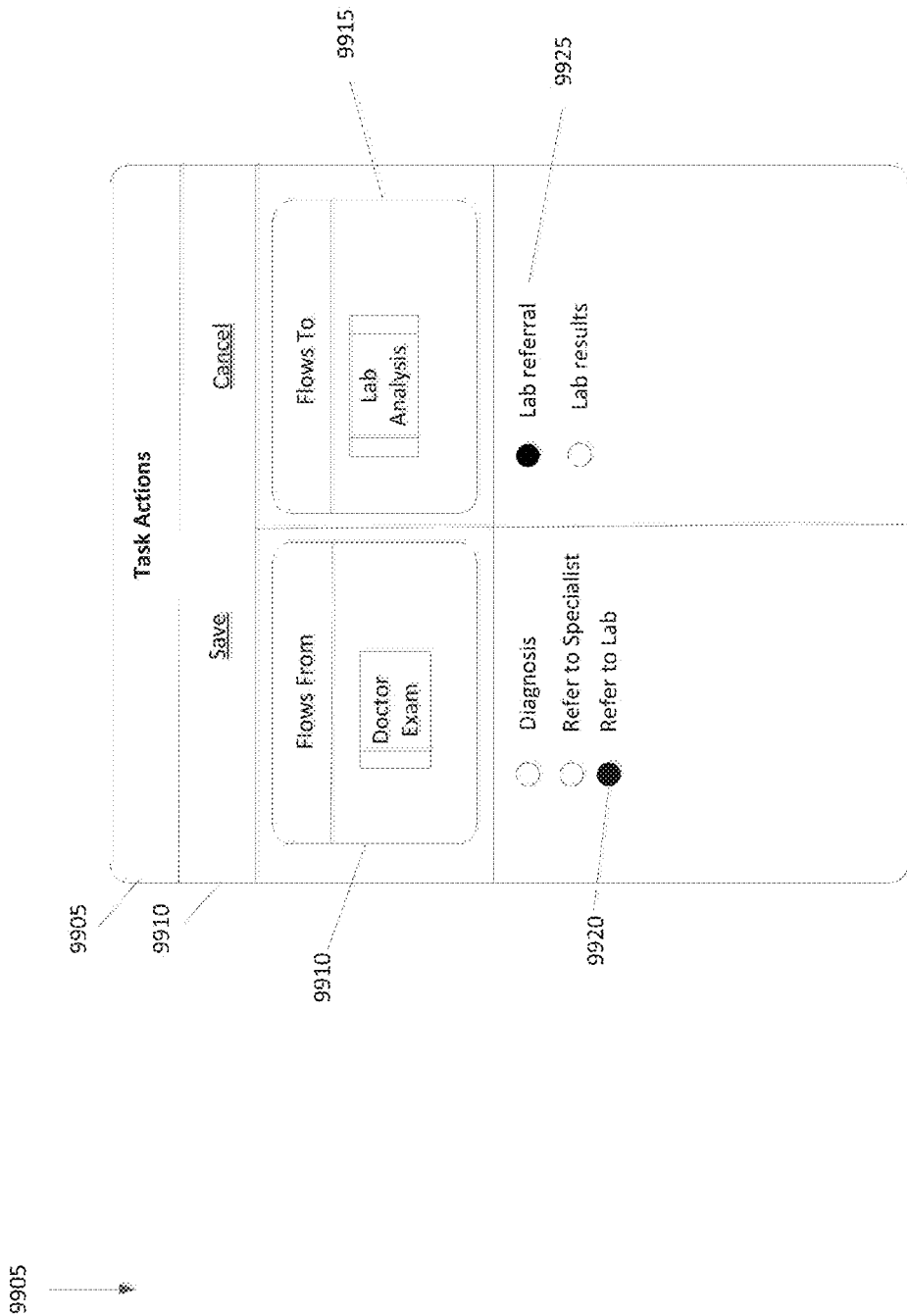
Figure 99. Wiring Parent Task Input to Nurse Exam Member Task Input

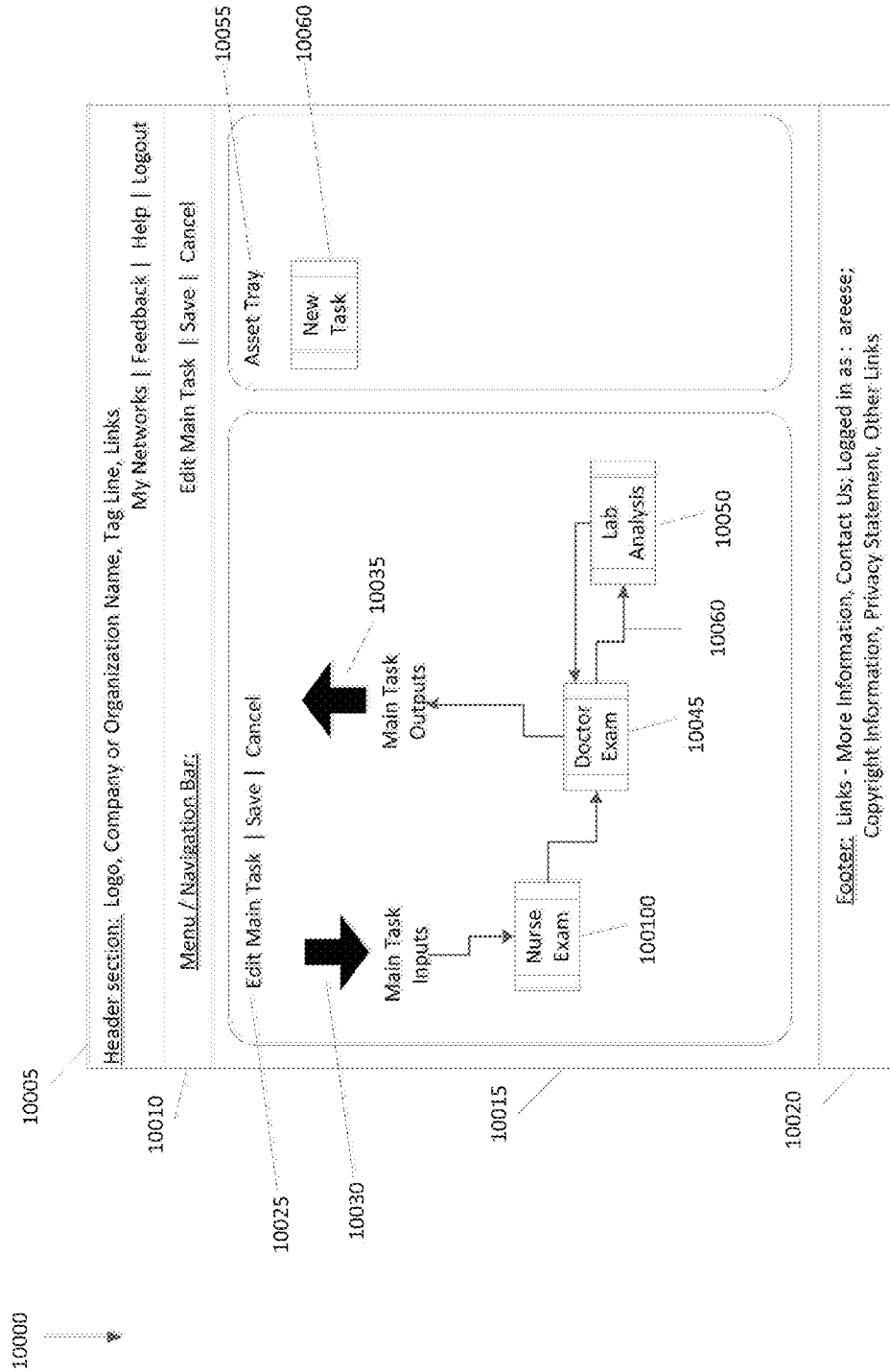
Figure 100. Doctor Visit Workflow with Lab Analysis Member Function Added

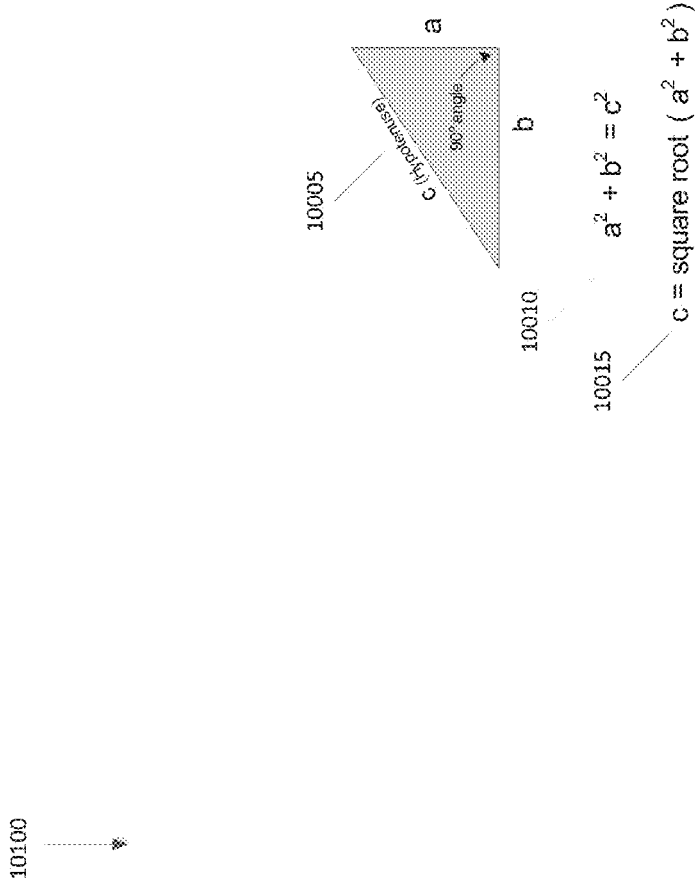
Figure 101. Pythagorean Theorem for Calculating Hypotenuse

SYSTEM AND METHOD FOR THE STRUCTURING AND INTERPRETATION OF ORGANIC COMPUTER PROGRAMS

CROSS-REFERENCE TO RELATED APPLICATIONS

This application claims priority and benefit of U.S. Provisional Application No. 61/470,198 filed on Mar. 31, 2011, entitled SYSTEM AND METHOD FOR THE STRUCTURING AND INTERPRETATION OF ORGANIC COMPUTER PROGRAMS, the disclosure of which is incorporated herein in its entirety.

This application is also generally related to U.S. application Ser. No. 13/341,401 and is also generally related to U.S. application Ser. No. 13/304,161 and is also generally related to U.S. application Ser. No. 13/163,634, the disclosures of which are hereby incorporated by reference herein in their entirety.

BACKGROUND

1. Field of the Invention

The invention relates generally to information processing technology and, more specifically, to a system and method that generally provides for unifying program design time and program run time, may provide for program structure and program state to change at run time, and may provide for programs to continuously change and evolve through the addition of member functions, inputs, and outputs as the program is running, among other aspects.

2. Related Art

Computer programs today are typically constrained by the fact that they exist in one and only one of two states at a given time. These states are referred to generally as "design time" and "run time".

"Design Time" is the state in which the program is typically represented as one or more text files containing alphanumeric characters arranged according to the requirements of a given programming language (i.e. as "code"). While a program is in this state it can be modified by a programmer or by another program capable of modifying text files, but it is inert—its expressions cannot be evaluated, its functions cannot be executed. Branching statements such as case, if/then and the like may be used during design time to provide for multiple paths of execution, but all possible end states and paths must be fully defined and coded during design time.

"Run Time", on the other hand, is the state in which the program is being executed on a computer system. Functions are being called, expressions are being evaluated and the program itself can be described as operational—but in this state it typically cannot be changed. The capabilities of the program are bounded by the possible end states and paths that are defined during design time.

Computer programs today are typically incapable of making design time changes at runtime, and are likewise incapable of executing run time operations during design time. This approach locks systems into specific execution paths and typically requires significant investment in man hours and code revision to add new branching options, execution paths or end states to a given program.

SUMMARY OF THE DISCLOSURE

The shortcomings of the prior art are addressed by the present disclosure and provides for a more robust and flexible computer environment, expanding capabilities of computing overall. The present disclosure generally provides for unifying program design time and program run time, may provide for program structure and program state to change at run time, and may provide for programs to continuously change and evolve through the addition of member functions, inputs, and outputs as the program is running, among other aspects described herein.

In one aspect, a computer-implemented method for uniformly representing computer program structure as forms so that one or more instances of a computer program are implementable as entity instances of the forms is provided including the steps of creating a first function definition as a form and creating a first function application as a form, storing the first function definition as a form and the first function application as a form, creating a link between the first function application form and the first function definition form, transforming the first function application into a subclass of the first function definition, wherein the first function application substitutes a set of properties linked to the first function definition with a set of properties linked to the first function application, and wherein at least one first member of the set of properties of the first function application binds to a variable form that is a subclass of the variable form bound to by at least one first member of the set of properties bound to by the first function definition, so that the first function application invokes the first function definition by linking the first function application to the variable form, wherein any of the sets of properties includes at least one of an input property and an output property, and processing instances of the first function application form according to the first function definition by computing instances of variables bound to the first function application, wherein the creating steps, the storing steps, the transforming step, and the processing step are performed by a computer or an electronic circuit.

The at least one first member of the set of properties of the first function application may bind to a variable form that is a subtype of the variable form bound to by at least one first member of the set of properties bound to by the first function definition, so that the first function application invokes the first function definition by linking the first function application to the variable form, wherein any of the sets of properties includes at least one of an input property and an output property. Any of the creating steps, storing steps, transforming step, and processing step are performable on different computer systems. The transforming step may be performed by a derivation relationship. The linking of a first set of properties to the first function definition may be performed by a relationship. Linking of a first set of properties to the first function application may be performed by a relationship. The computer implemented method may further comprise propagating the first function definition and the first function application within one computer system or across a plurality of computer systems. Moreover, the propagating step may comprise a messaging protocol.

In one aspect, a computer-implemented method for representing functions as streams containing immutable data is provided that includes defining a uniform schema for a plurality of functions and data, wherein the plurality of functions and the data each have a state and a structure, defining the plurality of functions and the data uniformly according to the schema, transforming the schema, the plurality of functions, and the plurality of data into at least one first stream of entities, each entity containing immutable data, and storing the at least one first stream in a tangible storage medium and wherein the combination of the schema, the plurality of functions, the data, any state, and any structure is portable and any change to the combination is synchronizable within one computer system or across a plurality of computer systems. The state and the structure of the plurality of the functions and the state and the structure of the data may be maintainable according to the schema as they occur through time within one computer system or across a plurality of computer systems. The uniform schema may comprise at least one form, at least one relation, and at least one relationship. The at least one form, at least one relation, and at least one relationship may comprise at least one of the entities in the at least one first stream. The plurality of functions, the data, the structures, a change to the states, the at least one first stream, the at least one form, the at least one relation, and the at least one relationship and the at least one entity comprise first-class objects. The at least one entities in the stream are describable using the same uniform schema.

In one aspect, a computer-implemented method for differentiating and synchronizing functions as streams containing immutable data is provided including defining a uniform schema for a plurality of functions and data, wherein the plurality of functions and the data each have a state and a structure, defining the plurality of functions and the data uniformly according to the schema, transforming the schema, the plurality of functions, the plurality of data, the plurality of states, and the plurality of structures into a at least one first stream of entities, each entity containing immutable data, propagating the first stream of entities to a second computer system and interpreting at the second computer system any one of the propagated functions to expand the operational capability of the any one of the propagated functions, wherein each of the steps are performed by a computer or an electronic circuit. The interpreting step may include modifying the state or structure of any one of the propagated functions.

In one aspect, a computer program product embodied as software code stored on a computer readable non-transitory storage medium is provided, the software code when read and executed by a processor performs a method for uniformly representing computer program structure as forms so that one or more instances of a computer program are implementable as entity instances of the forms, the method includes the steps of creating a first function definition as a form and creating a first function application as a form, storing the first function definition as a form and the first function application as a form, creating a link between the first function application form and the first function definition form, transforming the first function application into a subclass of the first function definition, wherein the first function application substitutes a set of properties linked to the first function definition with a set of properties linked to the first function application, and wherein at least one first member of the set of properties of the first function application binds to a variable form that is a subclass of the variable form bound to by at least one first member of the set of properties bound to by the first function definition, so that the first function application invokes the first function definition by linking the first function application to the variable form, wherein any of the sets of properties includes at least one of an input property and an output property; and processing instances of the first function application form according to the first function definition by computing instances of variables bound to the first function application.

In one aspect, a computer program product embodied as software code stored on a computer readable non-transitory storage medium is provided, the software code when read and executed by a processor performs a method for representing functions as streams containing immutable data, the method includes the steps of defining a uniform schema for a plurality of functions and data, wherein the plurality of functions and the data each have a state and a structure, defining the plurality of functions and the data uniformly according to the schema, transforming the schema, the plurality of functions, and the plurality of data into at least one first stream of entities, each entity containing immutable data and storing the at least one first stream in a tangible storage medium and wherein the combination of the schema, the plurality of functions, the data, any state, and any structure is portable and any change to the combination is synchronizable within one computer system or across a plurality of computer systems, wherein the state and the structure of the plurality of the functions and the state and the structure of the data are maintainable according to the schema as they occur through time within one computer system or across a plurality of computer systems.

In one aspect, a computer program product embodied as software code stored on a computer readable non-transitory storage medium is provided, the software code when read and executed by a processor performs a method for differentiating and synchronizing functions as streams containing immutable data, the method includes the steps of defining a uniform schema for a plurality of functions and data, wherein the plurality of functions and the data each have a state and a structure, defining the plurality of functions and the data uniformly according to the schema, transforming the schema, the plurality of functions, the plurality of data, the plurality of states, and the plurality of structures into a at least one first stream of entities, each entity containing immutable data, propagating the first stream of entities to a second computer system; and interpreting at the second computer system any one of the propagated functions to expand the operational capability of the any one of the propagated functions.

BRIEF DESCRIPTION OF THE DRAWINGS

The accompanying drawings, which are included to provide a further understanding of the invention, are incorporated in and constitute a part of this specification, illustrate aspects of the invention and together with the detailed description serve to explain the principles of the invention. No attempt is made to show structural details of the invention in more detail than may be necessary for a fundamental understanding of the invention and the various ways in which it may be practiced. In the drawings:

FIG. 1 is an exemplary illustration of an Architecture of a first Example System Incorporating a System and Method for Structuring and Interpreting Organic Computer Programs, configured according to the principles of the disclosure;

FIG. 2 is an exemplary illustration of an Architecture of a second Example System Incorporating a System and Method for Structuring and Interpreting Organic Computer Programs, configured according to the principles of the disclosure;

FIG. 3 is an exemplary illustration of an Architecture of a Third Example System Incorporating a System and Method for Structuring and Interpreting Organic Computer Programs, configured according to the principles of the disclosure;

FIG. 4 is an exemplary illustration of an Architecture of a Fourth Example System Incorporating a System and Method for Structuring and Interpreting Organic Computer Programs, configured according to the principles of the disclosure;

FIG. 5 is an illustration of an Example Organic Computer Program, configured according to the principles of the disclosure;

FIG. 6 is an exemplary illustration of Forms Subclassing, also referred to a From Derivation, configured according to the principles of the disclosure;

FIG. 7 is an exemplary illustration of Forms, Relations, and Corresponding Relations, configured according to the principles of the disclosure;

FIG. 8 is an exemplary illustration of a Relation Form, configured according to the principles of the disclosure;

FIG. 9 is an illustration of Example Name Relation, configured according to the principles of the disclosure;

FIG. 10 is an exemplary illustration of a Relationship Entity Signifying Change to a Relation, configured according to the principles of the disclosure;

FIG. 11 is an illustration of an Example Substitution, configured according to the principles of the disclosure;

FIG. 12 is an illustration of an Example Identity Object Derivation, configured according to the principles of the disclosure;

FIG. 13 is an exemplary illustration of Membership Overview, configured according to the principles of the disclosure;

FIG. 14 is an illustration of a Membership Example—Functions as Tasks, configured according to the principles of the disclosure;

FIG. 15 is an illustration of a Membership Example—User and Group, configured according to the principles of the disclosure;

FIG. 16 is an illustration of a Membership Example—Functions as Computations, configured according to the principles of the disclosure;

FIG. 17A is a flow chart providing an Exemplary Process Flow for Creating Membership, configured according to the principles of the disclosure;

FIG. 17B is a flow chart providing an Exemplary Process Flow for Creating Membership—continued, configured according to the principles of the disclosure;

FIG. 18 is an exemplary illustration of Persona and Membership, configured according to the principles of the disclosure;

FIG. 19 is an illustration of an Example of Program Structure Changes Over Time During Runtime, configured according to the principles of the disclosure;

FIG. 20A is an exemplary illustration of a GoShopping( ) Function Relationships at time t=1, configured according to the principles of the disclosure;

FIG. 20B is an exemplary illustration of a GoShopping( ) Function Relationships at time t=2, configured according to the principles of the disclosure;

FIG. 20C is an exemplary illustration of a GoShopping( ) Function Relationships at time t=3, configured according to the principles of the disclosure;

FIG. 21 is an illustration of an Example Derivation for a Function Form and a Variable Form, configured according to the principles of the disclosure;

FIG. 22 is an illustration of an Example Function F, configured according to the principles of the disclosure;

FIG. 23 is an illustration of an Example Change Owed( ) Function, configured according to the principles of the disclosure;

FIG. 24 is an illustration of Example Forms Associated with the ChangeOwed( ) Function, configured according to the principles of the disclosure;

FIG. 25 is an illustration of an Example Function Form Types, Derivations, and Relations, configured according to the principles of the disclosure;

FIG. 26 is an illustration of an Example Variable Stream, configured according to the principles of the disclosure;

FIG. 27 is an exemplary illustration of Wiring Functions Together—Example 1, configured according to the principles of the disclosure;

FIG. 28 is an exemplary illustration of Wiring Functions Together—Example 2, configured according to the principles of the disclosure;

FIG. 29A is an exemplary illustration of Function Decomposition for an Example Movie Review, configured according to the principles of the disclosure;

FIG. 29B is an exemplary illustration of Function Decomposition for an Example Movie Review—continued, configured according to the principles of the disclosure;

FIG. 30 is an exemplary illustration of an Alternative Implementation of totalPrice( ) and changeOwed( ) Functions, configured according to the principles of the disclosure;

FIG. 31 is an exemplary illustration of Task Decomposition and Serial/Parallel Execution, configured according to the principles of the disclosure;

FIG. 32A is a flow chart providing an Example Process Flow for Variable and Function Definition, Application, and Instantiation, configured according to the principles of the disclosure;

FIG. 32B is a flow chart providing an Example Process Flow for Variable and Function Definition, Application, and Instantiation—continued, configured according to the principles of the disclosure;

FIG. 32C is a flow chart providing an Example Process Flow for Variable and Function Definition, Application, and Instantiation—continued, configured according to the principles of the disclosure;

FIG. 33A is a flow chart providing an Example Process Flow for Variable and Function Definition, Application, and Instantiation, configured according to the principles of the disclosure;

FIG. 33B is a flow chart providing an Example Process Flow for Variable and Function Definition, Application, and Instantiation—continued, configured according to the principles of the disclosure;

FIG. 33C is a flow chart providing an Example Process Flow for Variable and Function Definition, Application, and Instantiation—continued, configured according to the principles of the disclosure;

FIG. 33D is a flow chart providing an Example Process Flow for Variable and Function Definition, Application, and Instantiation—continued, configured according to the principles of the disclosure;

FIG. 33E is a flow chart provided an Example Process Flow for Variable and Function Definition, Application, and Instantiation—continued, configured according to the principles of the disclosure;

FIG. 34 is an exemplary illustration of an Example Process Flow for Differentiating Function as Streams, configured according to the principles of the disclosure;

FIG. 35 is an exemplary illustration of a Derivation Hierarchy for Task, configured according to the principles of the disclosure;

FIG. 36A is an illustration of an Example Task Definition, Application, Instantiation Flow, configured according to the principles of the disclosure;

FIG. 36B is an illustration of an Example Task Definition, Application, Instantiation Flow, configured according to the principles of the disclosure;

FIG. 36C is an illustration of an Example Task Definition, Application, Instantiation Flow, configured according to the principles of the disclosure;

FIG. 37A is an exemplary illustration of a process flow for Uniformly Representing Program Structure as Forms and FIG. 37B is an exemplary illustration of a process flow for Uniformly Representing Program Structure as Forms and Implementing as Multiple Program Entity Instances—continued, configured according to the principles of the disclosure;

FIG. 37C is an exemplary illustration of a process flow for Uniformly Representing Program Structure as Forms and Implementing as Multiple Program Entity Instances—continued, configured according to the principles of the disclosure;

FIG. 37D is an exemplary illustration of a process flow for Uniformly Representing Program Structure as Forms and Implementing as Multiple Program Entity Instances—continued, configured according to the principles of the disclosure;

FIG. 37E is an exemplary illustration of a process flow for Uniformly Representing Program Structure as Forms and Implementing as Multiple Program Entity Instances—continued, configured according to the principles of the disclosure;

FIG. 37F is an exemplary illustration of a process flow for Uniformly Representing Program Structure as Forms and Implementing as Multiple Program Entity Instances—continued, configured according to the principles of the disclosure;

FIG. 37G is an exemplary illustration of a process flow for Uniformly Representing Program Structure as Forms and Implementing as Multiple Program Entity Instances—continued, configured according to the principles of the disclosure;

FIG. 38 is an exemplary illustration of Mapping a Form with Invariant Relations to a Database, configured according to the principles of the disclosure;

FIG. 39 is an exemplary illustration of Mapping Invariant Relations of an Entity to a Database Table, configured according to the principles of the disclosure;

FIG. 40A is an exemplary flow chart of a Process Flow for Writing Entities to a Database, configured according to the principles of the disclosure;

FIG. 40B is an exemplary flow chart of a Process Flow for Writing Entities to a Database—continued, configured according to the principles of the disclosure;

FIG. 41A is an exemplary illustration of a Person Entity and Referenced Entities, Including Several Relation Types, configured according to the principles of the disclosure;

FIG. 41B is an illustration of an Example of Writing Several Entity Types to a Table in a Database, configured according to the principles of the disclosure;

FIG. 42 is an illustration of an Example of Static Typing, configured according to the principles of the disclosure;

FIG. 43 is an illustration of an Example of Mapping a Statically Typed Invariant Property to a Tuplebase, configured according to the principles of the disclosure;

FIG. 44A is an illustration of an Example of Relational Bridge Joining Two Forms, configured according to the principles of the disclosure;

FIG. 44B is an illustration of an Example Relational Bridge Joining Three Forms through Two Invariant Relation, configured according to the principles of the disclosure;

FIG. 45 is an illustration of an Example Relation Walking Between a Child Folder Entity and a Parent Folder Entity, configured according to the principles of the disclosure;

FIG. 46 is an illustration of an Example Relation Walking Between a Parent Folder Entity and a Child Folder Entity, configured according to the principles of the disclosure;

FIG. 47 is an illustration of an Example Relation Walking Between a Child Folder Entity and a Parent Folder Entity, configured according to the principles of the disclosure;

FIG. 48 is an illustration of an Additional Example of Relation Walking Between a Parent Folder Entity and a Child Folder Entity, configured according to the principles of the disclosure;

FIG. 48 is an exemplary flow chart providing a Conceptual Overview of the Process Flow for Traversing Relations, configured according to the principles of the disclosure;

FIG. 49A is an exemplary flow chart providing a Substitution Process Flow Example: Step 4905 through—Step 4945, configured according to the principles of the disclosure;

FIG. 49B is an exemplary flow chart providing a Substitution Process Flow Example: Step 4950 through—Step 4980, configured according to the principles of the disclosure;

FIG. 50 is an exemplary flow chart providing an Example Process Flow for Retrieving Entity State, configured according to the principles of the disclosure;

FIG. 51 is an illustration of an Example Distributed Workflow—Create the 2011 US Corn, Soy, and Wheat Market Analysis Report, configured according to the principles of the disclosure;

FIG. 52 is an exemplary illustration of Sharing and Merging a Subset of a Source Graph Database Node with a Recipient Graph Database Node, configured according to the principles of the disclosure;

FIG. 53 is an exemplary flow chart providing a Flow Diagram of Exemplary Process to Generate Functions from Functions, configured according to the principles of the disclosure;

FIG. 54 is an exemplary illustration of an Information Stream, configured according to the principles of the disclosure;

FIG. 55 is an exemplary illustration of a Simplified Conceptual View of Writing Person Entity and Related Entities to an Information Stream, configured according to the principles of the disclosure;

FIG. 56A is an exemplary illustration of Appending Substitution Relationship Entities to an Information Stream, configured according to the principles of the disclosure;

FIG. 56B is an exemplary flow chart providing a Process Flow for Creating Information Streams and Reflecting Change in State by the Addition of New Entities, configured according to the principles of the disclosure;

FIG. 57 is an illustration of an Example of Writing $\tilde{H}$s for Single Containment Relationship, configured according to the principles of the disclosure;

FIG. 58 is an exemplary illustration of Table 4 Folder Entity and Multiple Stream Writing, configured according to the principles of the disclosure;

FIG. 59 is an exemplary illustration of Writing Streams for Multiple Containment Relationship, configured according to the principles of the disclosure;

FIG. 60 is an illustration of an Example of Writing Streams for Multiple Containment and Other Relationships, configured according to the principles of the disclosure;

FIG. 61 is an exemplary flow chart providing a Process Flow for Diverging and Converging Streams, configured according to the principles of the disclosure;

FIG. 63 is an exemplary illustration of a Generalized Stream Computing Engine Implementation, configured according to the principles of the disclosure;

FIG. 64 is an exemplary illustration of Another Stream Computing Implementation, configured according to the principles of the disclosure;

FIG. 65 is an exemplary illustration of a workflow Display, configured according to the principles of the disclosure;

FIG. 66 is an exemplary illustration of a Login Page, configured according to the principles of the disclosure;

FIG. 67 is an illustration of an Example Application Home Page, configured according to the principles of the disclosure;

FIG. 68 is an exemplary illustration of a Create Workflow Interface, configured according to the principles of the disclosure;

FIG. 69 is an exemplary illustration of an interface to Edit Task Information, configured according to the principles of the disclosure;

FIG. 70 is an exemplary illustration of an interface to Edit Doctor Visit (Parent Task) Information, configured according to the principles of the disclosure;

FIG. 71 is an exemplary illustration of an interface to Specify (Parent Task) Inputs, configured according to the principles of the disclosure;

FIG. 72 is an exemplary illustration of an interface to Specify (Parent Task) Inputs—Example Input, configured according to the principles of the disclosure;

FIG. 73 is an exemplary illustration of an interface to Specify (Parent Task) Outputs, configured according to the principles of the disclosure;

FIG. 74 is an exemplary illustration of an interface to Specify (Parent Task) Outputs—Example Output, configured according to the principles of the disclosure;

FIG. 75 is an exemplary illustration of an interface to Add a Member Function to the Doctor Visit Task, configured according to the principles of the disclosure;

FIG. 76 is an exemplary illustration of an interface to Add Nurse Exam Member Function Information, configured according to the principles of the disclosure;

FIG. 77 is an exemplary illustration of an interface for a Doctor Visit Workflow with Nurse Exam Task Added, configured according to the principles of the disclosure;

FIG. 78 is an exemplary illustration of an interface to Add Doctor Exam Member Function Information, configured according to the principles of the disclosure;

FIG. 79 is an exemplary illustration of an interface showing a Doctor Visit Workflow with Doctor Exam Member Function Added, configured according to the principles of the disclosure;

FIG. 80 is an exemplary illustration of an interface for Wiring Parent Task Input to Nurse Exam Member Task Input, configured according to the principles of the disclosure;

FIG. 81 is an exemplary illustration of an interface for a Doctor Visit Workflow with Doctor Exam Member Function Added, configured according to the principles of the disclosure;

FIG. 82 is an exemplary illustration of an interface for Wiring Nurse Exam Member Task Outputs to Doctor Exam Member Task Inputs, configured according to the principles of the disclosure;

FIG. 83 is an exemplary illustration of an interface for a Doctor Visit Workflow with Doctor Exam Member Function Added, configured according to the principles of the disclosure;

FIG. 84 is an exemplary illustration of an interface for Wiring Doctor Exam Member Function Outputs to Doctor Visit (Parent Task) Outputs, configured according to the principles of the disclosure;

FIG. 85 is an exemplary illustration of an interface for a Doctor Visit Task with Doctor Exam Member Function Wired, configured according to the principles of the disclosure;

FIG. 86 is an Example Interface showing a Doctor Visit Workflow Added to Group Folders Pane, configured according to the principles of the disclosure;

FIG. 87 is an exemplary illustration of an interface showing a User View Before Being Assigned a Task in the Doctor Visit Workflow, configured according to the principles of the disclosure;

FIG. 88 is an exemplary illustration of an interface showing Nurse Exam Member Function Details, configured according to the principles of the disclosure;

FIG. 89 is an exemplary illustration of an interface to Select and Assign a User to the Nurse Exam Task, configured according to the principles of the disclosure;

FIG. 90 is an exemplary illustration of an interface showing a Nurse Exam Member Function with User "smiller" Assigned to Task, configured according to the principles of the disclosure;

FIG. 91 is an exemplary illustration of an interface showing User "smiller"'s view after Being Assigned Nurse Exam Member Function, configured according to the principles of the disclosure;

FIG. 92 is an exemplary illustration of an interface showing Blank Appointment Input, configured according to the principles of the disclosure;

FIG. 93 is an exemplary illustration of an interface to Populate Appointment Input, configured according to the principles of the disclosure;

FIG. 94 is an exemplary illustration of an interface showing a Nurse Exam Member Function with an Input File, configured according to the principles of the disclosure;

FIG. 95 is an exemplary illustration of an interface showing a Nurse Exam Member Function before Output File Populated, configured according to the principles of the disclosure;

FIG. 96 is an exemplary illustration of an interface showing a Doctor Exam Member Function with Streamed Input File, configured according to the principles of the disclosure;

FIG. 97 is an exemplary illustration of an interface to Modify a Member Function of a Parent Task During Run-Time, configured according to the principles of the disclosure;

FIG. 98 is an exemplary illustration of an interface to Add a Lab Analysis Member Function Information, configured according to the principles of the disclosure;

FIG. 99 is an exemplary illustration of an interface for Wiring Parent Task Input to Nurse Exam Member Function Input, configured according to the principles of the disclosure;

FIG. 100 is an exemplary illustration of an interface showing a Doctor Visit Workflow with Lab Analysis Member Function Added, configured according to the principles of the disclosure; and FIG. 101 is an illustration of the Pythagorean Theorem for Calculating the Hypotenuse of a Triangle.

DETAILED DESCRIPTION OF THE DISCLOSURE

The various aspects of the disclosure and the various features and advantageous details thereof are explained more fully with reference to the non-limiting examples that are described and/or illustrated in the accompanying drawings and detailed in the following description. It should be noted that the features illustrated in the drawings are not necessarily drawn to scale, and features of one example may be employed with other examples as the skilled artisan would recognize, even if not explicitly stated herein. Descriptions of well-known components and processing techniques may be omitted so as to not unnecessarily obscure the various examples of the invention. The examples used herein are intended merely to facilitate an understanding of ways in which the invention may be practiced and to further enable those of skill in the art to practice the various aspects of the invention. Accordingly, the examples herein should not be construed as limiting the scope of the invention, which is defined solely by the appended claims and applicable law. Moreover, it is noted that like reference numerals represent similar parts throughout the several views of the drawings.

It is understood that the invention is not limited to the particular methodology, protocols, devices, apparatus, materials, applications, etc., described herein, as these may vary. It is also to be understood that the terminology used herein is used for the purpose of describing particular examples only, and is not intended to limit the scope of the invention, unless specifically stated otherwise. It must be noted that as used herein and in the appended claims, the singular forms "a," "an," and "the" include plural reference unless the context clearly dictates otherwise.

A system and method for the structuring and interpretation of organic computer programs may provide for programs to expand, grow and evolve after initiation in a manner that may be analogous to the way plants, animals, and organisms in nature that grow and evolve over time after their building blocks are assembled. The organic computing system and method, when constructed and/or performed according to principles of the disclosure, may unify program design time and program run time; may provide for program structure and program state to change at run time, and may provide for programs to continuously change and evolve through the addition of any one of member functions, inputs, and outputs as the program is running.

In a system configured according to the principles of the disclosure, a program may begin running as soon as the first of any interpretive actions is performed. An interpretive action may include but is not limited to: creating a function definition, creating a function application, inviting a member function to a function, triggering the creation of a membership relationship designating another interpreter, specifying an input, specifying an output, creating a new function application, creating a variable application, linking a function input to the input of another function, linking a function output to the input of a different or the same function, linking a function output to the same function or a separate function output, and the like.

The organically growing program may be considered and interpreted as a functional dependency graph.

In a system configured according to the principles of the disclosure, a uniform schema may provide for all of the that the following to be represented using the same basic primitives so that instances of each of these classes to interact with others: (1) the data being represented, (2) the schema of the data being represented, (3) functions which can accept input and return output, (4) the input and output of those functions, and (5) the structure of the system, itself that provides a set of constructs for defining entities in the system. Primitives in the uniform schema may include at least one form, at least one relation, and at least one relationship. These primitives may be used to construct entities such as streams, functions, variables, human action modeled as functions, automated functions, machine functions, logic functions, and the like. The structure of a form may vary over time and there may be multiple representations and/or interpretations of a form in different databases, across different graphs, in different streams. The invention provides the three building blocks typically required to build computer software: a means of abstraction, a means of combination, and a set of primitives. The means of abstraction is provided through the uniform schema in that forms and relations are both classes, and these classes may subclassed, creating a class hierarchy. The means of combination is provided through relationships and linkage. The set of primitives typically includes numbers, strings, and functions such as add, subtracts, multiply, and divide. The means of abstraction, a means of combination, and the set of primitives may be uniformly represented by the invention and are all storable in a tangible computer medium in a uniform manner as streams of entities containing immutable data.

Terminology

A description of the terms used to describe aspects of the system and method for the structuring and interpretation of organic computer programs, including organic programs expressed as a graph database, configured according to the principles of the disclosure, are provided below:

Actor: Any internal or external agent to the system that may be capable of providing inputs, submitting requests, or operating on an entity or other system object. Examples of actors in a system may include but are not limited to: users, groups, and functions.

Access Control List (ACL): a link to the collection of access points and corresponding access rights assigned to a specific identity object.

Cloud: As may be understood by one of ordinary skill in the art, the Cloud refers to a set of computer servers and associated hardware infrastructure that may be accessible through the internet that an organization may operate on its own (private Cloud) or operated by third parties (Commercial Cloud) which may offer on an as-needed basis the virtual space and computing resources, operational support, and other services to organizations or individuals on a commercial or free basis. Cloud operators, private or public, may also offer service level agreements guaranteeing a certain percentage of time of availability of the servers, resources, and associated hardware infrastructure. It is possible that an entirely independent network other than the Internet might be employed to provide a Cloud.

Complex Entity: A complex entity may be a construct for structured or unstructured data that may vary in format, size, and content. Examples of Complex Entities may include Files, Folders, and Forms.

Cycle: The duration of one run of an instantiated function. A cycle connects a set of generated outputs to a specific set of provided inputs.

Database State Transition: may include a modification to the database resulting from a change in program structure, a modification to the database resulting from a change in program state.

Data Node: An Entity in a database or a stream configured according to the principles of the disclosure. The entity is defined by a Form and contains immutable data such as globally unique identifier (GUID) and date/timestamp of its creation.

Database Node: An instance of a collection of data nodes configured according to the principles of the disclosure. A database node is defined by a Form and is an entity that contains immutable data, including but not limited to a GUID and a date/timestamp. A database is addressable and separately referenceable by its GUID.

Delta: A set of entities that correspond to a change made at a specific point in time to any entity. For example, the delta entities generated to update updating a user name may include a substitution relationship entity and a new primitive entity.

Differential Integration: a process which may include: dividing functions into subfunctions, linking a function to subfunctions, and linking one or more subfunctions to one or more other subfunctions. A subfunction may also be referred to as a member function.

Differentiation: a process in which one function may be divided into subfunctions; these subfunctions may also be referred to as member functions. For example, the hypotenuse of a right triangle with side a and side b may be calculated by first summing the length of side a squared plus the length of side b squared, and then calculating the square root of the sum. This calculation may also be expressed as:

$$\text{hypotenuse} = \text{square root}[(\text{length of side } a)^2 + (\text{length of side } b)^2]$$

In this example, the hypotenuse function may be divided into three subfunctions: a square function, a sum function, and a square root function. The square function may be used to calculate the square of side a and the square of side b, the sum function may be used to add the results of the square function, and the square root function may be used to determine the hypotenuse from the sum.

Distributed Graph: a graph that may be spread across more than one of any type of electronic infrastructure and may be inter-connected via a communications channel and/or communications protocol. The electronic infrastructure may include, but is not limited to: virtual machines, physical servers, other computer servers, electronic devices (e.g., smart phones, tablet computers, desktop computers, laptop computers, netbooks, and the like), or other computing devices.

Distributed Grid Infrastructure: A collection that may include at least two of any combination of the following: virtual servers, physical servers, or electronic devices.

Entity: A concrete instance of a Form. For example, a "Company" Form and the associated relations used to describe a Company and its properties, respectively, may become an Entity when it is instantiated and a GUID (globally unique identifier) is assigned. For example, after instantiation, a name, such as "Acme, Inc.", may be associated with the "Company" Entity through the "Name" Relation and the "Name" Relationship. Each entity contains immutable data that may not be changed (other than deletion), such as the entity GUID which may be an identifier and a date/timestamp of creation. The immutable data of an entity provides a basis for knowing the state of the entity at any point in time based upon the date/timestamp. Typically, each invariant relation is represented by immutable data fields belonging to the entity. Anytime a new link is created between entities, a relationship may be created to reflect that the new link may signify one or more changes to the entities being linked. An entity contains immutable data (including a GUID and timestamp of creation) but the effective state of the entity may be changed only through adding relationships. For example, as described above a Company Entity may have the name "Acme Inc." at time t=1. The Company Entity with the name "Acme Inc." may be bought by "Supermarkets, Inc." at time t=2 and a new name associated with it at that time. The Company Entity immutable data is unchanged, however the Company entity "mutable name" may be updated using a substitution relationship thereby effectively changing the state of the Company entity (i.e., the name) through the addition of a relationship at time t=2. The old name "Acme Inc. is still preserved, as it is immutable.

Extension: A characteristic of an access right that may allow an identity object that is an access recipient to extend a subset of their access right(s) to other identity object(s).

Evolution: A characteristic of an access right that may allow an identity object that is an access recipient to automatically be granted access to future versions of an access point. For example, a document may have multiple versions as access recipients modify and update the document content. If access evolution is enabled for an access recipient, all future versions of a document may be accessible to that access recipient.

First-class object: A representation of a piece of information that may be referenceable. Within a programming language, a first class object may be an executable block of code or a referenceable piece of data that can be passed as a parameter to a function, returned as a value from a function, defined or modified at run-time, and introspected at run-time. In addition, a first-class object must be able to be either a self-contained component of a program or can be the sole object in a program. In one implementation, a first class object may be an object defined by a Form. Forms may also be first class objects as they are themselves defined by Forms. For example, functions, inputs, outputs, data, structures, schema, changes to states, streams, forms, relations, relationships, and entities may typically be first-class objects in a system configured according to the principles of the disclosure.

Form: A Form is a construct used to model objects using one or more entities, configured according to the principles of the disclosure. A Form may be a collection of Relations, and Relations are also be defined by Forms. A Form defines the immutable properties of an entity as well as the mutable properties of an entity through its Relations. For example, a system may include two Forms: A "Person" Form and a "Company" Form. The "Person" Form may contain a "Name" Relation to link a "Name" Form with the person. A "Company" Form may contain two relations: a "Name" Relation to link a "Name" Form with a company and an "Employee" Relation to link multiple "Person" Forms to the "Company" Form. A Form may model essentially anything tangible and/or anything intangible.

Frame: A container of execution for a set of processes, activities, or actions with a distinct start time. A Frame may contain one or more transactions. A Frame may hold, but is not limited to, an instantiated Function and its instantiated: inputs, properties, member variables, member functions, as well as the instantiated inputs, member variables, and member functions of the member functions, and similar functions and variables. The duration of a frame varies, and typically lasts until a Function completes. Frame duration may be constrained or may be indefinite.

Function: A Form that is instantiated as an Entity that consumes inputs and/or produces outputs. A Function may have, but is not limited to, one or more of any of the following: inputs, outputs, member variables, and member functions. A Function is associated with an actor and supervises its member functions.

Function Graph: May include a collection of linked functions as a graph database node or a GraphNet that may be wired together by connecting the outputs of one or more functions in the collection to the inputs of one or more functions in the collection using one or more relationships.

Function signature: A function signature may typically specify the inputs to a function and the outputs of a function. A function may accept and entity as an input and produce any entity as an output. Input entities and output entities may include but are not limited to: variables, other functions, member functions, interpreted functions, choice functions, streams, databases, graph databases, functions that are associated with the actions of human beings, groups of human beings, software programs, collections of software programs, dedicated hardware, combined units of hardware, business processes, workflows, member functions, and the like.

Graph Database (GraphDB): A collection of information that may be modeled as objects (data nodes) and may be joined by relationships (edges). A graph database configured according to the principles of the disclosure may be stored in memory and persisted in a variety of formats, including but not limited to key-value, text-based, document-based, semi-structured format, structured format, unstructured format, and the like.

Graph Data Node (GraphDN): An object in a graph database. A graph data node is defined by a Form, and is an Entity containing immutable data such as GUID and date/timestamp. A GraphDN is also referred to as a data node.

Graph Database Node (GraphDBN): An instance of a graph database. A GraphDBN node is defined by a Form, and is an Entity containing immutable data such as GUID and date/timestamp.

GraphNet: A distributed Graph Computing Network in which one or a plurality of GraphDBNs that may be connected by edges may be deployed on one or a plurality of physical or virtual machines.

Identity: a unique object that may perform an action in a computer system and to which actions may be attributed. An identity may be assigned to a user, process, function, task, group, or other system object.

Identity Object: the context under which an identity may perform a particular action. For example, people in the real world, functions in a computer program, and processes in an application may be thought of as "wearing multiple hats" when fulfilling different job duties, roles, assignments, or operations which may or may not be related. These "multiple hats" may be interpreted as multiple identities for a single person. Similarly, each identity object may be thought of as a different "hat", a different role, or a different context, that the identity may "put on" as it works in the system and interacts with the available resources and functionality. An identity object may also be referred to as a persona. According to principles of the disclosure herein, a new, derived identity object may be created each time an existing identity object is invited to become a member of a function, group, or task in the system. This new identity object may represent that membership and may be derived from the invited identity object. Each identity object may include, but may not be limited to, one or more of the following:

Access Recipient: An identity object, such as a persona, user, group, or other similar object, to which access rights may be applied;

Access Point(s): Object(s) or resource(s) for which the access rights may be assigned to the access recipient;

Routing Name: A unique identifier for the identity object, may be human readable or machine readable;

Inbox: A container for objects that may be sent to an identity object;

Outbox: A container for objects that may be sent by an identity object;

Licensed to collection: A listing of the memberships to which the identity object may have been licensed;

Date and time that the identity object was created; and

Access Collection: Collection of objects the identity object may access, and may specify the rights granted, precluded, or revoked. Several non-limiting examples of the objects that may be accessed may include: files, folders, functions, tasks, projects, and other identity objects.

The newly created identity object may then be invited to become a member of another group, another task, or another similar object, creating a derived identity. Each identity object may itself become an access recipient, thus creating identity objects which derive from existing identity objects. This designation as access recipient and identity object derivation may be repeated over and over. Once an identity is authenticated to the system, it may move between one or more of its available identity objects, and each action performed may be completed under the context of one or more derived identity objects.

Information Graph: a web of interconnected data that may be comprised of a collection of data nodes that may be connected by relationships.

Inheritance: Once a construct such as a Form, is specified, it may be used as a template to create child or derived constructs that share characteristics of the template or parent construct. This derivation process may also be referred to as subclassing the Form, or parent construct. Additional characteristics may be added to a child construct, or subclass, and may not affect the parent construct, or superclass. Unlimited generations of inheritance, or subclassing, may be specified, and any child may itself be a parent, or superclass, for additional children. The inherited characteristics may include all characteristics specified for the parents and children preceding the lowest level child construct.

Input: An entity such as a node, Form, stream, database, and the like that is consumed by a Function.

Input stream: A collection over time of the versions of an Entity that are consumed by a Function. Each version in the stream is associated with an offset and a length that can be accessed and used for a number of purposes, such as but not limited to retrieving a specific or the complete set of versions.

Instantiate: As understood by one of ordinary skill in the art, to instantiate may be to create a "concrete" instance of an abstract object (e.g., in computer's transient memory or in a computer's physical storage layer). In the Forms Language, a Form may be instantiated when an Entity defined by a specific Form is created.

Integration: a process in which a function may be linked to its subfunctions or linking one or more subfunctions to one or more other subfunctions. A subfunction may also be referred to as a member function.

Interpreted Function: A type of Function configured according to principles of the disclosure that is may typically be used to construct algorithmic or mathematical processes.

Interpreter: Another name for a Member Function. For example, a Member Function or Interpreter that represents the actions of a human in the system may divide a specific function into two or more child functions.

Invariant Form: A Form that may be comprised of mostly invariant, or one-to-one, relations. For example, Relationship Entities may typically be instantiated from Invariant Relationship Forms.

Invariant Relation: An association between a left side form, an entity which is an instance of the left side form, a right side form, at least one second entity which is an instance of the right side form, representing an association between two entities that does not change over time. For example, GUID and Time may be invariant Relations for Entities, expressing immutability over time.

Linkage: an edge in a database, such as a graph database, that connects one or more entities to one or more other entities. A linkage is itself an entity. A linkage is also referred to as a relationship.

Member Function: A subfunction of a parent function, also referred to as a child function or interpreter. A parent function may be decomposed into zero, one or more Member Functions. A Member Function typically contains the instructions for, or specifies several of the steps or processes required to, execute all or part the Function of which it is a child. Member Functions may also be personas. Any Member Function can itself be a parent function if it is further decomposed into another set of child functions. As a function itself, a member function is associated with an actor and supervises its any member functions that are its children.

Membership: a type of relationship typically created following association of an identity object with, or entry into, a group, task, function, or other similar object. Membership may result in the creation of a new identity object derived from the invited identity object (i.e., a derived identity object), or may license an existing derived identity object. Membership may typically be granted to identity objects associated with users, personas, groups, tasks, functions, and other similar objects in the system. The system may attribute all actions and interactions with the target entity with the new identity object. A membership may include, but is not limited to, one or more of the following characteristics:

Membership Recipient: the identity object invited to join the group or task;

Membership Provider: the identity object that requested another identity object join the Membership target;

Membership Target: the group, task, function, project, or other object the identity object is being requested to join; and Licensing Identity Object: a derived identity that may be created as a result of the membership, this derived identity object may license the identity object being asked to join the membership target.

Member Variable: An entity that is used to pass required information within or between member functions of a parent function. Each member variable is stored in a named stream that contains all of its versions as it changes over time.

Network: The name of the organization or collaboration that may be associated with a graph database node. The name may typically be specified by the user that initiated creation of the GraphDBN.

Non-relationship entity: A non-relationship entity is an entity that may be pointed to by one or more Relationships, and the non-relationship entity may not itself point to any other Relationships. Example non-relationship entities may include a string, a number, or a file. Expanding the example, a name "Chuck", an age "25", an image file, a set of instructions that make up computer program, and the like, may be non-relationship entities.

Object: As understood by one of ordinary skill in art, an object may be a data structure used in programming that may include attributes to define its properties, methods to define its state, and methods to define operations that it may perform or that may be performed on it.

Organic computing: a workflow, program, or process that evolves through the addition of new relationships and other entities after initiation analogous to the way plants, animals, and organisms in nature grow and evolve over time after their building blocks are assembled. An organic computer program unifies program design time and program run time and provides for program structure and program state to be changed, or continuously evolved and grown, during run time through the addition of functions, member functions, inputs, and outputs that are appended to the program stream(s).

Output: An entity such as a node, Form, stream, database, and the like that is produced by a Function.

Output stream: A collection over time of the versions an entity that is produced by a Function. Each version in the stream is associated with an offset and a length that can be accessed and used for a number of purposes, such as but not limited to retrieving specific or the complete set of versions.

Persona: a persona may be another name for an identity object. One skilled in the art would recognize that many other terms may be appropriate synonyms for identity objects.

Primitive Entity: A primitive entity may be a construct for structured data of a specified type that may be stored using a specified maximum number of bytes. Examples of "Primitive" entities may include string, number, date, and the like.

Primitive Function: A predefined set of instructions for a particular process that is available in the system.

Private Internet: A propagation of the private graph database nodes, graph computing environment, and software configured according to the principles of the disclosure in a virtual environment, on dedicated physical hardware, or any combination of virtual environments and dedicated physical hardware, in which at least two of the GraphDBNs may directly connect to one another for purposes of exchanging information. The private internet may be co-resident on the same hardware as the current internet, or on a separate infrastructure. The private internet may only be accessible to actors:

with proper authentication credentials;

to which the electronic means of access, such as a web address or other electronic address, are known;

which have been granted access controls through the graph computing environment;

And for which access controls are stored in the graph comprising the private internet.

Program structure transition: may include a modification to the composition of a function. Example program structure transitions in a system configured according to the principles of the disclosure may include, but are not limited to: dividing a function into subfunctions by adding one or more member functions to a function; specifying inputs or outputs to a function, specifying inputs or outputs to subfunctions, assigning interpreters to a function (may be similar to the process of assigning member functions to a function).

Program state transitions: may include populating a function input, populating a function output, or populating a member variable.

Relation: A link between two or more Forms. A Relation may be used to define a property on a Form so that an entity instantiated from the Form may be associated with specific attributes which may be named and/or typed. An attribute name may be used as a means to refer to or retrieve information is associated with the attribute. An attribute type may be used to constrain the type of entities that may be associated with the attribute. An attribute type may also be referred to as static typing, and may be performed using a custom containment relationship.

A Relation acts as a Function that joins one or more Forms on one side (e.g., the input Form, or left Form) to one or more Forms in the other side (e.g., the output Form, or right Form). For example, a system may include three Forms: A "Person" Form, a "Name" Form, and a "Company" Form.

A "Person" Form may contain a "Name" Relation to link a name with a person. A "Name" Relation may act as a Function, joining the "Person" Form on one side (as the left side Relation on the Name Relation) with a "Name" Property Relationship Form (as the right side Relation on the Name Relation). The Name Property Relationship Form would contain a relation that link it to another Form, such as a string primitive Form, that stores the name to be associated with the Person Form.

Similarly, a "Company" Form may also contain a "Name" Relation to link a name with a company though a "Company Name" Property Relationship Form and another Form, such as a string primitive Form, that may store the name to be associated with the Person Form.

Additionally, the Company" Form may include an "Employee" Relation to link "Person" Forms to a "Company" Form through a Containment Relationship Form.

The phrase "left Form", the phrase "right Form", the phrase "left side Relation", and the phrase "right side Relation" used in this disclosure (including the claims) are names given to the respective logical objects associated with a relation Form and are not meant to refer to an actual specific physical limitation or a specific physical arrangement; the terms are simply names for the respective logical objects to permit improved explanation/description of the Relation Form.

Relation Join Stream: A Relation Join Stream may be used to store the Relations of an Entity in the database. The Relation Join Stream is part of the entity stream.

Relationship: An object that links at least two entities. A relationship is defined by a Form and is itself an Entity. A Relationship typically signifies change to at least one of the entities it links. For example, a system may include three Entities: A "Joe" Entity, a "Mary" Entity, and an "Acme, Inc." Entity. The "Acme, Inc." Entity may contain an "Employee" Relation that may link the "Joe" Entity and the "Mary" Entity to the "Acme, Inc." Entity through a Containment Relationship Entity. A Relationship is also referred to as an edge.

Stream: A sequence of versions over time of entities, including but not limited to nodes, forms, functions, tasks, and variables that are moved between entities in a single database, or moved between entities across multiple databases. Each stream is an entity defined by a form and contains immutable data such as GUID and date/timestamp. Each stream is addressable using its GUID. A version in a stream is associated with an offset and a length. The offset and length may be used by the system for a number of purposes, such as but not limited to locating and retrieving specific entities from the stream.

Stream or Entity Stream: A collection of entities instantiated from Forms configured according to the principles of the disclosure. A stream stores content for a database configured according to the principles of the disclosure. A stream may typically include a relationship entity signifying a change with respect to at least one other entity or relationship entity which may or may not be present in the stream. As an entity itself, a stream is defined by a form and contains immutable data such as a GUID and a date/timestamp.

Streamable: Entities in one stream that can be merged or appended with any other stream are streamable. A stream may also be referred to as a database configured according to the principles of the disclosure. A stream may be maintained in a readable non-transitory storage medium at any of the nodes (or more than one node) in the network of nodes. A stream may also be maintained in a computer readable storage medium at any of the nodes (or more than one node) in the network of nodes.

Streambase: A medium that may store structured data and/or traditionally unstructured data (e.g., documents, images) in a structured way through the use of an entity-relational model configured according to the principles of the disclosure which may suffuses entities and relations into a flat data structure of essentially unlimited length. A Streambase may also comprise a part of the storage layer of a database configured according to the principles of the disclosure. Also known as a streamable database.

Task: A type of Function configured according to principles of the disclosure that is typically used to construct human-driven processes.

Transaction: A collection of changes or outputs of one or a set of Functions that have executed and whose results are to be committed to the database at the same time or in a certain sequence.

Variable: An entity that is a named stream that stores a specific entity and its versions as it changes over time. A variable may be used as any of one of an input and output to functions and member functions.

Variant Form: A Form that may be comprised of mostly variant, or one-to-many, relations. For example, a Folder Form may be comprised of mostly variant relations.

Variant Relation: An association between a left side form, an entity which is an instance of the form, and a time varying set of relationships created with respect to the relation and the entity, wherein those relationships are instances of the right side form, wherein those relationships may be substituted or negated over time, so that the relationships may signify the changing values of the entity with respect to the relation. A variant Relation typically links entity instances of Form to an unlimited number of entity instances of Relationship Forms created over time, although may only to one Relationship Form or sets of Relationship Forms at any given time. When instantiated, the right side Relation of a Variant Relation of an Entity may typically link to one or more Relationship Entities.

Version: An entity, including but not limited to a node, form, function, relation, or relationship that may be instantiate as second entity that is different from a first entity in some way, but may be linked to the first entity using a version Relationship.

Virtual Private Graph (VPG): a GraphNet that may include one or more GraphDBNs that may be deployed on the public internet, in a Cloud environment, behind a company firewall, or through some other communication infrastructure. The VPG may be secured in such a way that it may not be discoverable and may only be accessed by actors with the exact address and valid authentication credentials; and for which the communications between the GraphDBNs, as well as between clients and the GraphDBNs, may be encapsulated and/or encrypted. For example, each GraphDBN in a GraphNet may be accessed by users through a VPN tunnel.

Workflow: A functional dependency graph constructed according to principles of the disclosure using Tasks and/or Interpreted Functions.

Exemplary Architectures Configured According to Principles of the Disclosure

FIG. 1, FIG. 2, FIG. 3, and FIG. 4 are each an illustrative block diagram of exemplary architectures, configured according to principles of the disclosure, generally denoted as 100, 200, and 300, respectively. The systems shown in FIGS. 1, 2 3, and 4 are exemplary and may take on different architectures as one of ordinary skill in the art may recognize.

Exemplary FIGS. 1, 2 3, and 4 show the use of servers, virtual machines, and nodes connected in a distributed system. As one of ordinary skill in the art may recognize, a server may typically include a physical device with, for example: one or more hard drives that may provide a storage medium for electronic data; random access memory (RAM) for holding information that may be needed to execute computer programs and their instructions; a processor that may execute the various computer programs and their instructions; various connection points for input/output, multimedia devices, other peripheral devices, and communications with other servers; and a motherboard, may also be referred to as a circuit board, that may connect and may provide power to the server components. A server may host zero, one, or multiple virtual machines.

The terms "virtual machine" and "virtual server" refer to a collection of software that may be required to execute and run programs on a physical server. A virtual server may share the memory and storage resources of the physical server on which it resides with other virtual machines or other installed software, or the virtual server may be specifically allocated memory and storage resources that cannot be accessed by other software on the same physical server.

FIG. 1 is a block diagram showing an exemplary architecture of an illustrative system configured according to the principles of the disclosure, generally denoted by 100. The example environment shown in FIG. 1 may include the following:

- User Devices (105, 110, 115): electronic equipment capable of accessing the server computer that contains the organic computer program node(s).
- Server Computers (120): Physical or virtual machines configured to operate a computer system.
- Web Server (125): In general, may receive requests such as Hypertext Transfer Protocol (HTTP) requests (for example), typically from an internet browser, and may forward those requests to the Application Server, and may deliver the response to the internet browser in the form of a web page.
- Application server (130): May typically interpret HTTP requests (or similar requests) and may perform processes and operations required to respond to the request. May forward the response to the request to the web server.
- Target application using an organic computer program node (135): Software that may typically be accessed and run using an internet browser.
- Organic Computer Program Node (140): A construct that may store an organic computer program node in a graph node configuration, as structured and unstructured data, collected by or associated with the target application. Other implementations may store the organic computer program node on a separate physical or virtual server.

In the example architecture shown in FIG. 1, a server (120) may host an application, such as a Java® application, that may incorporate the operational logic for target application using an organic computer program node (135), and may be deployed using a web server (125) that may be accessible through the internet. The application may be employed inside of an application server (130) such as Apache Tomcat™, for example. The application may use a Java Database Connector (JDBC) to connect to a remote or embedded collection of data (140) that may be configured as a graph database node. The data may be persisted from the organic computer program node configuration into a format including but not limited to a database such as Oracle's MySQL®, a key-value database, object-oriented database, graph database, and the like, or may directly interact with a text file, or other collections of data. The data collection provides storage and retrieval of the data for or to the application. The application server (130), such as Apache Tomcat™, may also connect to a web server (125) such as Apache HTTP Server®. A user device (105, 110, 115) may access the application with a software tool or similar utility capable of communicating with the web server (125). The tool may include, for example, an internet browser, such as Mozilla's Firefox®, Microsoft Internet Explorer®, Google Chrome®, and the like and connecting to the application via a Uniform Resource Locator (URL). The requests are received by the web server (125) and immediately passed to the application server (130) for processing by the application (135).

A "server" such as shown in FIG. 1, FIG. 2, and FIG. 3 may indicate a virtual server, virtual machine, physical server, physical machine, electronic device, program, or programming environment capable of running a system or part of a system configured according to the principles of the disclosure.

FIG. 2 is a block diagram showing an exemplary architecture of an illustrative system configured according to the principles of the disclosure, generally denoted by 200. The illustrative environment shown in FIG. 2 may include servers, such as physical or virtual machines, organized as a distributed system that may incorporate the use of organic computer program nodes. The illustrative environment shown in FIG. 2, generally designated by reference numeral 200, may include the following:

- Clients (230a, 230b, 230c, 235a, 235b, 235c, 240a, 240b, 240c, 245a, 245b, 245c, 250a, 250b, 250c) for the servers housing the distributed Organic Computer Program Nodes: interface through which users may access the servers, the information organized as an Organic Computer Program Node, any applications, data, and information that may be stored on those servers for systems configured according the principles of this disclosure. The client interface may be a thin web client, thick web client, desktop interface, command prompt, or another interface type and may be accessed on any electronic device capable of running the client.
- Organic Computer Program Node Servers (205, 210, 215, 220, 225): Servers that may provide a set of applications (e.g., file management, user management, group management, database applications, specialized applications, etc.) operating on the information organized as an Organic Computer Program Node, and may persist and manage data, information, and users.
- Messaging Server (included in 205, 210, 215, 220, 225): May receive, queue, store, manage, and otherwise transact information packets, including but not limited to streams and subsets of an Organic Computer Program Node, being transferred between servers for systems configured according to the principles of the disclosure. The messaging server may utilize a messaging protocol that defines a standard syntax and semantics for information exchanged using a communications protocol. Examples of messaging protocols include: HTTP, Simple Mail Transfer Protocol (SMTP), File Transfer Protocol (FTP), Short Message Service (SMS), Java Message Service (JMS)-based protocols, the Akka messaging protocol, and the like. For example, the HTTP messaging protocol defines a message in terms of headers and a body, wherein the headers contain metadata relating to the syntax of the message while the body contains its semantic content. In another example, a protocol may define a string that identifies the start and stop of a message, wherein the messaging protocol comprises email, HTTP, Transmission Control Protocol (TCP) sockets, language-specific message passing architectures, or software transactional memory.

In another implementation, any one or more of the collection of Organic Computer Program Node Servers (205, 210, 215, 220, 225) may act as a central hub for accessing the other nodes. One of ordinary skill in the art may also recognize that any number (greater than zero) of Hub and Servers, Messaging Servers, Organic Computer Program Node Servers, and clients may be implemented in this architecture.

FIG. 3 is a block diagram showing an exemplary architecture of an illustrative system configured according to the principles of the disclosure, generally denoted by 300. The illustrative environment shown in FIG. 3 may include user devices (305a, 305b, 305n), servers (330a, 330b), web servers (310, 330a, 330b), application servers (315, 330a, 330b), storage (320, 330a, 330b), messaging servers (330a, 330b), and clients as described in FIG. 1 (100) and FIG. 2 (200) in a as a distributed system that may incorporate the use of organic computer program nodes. In this example architecture, the web server, application server, messaging server, and storage layer may be stored and run on the user device in addition to on a server, and user devices may connect with other user devices and servers through peer-to-peer connections. One of ordinary skill in the art may recognize that a brokered connection through a hub for one or more users or servers may also be possible in this architecture. Additionally, the architecture may include user devices only.

Additionally, the communications protocol shown in these examples is internet protocol (IP). One of ordinary skill in the art may recognize that other communications protocols may also be used. The connection protocol communications may be secured through the use of a firewall, secure socket layer (SSL) technology Virtual Private Network (VPN), other security protocols, or the like.

An Organic Computer Program Node may be deployed on multiple systems on the Internet on a physical server or virtual server, with or without firewalls, and may connect through another Organic Computer Program Nodes, or directly to another Organic Computer Program Node such as is common in a peering connection. An Organic Computer Program Node may be expressed as a Graph Database Node. A collection of linked Organic Computer Program Nodes may be considered a GraphNet, and may also be referred to a Private Internet, virtual private graph, and the like. One of ordinary skill in the art may recognize that a variety of terms may be used to describe a set of linked, distributed Organic Computer Program Nodes. It is also possible that an entirely independent network other than the Internet might be employed.

The system and method for organic computing also provides for a variety of other architectures to be developed, ranging from something simple (e.g., a microcontroller makes HTTP Posts directly to a platform instance) to the complex (e.g., a web server directs users to content generated by an application server which is in turn in a state of communication with an instance of the platform using some messaging protocol). In either example, the system and method for organic computing itself may serves as an encapsulated component of a larger architecture, functioning in much the same way as a traditional database server, messaging service or remote API does. FIG. 4 is a block diagram showing an exemplary architecture of a fourth illustrative system configured according to the principles of the disclosure, generally denoted by 400. The illustrative environment shown in FIG. 4 may include user devices (405, 410, 415) and also provides for interaction with microcontrollers, a virtual or physical servers (420), a combined web/application servers (425), an organic computing system (435) that includes storage (440), and clients. In this example architecture, the organic computing system interacts with user or client devices through a simple http communications protocol. The devices may be connected through peer-to-peer connections or other connection frameworks.

System and Method for the Structuring and Interpretation of Organic Computer Programs In one implementation configured according to the principles of the disclosure, the system and method for the structuring and interpretation of organic computer programs may be used to create functions and programs that may expand, grow and evolve over time, including during runtime, significantly reducing costs typically incurred to change systems of today before the disclosure. An entire organic computer program or a subset of an organic computer program may be distributed across an essentially unlimited set of virtual servers, physical servers, and/or electronic devices while maintaining the connectedness of the distributed components, providing for automated flow of outputs and inputs across the distributed system. The system and method may also include subscribe, push, pull, or other model to provide for distributed organic computer programs to differentiate and/or synchronize, in whole or in part, as updates to the components of a distributed organic computer program are made. The loose coupling of functions in a distributed organic computer programs provides for components to be distributed and re-interpreted at each receiving system without altering the configuration of the program on the system doing the distributing. In one implementation of a system configured according to the principles of the disclosure, organic computing programs may be implemented using Forms Language constructs and each entity in the organic computer program may contain immutable data. This immutable data may provide for a temporal aspect to the invention as well as for each entity to be addressable. Any organic computer program may link to any other organic computer program. An organic computing program may be implemented as a stream, a graph database, a web database, a key-value structure, text files, document database, relational database, and the like. A subset or all of an organic computer program in an in-memory or persisted data store may be linked to or shared with any other organic computer program in an in-memory or persisted data store. An Organic Computer program may also include a collection of functions linked to other functions through relationships that join the outputs of one or more function to the inputs of one or more functions.

The entities that make up an organic computer program typically include functions, member functions, inputs, and outputs. Relationships typically link these entities to each other to structure the program. Any entity in an organic computer program may also be referred to as a data node, with relationships acting as the edges linking together two or more data nodes. A relationship may itself be an entity and may also be referred to as a data node. A collection of data nodes and edges configured according to the principles of the disclosure may be referred to as a stream, a database, or a graph database node (GraphDBN).

The system and method for structuring and interpretation of organic computer programs may provide an environment in which the entities that may be functions, member function, inputs, outputs, variable, and relationships may be portable as a result of the immutable data each may contain. These portable entities are also addressable and may be distributed across multiple organic computing nodes configured according to the principles of the disclosure and may be further interpreted at each receiving organic computing node. The portability of organic computer programs across a distributed computing environment may streamline the process of creating a distributed computer program for information sharing and storage; for distributed human collaboration in which humans are represented as functions; for distributed automated collaboration; for a combination of distributed human and automated collaboration; and other distributed operations.

For example, a conceptual example of an organic computer program is provided in FIG. 5, generally denoted as 500. In FIG. 5, Jackson Shipping Inc. (545), Smith Weather Logistics Inc. (530), GroundShip Inc. (535), and Fly Anywhere Inc. (540) have all implemented servers with systems configured according to the principles of the disclosure. The servers may be virtual or physical, hosted off-site or hosted on-site for each organization. Jackson Shipping Inc. wrote an organic computing program (505) to determine whether it is more cost-effective to ship packages via a ground based on weather conditions at package source, weather conditions at package destination, and package weight. The organic computer program that includes four functions: weatherDelay( ) (510), priceAir( ) (515), priceGround( ) (520), and shipChoice( ) (525). Jackson Shipping Company specifies two inputs to weatherDelay( ) (510): package source and package destination and two outputs to weatherDelay( ) (510): projected weather delay duration for air transport and the projected weather delay duration for ground transport. JacksonShipping Company assigns the weatherDelay( ) function (510) to Smith Weather Logistics Inc. and sends the assignment to their server (530). Smith Weather Logistics Inc. may further interpret the assigned function by adding additional member function as desired, however the function processing is not complete until the specified output is populated. For example, Smith Weather Logistics may further interpret the assigned function by inviting another group or person within a company to interpret the assigned function at run-time, or by breaking the assigned function down into newly created member functions at run-time and assigning those member functions to groups or companies or people or machine interpreted functions, or by changing or adding or removing the inputs and outputs of the assigned function or member functions, or by inviting other people, groups, companies or machine interpreted functions to change, add, or remove inputs and outputs of the assigned function or member functions of the assigned function, or by changing the textual description of the assigned function or its member functions, so that people, companies, groups, or machine interpreted functions may differently interpret the function according to the specification provided by the textual description. In this way, the interpretation of the program may evolve organically and continuously as new functions are created and linked to existing functions and as people, groups, or machine interpreted functions, themselves represented as functions, are invited to interpret and change assigned functions by becoming member functions of assigned functions. The system automatically flows the outputs to the shipBy( ) function (525), where they are specified as an inputs.

Continuing the example, Jackson Shipping Company specifies two inputs to priceAir( ) (515): package source and package destination, and one output to priceAir( ) (515): priceByAir. JacksonShipping Company assigns the price Air( ) task (515) to FlyAnywhere Inc. and sends the function to their server (540). Fly Anywhere Inc. may further interpret the assigned function by adding additional member function as desired, however the function processing is not complete until the specified output is provided. The system automatically flows the output to the shipBy( ) function (525), where it is specified as an input.

Jackson Shipping Company also specifies two inputs to priceGround( ) (520): package source and package destination, and one output to priceGround( ) (520): priceByGround. JacksonShipping Company assigns the priceGround( ) task (520) to GroundShip Inc. and sends the function to their server (535). GroundShip Inc. may further interpret the assigned function by adding additional member function as desired, however the function processing is not complete until the specified output is provided. The system automatically flows the output to the shipBy( ) function (525), where it is specified as an input.

Lastly, Jackson Shipping Company creates the shipBy( ) member function (525). The specified inputs to shipBy( ) (525) include the outputs of the other member functions, the delayAir output from weatherDelay( ) (510), the delayGround output from weatherDelay( ) (510), the priceByAir output from priceAir( ) (515), and the priceByGround output from priceGround( ) (515). the shipBy( ) member function (525) also include internal code to determine the appropriate shipping choice based on specified constraints. One of ordinary skill in the art may recognize that any number of constraints could be coded, and the example shown is pseudocode for one set of constraints. Each member function in the shippingMethod( ) function (505) can begin running as soon as its inputs are made available. Based on the constraints shown for the shipBy( ) function (525), the choice to ship by air may be made based on the output of priceGround( ) (515) and priceAir( ) (515) alone if priceAir( ) is less expensive, even if weatherDelay( ) (510) has not completed processing.

The constructs used as building blocks of a system and method for creating, deploying, and integrating new nodes in a distributed network of graph databases may include, but are not limited to the following:

Forms, Relations, and Relationships
Functions, member functions, interpreters, inputs, outputs, variables, and streams
Membership and Personas
Streams, databases, and graph databases
Access Control These constructs may be applied to build a system and method for structuring and interpreting organic computer programs. One or more subsets of or an entire organic computer program may be distributable in a network of distributed database nodes using principles of the disclosure, described herein.

Additional Detail for Forms Language Constructs: Forms, Relations, Relationships, and Entities The Forms Language provides a structure that may be used to create and assemble diverse and richly linked webs of entities in streams, databases, graph databases, and the like. The Forms Language may permit the creation of "Forms", which may define the class properties of the Entities each represents and may define the relational structure of each specific type of Entity. A form defines a data nodes and the class defined by a Form may be a Form Entity, Relation Entity, Relationship Entity, or any other Entity that may be instantiated by a Form. In one example implementation, a Form may be partially defined as follows:

Form Folder extends Content { ...

In this example, the Folder Form class extends and inherits from the Content Form class. Continuing this example, the Content Form class declaration may be as follows:

Form Content extends Entity { ...

Indicating that the Content Form class extends and inherits from the Entity Form class. Because the Folder Form class extends and inherits from the Content Form class, the Folder Form class also inherits from the Entity Form class. When inheriting from a class, the class hierarchy may typically mimic the Form hierarchy.

Each Entity instantiated from the Form may be an instance of the class the Form defines. The structure of a Form may be defined by a set of Relations that bind, or link, one Form together with other Forms. Each of the set of Relations may be defined by Forms and may also be classes. These Relations may associate meaning, context, and content with Forms they link.

FIG. 6 is an illustration of a Form and its Relations, generally designated by reference numeral 600. In the Form and Relation example 600, Form 1 (610) includes Relation 1, Relation 2, and Relation N, where N signifies any number greater than 2. Relation 1 links Form 1 (610) to Form A (650) through right side Relation of Relation 1 and Corresponding Relation 1 on Relation Form 1 (620), respectively. Relation 2 links Form 1 (610) to Form B (660) through the right side Relation of Relation 2 and Corresponding Relation 2 on Relation Form 2 (630), respectively. Relation N links Form 1 (610) to Form C (670) through Relation N and Corresponding Relation N on Relation Form N (640), respectively. A Corresponding Relation may typically be used to join a Relation on a Relation Form to a specific Relation on the Form joined to by the right side Relation of the Relation Form.

FIG. 7 is an exemplary illustration of a simplified example of Form Inheritance and Subclassing, generally denoted by 700. The simplified example of Form Inheritance and Subclassing 700 is one implementation of the invention and may be used to subclass a generic Entity Form (705) to a Function Form (740) that inherits the relations of the entity Form, generally denoted by reference numeral 700. In this example, a generic Entity Form (705) specifies characteristics, or relations, that all subclassed Forms inherit, including a GUID Relation (710) and a Time Relation (715). Continuing the example, the generic Entity Form (705) may be subclassed to create the Function Form (740). This Function Form may inherit the relations of the generic Entity Form (705), including a GUID Relation (720) and a Time Relation (725), and additional relations, including Member Functions (730), Inputs (735) and Outputs (740) may be added.

Relations

In a system configured according to the principles of the disclosure, a Relation may be a function that maps a Form on one side (e.g., "logically" the left side or the input side) to a Form on the other side (e.g., "logically" the right side or the output side). The Relation itself may be a Form of type Function, so that a user of the system may use an executeRelation function to execute a relation with respect to an entity and get back as output of the executeRelation function a resulting set of linked entities, whereby a relational step occurs, wherein the calling the executeRelation allows for the traversal of the graph within a single graphDB or across graphDBs in a GraphNet. FIG. 8 is an exemplary illustration of a Relation, generally designated by reference numeral 800. In this example, Relation Form 800 may include:

A Relation 1 Form (830) for Relation 1 (820), that links a Left/Input Form (810) through the Left Side/Input Relation (840) to a Right/Output Form (860), through the Right Side/Output Relation (850), and A Corresponding Relation (870) that links to Relation 2 (880) on the Right/Output Form.

Once a Form and its Relations are defined, the Form may be instantiated to create new Entities that are joined to other Entities through Relations and Relationship Entities. Each Entity instantiated from the Form is an instance of the class the Form defines. The example functions represented by the example Relations shown in FIG. 8 (800) are listed in Table 1.

TABLE 1

Example: Form 1 (810) Relation Functions

| Relation | Input/Left Side Form | Output/Right Side Form |
|---|---|---|
| Relation 1 | Form 1 (810) | Form A (850) |
| Relation 2 | Form 1 (810) | Form B (860) |
| Relation N | Form 1 (810) | Form N (870) |

In the more specific example of a Relation Form, generally denoted by reference numeral 900, shown in FIG. 9, The Name Relation Form 900 may include a Person Form (910) with a Name Relation (920). The Name Relation (920) is defined by a Name Relation Form (930) that links the Person Form (910) through Left Side Relation 1 (940) to the Name Property Relationship Form (960) through Right Side Relation 1 (950). The Name Relation Form (930) may include a Corresponding Relation 1 (955) that links to the Parent Relation (968) on the Name Property Relationship Form (960). The Name Property Relationship Form (960) includes a Child Relation (965) which is defined by the Child Relation Form (970). The Child Relation Form (970) links the Name Property Relationship Form (960) through Left Side Relation 2 (975) to the String Primitive Form (985) through Right Side Relation 2 (980). The String Primitive Form (990) may include a Corresponding Relation 2 (985) that links to the String Value Relation (995) on the String Primitive Form (990). The String Primitive Form (990) may be instantiated to an Entity that may contain the string with the name when the Person Form is instantiated.

Throughout this disclosure, for ease of discussion and simplicity, the text and illustrations do not typically include a display and description of the Relation Form that corresponds to each Relation. Relations are typically shown as linking directly to the right side/output Form.

The phrase "left Form" and the phrase "right Form" used in this disclosure (including the claims) are names given to the respective logical objects associated with a relation Form and are not meant to refer to an actual specific physical limitation or a specific physical arrangement; the terms are simply names for the respective logical objects to permit improved explanation/description of the relation Form. Similarly, the phrase "left side relation" and the phrase "right side relation" (or "right side relations") used in this disclosure (including the claims) are names given to the respective logical references (i.e., pointers or linkages) associated with a relation Form and are not meant to refer to an actual specific physical limitation or a specific physical arrangement; the terms are simply names for the respective logical references to permit improved explanation/description of the references associated with a relation Form.

When a Form is said to "have" a set of Relations, it means that the Form is targeted by those Relations on one side (e.g., the left side, the input side). When a Form is "produced" by a Relation, it receives the Relation (e.g., the right side, the output side).

Using Forms Language, any number of Entities, including Forms, Relations, Relationships, Entities instantiated from Forms, and the like may be created. A Relation is an entity that may link one Form to another Form. A Relation may map a Form on one side, (e.g., the input side, the left side) to a Form on another side (e.g., the output side, the right side).

A Relation on a Form may point to another Form, a Relationship Form, or another entity. A Relationship Form may itself contain Relations that may point to another Relationship Form or another Form. The type of Form that a Relation points to may depend on whether the Relation is variant or invariant. A Relation may be designated as variant if there may be a need to change the target output at some time. A Relation may be designated as invariant if there will never be a need to change the target output.

Relationships

A Relationship is an Entity that defines an edge and may therefore be defined by a Form and its Relations. A Relation may typically link to a Relationship through the right side Relation on the Relation Form. A Relationship Entity may be the link between the right side Relation of a Relation on an Entity and another Entity Form, or when instantiated, may link a right side Relation on the Relation on an Entity to a Relationship Entity. Relationships created using the Forms Language may be mostly invariant. Relationships may be immutable because a Relationship may be an association. If any part of the association changed, it would no longer be the same association. Therefore, because Relationship entities are associations, a relationship entity may be invariant (or characterized by Relations that are also invariant). In one aspect, in a system configured according to the principles of the disclosure, changes may be signified only through the addition of new Relationship Entities that may create new linkage between entities. A Relationship may create linkage between a plurality of entities.

Because a Relationship may be defined by a Form, and a Relationship may also be referred to as an edge, an edge may also an entity. Additionally, because a Relationship may be defined by a Form and a Form may be a class, a Relationship may also be a class. As a class, a Relationship may be considered a first-class object so that change itself may be an object in the system rather than simply the result of an action. According to the principles of the disclosure, a Relationship represents change in a system. Relations belonging to a Form are mostly immutable, and rather than changing, are classes that represent the changes in the system. Relationships signify changes to entities they reference. As such, Relationships may reflect differential data with respect to one or more entities in a system. A relationship may be called a delta object, since it is typically an entity representing a change made with respect to a set of referenced entities. In one aspect, information may be expanded in such a system only through the accrual of differential data using Relationships and/or non-relationship entities. In this way, relationships are typically the change agents, and may be the sole enabler of logical change in the system, thereby enabling the evolution of program structures or data structures without altering the immutability property of program structure entities or the data structure entities which those relationships reference, while enabling those program entities or data entities to evolve or change in association with other program entities or data entities by means of the relationships which represent those associations.

The changes that may be signified by a Relationship may be considered to be changes on one or more entities with respect to one or more other entities. FIG. 10 is an exemplary diagram of a Relationship Entity Signifying Change to a Relation, generally denoted by 1000. For example, as shown in FIG. 10 the removal of Folder Entity 4 (1055) as a Child of Folder Entity 1 (1025) is a change in the containment of Folder Entity 1 (1025) with respect to Folder Entity 4 (1055). Similarly, FIG. 11 is a simplified example of a substitution relationship, generally denoted by 1100. As shown in FIG. 11, the change of a Person Entity's Name (920) from "Joe" to "Joseph" is a change of the Name Relationship Entity (1140) with respect to Person Entity 1 (1120).

Relationships may be versioned, or substituted, through a process in which the Relationship linking one Entity to another Entity may be updated by inserting a Substitution Relationship. This Substitution Relationship may point to the Relationship being updated as the Previous Version Relation and the new Relationship as the Version Next Relation. During the substitution process, the existing Relationship linking the two entities may be assigned to the "Previous Version Relationship" in the Substitution Relationship Entity. In addition, the newly created Relationship linking the two entities may be assigned to the "Next Version Relationship" in the Substitution Relationship. FIG. 11 is an illustration of a simplified example of a Substitution Relationship, configured according to the principles of the disclosure, generally denoted by reference numeral 1100. In this example, a Person Entity (1110) includes a Name Relation (1120) that is linked to the String Entity assigned a value of "Joe" (1130) through the Name Relationship Entity 1 (1140). The Name Relationship (1120) may be updated to point to the String Entity assigned a value of "Joseph" (1190) to "Joseph" by creating a Substitution Relationship Entity (1150) that assigns the existing Name Relationship 1 (1140) that points to the String Entity assigned a value of "Joe" (1130) as the Previous Version Relation (1160), and assigns the assigns the new Name Relationship 2 (1180) that points to the String Entity assigned a value of "Joseph" (1190) as the Next Version Relation (1170).

To negate a Relationship during the substitution process, similar to the process shown in FIG. 11, a new Substitution Relationship may be added. In an example implementation in which Substitution Relationships signifying new information that may be associated with an entity, the system may perform a type of Relational Algebra when retrieving a specified state of an entity. For example, FIG. 10 illustrates example Folder Entity 1 (1025) which at a certain time t is linked to Folder Entity 2 (10450, Folder Entity 3 (1050), and Folder Entity 4 (1055) through Containment Relationship 1 (1030), Containment Relationship 2 (1035), and Containment Relationship 3 (1040), respectively. To retrieve a current state of Folder Entity 1 (1025) before the substitution relationship was added, the system may execute the relations on Folder Entity 1 (1025) to retrieve all of the Containment Relationship Entities and then and execute the Child Relation in the Containment Relationship Entities to retrieve Folder Entity 2 (10450, Folder Entity 3 (1050), and Folder Entity 4 (1055).

At time t+1, the Containment Relationship Entity joining Folder Entity 1 (1025) with Folder Entity 3 (1050) may have been substituted using Substitution Relationship 1 (1060). To negate the Folder Entity 1 (1025) with Folder Entity 3 (1050), Substitution Relationship 1 (1060) may point to a null entity.

The combination of Relationship Entities such as Containment Relationship Entities and Substitution Relationship Entities may be thought of as comprising a type of Relational Algebra. Relationship Entities such as Containment Relationship Entities that expand the information set of an entity such as Folder Entity 1 (1025) may be thought of as 'positive terms'.

Relationship Entities such as Substitution Relationship Entities that negate or otherwise discontinue one relationship beginning at a certain point in time may be thought of as 'negative terms'.

Considering each relationship in positive and negative terms, then the state of an entity at time "t" may be considered the sum of all relationships up to time "t". In other words, summing change yields state. This may be considered the relational algebra and captures the notion of an "evolving data system". Relational algebra may provide for the discovery of historical, current and new states and structures at any point of time of their history within one computer system or across the plurality of computer systems.

The value of linkage, or the connections between entities, is often underestimated; a link between two entities may itself be information about the two linked entities. For example, linking George Washington and the United States in a "President-Country" relation may convey not only that the two are linked in some way, but may also convey the information associated with the "President" relation. Further linking George Washington to Martha Custis using a "Spouse" relation provides additional information. Linking George Washington to Boston and Yorktown with the "Battles Won" relation provides even more information. The more links exist between George Washington and other data in a system, the more information is known about George Washington, and reciprocally, the more that is known about the entities to which George Washington is linked. Using the computer-based Forms Language as a construct for building a system and method for structuring and interpreting organic programs, and the functional dependency graph which may result, the usefulness of data may be increased as its connectivity increases, in other words, the more data are connected to other data, the more information is available as a result of those connections.

Additionally, entities may not be changed (i.e., changed in the sense of traditional systems) in a system configured according to the principles of the disclosure; rather entities may evolve as a result of the addition of Relationship Entities, negation of Relationship Entities, or creation of Versions through Substitution Relationship Entities.

Today's systems before this disclosure link data through uncharacterized constructs, such as left joins and right joins and outer joins, or simple pointers between one data field and another data field. The linkages do not provide information about the context of the link; the context must be inferred based on what is being linked, the report that uses the link, the business rules in the query used to create a linkage, and the like. Additionally, these traditional joins are limited in that it is only practical and feasible to join a limited number of tables. However, in a system configured according to the principles of this disclosure, links are objects themselves and have their own relations, allowing for a robust set of descriptive relations to be included as part of the link itself so that a link can add to the information set through the information it contains, and possibly linking the link to other entities or links, potentially expanding the graph database and its corresponding information web organically. Because entities in a system configured according to the principles of the disclosure contain immutable data, the information represented in an organic computer program that may be expressed as a graph database may only be expanded. Therefore, information may not be lost over time due to the temporal nature of the invention and the way in which changes are typically recorded as new entities which reference and are thereby said to change existing objects without directly modifying those existing referenced entities or violating an immutability property of the referenced entities. Configuring links in an organic computer program as entities that have immutable data and that also contain relations provides for more robust and more information dense linkages than may be possible in previous systems. A relationship may join one or a plurality of entities to one or a plurality of other entities. The immutable, robust, information dense linkages may be used to create distributed networks of linked organic computer programs that can be efficiently synchronized in part or in whole. In an organic computer program, these networks may be expressed as one or more functional dependency graphs, wherein the links connecting the functions into a functional dependency graph are implemented using relationship entities. This synchronization may be possible by performing a simple union of the sets to be merged with logic that determines whether an entity to be merged is already contained in the target graph database node and may add the data node if it is not already contained, and may skip adding the data node if it already exists. In this way, data nodes, including but not limited to that are objects and entities such as relations, relationships, and the like, may be merged using union operations without worry of conflict.
Additional Detail: Identity Objects, Membership and Personas In one implementation configured according to the principles of the disclosure, membership is used to create graphs of functional decomposition, wherein a graph may be a set of entities linked using relationships. The flow may be further constrained using the aspects of identity and access control and corresponding identity graphs and access control graphs. In such an implementation, information flows and is distributed according to the intersecting graphs of identity, graphs of access, graphs of function, and membership. Implementations configured according to the principles of the invention may be used to create systems in which users may be functions, groups many be functions, computations may be functions, and system objects may be functions. As user functions are invited to join others functions, the invited user function may become a member of the other function, and may then further interpreter that other function through a process of functional decomposition. By inviting other user functions to join the other function, or subdividing the other function into additional functions, the user function may create a self-implementing system in which member functions program and expand the collection of functions that comprise the complete functional graph of the system and further invite or assign other functions to become member functions of assigned functions and thereby interpret the assigned functions of which they are member functions. A recursive process characterizes organic computing by enabling functions to create new functions in the function graph as well as assign existing functions to interpret existing functions as member functions, thereby changing the implementation or interpretation of the program at run-time. In organic computing, since people may be represented by functions, assigning a person function to interpret an assigned function means inviting the person function to become a member function of the assigned function. The person function can then further and recursively invite other people or machine interpreted functions to interpret the same other functions to which the person has access. In this way, the program is self-interpreting in the sense that the people, insofar as they are expressed as by functions, are programming the system by assigning other people to become interpreters of other functions, thereby increasing the interpretation or implementation of the program. In this way, the program may only be abstractly defined when it begins, wherein a few tasks exist with only textual descriptions, but over time, as people invite other people to interpret those functions, and as those invited people create new functions which interpret as member functions the assigned functions they were invited to interpret, the program expands to eventually provide a complete implementation of the originally textual description of the top-level tasks of the system. Similarly, people, insofar as they are represented by functions and assigned as member functions of assigned functions they are assigned to interpret, may replace themselves by inviting machine interpreted functions to interpret the assigned function in their place, thereby freeing themselves from the act of interpreting literal output values from literal input values by providing algorithms which perform the interpretation or implementation in their place. In this way, people may assign computer algorithms or programs to interpret the tasks they have been given to interpret. This organic style of computing is useful because the goals of the system should in many cases only be suspected and abstractly formed when the interpretation by people begins at the beginning of the running of the system and eventually, as more functions are created and invited to interpret other functions, the system becomes understood and fully implemented by either people or algorithms. In this way, a system may evolve from an abstractly specified form in which the intent is characterized by functions described only by text into a rich and distributed functional dependency graph, in which the inputs and outputs of functions are fully formed and wired to the variables produced by and received by other functions and the functions are fully interpreted by people or algorithms assigned to interpret. In this way, the interpretation of the meaning and structure of the program is constructed at run-time, just as the interpretation of the outputs from inputs are produced by those same interpreters representing program state.

Identity Objects

Actors in a system configured according the principles of the invention may have an identity. An actor may be defined by a Form and may be an entity that contains immutable data such as GUID and date/timestamp if its creation. An actor is any agent internal or external to the computer system that is configured to perform any of the following: providing one or more inputs, consuming one or more inputs, generating one or more outputs, submitting one or more requests, or operating in a system. An agent is a function, and specific examples of functions may include but are not limited to any one or more of a user, projects, task, group, computation, and network. Inputs and outputs may also be functions in a system configured according to the principles of the invention. Thus an identity object is a function.

The identity of each actor may be described by any number of properties and typically includes an associated identifier. This associated identifier may be machine-readable, human-readable, or both. Examples of the associated identifier may include but are not limited: to a globally unique identifier that may be a distinct number represented in a specific format such as hexadecimal; a routing name; a series of randomly generated characters, numbers, or both; or a combination of these examples.

Actors may perform actions under different contexts in a system configured according to the principles of the disclosure. These contexts may be referred to as identity objects. For example, people in the real world, functions in a computer program, and processes in an application often "wear multiple hats" when fulfilling different job duties, roles, assignments, or operations which may or may not be related. Each identity object may be thought of as a different "hat", or a different role, that the identity can "put on" as it works in the system and interact with the available resources and functionality.

In a system configured according to the principles of the disclosure, identity objects may be derived from the actor identity, and additional identity objects may be derived from any existing identity object. The identity object from which another identity object is derived may be referred to as the parent identity object, and the derived identity object may be referred to as a child identity object. When a new child identity object is derived from an existing child identity object, the existing child identity object may be referred to as the parent identity object for the new child identity object. As an identity object provides an actor a means to provide one or more inputs, consume one or more inputs, generate one or more outputs, submit one or more requests, and operate in a system, an identity object is a function.

FIG. 12 is an illustration of identity object derivation, configured according to the principles of the disclosure, generally denoted by reference numeral 1200. An example identity object derivation may include an Actor (1205) and Identity Object 1 (1210) for the Actor. Identity Object 1 (1210) may be derived to create Identity Object 2 (1215), Identity Object 3 (1220), Identity Object 4 (1225), and Identity Object 5 (1230). Identity Object 2 (1215), Identity Object 3 (1220), Identity Object 4 (1225), and Identity Object 5 (1230) may also be referred to as child identity objects of Identity Object 1. Identity Object 3 (1220) may be derived to create derived Identity Object 6 (1235), derived Identity Object 6 (1235) may be derived to create derived Identity Object 7 (1240), and Identity Object 7 (1240) may be derived to create derived Identity Object 8 (1245) so that child identity objects may be further derived to create additional child identity objects. In this example, child Identity Object 3 (1220) may also be referred to as a parent identity object of child Identity Object 6 (1235), child Identity Object 6 (1235) may also be referred to as a parent identity object of child Identity Object 7 (1240), and child Identity Object 7 (1240) may also be referred to as a parent identity object of child Identity Object 8 (1245).

The properties of an identity object may vary according to the requirements of a particular implementation, but may typically include an identifier that may be similar to a property of the parent identity object from which the identity object was derived. For example, in one implementation of the invention, if the parent identity object has a GUID identifier, the derived identity object may identifier may append a second GUID or a specific string of characters to the end of the parent identity object GUID. Referring to the Example Persona Derivation 1200, Identity Object 1 may have an identifier of 1a234-5a9-762 and Identity Object 2 may have an identifier of 1a234-5a9-762.9a065-4230a.

In another example, if the parent identity object has a string or name identifier, the child identity object identifier may append another string or name to the end of the parent identity object string or name identifier. One of ordinary skill in the art may recognize that a wide variety of human and/or machine readable formats may be appropriate for the identifier of an Identity Object, and a specific implementation may be based on the requirements of a specific implementation.

In addition to an identifier, each identity object may also be associated with a collection of content; this collection of content may also be referred to as an information set. The content that may be associated with an identity object may include any object in a system or may be restricted to a subset of the types of objects in a system. For example, content may include files such as document, images, and program files; functions; inputs; outputs; and the like. The information set associated with an identity object may evolve independently of any of its parent or child identity objects, so that content added to one identity object is only accessible to that identity object.

Membership

A membership object may be created as a result of the association of an identity object with a function. A membership object, also referred to as membership, may be defined by a Form and may be an entity that contains immutable data such as GUID and date/timestamp of its creation. Creating membership through membership objects may also be referred to as an identity object "joining" a function. A function may be a group, task, project, input, output, or other similar object. Identity objects and membership objects are also functions. A membership object may have one or more of the following characteristics:

Membership Recipient: the identity object associating with, or 'joining' the function.

Membership Provider: the identity object initiating the association with or joining of the membership recipient identity object with the membership target.

Membership Target: the function with which the membership recipient identity object may associate or join.

Licensing Persona: a new identity object that may be created as a result of the membership. This new identity object may license the membership from the membership recipient identity object. The identifier for this new identity object may include a property of the membership recipient identity object identifier and a property of the membership target.

A membership object may be a type of access derivation in which the access provider may be a function that may also be a membership provider, the access recipient may be a function that may also be a membership recipient, and the access point may be a function that may also be a membership target to which the access recipient, may also be referred to as the membership recipient, may be granted access.

In some implementations of the invention, membership may be initiated though an invitation process in which a first identity object may invite a second identity object to join a membership target. The invitation process may be automated or manual, the invitation may require acceptance prior to creating membership, or the membership may be immediately created after initiating the invitation process.

In other implementation of the invention, membership may be created as a result of an assignment process in which a specific entity may be linked to the membership target without requiring invitation or access/response steps. The assignment process may be automated or manual, and may be facilitated through, for example but not limited to, a graphical user interface, a command line interface, an integrated development environment, text files, and the like.

When a membership is granted, it may cause the creation of a new identity object that derives from the identity object of the membership recipient. The new identity object may include an identifier that may have at least one property of the membership recipient identifier and one property of the membership target identifier so that any separately evolving information set of an identity object associated with the membership target may be made immediately accessible to the new child identity object. In addition, objects associated with the accessible identity objects of the membership target in addition to the separately evolving information set may also be accessible to the new identity object. These other objects may include other identity objects joined to the membership target through other membership objects. For example, if the identity object for an actor that is a user is the membership recipient in a membership object where the membership target is a group, the new identity object created for the user may see a listing of group members by gaining immediate access to the other identity objects created for other users that are joined to the group through other membership objects.

Additionally, a system configured according to the principles of the disclosure may record and/or may attribute all actions and interactions by the new identity object with or on any separately evolving information set of any accessible identity object of the membership target to the new identity object.

A system configured according to the principles of the disclosure may use an access collection to specify interaction privileges between the new identity object's separately evolving information sets.

Many combinations of identity objects and functions may be possible in a system configured according to the principles of the invention. A few examples include but are not limited to: when a user joins the system, membership in the System Group may be the first membership created; when a Group is created in the system, membership in the System Group for the new Group may be created; and when 'Group A' is invited to join 'Group B', membership for 'Group A' in 'Group B' may be created; and when a function is added to a Group, membership of the function in the new Group may be created.

FIG. 13 is an exemplary overview of logical organization of membership providers, membership recipients, membership object, and associated identity objects and actors, and is generally denoted by 1300. In this example, a first actor (1310) with a first identity object (1325) invites a second identity object (1320) associated with a second actor (1305) to join a third actor (1315). In this example, the membership object may include: a membership provider that is the first identity object (1325), and membership recipient that is the second identity object (1320), and a membership target that is the third actor (1315). Creation of the membership object triggers creation of a fourth identity object (1340). This fourth identity object is also associated with the second actor (1305). The fourth identity object (1340) then licenses the membership (1335) between the second identity object (1320) and the third actor (1315). The license may be useful so that if the membership (1335) at some point may need to be discontinued, the license to the fourth identity object (1340) may be discontinued without affecting the second identity object (1320).

In one exemplary aspect of membership, the membership target may be a function that is a task, the membership provider a user, and the membership recipient may be a new task that is a subtask of the membership target. FIG. 14 is an example of membership for first function, referred to as a task in this example, being associated with a second function, also referred to as a Task in this example, and is generally denoted by 1400. In this example, one of the actors may be a user, and two of the actors may be functions that may be considered tasks. In FIG. 14 (1400), a first actor Sally (1410) with a first identity object Sally.System.WriteReportTask (1425) invites a second identity object, PrepareOutlineTask.System (1420), associated with a first function PrepareOutlineTask (1405) to join a second function WriteReportTask (1415). In this example, the membership object may include: a membership provider (1445) that is the first identity object Sally.System.WriteReportTask (1425), and membership recipient (1450) that is the second identity object PrepareOutlineTask.System (1420), and a membership target (1455) that is the second function WriteReportTask (1415). Creation of the membership object triggers creation of a fourth identity object PrepareOutlineTask.System.WriteReportTask (1440). This fourth identity object is also associated with the second function PrepareOutlineTask.System (1405). The fourth identity object PrepareOutlineTask.System.WriteReportTask (1440) then licenses (1460) the membership (1435) between the second identity object PrepareOutlineTask.System (1420) and the third actor WriteReportTask (1415). After licensing the membership, the fourth identity object PrepareOutlineTask.System.WriteReportTask (1440) may operate or may be operated on independently of the PrepareOutlineTask.System identity object (1420). For example, actions performed by the PrepareOutlineTask. actor (1405) may be conducted under the context of PrepareOutlineTask.System.WriteReportTask (1440). Additionally, operations such as providing access to the information set of WriteReportTask (1415) may be granted to the PrepareOutlineTask.System.WriteReportTask (1440) identity object. Additional identity objects may be invited to join PrepareOutlineTask.System.WriteReportTask (1440). As a task itself, an identity object associated with a user may be invited to join PrepareOutlineTask.System.WriteReportTask (1440) and perform activities. An Outline File may be created and associated with the content of PrepareOutlineTask.System.WriteReportTask (1440). Additionally, PrepareOutlineTask.System (1420) may be invited to participate in other tasks and additional memberships created. In this way, a system configured according to the principles of the invention may include functions or tasks that may be reused in a multiplicity of other functions. The PrepareOutlineTask. System (1420) function may be invited to the WriteReportTask (1415), it may be invited to a CompanyAnnualReportTask, and any report writing task, streamlining workflow creation processes and providing more efficiency through reusability. The license may also be useful in a scenario where the membership (1435) of PrepareOutlineTask.System (1420) in WriteReportTask (1415) should be revoked. In this scenario, the license may be discontinued without the need to delete PrepareOutlineTask.System (1420) and may not impact other memberships that PrepareOutlineTask.System (1420) may have in a system.

In one exemplary aspect of membership, the membership target may be an actor that is a Group, which may also be a function, and the membership provider and membership recipient may both be identity objects for actors that are users. FIG. 15 is an example of membership for a User joining a Group and is generally denoted by 1500. In FIG. 15 (1500), a first actor Sally (1510) with a first identity object Sally.System (1525) invites a second identity object John. System (1520) associated with a second actor John (1505) to join a third actor SalesGroup (1515). In this example, the membership object may include: a membership provider that is the first identity object Sally.System (1525), and membership recipient that is the second identity object John. System (1520), and a membership target that is the third actor SalesGroup (1515). Creation of the membership object triggers creation of a fourth identity object John.System.SalesGroup (1540). This fourth identity object is also associated with the second actor John.System (1505). The fourth identity object John.System.SalesGroup (1540) then licenses the membership (1535) between the second identity object John.System (1520) and the third actor SalesGroup (1515). After licensing the membership, the fourth identity object John. System. SalesGroup may operate or may be operated on independently of the John. System identity object (1520). The fourth identity object that is created is also a function, demonstrating functions creating functions. For example, actions performed by the John actor (1505) may then operate under the context of John. System.SalesGroup (1540). Additionally, operations such as providing access to the information set of SalesGroup can be granted to the John.System.SalesGroup (1540) identity object. For example, suppose John.System.SalesGroup (1540) was granted access to FileA of the SalesGroup content. If John.System.SalesGroup (1540) provides a new version of FileA to the SalesGroup content, the creator of that new version may be recorded as John.System.SalesGroup (1540). The license may also be useful in a scenario where the membership (1535) of John.System (1520) in SalesGroup (1515) should be revoked. In this scenario, the license may be discontinued without the need to delete John.System and may not impact other memberships that John. System may have in a system.

In a third exemplary aspect of membership, the membership target may be a function that is a computation, the membership provider the function itself, and the membership recipient may be a computation, or subfunction, of the membership target. Inviting a function to join another function in a membership object may specify the function that licenses the membership recipient as an interpreter of the membership target function. The membership target may be considered an outer function and the function that licenses the membership recipient may be considered an inner function. FIG. 16 provides an exemplary illustration of inviting computational functions to join computational functions, and is generally denoted as 1600. If a user Sally (1610) invites a square number function (1640) to join a hypotenuse function (1615), the memberships created as a result of this invitation may include the following. For ease of reference, each function is referred to by a routing name:

SquareNumber function membership in a hypotenuse function
    Membership provider: Sally.System (1625)
    Membership Recipient: SquareNumber.system (1620)
    Membership target: HypotenuseCalc (1615)
    Licensed by: SquareNumber.System.Hypotenuse (1640)

FIG. 17A and FIG. 17B are example flow diagrams for the process of Creating Membership and are generally denoted by 1700A and 1700B. All flow diagrams herein (including FIGS. 17A, 17B, 31, 32A, 32B, 32C, 33A, 33B, 33C, 33D, 33E, 35, 36A-36C, 37A-37G, 40A, 40B, 48, 49A, 49B, 50, 51, 52, 53, 56A, 56B, 61, 62, 63, 64); and any drawing showing relational type constructs (such as FIGS. 7-16, 18-30, 34, 41A-47, 54, 55 and 57-60) may equally represent a high-level block diagram of respective computer based components of the invention implementing any steps thereof. Also, the Figures showing relational type constructs (such as FIGS. 7-16, 18-30, 34, 41A-47, 54, 55 and 57-60) may also represent steps for creating the respective relational type constructs. All figures showing graphical user interfaces (such as FIGS. 65-100) may also represent a block diagram of the software component(s) (executable in conjunction with an appropriate computer platform) for creating the graphical user interface and receiving inputs therefrom and for displaying outputs thereto. The steps and/or components may be implemented as computer logic or computer code in combination with the appropriate computing hardware. This computer program code or computer logic may be stored on computer readable storage media such as a diskette, hard disk, CD-ROM, DVD-ROM or tape, as well as a memory storage device or collection of memory storage devices such as read-only memory (ROM) or random access memory (RAM), for example. Additionally, the computer program code can be transferred to a workstation over the Internet or some other type of network. The computer code may comprise a computer program product that is stored on a non-transitory computer readable medium and when read and executed by a computer processor executes the computer code.

Referring to FIGS. 17A and 17B, the Creating Membership Process Flow 1700A and 1700B may include:

Step 1705: For multiple actors in a system, derive from a first parent identity object for a respective actor a first set of one or more child identity objects for the respective actor, wherein the first parent identity object for the respective actor have an associated identifier and also defining a first information set for the first parent identity object for the respective actor, Step 1710: For multiple actors in a system, assign an associated identifier for each of the first set of one or more child identity objects for the respective actor that includes at least one property of the associated identifier of the first parent identity object for the respective actor, so that the respective actor may be knowable by its parent identity object and each derived child identity object, and each derived child identity object may reference the parent identity object for the respective actor, Step 1715: For multiple actors in a system, derive from any of the first set of one or more child identity objects a second set of one or more child identity objects for the respective actor, wherein any of the one or more child identity objects that may be derived for the respective actor may be a second parent identity object for the second set of one or more child identity objects for the respective actor, Step 1720: For multiple actors in a system, assign for each of the second set of one or more child identity objects for the respective actor an associated identifier that may include at least one property of the associated identifier for the second parent identity object for the respective actor and the at least one property of the associated identifier for the first parent identity object for the respective actor so that a plurality of graphs of derived identity may be created wherein the respective actors may be knowable in each graph by at least any one of: the first parent identity object for the respective actor, any of the first set of child identity objects for the respective actor, the second parent identity object for the respective actor, and any of the second set of child identity objects for the respective actor, Step 1725: For multiple actors in a system, evolve separately at least any one of: a first information set associated with, or contained by, the first parent identity object for the respective actor, a separate information set associated with each of the first set of one or more child identity objects for the respective actor, a separate information set associated with the second parent identity object for the respective actor, and a separate information set for any of the second set of child identity objects for the respective actor, so that the separate information sets may evolve in a context of any of the parent or child identity objects for the respective actor, Step 1730: For multiple actors in a system, provide for the respective actor access to the first parent identity object so that access to any of the first set of child identity objects through the first parent identity object, and provide for the respective actor access to any of second set of one or more child identity objects through the first parent identity object and the second parent identity object, so that any of the separately evolving information sets may be accessible by the respective actor, Step 1735: For multiple actors in a system, may distribute a parent identity object or any of the child identity objects for any of the respective actors within a computer system, thereby may provide distributed identity objects so that wherein each of the distributed identity objects may be knowable by its respective actor so that the respective actor may access any of its distributed identity objects, and wherein the associated information set for each of the distributed identity objects may evolve, Step 1740: For multiple actors in a system, may join in a membership object a membership provider, a membership recipient, and a membership target, wherein:

the membership provider may be an identity object, including a function, from one of the multiplicity of identity graphs, the membership recipient may be an identity object, including a function, from one of the multiplicity of identity graphs, and the membership target is an actor that may also be a function.

Step 1745: For multiple actors in a system, the creating of a membership may trigger the creating of a new child identity object for the membership recipient identity object that may include an identifier that may include at least one property of the membership recipient identifier and one property of the membership target identifier so that any separately evolving information set of the identity object associated with the membership target may be made immediately made accessible to the new child identity object and so that the new child identity object may invite additional identity objects, including functions, to join with the membership target in a membership relationship. For example, if the membership target is a group, the new child identity object may immediately be granted access to the list of group members, any files shared with or created by the group, and any messages sent to the group. In another example, if the membership target is a function, the new child identity object may be granted access to all member functions for the function, all function inputs, and al function outputs.

In addition, membership may be used to accomplish decomposition of the membership target function through the creation of new membership objects, wherein the newly derived identity object resulting from the new membership is a member function of the membership target function, so that new member functions generate new membership objects and the collection of functions and member function may create an expanding program structure, thus creating a collaborative means for interpreting the functional structure of a computer program wherein all of the member functions may participate in the interpretation so that interpretation may be performed dynamically at system runtime so that the structure of a program can change dynamically at runtime and fluidly adapt to changing requirements.

Personas as Identity Objects

In an exemplary system configured according to the principles of the invention, an identity object is a function and may be referred to as a persona. A persona is defined by a Form and is an entity that contains immutable data such as GUID and date/timestamp of its creation. A derived identity object may be referred to as a derived persona, a child identity object may be referred to as a child persona, and parent identity object may be referred to as a parent persona. One of ordinary skill in the art may envision that any number of terms, including but not limited to identity object, persona, alias, alternate identity, and the like may be used as when referring to identity objects. For ease of discussion, identity objects may be used interchangeably with personas in this disclosure.

After a persona, or identity object is created, it is applied or used in a system configured according the principles of the invention in several ways, such as for example:

A persona may be associated with and granted access to objects in the system;

A persona may be invited to join a group and may be specified as the membership recipient in a new membership, and may result in the creation of a new persona, or derived persona;

A persona may be used to accomplish decomposition in a system.

In one aspect of the invention, a persona is generated as a result of membership. As such, a persona may has a set of associated properties, which may include the following:

Identifier: a unique identifier for the persona, may be machine or human readable, may include one or more properties of a persona from which it derives, if any.

Date/timestamp: the date and time at which the persona was created

Access Recipient: the persona from which the new persona derives and the

Access Point: the membership target that the persona object or persona the person.

ACL Collection—Received: access rights that may have been granted to the persona by other personas.

ACL Collections—Granted: access rights the persona may have granted to other personas.

Content: references to the information objects that may comprise the information set associated with the persona. The information set may include files, folders, messages, comments, tasks, computations, functions, other personas, and the like.

Derived personas: references to the personas that may derive from the persona. For example, if a persona was invited to join five different groups, the five personas derived from the persona as a result of the creation of five membership objects for those five invitations would be referenced.

Invited personas: references to personas that the persona has invited to join with a function in a membership object. For example, if a persona invited three other personas to join a group, the personas that are the membership recipient in the membership relationship would be referenced as invited personas.

One of ordinary skill in the art may recognize that the persona property names are exemplary and any name, human or machine readable, may be appropriate for a system configured according to the principles of the invention.

A persona may be considered derived from another persona when it is generated as the result of membership and its Access Recipient is specified as the other persona. In this scenario, the new persona may derive from the other persona specified as its Access Recipient. The new, or derived persona may then be associated with and granted access to objects in the information set associated with the membership target, and it may also be invited to join other function, such as groups by being designated as the access recipient in yet another new membership, creating a third derived persona.

A derived persona may have all of the same features and functions as the persona from which it derives, though it may have different membership(s) and may include different access rights. There may be no limitation on the number of times a persona can be derived, and no limitation on the depth of persona derivation. This derivation of personas may create an identity graph.

FIG. 18 is a logical functional block diagram that provides an example of creating a membership and also displays the characteristics of the persona that may be created as a result of the membership. In the Membership and Persona example 1800, the following steps may be completed:

Assumptions: John and Sally are both members of Acme. John is also a member of Writers.Acme.Sally is also a member of BakerContract.Acme.

Step 1: John and Sally are both members of Acme. Identity Object: Sally.Acme.BakerContract (1805) has invited the Identity Object: John.Acme.Writers (1810) to join the Group: BakerContract (1820).

Step 2: John.Acme.Writers (1805) accepts the invitation.

Step 3: A Membership (1815) is created.

Step 4: Verify whether the required identity object already exists.

Step 5: A new identity object is created: John.Acme.Writers.BakerContract (1825), Step 6: Populate the Access Point (1835) as Group: BakerContract (1835).

Step 7: Populate the Access Recipient (1830) as John.Acme.Writers.BakerContract (1825).

Step 8: Populate any additional persona attributes as appropriate.

Step 9: The newly created Identity Object: John.Acme.Writers.BakerContract (1825).licenses the Identity Object: John.Acme.Writers (1810).

In this Membership and Licensing example shown in FIG. 18, the membership characteristics are as follows:

Member: John.Acme.Writers (1810)
Membership Provider: Sally.Acme.BakerContract (1805)
Membership Target: BakerContract (1820)
Licensing Persona: John.Acme.Writers.BakerContract (1825)

Routing Names

In some systems configured according to the principles of the invention, it is useful to define a mechanism for referring to and differentiating between a persona and all of the objects in which a persona has membership. While a unique identification number is assigned in the system for each of these objects, a human readable routing name can also be useful. One method for assigning human readable routing names is described in this section. One of ordinary skill in the art may recognize that many techniques for assigning names to differentiate personas are possible.

When an identity, such as a user, group, function, or any object to which membership is granted is created, it is assigned a unique identifier that is a GUID. Additionally, for a user another identifier such as a username. For a group or another function, it may be a unique variation of the associated name. After membership is granted to a group and a persona is created, a unique routing name is also created by combining the property of the membership recipient routing name to the property of the membership target group name.

For example, if a user with a username of user1 becomes a member of a group with a routing name of group1, then the routing name of the persona that may be created for that membership may be user1.group1. If that persona then becomes a member of a group with a routing name of group2, the new persona routing name may then be user1.group1.group2. In this example, the persona routing name may answer the question: Who joined what? Where the first part of the routing name may specify the "who" and the second part may specify the "what".

Function Decomposition Using Personas and Membership

Personas may be created for any objects that become a member of another object. Personas may be used to represent, for example, systems in a collection of distributed systems, groups, users, tasks, functions, to list just a few. In one exemplary environment for implementing principles of the disclosure, these systems may be referred to as networks. Personas and membership are applied to decompose a membership target into zero or a plurality of additional functions that interpret the membership target objects.

For example, a system may be implemented as a Network and the network may have a persona. The Network persona may be decomposed into a collection of Groups that have membership with it and the member group personas may derive from the Network persona. A Group may also be decomposed into a collection of additional member groups that derive from initial group persona. The group may also include one or more members that are associated with personas that are users. A task is decomposable into a collection of member tasks that make up, or derive from, the parent task. A function is decomposable into a collection of member functions, or functions that derive from the initial parent function. In a system configured according to the principles of the invention, any actor, function, group, task, or other object is decomposable into one or a plurality of member objects. Each of these member objects is an interpreter of the parent object. The member functions may also be assigned a particular order for execution.

For example, inviting a function to join another function in a membership object essentially specifies the function that licenses the membership recipient as an interpreter of the membership target function. The membership target is essentially an outer function and the function that licenses the membership recipient is essentially an inner function. Continuing the example, if a hypotenuse function in a system invites a sum of squared sides function and a square root function to join it in a membership, the memberships created as a result of this invitation may include the following. For ease of reference, each function is referred to by a routing name:

Sum of Square Sides function membership in a hypotenuse function
   Membership provider: Hypotenuse.system
   Membership Recipient: SumofSquaredSides.system
   Membership target: Hypotenuse.system
   Licensed by: SumofSquaredSides.System.Hypotenuse
   Square root function membership in a hypotenuse function
   Membership provider: Hypotenuse.system
   Membership Recipient: SquareRoot.system
   Membership target: Hypotenuse
   Licensed by: SquareRoot.System.Hypotenuse Further continuing this example, the SumofSquaredSides function may invite an Add function and a Square function to join through a membership object. In this way, the Sum of Squared Sides is an interpreter of the Hypotenuse function. The memberships created as a result of these invitations may include the following. For ease of reference, each function is referred to by a routing name:

Add function membership in a SumofSquaredSides function
   Membership provider: SumofSquaredSides.System.Hypotenuse
   Membership Recipient: Add.system
   Membership target: SumofSquaredSides.System
   Licensed by: Add.SumofSquaredSides.System.Hypotenuse
   Square function membership in a SumofSquaredSides function
   Membership provider: SumofSquaredSides.System.Hypotenuse
   Membership Recipient: Square.system
   Membership target: SumofSquaredSides.System
   Licensed by: Square.SumofSquaredSides.System.Hypotenuse In another exemplary environment for implementing principles of the disclosure, the Hypotenuse function may be considered an outer function, the SumofSquaredSides function an inner function, and a SquareRoot function a second inner function. Additionally, the Add function and Square function may be considered inner functions of the SumofSquaredSides function. These additional inner functions interpret the SumofSquaredSides function. This succession of outer functions and inner function create a function graph. In this example, one of ordinary skill in the art may recognize that the outer function may be more general, or more abstract, and the succeeding layers of inner functions may become more and more concrete with each progressive layer. The inner functions may concretely interpret the outer function which is an abstract function.

In another example, suppose a Sales Group that is a function and a user Sally.SalesGroup is a member of the SalesGroup in a system that is configured according to the principles of the invention. Suppose further that Sally.SalesGroup invites five other users to join the Sales Group. Suppose Sally.SalesGroup creates a PreSales Group as a member of SalesGroup, and a PostSales Group as a member of SalesGroup. In all of these instances, Sally.SalesGroup is interpreting the SalesGroup by adding new member functions, each of which may also further interpret, or decompose, SalesGroup by inviting additional member functions.

The functional decomposition aspect of the invention provides for starting with a general, or abstract function, and as memberships are created, adding inner functions that interpret the work of the outer function into more specific, or more concrete units of work. This is a powerful paradigm that is similar to traditional computing interpreters that are accomplished using language and syntax. However, when configured according to the principles of the invention, interpreters in a system may be any number of functions that model the actions of people, functions that model the actions of people, these people may: map a function information set to include its inputs and outputs, invite other functions that model the actions of other people to functions, and those invited functions that model the actions of people themselves become interpreters of the function. As these interpreters decompose the function into a collection of additional functions, the interpreters themselves dynamically generate functions, and dynamically generate organic programs.

Additionally, suppose a task with eight personas linked to it through membership exists in a system configured according to the principles of the disclosure. This system provides for a multi-threaded model of execution which may include eight threads, one for each member function, including the personas that are also functions. Membership and persona generation are one process by which the system grows, expands, and evolves. Inviting eight personas to a function is the same as inviting eight functions to a function in a system configured according to the principles of the disclosure. Because each function may operate independently of any other member function within the scope of its access rights, the membership target function may operate as a multi-threaded function.

In another example of a system configured according to the principles of the disclosure, suppose a Shipping function exists and five user personas are invited to become members of the shipping function. Continuing the example, suppose each of the five personas creates one new abstract member function for the Shipping function, which may include: pack shipment, complete paperwork, select delivery method, calculate fees, and manage complaints. As each new member functions are added through each persona, each persona is programming the function. The users, through their associated personas, may then invite additional personas associated with additional users to join in a membership with one of the member functions. The new members may then further subdivide any of the member functions, continuing to program the system. In a system configured according to the principles of the disclosure, users, through their personas which are functions, build complex systems one function at a time rather than relying on expensive software developers with specialized skills and requiring a thorough mapping of system end states and paths of execution before beginning programming—or require complete programming before running, since the invention makes the running of the system the process by which the programming of the system occurs. The system can be readily modified by discontinuing memberships or adding new memberships that add additional functions or invite additional personas and their associated users and the like. The program may become self-generating as the member functions collectively expand the functional space. Further, the decomposition of functions through membership may create a function graph that may be distributed across systems on a single node or multiple nodes in any combination of physical and virtual server environments, as well as on electronic devices capable of running the system.

The decomposition aspect of the disclosure provides for functions to generate functions through identity, access control, and membership. For example, suppose a system contains four functions in which a membership object joins the first identity object, the second identity object, and the third function. In this example, the first identity object is a membership provider, the second identity object is a membership recipient, and the third function is a membership target, so that the second identity object is a member of the third function. Continuing the example, through the creation of a fourth identity object with an associated fourth identifier that derives from the second identity object in the membership relations, the third function is decomposable into a collection of multiple member functions through the creation of additional membership objects, accomplishing decomposition of the membership target function through the creation of new membership objects, wherein the newly derived identity object resulting from the new membership is a member function of the membership target function, so that new member functions generate new membership objects, creating an expanding program structure and a collaborative means for interpreting the functional structure of a computer program wherein all of the member functions participate in the interpretation, performing interpretation dynamically at system runtime so that the structure of a program dynamically changes at runtime and fluidly adapts to changing requirements.

Additional Detail: Graph Data Node and Graph Database Node Constructs

In a system configured according to the principles of the disclosure, an organic computer program may be a collection of information modeled as entities (data nodes) and joined by relationships (edges). An entity may also be referred to as a data node. The data nodes of an organic computer program include function entities, membership entities, persona entities, user entities, access control entities, variable entities, relationship entities, and other entities defined by forms.

An organic computer program may be expressed as a Graph Database (GraphDB). As such, graph databases include constructs to create entities that may be data nodes, as well as the edges, also referred to as relationships, that link the data nodes, and a varied set of application programming interfaces (APIs) to add information to the graph, query the graph, traverse the graph, maintain the graph, and the like. In one aspect, the GraphDB may itself be configured as a node in the graph, referred to as a graph database node (GraphDBN), and the graph database node may be decomposed by selecting one or more subsets of the data nodes, including edges, it contains and using those subsets to create new graph database nodes that may then evolve and expand through the addition of new nodes, new edges, and the like. These and any other GraphDBN may be distributed across a multiplicity of virtual and/or physical servers. In a distributed set of GraphDBNs, the relationships, or edges, between nodes and the data nodes themselves are maintainable across servers and devices as each data node and edge contain immutable data including a GUID and a date/timestamp to store the date and time of creation. The GUID provides for maintaining the integrity of data nodes and edges in a distributed system. The immutable data of a data node and edge further support the maintenance of information integrity. In a system where the integrity of data nodes and edges is maintainable through the use of unique identifiers and immutability, evolution of data nodes and edges may only be possible through the addition of any of: a new edge joining one or more data nodes and the addition of a new data node and a new edge joining that new data node. The new edge is an entity, typically a relationship entity, and the data nodes are entities and may be either relationship entities or non-relationship entities.

A data node also provides for binary large object (BLOBs) to be contained within a graph database node, and enables the graph database node to contain unstructured content such as, but not limited to, files, and provide for graph database nodes to include data nodes that are BLOBs in subsets shared through merge operations, where a primitive binary string entity may contains the file content.

In another aspect, a Function entity that is a data node in a Graph database is linkable to a collection of other data nodes, such as member functions, inputs, outputs, variables, and other entities joined by relationships (edges). This collection of data nodes may be referred to as an organic computer program.

The graph database or graph database node that results from the collection of entities in an organic computer program configured according to the principles of the disclosure may be expressed as a functional dependency graph.

Organic Computer Program Constructs

The constructs of the system and method for the structuring and interpretation of organic computer programs configured according to principles of the disclosure may include but are not limited to the following: functions, member functions, interpreters, Functions
Member Functions
Interpreters
Relationships
Differentiation
Integration
Differential Integration
Program structure transitions
Program state transitions
Database State Transitions
Distributing a Subset of or a Full Organic Computer Program
Merging Organic Computer Programs and Subsets of Organic Computer Programs
Applying the Constructs to Structuring and Interpreting Organic Computer Programs These constructs are applicable to build a system and method for structuring and interpreting organic computer programs using principles of the disclosure, described herein. These constructs define the structures needed to capture, store, manage, transfer, copy, append, distribute, evolve, diverge, and/or converge information across a distributed set of databases, including graph databases, or even within a given database. This information includes data, programs, program code, functions, files, entities, streams, and the like, as well as connections between this information, and collections of connected information. The constructs that are used to model information and the connections between information in a system and method for the structuring and interpretation of organic computer programs are implemented using a computer-based Forms Language. Forms Language also provides one or more constructs that capture changes to the connections between information as separate objects.

According to an aspect of the disclosure, using the system and method for the structuring and interpretation of organic computer programs, once any part of the program is defined as a function and one or more interpreters assigned, the program may begin running, without compilation. Interpreters are also functions and can modify the program structure at any time, modify the program state at any time, and create new functions to specify how to complete the work of the program. Thus the program may run as it is created, and the program may be created as it runs. This provides for programs to be changed dynamically to adapt or respond to new or changing information without recompilation and may eliminate the need to stop and start the program to implement the change, significantly reducing the cost typically required to modify the static programs of today before the disclosure.

Examples of Interpreters include, but are not limited to algorithms, mathematical operations, and/or functions associated with the actions of a person. These interpreters are functions and inherit from the same base function class. Because programs are typically be written by people rather than computers, the principles of the invention models the actions of people and their activity as part of the program using functions and other entities, thus the program writes the program. For example, the humans modeled as functions in the program may write the program itself as they create new functions. Because people may act as interpreters in the program via appropriate inputs, the program may continuously write and expand itself. Interpreters are functions, program structure is defined using functions, and functions are entities, thus the program structure is storable in one or more databases, and is storable in one or more streams.

For example, FIG. 19 is an illustration of a program structure configured according to the principles of the disclosure being changed over time as it runs and is generally designated by reference numeral 1900. In the program structure changing example 1900, a simple program, referred to as the "Go Shopping( )" function (1906) is created at time t=0 using aspects of the disclosure. A "User 1" member function (1909) is assigned as an interpreter of the GoShopping( ) function (1906). "User 1" is modeled as a function.

Continuing the example, at time t=1 the "User 1" member function (1918) changes the structure and state of the GoShopping( ) function (1xx15). The "User 1" member function (1xx18) adds three member functions to the "Go Shopping( )" function (1916): a "Buy Bread( )" function (1921), "Buy Milk( )" function (1927), and a "Buy Butter( )" function (1933). The "User 1" member function (1918) then assigns these member functions to "User2" member function (1921), "User 3" member function (1930), and "User 4" member function (1936), respectively.

Continuing the example, at time t=2 the "User 3" member function, assigned to the "Buy Milk( )" member function (1927), decides to create additional member functions, such as a "Price Milk at Store 1" member function (1960), "Price Milk at Store 2" member function (1966), "Price Milk at Store 3" member function (1977), and assigns those member functions to "User 6" member function (1969), "User 7" member function (1975), and "User 8" member function (1981), respectively.

FIGS. 20A and 20B provide an exemplary illustration of how the program evolution shown in FIG. 19 changes the structure of a program as it runs in a system configured according to the principles of the disclosure. Changing the program structure results in a change in program state. For example, at time t=0 the program structure resembles that shown in FIG. 20A, generally denoted as 2000A. In this example, a "User1" member function (2015) is assigned to a GoShopping( ) function (2005) using a Membership relationship (2010).

Continuing the example, at time t=1 the program structure resembles that shown in FIG. 20B, generally denoted as 2000B. In this example, a "User1" member function (2015) may have divided the GoShopping( ) function (2005) into three member functions: a "Buy Bread( )" function (2020), a "Buy Milk( )" function (2057), and a "Buy Butter( )" function (2030). These three member functions are linked to the GoShopping( ) function (2005) through three membership relationships (2035, 2040, 2045). The "User 1" member function (2015) assigns the "Buy Bread( )" function (2020) to a "User2" member function (2050) through a membership relationship (2055). Similarly, the "User 1" member function (2015) assigns the "Buy Milk( )" function (2020) to a "User3" member function (2060) through a membership relationship (2065). Lastly, the "User 1" member function (2015) assigns the "Buy Butter( )" function (2020) to a "User4" member function (2070) through a membership relationship (2075).

Completing the example, at time t=2, the program structure resembles that shown in FIG. 20C, generally denoted as 2000C. In this example, a "User3" member function (2035) divides the "buyMilk( )" function (2015) into three member functions: a "priceMilkatStore1( )" function (2045), a "priceMilkatStore2( )" function (2050), and a "priceMilkatStore3( )" function (2055). These three member functions are linked to the "buyMilk( )" function (2015) through three membership relationships (2090, 2096, 2097), respectively. The "User 3" member function (2035) assigns the "priceMilkatStore1( )" function (2045) to a "User5" member function (2060) through a membership relationship (2092). Similarly, the "User 3" member function (2035) assigns the "priceMilkatStore2( )" function (2050) to a "User6" member function (2094) through a membership relationship (2094). Lastly, the "User 3" member function (2035) assigns the "priceMilkatStore3( )" function (2055) to a "User7" member function (2070) through a membership relationship (2099).

One of ordinary skill in the art may recognize from this example that any number of member functions and any number of interpreters may be added to the GoShopping( ) function by any the additional member functions described previously. Note that for clarity, only certain functions and relationships that may be created as a result of the actions described for FIGS. 20A, 20B, and 20C are shown and described. Additionally, one of ordinary skill in the art may recognize that although the examples illustrated in FIG. 19, and FIGS. 20A, 20B, and 20C are related to functions associated with humans, the same approach may be applied to mathematical functions, algorithmic functions, or any combination of human, mathematical, and/or algorithmic functions. Note that function definition, application, instantiation, interpretation, processing, transformation, and storage may be performed on a single computer system or across different computer systems configured according to the principles of the disclosure.

The examples shown in FIG. 19 and FIGS. 20A, 20B, and 20C demonstrate the differentiation of functions through functional decomposition, and functions creating other functions during run time. This example also encompasses integration. Using the system and method for the structuring and interpretation of organic computer programs, each member function is linked to the function to which it was added through a membership relationship. FIGS. 20A, 20B, and 20C illustrate the integration linkage between each of these functions.

In addition to linking to a parent function through a membership relationship, member functions may be linked to each other by specifying that the output of one or more functions may provide the input to one or more other functions. These outputs and inputs may be of a specific type, or may be abstract or generic linkages that are assigned as an interpreter further refines a function.

By changing the program structure through differentiating functions into member functions, and then integrating or linking those same member functions to each other, the system and method may perform "Differential Integration," according to principles of the disclosure. In one aspect, the invention may include creating a functional dependency graph as a result of this "Differential Integration." The dependencies generated in the graph may include, but are not limited to, the following: integrating or linking functions and member functions, integrating or linking functions and their inputs, integrating or linking functions and their outputs, and integrating or linking the outputs of one function to its own or another function's inputs.

"Differential integration" and the creation of the functional dependency graph also provides for significant ripple effects using the invention. This ripple effect may occur as a change in one part of the graph may impact a small or large subset of the graph as a result of its linkages. For example, changing a program state by populating a function output may trigger the flow of that output to the function(s) which use(s) it as an input. The execution of those functions and population of their respective outputs may trigger the execution of additional functions or functions. These processes may repeat until all of the linkages, also referred to as dependencies, impacted by the change in state are resolved. This may be especially useful in applications such as supply chain where low inventory or limited part availability may have a significant impact on downstream operations and alternate suppliers may need to be identified and/or reduced production schedules may need to be enacted. For example, the limited availability of parts needed to manufacture certain vehicles due to the interruption of manufacturing operations in Japan as a result of the March 2011 earthquake and tsunami significantly reduced operation schedules and production output for critical parts needed to assemble cars. Creating a distributed organic computer program according to the principles of the disclosure that maps scheduled tasks related to production of specific parts as functions and member functions, and tracks actual production rates output from one function as input to other functions may provide for an evolvable and integrated supply chain and manufacturing schedule program. Continuing the example, as the impact of reduced output for one or more parts ripples throughout the workflow, notifications may be generated and forwarded to assigned interpreters. This supply chain in this example can be readily modified to integrate new parts suppliers, or mitigate and communicate reduced production schedule.

A functional dependency graph that may be generated by the system for an organic computer program is storable in a database using a structure that includes both the program structure and the program state. The functions, inputs, outputs, member functions, and member variables that define the program are all entities joined by relationships. As such, these entities are writable to a database, thus the structure of the program is writable to a database.

Program state is changed as: (1) program structure is changed through adding new member functions, new inputs, or new outputs are added to a program, as well as (2) when outputs are populated and flow to inputs, thereby populating the respective inputs. Populating an output is the system is the result of joining a new or existing entity to an output entity through a new relationship. Changing program structure is accomplished by adding and linking new entities or linking existing entities. Populating outputs and inputs is completed by adding and linking new entities or existing entities. The entities used to effect change are all writable to a database in a system configured according to the principles of the disclosure. Thus a program state transition is completed as a result of writing an entity to a database, and a database state transition represents a program state transition.

Because any change in program state and any change in program structure results in a write to a database or stream, change is a first-class object in a system configured according to the principles of the disclosure. As a first class object, a change object is capturable, manipulable, operable, and interpretable. Further, in one aspect, monitoring of change expressed as database state transitions can be used to impact other functions by sending notifications based on properties of or constraints on a function. In this way, a computer system (including distributed networked systems) constructed according to these principles of the disclosure may also act as an operating system in that it monitors, queues, and attempts to run the functions.

In programming systems before this disclosure, program structure may typically be thoroughly specified in a complete a manner as possible before coding begins, including all possible end states and paths of execution. The program may then be coded, the code compiled, and the program executed. In systems today before the disclosure where the program specification is incomplete or poorly written, changes typically require significant monetary expenditures and/or a large number of working hours. The more complex or more connected the program or its outputs are with other programs, the more difficult and expensive it is to change. In some cases, the investment required to make a change to an existing system today before the disclosure may be deemed too large, and the desired change may not be implemented. Using principles according to the invention, program structure and program state may both be stored in the database and may both be changed during runtime. There may be no programmatic constraint that requires the thorough or complete specification of program structure and compilation before the program can begin running and changes in state recorded.

Functions

In one aspect of the invention, a Function may be represented in a graph database as a Form with a set of Relations. A Form with a set of Relations may also be referred to as a Node with a set of Edges. A Function consumes zero, one, or more input variables and produces zero, one or more output variables. A Function is used to model human-driven processes as well as machine functions, processes, and algorithms. The Relations of the Function Form may include, but are not limited to, the following:

Input variable(s): entities that are consumed by a function. Each input may typically be stored in a variable stream, and inputs streams are consumed by functions. Input variables are typically referred to as 'inputs' throughout the disclosure.

Output variable(s): entities produced by a function. Each output may typically be stored in a variable stream and output streams may be produced by a function. Output variables are typically referred to as 'outputs' throughout the disclosure. A function may output any entity, including forms, relationships, variables, other functions, streams of entities, sets of entities, and the like.

Member Functions: the collection of tasks, processes, or algorithms into which a parent function is decomposed or subdivided. Example member function may include but are not limited to: mathematical operations, algorithmic operations, logic operations, operations related to human action, and the like. Member functions are also referred to as interpreters or subfunctions throughout the disclosure.

Member variables: inputs to and outputs of a function or its related member functions. GUID: Each function in the invention includes a globally unique identifier (GUID). As may be recognized by one of ordinary skill in the art, a GUID may be a distinct number (e.g., in hexadecimal or other format). In a system configured according to the principles of the disclosure, a GUID may be used to uniquely reference the entity with which it is associated.

Date/Timestamp: Each function in the invention includes a date/timestamp that records the date and time the Function was created.

An illustrative example of one derivation of a typical Function Form and a typical Variable Form from a typical Entity Form, as well as a few example Relations for each is shown in FIG. 21, generally denoted by 2100. In this illustrative example, only a subset of the relations that may be included in each Form are shown. The Entity Form (2105) includes a GUID Relation (2110), a Date/Timestamp Relation (2115), and a Name Relation (2120). The Entity Form (2105) is derived to create the Function Form (2125). The Function Form (2125) may inherit a GUID Relation (2130), a Date/Timestamp Relation (2135), and Name Relation (2140) from the Entity Form (2105). The Function Form (2125) may be expanded by adding relations, such as an Input Relation (2145), an Output Relation (2150), a Member Function Relation (2155), and a Member Variable Relation (2160).

The Entity Form (2105) is also derived to create a Variable Form (2165). The Variable Form (2165) inherits a GUID Relation (2170), a Date/Timestamp Relation (2175), and Name Relation (2180) from the Entity Form (2105). The Variable Form (2165) may be expanded by adding relations, such as a Value Relation (2185).

One of ordinary skill in the art may recognize that the derivation shown in FIG. 21 may include additional Forms in the inheritance hierarchy between the Entity Form and Function Form, or between Entity Form and Variable Forms, and each Form may include Relations in addition to those listed.

An overview of an example function and its relations is shown in FIG. 22, generally denoted as 2200. FIG. 22 (2200) shows a Function F (2205) with two inputs: variable A (2222) and variable B (2225). Function F (2205) produces two outputs: Variable C (2230) and Variable N (2235). Function F also contains Member Functions (2210) and Member Variables (2215).

A more specific example of a function with pseudocode for its member functions is provided in FIG. 23, generally denoted as 2300. In exemplary FIG. 23, the changeOwed( ) function (2305) includes member function calculateTotal( ) (2335) to calculate the sum of the two input prices as item1Price (2310) and item2Price (2320), and a member function calculateChange( ) (2330) to subtract the output from calculateTotal( ) (2335) from the amountPaid input (2320) to determine the changeOwed( ) (2325) output. To summarize, the example changeOwed( ) (2305) function includes the following:

Inputs: item1Price (2310), item2Price (2315), amountPaid (2320)

Outputs: changeOwed (2325)
Member Functions:
calculateTotal( ) (2335)
  calculateTotal( ) (2335) Inputs: item1Price (2310), item2Price (2315)
  calculateTotal( ) (2335) Outputs: totalPrice (2345)
calculateChange( ) (2330)
  calculateChange( ) (2330) Inputs: amountPaid (2320), totalPrice (2345),
  calculateChange( ) (2330) Outputs: changeOwed (2325)
calculateTotal( ) (2335) Outputs: totalPrice (2345)
calculateChange( ) (2330) Outputs: changeOwed (2340)
Member Variables: totalPrice (2345)

In this simplified example shown in FIG. 23, each input, output, and member variable is a numeric value in currency format.

An overview of the Forms that may be created using various aspects of the disclosure to implement the changeOwed( ) Function described in FIG. 23 is shown in FIG. 24, generally denoted as 2400. Note that only a subset of the possible Relations for each Form are shown in FIG. 24, and Relationship Forms linking the Forms to the Relations of the changeOwed( ) Function Form (2405) are not displayed. FIG. 24 includes the changeOwed( ) Function Form (2405). The changeOwed( ) Function Form (2405) includes and Input Relation that is linked to the input1Price( ) Variable Form (2410), the input2Price( ) Variable Form (2415), and the amountPaid( ) Variable Form (2420). The changeOwed( ) Function Form (2405) includes and Output Relation that is linked to the changeOwed( ) Variable Form (2430). The changeOwed( ) Function Form (2405) includes and Member Function Relation that is linked to the calculateChange( ) Function Form (2435) and the totalPrice( ) Function Form (2440).). The changeOwed( ) Function Form (2405) also includes a Member Variable Relation that is linked to the totalPrice( ) Variable Form (2425).

Function Types

A Function Form is extendable to provide for human-driven functions, logic functions, algorithms, and machine functions, in accordance with principles of the disclosure. In one implementation, the following extensions of the Function Form are useful. Note that these are example extensions of the function form, many more may be provided by the systems and methods implementing aspects of the disclosure, and additional extensions may be added/provided as appropriate:

Interpreted Function Form: the Interpreted Function Form extends the Function Form and may include two additional relations that streamline the modeling and execution of machine processes, algorithms, and encoded instructions in an organic computer program that may be expressed as a graph database, also referred to as inducing a graph database. The two additional relations may include: the Language Relation and the Instruction Relation.

Task Form: To streamline the modeling of human-driven functions instructions in an organic computer program that may be expressed as a graph database, the Task Form extends the Group Form, which itself extends the Function Form. The additional Task Form relations may include, but are not limited to: start date, end date, status, inbox, outbox, percent complete, routing name, and contact persona. Note that several of these relations may be inherited from the Group Form.

Choice Form: The Choice Function Form may include at least one condition/constraint and provides for an interpreter (human, machine-based, and the like) to evaluate to the output that meets the specified conditions/constraints. The Choice Form has some similarity to traditional If/Select/Case statements; however the Choice Form extends the Function Form and may include additional relations for the condition to be interpreted.

An illustrative diagram of one implementation of the derivation of an Interpreted Function Form, a Task Form, and a Choice Function Form from a Function Form is shown in FIG. 25, generally denoted as 2500. Note that FIG. 25 displays a subset of the possible relations for each Form, and may not include all of the Forms in the intervening derivation tree.

In FIG. 25, the Function Form (2510) may be derived from the Entity Form (2505) and may inherit a set of Relations from the Entity Form (2505), as well as incorporate additional relations. The inherited relations are shown in italicized font. Continuing the description of FIG. 25, an Interpreted Function Form (2520), a Group Function Form (2525), and a Choice Function Form (2530) each derived from the Function Form (2510) and inherit a set of Relations from the Function Form (2510), as well as incorporate additional relations. The inherited relations are shown in italicized font. Lastly, the Task Function Form (2535) derives from the Group Function Form (2525) and inherits a set of Relations from the Group Function Form (2525), including the Relations the Group Function Form (2525) inherits from the Function Form (2510), as well as additional relations. The inherited relations are shown in italicized font.

Functions, Interpreted Functions, and Tasks may be used in combination to model simple and complex human-driven, algorithm-based, and/or other non-human processes and workflows. Additional detail on Interpreted Functions and Tasks is provided below.

Interpreted Functions

In one implementation of a system configured according to the principles of the disclosure and as shown in regards to FIG. 25, Interpreted Functions are derived from Function to provide for the use of one or more mathematical operations or an algorithm encoded in a set of instructions. Similar to Function, the Interpreted Function described by a Form with a set of Relations may also be expressed in a graph database as a Node with a set of Edges. The Interpreted Function also consumes inputs and produces outputs and provides for modeling and executing machine functions, processes, and algorithms through the specification of language and instructions. The encoded instructions in an Interpreted Function may be written as a script, package, class, method, or other structure using any software language supported by a runtime engine that can be included in the application server on which the organic computing program may be deployed. For example, an Interpreted Function Form that makes use of the Groovy language to add two numbers may be pseudocoded as follows:

```
Form addFunctionDef = InterpretedFunction.Builder
    .builder("add")
    .inputAsVariable(addend1Name, anyNumber)
    .inputAsVariable(addend2Name, anyNumber)
    .outputAsVariable(sumName, anyNumber)
    .implementation(Language.GROOVY,
        "outputs.put(\"sum\", addend1 +
            addend2)").build( );
```

In other implementations employing principles of the disclosure, member variables of the type 'script' and 'instructions' may be used. One of ordinary skill in the art may recognize that other implementations of the language and instructions specification may be possible.

Tasks

In another implementation of a system configured according to the principles of the disclosure and as shown in regards to FIG. 25, Tasks derive from Function to provide for modeling and expressing human-driven tasks and workflows.

Similar to a Function, a Task defined by a Form with a set of Relations may also be expressed as a graph database as a Node with a set of Edges. The Task also consumes inputs and produces outputs. In addition, the member functions of a Task typically include a persona that is associated with the actions of a user, a group, or actual human. Tasks are typically (but not necessarily) human-driven processes. The member functions of a task may also include other types of functions, including but not limited to interpreted, algorithmic, or other human functions. Systems and methods employing principles of the disclosure may be used to model human-driven workflow by decomposing a Task into a set of subtasks as member functions, and associating users (via their persona) with a Task, also as member functions.

Choice Functions

In another implementation of a system configured according to the principles of the disclosure and as shown in regards to FIG. 25, Choice Functions may be derived from Function to provide for human or machine interpreters to resolve a function to an output based on one or more constraints. For example, a Choice Function may provide for the creation of a Function that executes one subset of the dependency graph or a different subset of the dependency graph, depending on the specified condition. In another example, a Choice Function designed to trigger buying or selling of stock may include constraints that specify the following descriptive instructions: If price of Stock A rises by 25%, trigger the instantiations of sell functions. If the Price of Stock A drops by 10%, trigger the instantiation of buy functions.

Similar to Function, Choice is described by a Form with a set of Relations and may also be represented in a graph database as a Node with a set of Edges. The Choice Function also consumes inputs and produces outputs, including outputs that are also functions. In addition, the member functions of a Choice Function may be any type of function, but typically include an interpreter. The interpreter may be a persona that is associated with a user, a group, or actual human, or an interpreter may be an interpreted function.

Function Definition, Application, and Instantiation

In one implementation of a system configured according to the principles of the disclosure, functions are first defined, then be applied, and then instantiated. When a function is defined, a function definition form is created. When a function is applied, the function definition form is applied and a function application form created. When a function is instantiated, a function entity is created from the corresponding function application form.

The creation of a function definition form provides for reuse of the function definitions in many different function applications in systems configured according to the principles of the disclosure. The creation of a function application provides for reuse of function applications to create many different instances of the same function in systems configured according to the principles of the disclosure. Each instance may be independent, and each instance may run concurrently, in parallel, or at disjoined times. Each definition, application, and instance of a function may also be further interpreted in different ways, such as by adding new member functions, new inputs, new outputs, and the like, by other functions in the same system at the same time or over time. Interpreting a function typically results in at least one modification to the state or structure of the function. Interpreting a function may alter the function signature.

Additionally, when distributed across multiple systems configured according to the principles of the disclosure, each definition, application, or instance of a function may also be further interpreted in different ways, such as by adding new member functions, new inputs, new outputs, and the like, by other functions in different systems at the same time or over time.

Function Definition

In one implementation of a system configured according to the principles of the disclosure, any Function, including but not limited to Interpreted Functions and Tasks, are represented using at least one Form. A Function Form may be defined by providing a name, specifying the function type, and specifying function inputs, outputs, member functions, and member variables. A Function must typically be defined before it can be applied and instantiated. Example pseudocode for defining a Function may be as follows:

```
Form totalPriceFunctionDefinition=
    InterpretedFunction.Builder.build
```

Continuing the example, pseudocode for defining the inputs and outputs of the totalPriceFunctionDefinition may be as follows:

```
Form totalPriceFunctionDefinition=InterpretedFunction.Builder
.builder("addTwoPrices")
.input("input1")
.input("input2")
.output("sum").build
```

Both defined functions and applied functions may be represented in the system using Forms. An instantiated function may include a set of entities created from: the function application form and any forms corresponding to the applied function inputs, outputs, member variables, and member functions.

Function Application

In one implementation of a system configured according to the principles of the disclosure, a function may first be defined and a Function Definition Form may be required to be created before it can be applied. A function definition is applied when its inputs, outputs, member variables, and member functions are customized for a specific purpose, or when it is included as a member function in another function. The same function definition may be applied zero, one or multiple times, and may be added to another function as a member function. A function application may be entirely represented by Forms and Relations. There may be many Function Applications for a single Function Definition.

Sample pseudocode for applying the previously described totalPriceFunctionDefinition example function definitions is as follows:

```
Form totalPriceFunctionApplication=InterpretedFunction.Builder
.apply("calcTotalSpent", totalPriceFunctionDefinition)
.input("input1", "item1price")
.input("input2", "item2price")
.output("sum","totalprice").build
```

An applied function is a subclass of the function definition form it extends; it may be tightly bound to a specific use case of the Function Definition. The relations of the function definition form are inherited by the function application. Those relations may then be narrowed (overridden) to relate specific variable applications. In the totalPriceFunctionApplication pseudocode, the input1 input variable is applied by assigning item1price to it.

Function Instantiation

In one implementation of a system configured according to the principles of the disclosure, a function is instantiated when it is applied or when its' inputs are made available and it begins execution. The same function may be instantiated zero or multiple times. An instantiated function is entity of the type of the Function Form that defines it.

In the example changeOwed( ) function shown in FIG. 23, the changeOwed( ) function is instantiated when it is called by the system, and beings executing when any one of its inputs: item1price, item1price, or amountPaid, are specified. Note that if item1price, item1price are specified, the caculate Total( ) member function may execute whether or not the amountPaid input is available.

When a function is instantiated, the function and variable entities corresponding to the Forms used in applying the function are created. Each time a Function Application is executed, a new function instance may be created.

For example, a "MovieReview" Function Application may be instantiated three times by assigning "Jaws", "Piranha", and "The Deep" to a "Movie Title" input variable. The process for defining, applying, and instantiating a reusable a "MovieReview" Function may include the following:

Step 1: Begin creating a Function Definition for a move review process, link the name "MovieReview( )" with the function definition.

Step 2: Continue defining the "MovieReview( )" function by specifying a "MovieTitle" input variable and a "Movie Review Document" output variable.

Step 3: Create three function applications:
Application 1: Bind the "MovieTitle" input variable to "Jaws" and the "Movie Review Document" output variable to "Jaws Movie Review Document".
Application 2: Bind the "MovieTitle" input variable to "TheDeep" and the "Movie Review Document" output variable to "The Deep Movie Review Document".
Application 3: Bind the "MovieTitle" input variable to "Piranha" and the "Movie Review Document" output variable to "PiranhaMovie Review Document"

The system creates three Function instances and executes the three different movie review tasks:
"Jaws" Instance
"The Deep" Instance
"Piranha" Instance Variables Variables store information inside a function, store and transfer inputs to a function, and store and transfer outputs from a function. A variable that is the output of one function may be linked as an input to zero or more other functions, or may link as an input back into the same function. The linking is accomplished using relationships.

In one implementation of a system configured according the principles of the disclosure, a variable may be required to be defined before it can be used in a function. A variable used in a function may be an application of the variable. When a variable is populated as a function runs, it may be instantiated.

Variable Definition

In an implementation of a system configured according the principles of the disclosure, a variable may be represented using a Form and may be required to be defined before it may be applied. A variable Form is defined by specifying its type. A variable is typically defined by a form or an instances of a form and comprises a class or an instance of a class. Example pseudocode for defining a variable to store numeric values may be as follows:

```
Form vNumber = variableDefinition.define("anyNumber",
                                        number.getClass( )).build
```

In this exemplary pseudocode, the parameter assigned the value of "anyNumber" is the name of the new Form, and the parameter assigned the value of "number.getClass( )" is the base class that this new variable definition extends.

Continuing the example, pseudocode for defining a variable to store a currency value is as follows:

```
Form vCurrency = variableDefinition.define("anyCurrency",
                                          currency.getClass( )).build
```

And in another example, pseudocode for defining a variable to store a string is as follows:

```
Form vString = variableDefinition.define("anyString",
                                        string.getClass( )).build
```

Variable Application

In an implementation of a system configured according the principles of the disclosure, a variable may be required to be defined before it may be applied. A variable definition may be applied when it is associated with a specific variable name, such as in a Function definition. The same variable definition may be applied zero, one or multiple times.

Sample pseudocode for applying the example variable definitions described previously is as follows:

```
builder.memberVariableAsVariable("numberBought", anyNumber);
builder.memberVariableAsVariable("item1Price", anyCurrency);
builder.memberVariableAsVariable("item2Price", anyCurrency);
builder.memberVariableAsVariable("totalPrice", anyCurrency);
builder.memberVariableAsVariable("BuyerName", anyString);
```

A variable may typically applied when a variable definition associated with a variable form of a certain type is included in a function definition that is applied as a member function of another function. The variable application in the function application binds to a variable form that is a subtype of the variable form bound to by the variable in the function definition, so that the an application of the function application the function definition by linking the function application to the variable form. A variable is frequently used to specify and input property or an output property of a function. A variable may be applied to a function definition using a relationship that designates the variable definition as a superform and variable application as a subform. Additionally, a variable may be applied to a function application using a relationship variable definition as a superform and variable application as a subform.

Variable Instantiation

In an implementation of a system configured according the principles of the disclosure, a variable may be required to be applied before it can be instantiated. A variable is instantiated when a function in which it was applied executes. The same variable application may be instantiated zero, one, or multiple times. An instantiated variable may be an entity of the variable Form type that was used to define it.

In the example changeOwed( ) function shown in FIG. 23, when the changeOwed( ) function is instantiated, the amount Paid variable is instantiated.

Variable Storage and Variable Streams

In one implementation of a system configured according the principles of the disclosure, instantiated variables are stored as streams and may be persisted to a storage media in any number of formats, including a text file, database, BLOB, and the like. The content of a variable is linked with the variable using a relationship. All entities, including variables and Relationships, contain immutable data so the value of a variable is only changeable through the addition of a new relationship, typically a substitution relationship as shown in FIG. 9. The addition of a new substitution relationship results in a state change to the variable stream and the structure used to persist the stream, such as a database. For example, suppose a Company would like to determine whether there is a correlation between maintenance costs for a brand of air conditioning units based on the average number of times a collection of units turns on and turns off in a day. The Company may define and instantiate a function that consumes an input variable that is linked to an outside temperature sensor. The function outputs include the temperature, date and time, and whether the unit is on or off. Each of these variables may be written to a stream and collected from the unit itself or read over an internet connection to facilitate an analytical process.

Each instantiated variable may be stored in its own stream. Multiple variable streams may be merged for transport efficiency, but each stream may remain unique. A variable stream may be used to move the variable(s) from one function to another, if needed. In addition, because a variable may change over time, the variable's stream may store all versions of the variable, as well as an offset and length so that each version may be located and retrieved.

In the example changeOwed( ) function shown in FIG. 23, the totalPrice variable may be populated by the calculateTotal( ) member function. After being calculated, the instantiated totalPrice variable may be made available to the changeOwed( ) function through its stream. An example variable stream for the totalPrice variable is provided in FIG. 260, generally denoted as 2600. FIG. 260 shows the totalPrice variable (2610) and the totalPrice variable stream (2605). Initially, the totalPrice variable is populated with a value of $6.12 (2615). This value is appended to the totalPrice variable stream (2605) as an entity (2620). The totalPrice variable is then updated to $24.91 (2635) through Substitution Relationship1 (2625). Substitution Relationship1 (2625) is appended to the totalPrice variable stream (2605) as an entity (2630) and the new value is also appended as an entity (2640). The totalPrice variable is then updated to $18.32 (2655) through Substitution Relationship2 (2645). Substitution Relationship2 (2645) is appended to the totalPrice variable stream (2605) as an entity (2650) and the new value is also appended as an entity (2660). The totalPrice variable is then updated to $45.10 (2675) through Substitution Relationship3 (2665). Substitution Relationship3 (2665) is appended to the totalPrice variable stream (2605) as an entity (2670) and the new value is also appended as an entity (2680). The totalPrice variable may be updated n times, following the same process, with the nth value (2695) updated through Substitution Relationship n (2685). Substitution Relationship n (2685) is appended to the totalPrice variable stream (2605) as an entity (2690) and the nth value also appended as an entity (2696).

Inputs to Functions

A function in a system configured according to the principles of the disclosure may consume zero, one, or a plurality of variable entity streams as inputs. Inputs may be of any type, and may include numbers, strings, currency values, personas, other functions, blobs, media files, streams, and the like. Each input may be parameterized to restrict the type of variable Forms to which it may be bound.

Wiring Functions Together and the Resulting Functional Dependency Graph

In one implementation of a system configured according to the principles of the disclosure, functions may be wired together when the output of one function is linked to the same variable application form as the input to another Function through a Relation. The Relation between a function output and a function input may typically be the only connection between the functions. The binding may be performed during definition and application using Forms and Relations; and may then be instantiated along with the Function during execution.

An exemplary implementation of binding of inputs and outputs in a system configured according to the principles of the disclosure is shown in FIG. 27, generally denoted as 2700. FIG. 27 shows output1 (2720) of Function1 (2705) as bound to Variable1 (2715). Input1 (2725) of Function2 (2710) as bound to an application of Variable1 (2715). When Function1 (2705) and Function1 (2710) are instantiated, Function1 (2710) is registered as a listener for changes in the application of Variable1 (2715). When the application of variables (2715) is updated by Function1 (2705), the application of Variable1 (2715) is made available to Function2 (2710). Note that Function2 (2710) is a listener of changes on the application of Variable1 (2715) only, it does not connect directly to or interact directly with Function1 (2705).

In another implementation configured according to the principles of the disclosure, each input and output may be linked to distinct applications of variables. Then the input variable may be linked to the distinct output variables. An illustration of this linking methodology is shown in FIG. 28, generally denoted as 2800. FIG. 28 shows output1 (2830) of Function1 (2805) as bound to an application of Variable1 (2815). Input1 (2835) of Function2 (2810) is shown as bound to an application of Variable2 (2820). The application of variables (2815) may then be linked to Variable2 (2820) through a linker relationship (2825). When Function2 (2810) are instantiated, Function2 (2810) may register as a listener for changes on the application of Variable1 (2815). When the application of variables (2815) is updated by Function1 (2805), the application of Variable1 (2815) is made available to Function2 (2810). Note that Function2 (2810) may be a listener of changes on the application of Variable1 (2815) only, it does not connect directly to or interact directly with Function1 (2805).

A function may be considered a listener when: an output variable for one function is linked as an input variable to another function (the listening function) through a relationship or when access control is created for the function wherein the function is the access recipient to one or more entities granted by an access provider. In this example, the access provider is the sender and the access recipient in the receiver. In this way, a message passing architecture is provided by the invention, wherein a function acting as a sender of information sends a message to a function acting as the receiver of information, wherein the message comprises a stream of entities called the message stream which collectively define the message. The message stream may contain entities encoding the sender's address and the receiver's address and the subject of the message and the body of the message and the attachments to the message. In this way, GraphDB may be used to implement a distributed electronic messaging system.

The message stream may be sent from a first GraphDB to a second GraphDB by replicating the entities of the message stream from the data storage medium of the first GraphDB into the data storage medium of the second GraphDB. The second GraphDB may store the message stream as a first set of entities so that changes made by the receiving function to the first set of entities may be represented and recorded as a second set of entities. The second set of entities may reference, using the relational algebra, entities in the first set. The second set of entities may then be recorded as a message stream and sent back to the a function on the first GraphDB as a means of synchronizing changes made to the first set, so that the first GraphDB receives the changes made by the second GraphDB and enters into a synchronized state with the second GraphDB. By reciprocally exchanging new data sets, the two GraphDB's may remain in synchronization with each other with respect to an evolving set of shared entities. The first graph DB may gather data about a certain entity and share this data with the second GraphDB and vice versa, so that the two graph databases may remain in sync with respect to a synchronized entity and entities linked directly or indirectly to the synchronized entity.

Multiple functions and member functions joined together using relationships may be expressed as a functional dependency graph. As shown in the example illustrated in FIG. 27 (2700), Function2 (2710) may rely on to Function1 (2705) to provide as input the application of Variable1 (2715); therefore Function2 (2710) may be dependent on Function1 (2705).

A function's output may also be linked back as an input to the function that produced it. For example, suppose a cleanUpImage( ) function is designed to process an image file and remove noise from the picture. Passing the same image file through cleanUpImage( ) function multiple times may result in a clearer and clearer picture, as an example. The example cleanUpImage( ) function may be designed with the following inputs: the imageToProcess file and a variable, iterationStepsRemaining, indicating the number of times to process the file. Each time the cleanUpImage( ) function processes the imageToProcess file, it checks the iterationStepsRemaining input. If the input is greater than 1, the cleanupImage( ) function sends the output file back into the function as its own input, as well as the iterationStepsRemaining input variable, decreased by one. Eventually the number of iterations steps remaining will be zero and the cleanUpImage( ) function may pass the fully processed image file as a separate output for other functions to use.

Outputs from Functions

A function produces zero, one or more output variables. Each output variable may have a stream associated with it. The stream may include all versions of the output variable over time, and may be used to move the output variable from one function to another function. Output variables may be of any type, and may include numbers, strings, currency values, personas, other functions, blobs, media files, streams, and the like. Each output may be parameterized to restrict the type of variable Forms to which it may be bound.

Member Functions

Member functions are "interpreters" of a function. Member functions include Functions, Function Applications, Interpreted Functions, Tasks, Personas, or any other entity defined by a Form that extends the Function Form, including but not limited to the Interpreted Function Form, Task Form, Choice Form, and the like. A function includes zero, one, or more member functions assigned to it. By decomposing, also referred to as subdividing, a Function into a set of member functions in a system configured according to the principles of the disclosure, a function provides for algorithm-based, computer-based, logic-based, and human-driven workflows.

A Member Function is related to a Function through a Membership Relationship. When a member function is included in another function, a membership relationship is created. The member function is typically considered a child of the parent function of which it is member. The creation of a membership relationship may also result in the creation of a persona entity. Because the persona entity is defined by the Persona Form, and the Persona Form extends the Function Form, a Persona is also a Function. Users that are humans and are associated with a personas may be assigned as Member Functions, and provide for directives that model a human action or a human decision to interpret a function.

For Tasks that are Functions, the persona that creates the Task may be automatically included as a member function for the task, providing for the task creator to decompose the task into subtasks (also referred to as member functions) and invite other functions to join the task. The other functions may include personas associated with humans, to join the Task. The inviting step may include creating a membership relationship entity form that assigns a function application to be a member function of function definition form.

A Member Function may itself contain its own Member Functions. There may be no practical constraints on the nesting of member functions, which themselves may be member functions. The nesting may reach essentially any level that is desired or required to accomplish the work of the Function.

While functions are interpreted by other functions, such as member functions, and further interpreted to create a tree of virtually unlimited depth of functional dependency, one or more of the member functions eventually performs the work of the function. The member function that performs the work of the function may include, but is not limited to, any of the following:

One or more personas associated with one or more users whose actions and decisions are modeled as directives.

One or more computing devices that execute a set of instructions. For example, actual lines of code provided as a script or package.

A primitive function provided by the invention. For example, primitive functions include but are not limited to: Boolean logic functions or computational functions, such as AND, OR, +, −, *, /, modulo.

Function Decomposition

Functions may be decomposed into a set of subfunctions, also referred to as member functions. The function being decomposed may be considered a parent function, and the set of subfunctions, also referred to as member functions, into which the parent function is decomposed may be considered child functions. In the example shown in FIG. 21, the changeOwed( ) function is decomposed into the following two child functions: calculateTotal( ) and calculateChange( ). The terms subfunction, child function, and member function are typically synonymous in this disclosure. Any function may act as a parent function, a subfunction, or both at the same time. All functions directly or indirectly extend the Function Form.

A Function may act as a child function when it is related to a parent function through the member function relation, and its input may be linked to a member variable of the parent function, or to an output of another member function.

When creating a Function Definition, applications of existing Function Definitions may be included in another Function Definition as Member Functions. These Member Functions may be Applications of their Function Definitions or Applications of their Applications. The Function to which member functions may be added may be referred to as a Parent Function. The inputs and outputs of the Member Functions may then be associated with Member Variables of the parent function definition.

When an existing Function Definition is added as a Member Function to another Function Definition, the system may create a new Function Application for the new Member Function and any Member Function that it may include.

Member Function Example

In one implementation of a system configured according to the principles of the disclosure, an example of the use of member functions may include the following steps. One of ordinary skill in the art may recognize that many different uses for member functions are possible.

Step 1: Create a Function Definition and name it Addition( ).

Step 2: Define two input variables by extending the Number Form. Name the variables input1 and input2. Associate the input1 and input2 with the Input Relation of the Addition( ) function, this is also known as splitting the Input Relation of the function.

Step 3: Define one output variable by extending the Number Form. Name the variable output1. Associate output1 of the with the Output Relation of the Addition( ) function. Note that Output Relations may also be split for a function.

Step 4: Apply the two input variables, input1 and input2, in the Addition( ) function definition.

Step 5: Apply the output variable, output1, in the Addition( ) function definition.

Step 6: Create another Function Definition and name it Average( ).

Step 7: Apply the Addition( ) Function Definition as a Member Function of the Average( ) Function Definition.

Step 8: The system creates a new Function Application called Addition1( ) which extends Addition( ).

Step 9: The system creates three new Variable Applications for the inputs and outputs of the new Addition1( ).

Step 10: Addition1( )'s inputs and outputs are bound to the Member Variable Definitions inside of the Average( ) Function.

Step 11: Create a ClassRanking( ) function and apply the Average( ) function as a member function.

Step 12: The system creates a new Function Application called the Average1( ) which extends the Average( ) Function.

Step 13: The system creates a new Function Application, Addition2( ), which extends the Addition1( ) function, which is a member function of the Average( ) Function.

Human Member Functions/Human Interpreters

An actor associated with a human may be specified as an interpreter of a function through a persona associated with the human. An example of this may be when a function may be used to define a task, and a user may be assigned to complete the task by inviting a persona associated with that use to be a member function of the task. In a system configured according to principles of the disclosure, a human interpreter may be represented by a Persona Entity instantiated using a Persona Form. A Persona typically describes the membership of one entity in another entity, and in the case of human function, is associated with a user that is a person assigned to a task. For example, when a user is assigned to a Task through an associated persona, a membership relationship is created that links the task and the Persona associated with the user. The Membership relationship typically specifies the persona associated with the user as the Membership Recipient and the Task as the Membership Target. The creation of a membership relationship typically triggers the creation of a new Persona that specifies the invited persona as the Access Recipient and the Task as the Access Point.

The Persona Form derives from the Function Form. In addition to the relations of a Function Form, a Persona may have, but is not limited to, the following relations:
- Inbox: an input stream that contains messages and other entities sent to the Persona.
- Outbox: an output stream that contains messages and other entities sent from the Persona.

After a Persona is associated with a human user or another Persona, the human associated with the Persona may create and associate with the task it has membership with as many subtasks, also referred to as member functions, as desired unless constrained by access control or other means in the system.

An illustrative example of the process of decomposing a movie review task is provided in FIGS. 29A and 29B, generally denoted as 2900A and 2900B. In this example, user "Corey" acting under a "CoreytheMovieReviewer" persona creates the "Movie Review" task (2902). The "CoreytheMovieReviewer" Persona creating the task may decompose the "Movie Review" task (2902) into the following five subtasks as member functions and may specify inputs, outputs, member functions, and member variable as described:

Task/Function: MovieReview( ) (2902)
  Input: movieTitle (2914)
  Member Functions: WatchMovie( ) (2904), WriteDraftReview( ) (2906),proofReview( ) (2908), rewriteReview( ) (2910), publishReview( ) (2912)
  Member Variables: Movie Watching Notes, Completed Draft Movie Review Document, Rejected Movie Review Document, Revised Movie Review Document, Final Movie Review Document, Published Movie Review Document
  Outputs: publishedMovieReview (2958)
Subtask/Member Function: Watch the Movie( ) (2904)
  Input: Movie title (2914)
  Member Function: Persona—MovieReviewer (2918)
  Output: viewingNotes (2920)
Subtask/Member Function: Write the DraftReview( ) (2906)
  Input: movieReviewTemplate (2924)
  Member Function: Persona—MovieReviewer (2928)
  Output: Completed Draft Movie Review Document (2932)
Subtask/Member Function: ProofReview( ) (2908)
  Input: draftReview (2932)
  Member Function: Persona—MovieReviewProofer (2936)
  Output: rejectedReview (2938), finalReview (2940)
Subtask/Member Function: rewriteReview (2910)
  Input: rejectedReview (2942)
  Member Function: Persona—MovieReviewer (2946)
  Output: revisedReview (2948)
Subtask/Member Function: publishReview( ) (2912)
  Input: finalReview (2950), publisherInfo (2952)
  Member Function: Persona—MovieReviewPublisher (2956)
  Output: publishedReview (2958)

The movieReview task (2902) may be instantiated multiple times in parallel or in sequence by providing a new movieTitle input (2914) and assigning the member functions to various users via their personas (2918, 2928, 2936, 2946, 2956). Additionally, in an example in which it may be required to send the review to five publishers, the publishReview member function may be instantiated five times by providing the five different publishingLocations inputs (2952) and assigning the person responsible for publishing the review to the task by inviting their persona (2956) to participate as a member function.

Computer/Machine Functions—Computer/Machine Interpreters

Functions also provide for incorporating algorithms and mathematical operations in an organic computer program. These algorithms and mathematical operations may be included in a function as member functions, or may be defined as part of a workflow.

Referring to the illustrative example of a changeOwed( ) (2305) function shown in FIG. 23, the member function calculateTotal( ) (2335) includes the algorithm to sum together the price of two items purchased inside the changeOwed( ) function (2305). The inputs item1Price (2310) and item2Price (2315) are linked to the calculateTotal( ) member function (2335).

An alternate illustrative implementation of the example shown FIG. 23 is provided in FIG. 30, generally denoted at 3000. In this example, the totalPrice( ) function (3005) is specified outside of the changeOwed( ) function (3010), and the output (3035) of totalPrice( ) function (3005) is linked to the input (3040) of the changeOwed( ) function (3010). Using either approach, the totalPrice( ) function is distributable and propagatable to any database, including a graph database or a network, on any server or electronic device configured according to the principles of the disclosure.

Order of Processing and Output Generation

A set of functions linked through their outputs and inputs in a system configured according to the principles of the invention may be expressed as a "function graph". However, because the executions of the functions in the graph dependent on the execution of the other functions in the graph and generation of outputs used as inputs, this collection of functions may be referred to as a "functional dependency graph". The order of processing of the functions may vary based on any constraints specified during function definition and application, as well as the availability of inputs. One branch of the functional dependency graph may proceed quickly while another branch may proceed slowly.

For example, an overview of a Task, its inputs and outputs, and its decomposition into member tasks is provided in FIG. 31, generally denoted by 3100. As shown in FIG. 31, suppose a company is auditing a recently completed project and creates the "Project EnglishAudit" task (3105). FIG. 31 provides an overview of the Task, its inputs and outputs, and its decomposition into member tasks. Each of the eight member functions in this project operates independently from the other functions. Each function knows only its own inputs, its own outputs, and its own member functions. Each function is ready for execution as its inputs are provided and its member functions operate on the inputs and produce outputs. Member Functions may execute independently of other member functions. For example, the 'deliverableAudit' function (3115) shown in FIG. 31 may execute independently of the 'staffingAudit' function (3120). Although the 'draftReporffunction' (3130) requires outputs from several other functions, it does not typically track or interact with those other functions other than receiving their outputs as inputs. Each function may produce output(s) as it executes.

In this example, the "ProjectEnglishAudit" task (3105) is divided into seven member functions. Several of the member functions are themselves subdivided into additional member functions. The "draft Report" member function (3130) may use the outputs of several other member functions as its inputs, including: the financial audit summary (3155), deliverable audit summary (3160), staffing audit summary (3165), and client satisfaction audit summary (3170). The "draftReport" member function (3130) cannot be completed until all of inputs are provided. It is possible that the financial audit summary (3155) and deliverable audits summary (3160) complete within one week while the client satisfaction audit summary (3170) progresses slowly because the client is on vacation for a month.

In the example shown in FIG. 31, several of the member functions may execute in parallel, and several execute in series. The functions that may execute in parallel include 'finanacialAudit' function (3110), 'deliverableAudit' function (3115), 'staffingAudit' function (3120), and the 'clientSatisfactionAudit' function (3125). The functions that execute in series include the 'draftReport' function (3130), the 'reviewReport' function (3135), the 'reviseReport' function (3140), and the 'finalizeReport' function (3145). Each member function executes as its input variables become available. This combination of serial and parallel member function execution may provide for modeling of simple functional dependency graphs, complex functional dependency graphs, or any combination of simple and complex functional dependency graphs. The work of the functions that may be completed by personas associated with humans, or may be completed using code, algorithmic, or other automated machine functions. A set of one or more functions and member functions may also be referred to as a workflow. A workflow may also be expressed as a functional dependency graph. These functional dependency graphs may be used to represent real world workflows using aspects of the disclosure. Once defined using the principles of the invention, the workflows may be applied many times and instantiated to support many purposes. For example, the defined version of the functional dependency graph that was applied and instantiated for the "ProjectEnglishAudit" may be applied to audit all of the projects completed at a company.

The order of processing inputs to a function may or may not be specified. For example, if not specified or constrained, in a document printing function to which a persona associated with a human is assigned, a human may decide to print the shortest document first even though it may have been received last.

Member Variables

Member variables are typically associated with member functions. Member variables are used for, but are not limited to, the following:

Moving information between member functions inside a parent function;

Connecting one member function to one or more other member functions;

Creating input from output.

Defining, Applying, and Instantiating Variables and Functions

In one aspect, a system constructed according to principles of the disclosure or a method performed according to principles of the disclosure may define and apply entities that are functions and variables. The functions may implement a workflow by linking outputs, inputs, and member variables. These linked entities may be expressed as a functional dependency graph that may reflect the specified wiring. A subset or the entire program graph may be instantiated as the functions run and variables are populated. Functions can be represented in the data layer according to the uniform schema and addressed globally. For example, the global addressing may include a URL or URI or a GUID or a routing name and the like, so that a distributed message passing architecture may exist with functions as senders and receivers of entity streams.

By providing for the definition of any type of variable, any combination and use of variables, and functions that may consume inputs and produce outputs, the principles of the invention may be used to model any thing, any function, any noun, and any verb. For example, a set of Forms and Relations that reflect the characteristics of Company A (a noun) and its employees and customers (also nouns) may be defined, applied, and instantiated. Functions that reflect Company A's hiring processes (verbs, actions) and sales processes (verbs, actions) may be defined, applied, and executed to populate the employee and customer Forms and Relations. In another example, a set of Forms and Relations that model sales data (a noun) may be defined, applied, and instantiated. Functions that collect (a verb) and populate (a verb) the sales data may be defined, applied, and executed when instantiated.

Variable definitions and function definitions are the building blocks of organic programs that may be expressed as functional dependency graphs. Variable applications and function applications may use the building blocks to create a template for completing a machine action or human action. These applications may be templates and may be reused any number of times. The instantiated functions and variables may perform or complete the specified instructions.

During definition and application, Forms and relations are created. During instantiation, entities may be created from the Forms. Entity creation may be delayed until a function is initiated (or its inputs become available), or it may be created immediately. In this way branching functions may be included in the graph and when executed multiple times, may produce multiple versions of the graph. For example, a Function Graph that models a decision to ship a package by ground or air based on certain inputs and member functions may sometimes evaluate and determine to ship a specific package by ground and may at other times evaluate and determine to ship a package by air. As the available inputs and function outputs change, different versions of the graph may be generated by dynamically instantiating subsequent functions, traversing different branches of the graph.

The process graph definition and application environments may be accessed through any of the following. One skilled in the art may recognize that other access mechanisms may also be used:

A rich internet application or graphical user interface available on the internet or a computer network. The interface could be prepared using any interface development language, such as but not limited to Java, Flash, C#, PHP, and the like.

An integrated development environment (IDE) such as but not limited to one similar to those provided by Eclipse or IntelliJ.

A custom interface.

A web service or similar type interface.

A text editor.

When defining the program graph, the building blocks of the program may be specified. These building blocks may be used to create the actual program instructions during application. The program graph may be executed at instantiation.

A detailed description of the process may be used to define, apply, and instantiate variable and functions for both interpreted functions and tasks follows.

Variables and Interpreted Functions: Definition, Application, and Instantiation Flow An exemplary flow diagram of steps performed in defining, applying, and instantiating variable and functions is provided in a system configured according the principles of the disclosure is shown in FIG. 32A, FIG. 32B and FIG. 32C, generally denoted as 3200A, 3200B, and 3200C. A description of each step in FIG. 32A, FIG. 32B and FIG. 32C is provided as follows. One of ordinary skill in the art may recognize that more or fewer steps may be used in defining, applying, and instantiating variable and functions in a system configured according to the principles of the disclosure.

Variable Definition:

Defining variables needed for the interpreted function to execute, including inputs, outputs, and member variables.

Step 3201: Start defining a variable by giving it a name.

Step 3202: Continue defining a variable by specifying a type for the variable, such as any primitive or complex entity, including but not limited to: number, string, file, persona, group, and form. Repeat Steps 3201 and 3202 for each desired variable.

Step 3203: The system may build each variable definition Form using the name and type specifications.

Interpreted Function Definition and Variable Application:

Defining an interpreted function and specifying its input, outputs, member variables, member functions, and properties.

Step 3204: Start defining a function by giving it a name.

Step 3205: Continue defining the function by specifying the type for the function, including but not limited to include function, interpreted function, or task. In this example, the type specified is interpreted.

Step 3206: Continue defining the interpreted function by specifying its input variables.

Inputs are consumed, or used, by the interpreted function. The specification of a variable may be completed by applying an existing variable definition.

Step 3207: Continue defining the interpreted function by specifying its output variables.

Outputs are produced by the interpreted function. The specification of a variable may be completed by applying an existing variable definition.

Step 3208: Continue defining the interpreted function by specifying its member variables. The specification of a member variable may be completed by applying an existing variable definition or creating a new variable definition and applying the new definition.

Step 3209: Continue defining the interpreted function by specifying its member functions. Member functions must be already defined to be used as such. The specification of a member function may be completed by applying an existing function definition.

Step 3210: Continue defining the interpreted function by assigning member function inputs to member variables and member function outputs to member variables. These assignments may "wire" the member functions together.

Step 3211: Continue defining the interpreted function by specifying the language property. The language property may tell the system how to execute the function. Languages may include but are not limited to: Java, Groovy, JRuby, .Net, Flash ActionScript, C#, Oracle, and the like. In some implementations, the language property may be used only for interpreted functions.

Step 3212: Continue defining the interpreted function by specifying the instructions property. The instructions property may contain the statements to be executed for the interpreted function to complete. The language property may be used only for interpreted functions.

Step 3213: The system builds each interpreted function definition form.

Step 3214: The system builds each variable application form, including input variables, output variables, and member variables for the function being defined and for any member functions.

Step 3215: The system builds a function application form for each member function.

Interpreted Function Application and Variable Application:

Applying an interpreted function definition and its variables. A function application may be transformed into a subclass of a first function definition using a derivation relationship that designates the function definition as the super form and the function application as the subform. As part of this process, the function application substitutes a set of properties linked to the function definition with a set of properties linked to the function application. At least one member of the set of properties of the function application binds to a variable form that is a subclass of the variable form bound to by at least one member of the set of properties bound to by the function definition, so that the function application invokes the function definition by linking the function application to the variable form. The set of properties may typically include an input property and/or an output property. The properties of the function application may typically override or substitute the properties of the function definition.

Step 3216: Start applying an interpreted function by creating a new Function Form that extends the Interpreted Function Definition Form and give it a name.

Step 3217: Continue applying an Interpreted Function by further applying variable applications for inputs, outputs, and member variables. Specify names for each variable that may be applied. Function applications and variable applications may be applied zero, one, or a multiplicity of times.

Step 3218: Continue applying an Interpreted Function by further applying member function applications. Specify a name for each member function that may be applied, or allow the system to create a new name for each member function that may be applied. Function applications and variable applications may be applied zero, one, or a multiplicity of times.

Step 3219: The system builds the Interpreted Function Application Forms for the new interpreted function and any member functions by extending their respective function definition forms or function application forms, as appropriate.

Step 3220: The system builds Variable Application Forms for inputs, outputs, and member variables for the new function and any member functions by extending their respective variable application forms or variable definition forms and variable names.

Instantiating Interpreted Function Applications and Instantiating Variable Application:

An entity may be created for each applied function and applied variable when instantiated. The instantiated interpreted function may be executed using its variable entities and member function entities and their respective variable entities. The values of variable entities may be null until populated based on a process or other operation.

Step 3221: Trigger instantiation of an interpreted function by calling the function to execute.

Step 3222: The system instantiates, or creates, entities for the interpreted function and each input, output, member variable, and member function.

Step 3223: The system may register the instantiated interpreted function as a consumer of its input variables. The registration may occur as the variables are applied as inputs to the function application that is instantiated.

Step 3224: The system may register the instantiated interpreted function as a producer its output variables. The registration may occur as the variables are applied as outputs in the function application that is instantiated.

Step 3225: The system may register each instantiated member function as a consumer of the member variables that are its input variables.

Step 3226: The system may register each instantiated member function as a producer of the member variables that are its output variables.

Step 3227: The system may listen for updates to input variables. At instantiation, variables may be null until populated.

Step 3228: When a variable is updated, the system may look up which functions are registered as consumers of the variable and passes the updated input variables to those registered consuming functions.

Step 3229: The Interpreted Function and its member functions execute according the language and instructions as inputs become available.

Step 3230: The Interpreted Function populates its output variables, if any. Each output variable may be made available to any functions registered as a consumer of the variable as an input. The availability of inputs may trigger other functions to execute.

Step 3231: Interpreted Function processing for the function called in Step 21 completes.

Note that in this example the function processing completes, but one of ordinary skill in the art may recognize that function processing may continue until all inputs are made available, or may continue processing if a member function further decomposes a function into additional subfunctions.

Example of an Interpreted Function and Variable Definition, Application, and Instantiation Flow Exemplary pseudocode corresponding to an implementation of interpreted function and variable definition, application, and instantiation for a function to add two number is shown in FIG. 33A, FIG. 33B, FIG. 33C, FIG. 33D, and FIG. 33E, generally denoted as 3300A, 3300B, 3300C, 3300D, and 3300E, respectively. In this example, a function to "addTwoNumbers" is defined and applied to create the "calcNumberBobKids" function.

Simple Interpreted Function Definition/Application/Instance Example—Add Two Numbers Variable Definition:

Defining variables needed for the interpreted function to execute, including inputs, outputs, and member variables.

Step 3301: Start defining a variable by giving it a name.
Example: Create the "anyNumber" variable.

Step 3302: Continue defining a variable by specifying the type for the variable. Types may be any primitive or complex, including but not limited to: number, string, file, persona, group, and form.
Example: Assign "anyNumber" to be of type "number".

Step 3303: The system builds each variable definition Form using the name and type specifications.

Interpreted Function Definition and Variable Application:

Defining an interpreted function and specifying its input, outputs, member variables, member functions, and properties Step 3304: Start defining a function by giving it a name.
Example: Create a function definition named "addTwoNumbers( )"

Step 3305: Continue defining the function by specifying the type for the function. Types may include by are not limited to function, interpreted function, or task. In this example, the type specified is interpreted.
Example: Specify the "addTwoNumbers( )" function as an "Interpreted Function".

Step 3306: Continue defining the interpreted function by specifying its input variables. Inputs may be consumed, or used, by the interpreted function. Complete the variable specification by applying an existing variable definition.
Example: Specify the function input variables as "input1" and "input2".
Example: Apply variable definitions by specifying that "input1" and "input2" are of type "anyNumber".

Step 3307: Continue defining the interpreted function by specifying its output variables. Outputs may be produced by the interpreted function. Complete the variable specification by applying an existing variable definition.
Example: Specify the function output variable as "sum".

Step 3308: Continue defining the interpreted function by specifying its member variables. Complete the variable specification by applying an existing variable definition.
Example: No member variables in the example.

Step 3309: Continue defining the interpreted function by specifying its member functions. Member functions may be required to be already defined to be used as such. Complete the specification of a member function by applying an existing function definition.
Example: No member variables in the example.

Step 3310: Continue defining the interpreted function by assigning member function inputs to member variables and member function outputs to member variables using relationships. These assignments may link the member functions together.
Example: No member functions or member variables in the example.

Step 3311: Continue defining the interpreted function by specifying the language property. The language property tells the system how to execute the function. Languages may include but are be limited to: Java, Groovy, jRuby, .Net, Flash ActionScript, C#, Oracle, and the like. In some implementations, the language property may be used only for interpreted functions.
Example: specify the language as "Groovy".

Step 3312: Continue defining the interpreted function by specifying the instructions property. The instructions property contains the statements to be executed for the interpreted function to complete. In some implementations, the language property may be used only for interpreted functions.
Example: specify that the "sum" output is equal to "input1" plus "input2".

Step 3313: The system builds each interpreted function definition form.

Step 3314: The system builds each variable application form, including input variable, output variable, and member variables for the function being defined and for any member functions.

Step 3315: The system builds a function application form for each member function.

Interpreted Function Application and Variable Application:

Applying an interpreted function definition and its variables.

Step 3316: Start applying an interpreted function by creating a new Function Form that extends the Interpreted Function Definition Form and give it a name.

Example: Create the "calcNumKids" function and apply the "addTwoNumbers( )" function definition.

Step 3317: Continue applying an Interpreted Function by further applying variable applications for inputs, outputs, and member variables. Specify a new name for each variable that is applied. Function applications and variable applications may be applied zero, one, or a multiplicity of times.

Example: Create the "numberGirls" and "numberBoys" variables by applying the "input1" and "input2" variables.

Example: Create the "totalKids" variable by applying the "sum" variable.

Step 3318: Continue applying an Interpreted Function by further applying member function applications. Specify a new name for each member function that is applied, or allow the system to create a new name for each member function that is applied. Function applications and variable applications may be applied zero, one, or a multiplicity of times.

Example: No member functions or member variables in the example.

Step 3319: The system may build the Interpreted Function Application Forms for the new interpreted function and any member functions by extending their respective function definition forms.

Step 3320: The system may build Variable Application Forms for inputs, outputs, and member variables for the new function and any member functions by extending their respective variable application forms or variable definition forms and variable names.

Instantiating Interpreted Function Applications and Instantiating Variable Application:

An entity may be created for each applied function and applied variable when instantiated. The instantiated interpreted function executes using its variable entities and member function entities and their respective variable entities. The values of variable entities may be null until populated by the system based on a process or other operation.

Step 3321: Instantiate an interpreted function by calling the function to execute.

Example: instantiate the "AddTwoFunctionApplication" Form as "CalcBobNumKids" entity Step 3322: The system instantiates, or creates, entities for the interpreted function and each input, output, member variable, and member function.

Example: Instantiate the "numGirls" variable application Form as the "numberBobGirls" entity.

Example: Instantiate the "numBoys" variable application Form as the "numberBobBoys" entity.

Example: Instantiate the "totalKids" variable application Form as the "numberBobKids" entity.

Step 3323: The system may register the instantiated interpreted function as a consumer of its input variables.

Example: The "kidsInBobFamily( )" function may be added as a "consumingFunction" for the instantiated "numberGirlsinBobFamily" input variable.

Example: The "kidsInBobFamily( )" function may be added as a "consumingFunction" for the instantiated "numberBoysinBobFamily" input variable.

Step 3324: The system may register the instantiated interpreted function as a producer its output variables.

Example: The "kidsInBobFamily( )" function is added as a "producingFunction" for the instantiated "totalKidsBobFamily" output variable.

Step 3325: The system may register each instantiated member function as a consumer of the member variables that are its input variables.

Step 3326: The system may register each instantiated member function as a producer of the member variables that are its output variables.

Step 3327: The system may listen for updates to input variables. At instantiation, variables may be null until populated by the system.

For example, a change may be made to the "numberBoysinBobFamily" input variable. The change may be made through a number of mechanisms, including but not limited to a system process or through a web interface in which a user enters a value that is used to populate the "numberBoysinBobFamily" input.

In another example, a change may be made to the "numberGirlsinBobFamily" input variable. The change may be made through a number of mechanisms, including but not limited to a system process or through a web interface in which a user may enter a value that is used to populate the "numberGirlsinBobFamily" input.

Step 3328: When updated, the system may look up which functions are registered as consumers of the variable and passes the updated input variables to those registered consuming functions.

Example: The system may make the changed variables available to the "kidsInBobFamily( )" function.

Example: The "kidsInBobFamily( )" function may determine if it has enough inputs to run.

Step 3329: The Interpreted Function and its member functions execute according the language and instructions as inputs become available.

Example: The system executes the function according the specified language and script.

Step 3330: The Interpreted Function populates its output variables, if any. Each output variable may be made available to any functions registered as a consumer of the variable as an input. The availability of inputs may trigger other functions to execute.

Example: The "totalKidsinBobFamily" output variable is populated.

Step 3331: Interpreted Function processing for the function called in Step 21 completes.

Example: The "totalKidsinBobFamily" function completes processing.

Tasks, Inputs, and Outputs: Definition, Application, and Instantiation Flow

Tasks may be used in a system configured according to the principles of the disclosure to define, apply, and instantiate functions typically performed by functions associated with the actions of a human rather than functions typically performed by machines. Task may follow a similar derivation path as Interpreted Functions, however the Task Form may derive from the Group Form, and the Group Form derives from the Function Form. A subset of the derivation hierarchy is shown in FIG. 31, generally denoted as 3400.

As shown in FIG. 34, Interpreted Function (3425) derives from Function (3405). The term "derives from" may also be referred to as "extending". Additionally, Task (3420) derives from Group (3415), which derives from OrgUnit (3410), which derives from Function (3405). In extending both Group (3415) and Function (3405), Task (3420) inherits relations from Group (3415) and Function (3405), including but not limited to:

Inputs, Outputs, Member Functions, and Member Variables;
Routing name;
Contact Persona; and
Description.

A Task may include several relations in addition to those inherited from Group and Function, including but not limited to:

Start Date
End date, and
Status.

The Member Functions of a Task may typically be referred to as Subtasks. Tasks may also inherit several system behaviors for Groups, including but not limited to:

Membership in the parent task under which it was created;
A persona that reflects the task membership for the parent task;
An inbox and outbox for the persona created for the task;
Membership in a parent task if the new task is created as a subtask of another task;
A persona that reflects the task membership in a parent task; and
An inbox and outbox for the persona created as a result of the new task's membership in a parent task.

Creation of a Membership may result in the creation of a Persona that reflects the membership of the joining entity with the joined entity. The Persona Form may include, but is not limited to, the following relations:

Inbox
Outbox
Content
Routing Name
Access Recipient
Access Point

These relations may be included in the Persona created as a result of an entity gaining membership in a Task.

FIG. 35 provides and exemplary process flow for differentiating and synchronizing functions as streams containing immutable data, and is generally denoted as 3500. The exemplary steps for differentiating and synchronizing functions as streams containing immutable data shown in FIG. 35 include:

Step 3501: Define a uniform schema for a plurality of functions and data, wherein the plurality of functions and the data each have a state and a structure;

Step 3502: Define the plurality of functions and the data uniformly according to the schema;

Step 3503: Transform the schema, the plurality of functions, and the plurality of data, the plurality of states, and the plurality of structures into a at least one first stream of entities, each entity containing immutable data;

Step 3505: Propagate the first stream of entities to a second computer system; and Step 3506: Interpret at the second computer system any one of the propagated functions to expand the operational capability of the any one of the propagated functions, Step 3507: Invite the first function application to interpret the second function definition form thereby the first function application becomes a first interpreter, the interpreting comprising any of the steps of:

Step 3508: Add at least one input property to the first function application; wherein the adding links at least one input property of the first function application to at least one input variable, so that the first function application receives at least one value assigned to at least one instance of the at least one input variable;

Step 3509: Add at least one output property to the first function application; wherein the linking at least one output property of the first function application to at least one output variable, so that the at least one output variable varies as a result of the first function application;

Step 3510: Add at least one member function to the first function application;

Step 3511: Add at least one member function to the second function definition;

Step 3512: Transform the second function definition form such that its operational capability is expanded by the interpretation of the first function application.

Step 3513: Store the at least one entity containing immutable data in a third stream to record the expanded operational capability.

Step 3514: Propagate the third stream to synchronize at least one of the first stream and the second stream by appending the entities containing immutable data from the third stream to at least one of the first stream and the second stream.

Interface to Define, Apply, and Instantiate Tasks and Workflows

The example interpreted function flow shown in FIGS. 30A through 30E may be provided from the perspective of using an integrated development environment, such as Eclipse or IntelliJ Idea, to define and apply functions and variables, and instantiate the functional dependency graph for execution. Additionally, a command line interface that interacts with application programming interfaces (APIs) to call functionality to create, read, update, and exchange entities by code written in scripting language (e.g., Javascript, Perl, Python, PHP, Ruby and the like) or other programming languages (e.g., Java, C++, .Net, and the like) may also be provided. In this section describing Task definition, application, and instantiation, the use of a graphical user interface, such as a web interface, or a rich internet application environment, is described. One of ordinary skill in the art may recognize that an integrated development environment, a web interface, a custom interface, text editor, command line or other interface integrating with a set of APIS, or other similar interface may be used to define, apply, and instantiate functions.

Variables and Tasks: Definition, Application, and Instantiation Flow

In using an interface to create and link a series of tasks and subtasks together, a set of functions, member functions, member variables, inputs, outputs that is created may be expressed as a functional dependency graph that reflects workflow typically completed based on human actions, or a combination of human and machine workflow may be created. An example interface to create a workflow may include, but is not be limited to, the following components:

Interface elements to add a task.
Interface elements to add inputs to a task.
Interface elements to add outputs to a task.
Interface elements to decompose a task into subtasks (or member functions).
Interface elements to include existing tasks as subtasks (or member functions).
Interface elements to link outputs (member variables) of one subtask to inputs (member variables) of another subtask.
Interface elements to invite user personas (also member functions) to a task or its subtasks.
Interface elements to populate task metadata.

Interface elements to save and trigger the building of the task and workflow definition and application, and instantiate the workflow.

A flow diagram of an exemplary implementation showing a process performed according to the principles of the disclosure in defining, applying, and instantiating tasks, inputs, outputs, and subtasks is shown in FIG. 36A, 36B, 36C generally denoted by 3600. A description of each step in FIG. 36 is also provided. This flow assumes the task and its subtasks are defined, applied, and instantiated through a user interface using common computer mouse actions (for illustrative example) such as clicking a button to drag an icon from one location in the application user interface, and then releasing the button to drop the icon in another location in an application user interface. One of ordinary skill in the art may recognize that the additional or fewer steps, as well as a different ordering of steps, may be used in defining, applying, and instantiating tasks, inputs, outputs, and subtasks according to principles of the invention. In addition, one of ordinary skill in the art may recognize that an interface that provides functionality to select, edit, and move around tasks, inputs, outputs, member variables, member functions, subtasks, users, and other aspects of a task may be implemented with a variety of techniques, including but not limited to: dragging and dropping, clicking, displaying and selecting from lists, touch screen gestures, importing complete specifications from text file, and the like. The steps shown in FIG. 36 include the following:

Design the Task or Workflow
- Step 3601: Begin designing a task by clicking a button or dragging and dropping an icon to create a task.

Continue the Design: Inputs, Outputs, Subtasks, and User Assignments
- Step 3602A through Step 3602E may be completed in any order:
    - Step 3602A: Continue designing a task by entering a name and other information for the task, such as contact persona and routing name.
    - Step 3602B: Specify variables as inputs or outputs to the task by clicking a button to drag an icon representing a specific input type or output type from one location in an application user interface, and then releasing the button to drop the icons in another location in an application user interface. For example, a document icon may be dragged from an input type section of an interface and then dropped onto a task icon in the interface.
    - Step 3602C: Begin designing a subtask by clicking a button or dragging and dropping a task icon to create a new task within the task, typically creating a subtask.
    - Step 3602D: Apply an existing subtask as a member function by clicking a button to view a list of existing tasks and select one or more to include in the task being defined, typically by clicking or dragging and dropping the existing task of interest.
    - Step 3602E: Assign users to tasks by clicking a button to and entering a user identified, clicking to select from a list of available user identifiers, or dragging and dropping an existing user identifier from one part of the interface to the subtask.
- Steps 3602F and 3602G may only be performed after a subtask is added to a subtask.
    - Step 3602F: Specify member variables by clicking a button to drag an icon representing a specific input type or output type from one location in an application user interface, and then releasing the button to drop the icons in another location in an application user interface. For example, a document icon may be dragged from an input type section of an interface and then dropped onto a task icon in the interface.
    - Step 3602G: Wire member variables as inputs or outputs to subtasks by clicking a member variable and selecting the subtask from which it is output and the subtask to which it is an input.

Continue the Design: Further Specify Subtasks
- Step 3603A through Step 3603E may be completed for a subtask in any order after the subtask is created:
    - Step 3603A: Continue designing a task by entering a name and other information for the task, such as contact persona and routing name.
    - Step 3603B: Specify variables as input or outputs to the task by clicking a button to drag an icon representing a specific input type or output type from one location in an application user interface, and then releasing the button to drop the icons in another location in an application user interface. For example, a document icon may be dragged from an input type section of an interface and then dropped onto a task icon in the interface.
    - Step 3603C: Begin designing a subtask by clicking a button or dragging and dropping a task icon to create a new task within the task, typically creating a subtask.
    - Step 3603D: Apply an existing subtask as a member function by clicking a button to view a list of existing tasks and select one or more to include in the task being defined, typically by clicking or dragging and dropping the existing task of interest.
    - Step 3603E: Assign users to tasks by clicking a button to and entering a user identified, clicking to select from a list of available user identifiers, or dragging and dropping an existing user identifier from one part of the interface to the subtask.
- Steps 3603F and 3603G may only be performed after a subtask is added to a subtask.
    - Step 3603F: Specify member variables by clicking a button to drag an icon representing a specific input type or output type from one location in an application user interface, and then releasing the button to drop the icons in another location in an application user interface. For example, a document icon may be dragged from an input type section of an interface and then dropped onto a task icon in the interface.
    - Step 3603G: Wire member variables as inputs or outputs to subtasks by clicking a member variable and selecting the subtask from which it is output and the subtask to which it is an input.

Create Definitions, Applications, and Instances and Initiate the Task or Workflow
- Step 3604: Save the design.
- Step 3605: The system creates variable definition forms and variable application forms as needed: including inputs, outputs, and member variables.
- Step 3606: The system creates function definition forms and function application forms as needed, including tasks and subtasks.
- Step 3607: The system instantiates all variables (inputs and outputs) and functions (tasks and subtasks).
- Step 3608: The system creates membership relationships and personas for all member functions.
- Step 3609: The system registers tasks as listeners to changes in inputs.

Step 3610: As tasks are completed and outputs populated, changed inputs are made available to tasks and the workflow progresses.

The flow outlined FIG. 36 and Steps 3601 through 3610 show a linear approach—define, apply, and instantiate. One of ordinary skill in the art may recognize that in one aspect when using principles of the invention, the system may build a function definition as soon as the definition is completed, and build the corresponding function application immediately after the definition is built, followed by immediate instantiation of the built function application. Because the disclosure herein provides for modification of a function before or after execution begins, the function may be modified at any time, including but not limited to: adding or deleting inputs, outputs, member variables, and member functions; changing the wiring of outputs to inputs; or making other modifications. For example, suppose "User1" creates "Task1" and assigns it to "User2". The task is executing. "User2" may receive "Task1" and divide it into "Task1A", Task1B" and Task1C", thus modifying the "Task1" as it is executing.

Builders

As described previously, Functions and Variables, as well as other objects, in a system configured according to the principles of the disclosure are defined and applied using Forms, Relations, and Relationships, and instantiated as entities. The full set or a subset of Forms, Relations, and Relationships and their corresponding instantiated entities may be constructed prior to or after execution of the function ad resolution of its functional dependency graph begins. The functional dependency graph for an executing Function may be expressed based on the collection of Forms, Relations, and Relationships constructed during Function and Variable definition and application.

To construct a set of functions and its associated Forms, Relations, Relationships, and other entities, the system may include Builders for the following:

Constructing and modifying Variable Forms and Relations for Variable definitions and applications.

Constructing and modifying Variable entities at instantiation.

Constructing and modifying Function Forms and Relations for Function definitions and applications.

Constructing Function entities at instantiation.

Modifying Function entities after instantiation.

Timing of the construction is dependent on many factors, some of which may be system specified, some of which may be specified by the designer of the function, and some of which may be specified by other components of the function. The constructed entities may be stored in memory or stored on a physical or virtual server, or stored an electronic device. The structure in which the entities are stored could include a database, a graph, a text file, a document, a BLOB, a stream, and the like. For example, for some functions the entire set may be constructed at instantiation, for other functions, such as but not limited to member functions and subtasks, instantiation may occur only after inputs become available. In other scenarios, the entire set, including all Functions, Member Functions, and further nested Member Functions may be instantiated at execution. One of ordinary skill in the art may recognize that many factors may be taken into consideration in function and variable construction and timing for instantiation.

Once even one function of an organic computer program is constructed, function execution may proceed as inputs become available. The set of entities, order of execution, end states, and execution paths may be modified as the program executes. For example, suppose a publisher at a magazine created the Movie Review workflow shown in FIG. 26A and FIG. 26B. During the movie review of "Jaws", the publisher realizes he wants to insert a subtask, the "publisherEdit( )", for his edit of the movie review prior to publication. To insert the "publisherEdit( )" subtask into the workflow, he may view the workflow through a user interface and use tools provided in the interface to insert a new "publisherEdit( )" task before the "publishReview( )" task, specify himself as the reviewer, and specify the proofed movie review document as the input, and his edited review as the output. He may also changes the input to the "publishReview( )" task to the output of the new task.

formBuilder

The formBuilder may construct forms according to the uniform schema.

variableBuilder

The variableBuilder may extend the variable form to create a new variable form that corresponds to the name of the new variable. The new variable Form includes, but is not limited to, the specified Form that corresponds to that name and also includes, but is not limited to: consuming functions, producing functions, and value relations.

functionBuilder

The functionBuilder may extend the Function Form to create a new Function Form that corresponds to the name specified for the new function. The new Form also includes, but is not limited to the specified: inputs, outputs, member variables, member functions, and other relations.

Instance Builder

Instances of functions may be created based on the action of another function. For example, in an illustrative implementation that uses an interface to create a workflow and its subtasks, the workflow may be instantiated as soon as the user, or function, creating the workflow gives the workflow a name. In another example implementation the workflow may be instantiated only after its inputs become available. In yet another example implementation the workflow may be instantiated when a user clicks a 'start' button in an interface. The member tasks and subtasks of a workflow may also be similarly instantiated, for example, when it is named, as inputs become available, or when a user clicks a 'start' button in a design interface. Variables and member variables may typically be instantiated as functions execute. One of ordinary skill in the art may recognize that many alternative implementations of timing for instantiating functions and variables may be possible.

Dynamic Forms and Form Views

When a variable or function is defined and applied, the appropriate Builders may be called and new Forms corresponding to the definition or application specification may be constructed.

A variety of interfaces may be used to define, apply, and trigger the start of interpreted function and/or task execution. When a graphical user interface, rich internet application, or command line environment may be used to design a task, workflow, or interpreted function, the Forms that implement the Function or Variable may be created as the design progresses, or all the required Forms may be constructed at any point when a request to build the Forms corresponding to the current state of the design is issued.

When a function is executing, member functions such as but not limited to subtasks, interpreted functions, choice functions, and personas may receive inputs and outputs. A member function may choose to further decompose a task when it is received. In this way, the organic computer program is dynamic. In addition, when a function runs multiple times it may follow the same or different execution paths.

For example, suppose a defined task determines which is less expensive: shipping a package by ground or shipping a package by air. Given weather conditions and other inputs one day, the function may output that ground transport is less expensive. Given different weather conditions and other inputs on another day, the function output that air transport is less expensive.

Dynamic formViews

Form views are used to query the set of entities constructed for a function and persisted in memory or in a data structure such as but not limited to a database, graph database, or functional dependency graph. Function Entities and Variable Entities according to principles of the invention may be instantiated from Forms. Function entities and variable entities are propagatable to any system configured according to the principles of the disclosure. If the entity is passed from one system to another system, shared with another entity, or made available for display in an interface, a formView for the entity may be used by the system to select a subset of the relationships and other entities to include with the entity as it is shared. If a Form is created dynamically, a formView for that dynamic form may also be created dynamically or may be inherited from the form from which the dynamic form derives. Multiple formViews may be created for each Form, and each formView may select a different (or the same) set of information for the Form.

Extensions

In one aspect, a system configured according to the principles of the disclosure may provide for extending variable definitions so that multiple applications of a variable definition may be created, as well as multiple instantiations of a variable application. Additionally, the system may provide for extending function definitions so that multiple applications of a function definition may be created, as well as multiple instantiations of a function application.

Multiple applications: For example, referring to the AddTwo( ) function shown in the example implementation in FIGS. 30A through FIG. 30E to determine the total number of children in one family. Multiple applications of the AddTwo( ) function may also be created if, for example, it is applied as part of a function to average two numbers, such as finding the average temperature based on readings from two different thermometers.

Providing for multiple applications of the same function definition may provide for the function to be interpreted differently at the same time or over time. This may be useful in providing a means for differentiation with and across systems. For example, the Project English Audit Task (3105) shown in FIG. 31 may be shared across multiple servers in multiple divisions in a company. Suppose Divison X received the task and decided to further decompose the financialAudit task (3110) to include three types of review and quality assurance procedures. The definition of the Project English Audit Task (3105) is unchanged, however the multiple applications of the Project English Audit Task (3105) definition diverge in this example. If at a later time another Division Y would like to use the application developed by Division X, the changes may be propagated to the Division Y application of the Project English Audit Task (3105), or the entire diverged function application may be shared.

Multiple instantiations: Referring to the MovieReview( ) example described previously and the example implementation shown in FIG. 29A and FIG. 29B The example "MovieReview" Function may be instantiated three times by providing three different MovieTitle inputs during execution.

Restrictions

A variable definition may be a generic representation of an object. A Variable Application may derive from the Variable definition, thus restricting the Variable Application. For example, input1 and input2 in the changeOwed( ) function shown in FIG. 23 both derive from the vCurrency variable definition.

A function definition may be a generic representation of a process. A system constructed according to principles of the disclosure may derive an applied function from the function's definition, and may typically restrict any inputs and outputs to the specific variable applications included in the function definition. By restricting variables to their applied types, functions may be expected to process only variables that meet the criteria of the applied variable type, and/or a specific value of that type. This characteristic may provide for the organic computing program to be programmed by wiring specific outputs variable to specific input variables. Creation of variable subtypes may also be provided. For example, if an "automobile" variable is created and the subtypes "Car" and "Truck" are also created, a function that requires the "Automobile" variable may also accept variables of type "Car" or "Truck".

The use of restrictions provides for implementing Functions that require specific input types and/or specific output types. Referring to the MovieReview( ) example shown in regards to FIGS. 29A and 29B, the input to the proof Review( ) subtask is wired to the specific draftReview output variable of the writeDraftReview( ) subtask.

Executing Functions—Frames and Cycles

Frames may be used to relate all variable, inputs, outputs, member variables, member functions with a specific instance of a function. Cycles may be used if the same instance needs to be run multiple times.

Frames

A function application may be instantiated one or multiple times. The multiple instantiations may occur with a time lag in between, concurrently, or both. A Frame may be used in the system to organize the collection of entities instantiated with each function execution. A Frame may be a relationship that links an executing function with its instantiated inputs, outputs, member variables, member functions, as well as the instantiated inputs, outputs, member variables, member functions of any member functions.

For example, a "cleanUpImage( )" function that improves the quality of an image file by applying a cleanup process in 10 consecutive passes may be called multiple times and execute concurrently if multiple images are ready to be processed. The "clean up image" function would be instantiated in a separate frame for each image.

In another illustrative example, suppose applications of the Movie Review function shown in FIGS. 29A and 29B are instantiated for the movie "Jaws", the movie "The Deep", and the movie "Piranha" at approximately the same time. Each of these functions may be instantiated in a separate Frame and their respective dependency graph may execute in parallel. Each of these functions and its member functions may be "listening" (or "awaiting") for their inputs in their own Frame. As member functions resolve and outputs are produced, member variables may be populated and flowed as inputs to other member functions, the parent function may progress in its Frame and the dependency graph may resolve.

As each function progresses in its Frame, additional member variables may be populated and member functions may execute.

One skilled in the art may recognize that alternate methods to organize the collection of entities associated with a specific execution of a Function and its member functions may be possible.

Continuing the example above, if the movie review output of the Jaws Movie Review function is unacceptable and the function instantiated a second time, this could be handled as a second "cycle" of a function in the same Frame or in a new Frame of execution, according to principles of the invention.

Cycles

A "cycle" may provide for a function with the following characteristics: 1) functions with multiple inputs that may or may not be available at the same time, and 2) a function that may be executed many times at the same time, essentially multiple concurrent executions. A cycle may organize a single run of a function so that a set of inputs may be related to a specific set of outputs.

For example, an addition function may be listening for two inputs, inputA and inputB. After inputA and inputB become available, the function may produce an output, outputC. Suppose the function then receives new values for inputA and inputB and so may produce a new output value for outputC. In this example, the addition function is instantiated multiple times concurrently, the date/timestamp alone may not be used to determine which inputA and inputB produced which outputC. In this example, assume a scenario in which two concurrent instantiations of the add function, "AddFunction1" and "AddFunction2". "AddFunction1" may receive "Input A" and time 0. "AddFunction2" may receive input B and Time 0. If date/timestamp alone were used, "Input A" from "AddFunction1" may be associated with "Input B" from "AddFunction2" in producing "Output C".

To prevent the described scenario, a Cycle may be used to link the particular value of "Input A" and "Input B" which produced the particular result of "Output C". At any time in the future the history of "Input A," "Input B," and "Output C" and the function Cycles may be reviewed to determine which inputs were used to produce which output.

If a function has multiple outputs, then zero to all outputs may be created during each cycle, depending on the function definition and the contained logic. Over the life span of the function, it may be possible that each output is produced, but possibly never at the same time.

Interpreting/Executing Organic Computer Programs as a Graph—Dynamic Forms and Functions As described throughout this disclosure, Functions and Variables, in addition to other entities, may be defined and applied using Forms and Relations, and may be instantiated as entities. The Forms, Relations, and Relationships, as well as corresponding instantiated entities, may be constructed prior to or after execution begins. The collection of Forms, Relations, and Relationships that may be constructed during Function and Variable definition and application may be used to build a program graph for an executing Function.

In one aspect, because an organic computer program may be expressed as a graph, every actor in the system may be generally related to some subset of the entire graph. Additionally, every entity, also referred to as a node, on the graph may be related to at least one other node in the graph. One technique used in a system constructed according to principles of the disclosure that may provide for execution of a graph is the use of Functions and Variables. As described throughout this disclosure, functions and variables may be defined using Forms and Relations. At execution, these Forms and Relations may be instantiated into their corresponding Function entities and Variable Entities.

In a system implemented using principles of the invention, in one aspect, some part of the graph may typically always be executing. Defining, applying, and instantiating additional functions and variables during execution may also be provided. While a function is executing, one or more of its member functions may be further decomposed into additional member functions. For example, the Movie Review example illustrated in FIGS. 29A and 29B may include the publishReview( ) member function (2912). When the MovieReview( ) function is instantiated and the personaMovieReviewPublisher (2956) receives the task assignment, he/she may decide that the review may be published to both a print newspaper and a website. The personaMovieReviewPublisher (2956) may dynamically add new functions and variables to the graph while it is executing by including subtasks such as publishReviewtoNewspaper( ) and publishReviewtoWebsite( ) to the publishReview( ) task (2912). The personaMovieReviewPublisher (2956) may then add subtasks to those new tasks as needed, assigning inputs, and outputs, and repeating. Because the workflow may be expressed as a graph, the new subtasks may be executed as their inputs become available.

Writing Functions and Other Entities to Databases and Streams

FIGS. 37A through 37G provide an exemplary illustration of a computer implemented method for uniformly representing computer program structure as forms so that one or more instances of a computer program are implementable as entity instances of the forms, generally denoted as 3700A through 3700G, respectively. The method shown in 3700A through 3700G includes the following steps:

Step 3701: Create a first function definition as a form and create a first function application as a form.

Step 3702: Store the first function definition as a form and the first function application as a form.

Step 3703: Create a link between the first function application form and the first function definition form.

Step 3704: Transform the first function application into a subclass of the first function definition, wherein the first function application substitutes a set of properties linked to the first function definition with a set of properties linked to the first function application, and wherein at least one first member of the set of properties of the first function application binds to a variable form that is a subclass of the variable form bound to by at least one first member of the set of properties bound to by the first function definition, so that the first function application invokes the first function definition by linking the first function application to the variable form, wherein any of the sets of properties includes at least one of an input property and an output property; and process instances of the first function application form according to the first function definition by computing instances of variables bound to the first function application, wherein the create steps, the store steps, the transform step, and the process step are performed by a computer or an electronic circuit.

Step 3705: Propagate the first function definition and the first function application within one computer system or across a plurality of computer systems.

Step 3706: Define a second function definition form.

Step 3707: Create at least one first relation on the second function definition form which links to the first function application form, so that the first function application form defines in part or in whole the implementation of the second function definition form, wherein the one first relation is a subclass of a Member Functions relation belonging to a Function Form, wherein the Function Form is the form from which all function forms derive.

Step 3708: Invite a first function form to interpret a second function form by creating a new membership relationship form which links the first function form to the second function form, wherein the first function form is designated by the new membership relationship form as an interpreter of the second function form, wherein the membership relationship form links to the one first relation, wherein first function form and second function form are each a subclass of the Function Form, wherein by inviting the first function form to interpret the second function form the first function form becomes a first interpreter of the second function form, the interpreting comprising any of the steps of:

Add at least one input property to the first function application form; wherein the adding links the at least one input property of the first function application form to at least one input variable form, so that the first function application form receives at least one value assigned to at least one instance of the at least one input variable form;

Add at least one output property to the first function application form; wherein the linking the at least one output property of the first function application to at least one output variable form, so that the at least one output variable form varies as a result of the first function application;

Add at least one member function to the first function application form;

Add at least one member function to the second function definition form;

Step 3709: Transform the second function definition form such that its operational capability is expanded by the interpretation performed of the first function application form.

Step 3710: Inviting a first function to interpret a second function by creating a new membership relationship entity which links the first function to the second function, wherein the first function is designated by the new membership relationship entity as an interpreter of the second function, wherein the membership relationship entity links to a Member Functions relation belonging to a Function Form, wherein first function form and second function are each a subclass of the Function Form, wherein the Function Form is the form from which all function forms derive, wherein by inviting the first function to interpret the second function the first function becomes a first interpreter of the second function, the interpreting comprising any of the steps of:

Add at least one input property to the first function; wherein the adding links the at least one input property of the first function to at least one input variable, so that the first function receives at least one value assigned to at least one instance of the at least one input variable;

Add at least one output property to the first function; wherein the linking the at least one output property of the first function to at least one output variable, so that the at least one output variable varies as a result of the first function;

Add at least one member function to an instance of the first function;

Add at least one member function to an instance of the second function;

Transforming the second function such that its operational capability is expanded by the interpretation performed by the first function.

Step 3711: Add an additional function as a second member function to the first function application to add a second interpreter to the first function application thereby creating organic computing in which the first interpreter and the second interpreter collaborate to create the computer program structure through multiple iterations of inviting and interpreting.

Step 3712: Communicate to any interpreters of the first function application expected inputs of the first function application.

Step 3713: Communicate to interpreters of the first function application expected outputs of the first function application.

Step 3714: Transform the at least one first function application, the at least one first function definition, the at least one input property, the at least one output property, the at least one input variable, and the at least one output variable into at least one first stream of entities, each entity containing immutable data;

Step 3715: Store the at least one first stream in a tangible storage medium; wherein any combination of the at least one first function application, the at least one first function definition, the at least one input property, the at least one output property, the at least one input variable, and the at least one output variable is portable and any change to the any combination is synchronizable within one computer system or across a plurality of computer systems.

Step 3716: Propagate the at least one first stream within one computer system or across a plurality of computer systems Step 3717: Create a second function application from the second function definition form;

Step 3718: Create a link between the second function application form and the second function definition form;

Step 3719: Transform the second function application into a subclass of the second function definition, wherein the second function application substitutes a set of properties linked to the second function definition with a set of properties linked to the second function application, and wherein at least one first member of the set of properties of the second function application binds to a variable form that is a subtype of the variable form bound to by at least one first member of the set of properties bound to by the second function definition, so that the second function application invokes the second function definition by linking the second function application to the variable form, wherein any of the sets of properties includes at least one of an input property and an output property;

Step 3720: Link an output property of the first function application to a first variable.

Step 3721: Link an input property of the second function application to the first variable so that the output of the first function automatically flows into the second function.

Step 3722: Store the second function application as a form.

Step 3723: Create a link between the second function application form and the second function definition form.

Step 3724: Transform the second function application into a subclass of the second function definition, wherein the second function application substitutes a set of properties linked to the second function definition with a set of properties linked to the second function application, and wherein at least one first member of the set of properties of the second function application binds to a variable form that is a subtype of the variable form bound to by at least one first member of the set of properties bound to by the second function definition, so that the second function application invokes the second function definition by linking the second function application to the variable form, wherein any of the sets of properties includes at least one of an input property and an output property.

Step 3725: Link an output property of the first function application to a first variable.

Step 3726: Link an input property of the second function application to the first variable so that the output of the first function automatically flows into the second function.

Step 3727: Transform the at least one first function application, the at least one first function definition, the at least one second function definition, the at least one second function application, the at least one input property, the at least one output property, the at least one input variable, and the at least one output variable into a at least one second stream of entities, each entity containing immutable data.

Step 3728: Store the at least one second stream in a tangible storage medium; wherein the combination of the at least one first function application, the at least one first function definition, the at least one second function definition, the at least one second function application, the at least one input property, the at least one output property, the at least one input variable, and the at least one output variable is portable and any change to the combination is synchronizable within one computer system or across a plurality of computer systems.

Step 3729: Propagate the at least one second stream within one computer system or across a plurality of computer systems.

Step 3730: Define the description as properties of a function form, so that a user of the system may describe the function form using plain text, so that a user may communicate the intent of the function form to any other member function form or function entity acting as interpreters of the function form, so that the member function or member function form may interpret the first function entity or first function form according to a specification provided by the first description.

Step 3731: Interpret at least any propagated: first function application, first function definition, second function definition, and second function application to expand using relationships the operational capability of any of the propagated functions; and Step 3732: Store the relationships in a third stream to record the expanded operational capability.

Step 3733: Propagate the third stream to synchronize at least one of the first stream and the second stream by appending the relationships from the third stream to at least one of the first stream and the second stream.

Step 3734: Add an additional function as a second member function to the first function to add a second interpreter to the first function thereby creating organic computing in which the first interpreter and the second interpreter collaborate to create the computer program structure through multiple iterations of inviting and interpreting.

Step 3735: Communicate to any interpreters of the first function expected inputs of the first function.

Step 3736: Communicate to interpreters of the first function expected outputs of the first function.

Step 3737: Transform the at least one first function, the at least one input property, the at least one output property, the at least one input variable, and the at least one output variable into at least one first stream of entities, each entity containing immutable data.

Step 3738: Store the at least one first stream in a tangible storage medium; wherein any combination of the at least one first function, the at least one input property, the at least one output property, the at least one input variable, and the at least one output variable is portable and any change to the any combination is synchronizable within one computer system or across a plurality of computer systems Step 3739: Propagate the at least one first stream within one computer system or across a plurality of computer systems.

Step 3740: Produce output by at least one of a plurality of functions, wherein the output comprises data that according to a schema represent at least one change that modifies a structure, the state or operability of at least one of the plurality of functions.

Step 3741: Define a description as properties of the second function, so that a user of the system may describe the second function using plain text, so that a user may communicate an intent of the second function to any other member functions or interpreters of the second function, so that the member functions may interpret the second function according to the specification provided by the description.

Step 3742: Interpreting at least any propagated: first function application, first function definition, second function definition, and second function application to expand using relationships the operational capability of any of the propagated functions.

Step 3743: Store the relationships in a third stream to record the expanded operational capability.

Step 3744: Propagate the third stream to synchronize at least one of the first stream and the second stream by appending the relationships from the third stream to at least one of the first stream and the second stream. Functions may be propagated within one computer system or across a plurality of computer systems. The propagation may be completed through a messaging protocol such as email, HTTP, TCP sockets, language-specific message passing architectures, software transactional memory, and the like.

Writing Functions and Other Entities to Databases and Streams

In one implementation of a system configured according to the principles of the disclosure, instantiating a Form to create an Entity, including but not limited to a Function entity, may generate a tuple structure. Each invariant Relation belonging to a Form may be mapped as a tuple in a new column in the corresponding Entity's data row. Variant Relations may not be mapped to columns in the row; variant Relations may instead be mapped as rows. Once a row is populated, it may not be changed and may preserve the immutability of data in a database configured according to the principles of the disclosure. The implementation of immutability through the construction and relation of tuples is a powerful and differentiating objective of databases configured according to the principles of the disclosure. By providing structures that enable immutability, data may never be lost or conflict with other databases in a distributed system of databases configured according to the principles of the disclosure. The immutability of data coupled with signifying changes through relationship entities may provide a mechanism to discover the evolution of the data throughout a distributed system, and also provides for the distribution and immediate or eventual synchronization of data throughout a distributed system.

FIG. 38 shows a conceptual overview of an example Form and how it's invariant Relations may be mapped to a database configured according to principles of the disclosure, and is generally denoted as 3800. In this example, Form A (3805) contains four invariant Relations: Relation 1 (3815), Relation 2 (3820), Relation 3 (3825), and Relation N (3830). Form A (3805) is mapped into a database table (3810) with four columns, one corresponding to each relation: a Relation 1 column (3835), a Relation 2 column (3840), a Relation 3 column (3845), and a Relation N column (3850). Because the Relations are invariant, the Relation column directly contains the data from the Form that the Relation links to on the right side. For example, if Relation 1 is a "GUID" Relation, the Relation 1 column may be named "GUID" and the content of the columns would be the actual GUID values.

Relationship entities may also corresponds to a row in a table, and each row may represent a state change of at least one entity referenced by a relationship entity. Multiple state changes of an entity referenced by a relationship entity may be represented by:

multiple rows in the table, each of the multiple state changes may correspond to a new row, and/or represented by a single row in the table, each of the multiple state changes reflected in the single row.

A conceptual view of how the invariant Relations and the Entities may be stored in the Tuplebase is sown in FIG. 39, also denoted as 3900. FIG. 39 shows a sample Form (3905) from which several Entities (3915, 3920, 3925) were instantiated and provides a conceptual view of how the invariant Relations and the Entities may be stored in the Tuplebase. In general, invariant Relations for an Entity may be mapped as columns in the same table in the Tuplebase. Each Invariant Relation (3906, 3907, 3908, 3909) of the Form (3905) is mapped to a corresponding column (3930, 3935, 3945, 3950) in the table. Because the Relations are invariant, the data that corresponds to each Relation for each Entity may be directly written to rows in the table. Entity A (3915) data are written to an Entity A row (3950). Entity B (3920) data are written to an Entity B row (3955). Entity C (3925) data are written to an Entity C row (3960).

The steps shown in FIG. 40A and FIG. 40B provide a more detailed description of the process or writing an entity to a database and are generally denoted as 4000A and 4000B. FIG. 40A and FIG. 40B show the process for writing an entity, including a function entity, to a database by writing the information for each Relation of the Entity to the database. The Relation Entities on a Form may be variant or invariant, and the data associated with the variant Relation Entities or invariant Relation Entities may be primitive or complex. The process for writing Entities to a database may include the following steps:

Step 4005: Determine the Relations on the Form defining the Entity to be written to a database.

Step 4010: For each relation, determine its type: primitive invariant, complex invariant, primitive variant, complex variant Step 4015: Determine whether a table exists for the Form that defines the Entity that contains the invariant relations.

Step 4020: Step 4020 contains multiple substeps including:
If a table does not already exist for the Form, create a table for the Form that includes the following:
A column that corresponds to each primitive invariant relation of the Entity to be written to the database.
A set of three columns for each complex invariant relation of the Entity to be written to the database:
Assigned Entity GUID column, prefixed with the relation name
Assigned Form GUID column, prefixed with the relation name
Assigned relation name column, prefixed with the relation name.

Step 4025: For any Primitive Invariant Relation Entity: write the invariant primitive relation data directly to the columns that correspond to the invariant primitive in the Entity Table.

Step 4030: Write the data required to populate the three columns for each complex invariant in the Entity Table.

Step 4035: Each variant primitive Relation points to a separate Relationship Entity that joins entity being written to the database to the Primitive Entity table that stores the data. Step 4035 contains multiple substeps including:

Determine to which Relationship Entity the variant primitive Relation points.

Determine whether a table already exists for the Relationship Entity.

If not, create it by:
Including columns for the invariant primitives of the relationship entity, typically: GUID, FormGUID, and Time.
Include a set of three columns that refer to the Entity that points to the relationship, typically referred to as the "Parent Entity" for the primitive variant relation of the Entity to be written to the database.
Assigned Entity GUID column, prefixed with the relation name
Assigned Form GUID column, prefixed with the relation name
Assigned relation name column, prefixed with the relation name.
Include a set of three columns that refer to the Variant Primitive Entity table that the Relationship points to, typically referred to as the "Child Entity" for the primitive variant relation of the Entity to be written to the database.
Assigned Entity GUID column, prefixed with the relation name
Assigned Form GUID column, prefixed with the relation name
Assigned relation name column, prefixed with the relation name.

Step 4039: Write the data required to populate the three columns for each primitive variant in the Entity Table.

Step 4045: Each variant complex Relation points to a separate Relationship Entity that joins entity being written to the database to the Variant Complex Entity table that stores the data. Step 4045 contains multiple substeps including:

Determine to which Relationship Entity the variant complex Relation points.

Determine whether a table already exists for the Relationship Entity.

If not, create it by:
Including columns for the invariant primitives of the relationship entity, typically: GUID, FormGUID, and Time.
Include a set of three columns that refer to the Entity that points to the relationship, typically referred to as the "Parent Entity" for the primitive variant relation of the Entity to be written to the database.
Assigned Entity GUID column, prefixed with the relation name
Assigned Form GUID column, prefixed with the relation name
Assigned relation name column, prefixed with the relation name.
Include a set of three columns that refer to the Variant Complex Entity table that the Relationship points to, typically referred to as the "Child Entity" for the variant complex relation of the Entity to be written to the database.
Assigned Entity GUID column, prefixed with the relation name
Assigned Form GUID column, prefixed with the relation name Assigned relation name column, prefixed with the relation name.

Step 4050: Write the data required to populate the three columns for each complex variant in the Entity Table.

Step 4055: For each primitive invariant entity written as a three column set in a Relationship table, Repeat multiples Steps 4003 through Step 4005 to create and/or write the primitive invariant data to a table in the database.

Step 4060: For each complex variant entity written as a three column set in a Relationship table, repeat multiple Step 4001 through Step 4011 until all tables required for all associated entities are written.

An illustrative example of writing one of each type of Relation of an Entity to a database is provided in FIG. 41A and FIG. 41B, generally denoted as 4100A and 4100B.

Determine the Relations on the Form defining the Entity to be written to a database. In this example, Person Entity 1 (4105) includes the following Relations
  FormGUID Relation (4110)
  EntityGUID Relation (4115)
  Date/Time Relation (4120)
  Name Relation (4125)
  Birth Information Relation (4130)
  Address Relation (4135)

For each relation, determine its type: primitive invariant, complex invariant, primitive variant, complex variant
  FormGUID Relation (4110) is a primitive invariant relation
  EntityGUID Relation (4115) is a primitive invariant relation
  Date/Time Relation (4120) is a primitive invariant relation
  Name Relation (4125) is a primitive variant relation
  Birth Information Relation (4130) is a complex invariant relation
  Address Relation (4135) is a complex variant relation Determine whether a table exists for the Form that defines the Entity that contains the primitive invariant relation. In this example, assume the table does not yet exist.

If a table does not already exist for the Form, create a table for the Form.
  Create a Person Entity Table (4160)
  Include a column that corresponds to each primitive invariant relation of the Entity to be written to the database (4165)
    Add FormGUID Column
    Add EntityGUID column
    Add Time column
  Include a set of three columns for each invariant complex relation of the Entity to be written to the database.
    For the Variant Birth Info Relation (4170)
      BirthInformationRelationEntityGUID column corresponded to the Assigned Entity column prefixed with the relation name, includes the GUID of the BirthInfoRelation for the Person A Entity
      BirthInformationRelationEntityFormGUID column Assigned relation column, prefixed with the relation name, includes the FormGUID for the BirthInfoRelation
      BirthInformationRelationEntityRelation—corresponds to the Assigned Value column prefixed with the relation name, includes the GUID of the BirthInformation Entity for Person A Entity For any Primitive Invariant Relation Entity: write the invariant primitive relation data directly to the columns that correspond to the invariant primitive in the Entity Table.
  Write the PersonEntity FormGUID in the FormGUID Column.
  Write the PersonA GUID in the EntityGUID column.
  Write the data and time the PersonA Entity was created in the Time column.

Write the data required to populate the three columns for each complex invariant in the Entity Table.
  For the Variant Birth Info Relation (4170)
    Write the GUID of the BirthInfoRelation for the Person A Entity in the BirthInformationRelationEntityGUID column
    Write the FormGUID for the BirthInfoRelation in the BirthInformationRelationEntityFormGUID column
    Write the GUID of the BirthInformation Entity for Person A Entity in the BirthInformationRelation-EntityRelation column Perform activities required to write the variant primitive Name Relation data to the database
  Assume that the Name Relationship Table pointed to by the variant primitive Name Relation already exists and includes the following columns:
    GUID
    FormGUID
    Date/Time
    ParentEntityGUID
    ParentEntityFormGUID
    ParentEntityRelation.
    ChildValueGUID
    ChildValueFormGUID
    ChildValueRelation column Write the information for the variant primitive Name Relation to the Name Relationship Table (4165)
  Write the Name Relationship GUID for Person A in the GUID column (4175)
  Write the Name Relationship FormGUID in the FormGUID column (4175)
  Write the data and time the Name Relationship for Person A was created in the Time column (4175)
  Write the Parent Entity information for the Name Relationship for Person A (4180)
    Write the PersonA GUID in the ParentEntityGUID column
    Write the PersonFormGUID in the ParentEntity-FormGUID column
      Write PersonFormNameRelation in the ParentEntityRelation column.
  Write the Child Entity information for the Name Relationship for Person A (4185)
    Write the String GUID in the ChildValueGUID column
    Write the StringFormGUID in the ChildValueFormGUID column
    Write AdHocRelation in the ChildValueRelation column.

Perform activities required to write the variant complex Address relation data to the database. Although not shown in the Figure, the table created for the Address Relationship Entity would be very similar to the Name Relationship table (4165), with the exception that is would point to a complex variant table for the Address Form Entity rather than a String Entity Table.

Assume that the Address Relationship Table pointed to by the variant complex Address Relation already exists and includes the following columns:
GUID
FormGUID
Time.
ParentEntityGUID
ParentEntityFormGUID
ParentEntityRelation.
ChildEntityGUID
ChildEntityFormGUID
ChildEntityRelation column Write the information for the variant complex Address Relation to the Address Relationship Table. Although not shown in the Figure, the table created for the Address Relationship Entity would be very similar to the Name Relationship table (4165), with the exception that is would point to a complex variant table for the Address Form Entity rather than a String Entity Table.

Write the Address Relationship GUID for Person A in the GUID column
Write the Address Relationship FormGUID in the FormGUID column
Write the data and time the Address Relationship for Person A was created in the Time column
Write the Parent Entity information for the Address Relationship for Person A (4180)
  Write the PersonA GUID in the ParentEntityGUID column
  Write the PersonFormGUID in the ParentEntityFormGUID column
  Write PersonFormNameRelation in the ParentEntityRelation column.
Write the Child Entity information for the Address Relationship for Person A (4185)
  Write the AddressEntity GUID in the ChildEntityGUID column
  Write the AdddressEntityFormGUID in the ChildValueFormGUID column
  Write AdHocRelation in the ChildEntityRelation column.

Static Typing and Mapping Variant Relations to a Database

In one implementation of a system configured according to the principles of the disclosure, Relations may be used to add properties, which may also be referred to as attributes, to a Form. Unless otherwise specified, the actual content that is specified for a Relation on a Form may be of any type. In some cases, constraining the structure of the Form that may be associated through a Relation may be beneficial. These constraints may be applied by creating Attribute Forms or Element Forms of the desired type and adding Relations to those specific attributes or elements to the Form.

For example, a Person Form may include Relations to a Name Attribute and an Age Attribute. If the Name Attribute and Age Attribute are not further defined, any type of input may be associated with the Name or Age and linked to the Person Form.

An unconstrained Name Relation may be created by deriving a Relationship Form, adding a new Relation "Assigned Name", and naming the new Relationship Form the Name Property Relationship Form.

A constrained, or statically typed Name Relation may be modeled by:
Creating a User Form.
Adding a Name Relation to a User Form.
Creating a Name Property Relationship Form.
Pointing the Name Property Relation Form Child Relation to a String Primitive Form so that only a string can be associated with the Name Relation.

FIG. 42 illustrates an example of static typing and is generally denoted as 4200. In this example, a Person Form (4205) and the Name Relation (4210) and Age Relation (4215) configured as statically typed. The Name Relation (4210) links to a String Primitive Form (4230) through a Name Property Relationship Form (4220). The Age Relation (4215) links to a Number Primitive Form (4235) through an Age Property Relationship Form (4225).

FIG. 43 provides an example of mapping a statically typed relation to a database, and is generally denoted as 4300. In the example shown in FIG. 43, an invariant, statically typed Person Form Eye Color Relation and its content may be mapped to a database configured according to the principles of the of the disclosure. Invariant relations are typically written directly to the tables mapped as into three columns: Assigned Entity, Assigned Entity Relation, and Assigned Entity Value.

In this Figure, the Person A Form (4305) links to an Eye Color as a variant String Primitive Form (4320) through an EYE Color Relation (4310) and an EYE Color Property Relationship Form (4315). A Person Entity and Eye Color "Blue" may be mapped to a database configured according to the principles of the disclosure as follows:

Write the invariant GUID and Time data for the person entity to the Person Entity table (4325). Because this information is invariant, the values are stored directly in the table in a single column for each invariant relation.
Write invariant data, write variant data for the parent relation, write variant data for variant name relation
Write invariant data for string primitive Managing Entities and Relational Stepping Content that the Entities configured according to the principles of the disclosure may maintain may be stored in many different types of structures, including but not limited to:

a hierarchical structure in which entities may be managed primarily through parent-child relations and containment relationships;
a graph database structure in which entities may be linked to other entities through a collection of relations and relationships, creating a rich web of linkage
a web structure;
a stream structure in which entities, relations, and relationships may be appended together, and change may be signified primarily through the addition of entities, including relationship entities;
a database structure wherein every entity is storable in the distributable electronic database as an object which contains immutable fields representing invariant relations of the entity, and separate relationship entities signifying changes to the variant relations of the entity;
and the like The linkages between entities in the different types of structures may be traversed by "reading", or executing the Relations on a Form. These Relations may be thought of as "bridges" between Entities. FIG. 44A is a general example of a relational bridge joining two Forms, generally denoted by reference numeral 4400A. The example relation bridge 4400A illustrates Form A (4405) as bridged, or linked, to Form B (4410) through Relation C (4415). After instantiation, Entity A may be bridged, or linked, to Entity B through a Relation as well.

For example, a system configured according to the principles of the disclosure may include an "Automobile" Form that may further include two invariant Relations: Automobile Make and Automobile Model. FIG. 44B is a general example of a relational bridge joining the three Forms through two invariant relations, generally designated by reference numeral 4400B. The example relation bridge joining three Forms 4400B illustrates the Automobile Form (4430) as:

Bridged, or linked, to an Automobile Manufacturer Form (4440) through the Automobile Make Relation (4435), and Bridged, or linked, to a primitive integer Form (4450) through the Automobile Model Year Relation (4435).

These entities may be instantiated to create a collection of entities that model a fleet of cars.

Relations may be executed to traverse from one Entity to another through a Relational Stepping process. This process may be bi-directional because each Relational hop has a corresponding hop in the other direction, meaning that Entity A can hop to Entity B, and Entity B can hop to Entity A. Relational Stepping may be summarized as comprising two processes:

Entity-to-Relation Hop 1: Hop from an Entity to a Relation
Relation-to-Entity Hop 2: Hop from a Relation to a related Entity Relational Stepping may be important to many operations of a structure configured according to the principles of the disclosure, and may be used to: retrieve all the subfolders of a parent folder, retrieve the file contents of a folder, retrieve the versions of an Entity such as a document, retrieving the characteristics of an entity, such as a file name or folder name, and many others. Using Relational Stepping, the set of entities associated with another entity may be retrieved. This may be useful in discovering the full set of linkage for an entity. For example, Relational Stepping may be used to retrieve a listing of the users that are members of a Group, users that have access to a file or folder, users who have shared a file or folder and whom they may shared it with, users who have been assigned to a task, users who have prepared output for a task, etc. These example uses may be important to the development of collaboration networks and relationship-based programming enabled by the Forms Language.

The process of creating and executing Relation as functions may include the following steps:

Creating an executable function for at least one relation corresponding to at least one property on a first Form defining a class of entities, the at least one relation defined by a second Form that includes two additional relations being a left side relation and a right side relation, the executable function having an input and having an output, wherein the input is an instance of the first Form pointed to by the left side relation of the second Form and the output includes at least one instance of a third Form pointed to by the right side relation of the second Form.

Executing the executable function to provide an instance of the first Form pointed to by the left side relation and the executable function identifying and retrieving all instances of all third Forms pointed to by the right side relation that are discoverable outputs of the second Form for the executing function, providing a web of linked entities instantiated from the Forms defining the classes of entities so that the web of linked entities provides at least one immutable stream of information that is at least one of readable, searchable, traversable, appendable, expandable and shareable by producers and/or consumers of the stream of information.

FIG. 45 is an example of relation walking between a parent Folder Entity and a child Folder Entity, generally designated by reference numeral 4500. The parent-to-child relation walking example 4500 provides a conceptual overview of the process that may be used during relational stepping to hop between parent folders and child folders, according to principles of the disclosure. In this example, the parent Folder Entity (4505) may hop to (or locate) a Child Folder Entity (4515) through the Containment Relationship Entity (4510) by Parent-Containment Hop 1: the Parent Folder Entity (4505) may execute its Parent Relation 1 (4520) to hop to the Containment Relationship Entity (4510). Recalling to FIG. 4 (400), the Parent Relation 1 (4520) on FIG. 45 (4500) may be defined by a Parent Relation 1 Form that include a Left side/input Relation, a Right side/output Relation, and a Corresponding Relation. The Left side/input Relation of Parent Relation 1 joins to the Parent Folder Entity (4505). The Right side/output Relation of the Parent Relation 1 joins to the Containment Relationship Entity (4510). The Corresponding Relation of the Parent Relation 1 joins to the Child Relation 2 (4525) of the Containment Relationship Entity (4510).

Containment-Child Hop 2: From the Containment Relationship Entity (4510), the Parent elation (4525) may be executed to determine that Child Folder Entity B (4515) is linked as a child. Recalling to FIG. 4 (400), Parent Relation 2 on FIG. 45 (4500) may also be defined by a Parent Relation 2 Form that include a Left side/input Relation, a Right side/output Relation, and a Corresponding Relation. The Left side/input Relation of the Parent Relation 2 joins to the Containment Relationship Entity (4510), the Right side/output Relation of the Parent Relation 2 joins to Child Folder Entity B (4515). The Corresponding Relation of the Parent Relation 2 joins to the Child Relation 3 (4530) of Child Folder Entity B (4515).

In some scenarios, Child Folder Entity B (4515) may also be a parent folder and linked to one or more child folders through containment relationships. In these scenarios, Hop 1 and Hop 2 may be repeated, with the Child Folder Entity B as the parent. This process may repeat to retrieve child folders through as many nested level of folder as required. The process may end when the Child Relation of the Parent Folder Entity is not linked to a Containment Relationship Entity.

FIG. 45 is an example of the relation walking between a child Folder Entity and a parent Folder Entity, generally designated by reference numeral 4500. In the child-to-parent relation walking example 4500, the bi-directionality process that may be used during relational stepping to hop between a child folder and a parent folder is shown, according to principles of the disclosure. In this example, the parent Child Entity (4515) may hop to (or locate) a Parent Folder Entity (4505) through the Containment Relationship Entity (4510) by:

Child—Containment Hop 1: the Child Folder Entity (4515) may execute its Child Relation (4525) to hop to the Containment Relationship Entity (4510).

Containment—Parent Hop 2: From the Containment Relationship Entity (4510), the Parent Relation (4525) may be executed to determine that Child Folder Entity B (4515) is linked as a child (4520).

In some scenarios, Parent Folder Entity A (4515) may also be a child of one or more folders and linked to its parents through containment relationships. In these scenarios, Hop 1 and Hop 2 may be repeated, with the Parent Folder Entity A as the child. This process may repeat to retrieve parent folders through as many nested level of folder as required. The process may end when the Parent Relation of the Parent Folder Entity is not linked to a Containment Relationship Entity.

FIG. 47 is an additional example of relation walking between a parent Folder Entity and a child Folder Entity, generally designated by reference numeral 4700. In the additional parent-to-child relation walking example 4700, a more detailed example of one possible two-hop relational stepping process for a Folder and related child Folders according to principles of the disclosure, as well as the corresponding process flow. In this Figure, the following steps depicted using arrows:

Step 4720: Execute the ParentRelation in Parent Folder Entity A (4705) to return the Containment Relationship Entities targeted by the Parent Folder Entity A. Note that Parent Relation A on Parent Folder Entity A (4705) may be defined by a Parent Relation A Form that include a Left side/input Relation, a Right side/output Relation, and a Corresponding Relation. The Left side/input Relation of Parent Relation A joins to the Parent Folder Entity A (4705). The Right side/output Relation of the Parent Relation A joins to the Containment Relationship Entity (4715). The Corresponding Relation of the Parent Relation A joins to the Child Relation 1 the Containment Relationship Entity (4715).

Step 4725: Retrieve GUID(s) of the Containment Relationship Entities (4715) that are associated with the Child Relations returned in Step 4720.

Step 4730: Retrieve the Parent Relations that correspond to the Containment Relations returned in Step 4725.

Step 4735: Retrieve the Child Folder Entities (4710) targeted by the GUIDs of the Child Relations returned in Step 4730. Recalling to FIG. 4 (400), Parent Relation 1 on FIG. 47 may also be defined by a Parent Relation 1 Form that include a Left side/input Relation, a Right side/output Relation, and a Corresponding Relation. The Left side/input Relation of the Parent Relation 1 joins to the Containment Relationship Entity (4715), the Right side/output Relation of the Parent Relation 1 joins to Child Folder Entity B (4710).

The Corresponding Relation of the Parent Relation 1 joins to the Child Relation B of Child Folder Entity B (4710).

FIG. 48 is a flowchart of an exemplary Process Flow for Traversing Relations, performed according to the principles of the disclosure, generally designated by reference numeral 4800. The Exemplary Process Flow for Traversing Relations 4800 indicates that each Relation in the example shown in FIG. 46 may actually be considered a function, with a left side/input relation and a right side/output relation. Re-integrating the functional nature of Relations, the steps that may be required to traverse a relation may be generalized as follows and are shown in FIG. 48:

Step 4805: Determine the Relation of interest on the Form type that defines the Entity of interest.

Step 4810: Treat as an executable function the Relation of interest, having a left side/input relation and a right side/output relation and a corresponding relation.

Step 4815: Discover the input/left side Entity pointed to by the input/left side relation.

Step 4820: In the context of the discovered input/left side Entity, execute the relation function for the Relation of interest discover the right side/output Entities pointed to by the right side/output of the relation.

Step 4825: Use the corresponding relation of the relation function to determine which relation on the right side/output Form is pointed to by the Relation of Interest.

Step 4830: Repeat for each Relation of interest on either the Left Side/Input Entity or Right Side/Output Entity(ies)

This process provides a web of linked entities instantiated from the Forms defining the classes of entities so that the web of linked entities provides at least one immutable stream of information that is at least one of readable, searchable, traversable, appendable, expandable and shareable by producers and/or consumers of the stream of information.

Immutability, Change, and State

In one implementation of a system configured according to the principles of the disclosure, a database may be implemented as non-destructive by evolving the database through the addition of entities rather than through traditional techniques such as overwriting other otherwise changing entities (techniques commonly employed in existing systems prior to the disclosure, typically using a row update procedure). Insert and append methods may be used to evolve content. These insert and append methods create new entities which include typically substitution relationships, enabling relationships previously created to be replaced by new relationships in a non-destructive and additive manner.

In one implementation of a system configured according to the principles of the disclosure, only row inserts are required to evolve the state of a database, thereby preserving row-level immutability because rows are typically inserted but typically not subsequently updated or altered after insert. In this configuration, an individual database row (R1) representing an entity (E1) does not change over time, in that is its field values are not updated or altered over time, since invariant relations (belonging to e1's Form) are mapped as columns in the row R1.

In this configuration, the difference between immutability and change is typically this: while the individual row representing e1 may not typically change over time and may typically be immutable (because invariant relations typically map to the columns of R1), the variant relations (VR-Set) defined on e1's Form (E1F) may not change over time, as new and separate relationship entities are created which reference or point back to existing entities (such as e1) under existing variant relations included in VR-Set. A variant relation (VR1) belonging to VR-Set may typically change over time as new relationships entities may be created which reference (or point back to) the entity e1 (the entity reference part of the reference triplet) under the relation VR1 (the relation reference part of the reference triplet). In this way, the invention is typically able to record change relationally without altering or modifying existing rows representing entities. The delta entity stream typically includes relationship entities signifying those changes.

In this sense, the invention may include and enable the following: that rows in a database may represent immutable changes rather than mutable states; that logical changes to the state of the system may be accomplished through the addition of new database rows rather than the modification of existing database rows; that immutability configured according to the principles of the invention make it possible to think of data in a "differential" way (as opposed to the more classic way of looking at rows as "integral" states); that the integrated state of an entity may be computed by adding the set of relationships which point to the entity at a point in time minus the set of relationships negated out or substituted out at that same point in time (the relational algebra); that these integrated states may also be stored representing an integrated snapshot of an entity at a point in time; that the graph model of information in a database configured according to the principles of the invention represent both links in the web of entities and changes to the existing set of entities in the web relationships, of which there are typically many types; that these entities may be shared across many databases configured according to the principles of the invention making it possible to integrate states continuously so as to increase collaboration and cooperative advantage between organizations and the resulting information symmetries among their databases, while at the same time not sharing for a time certain other entities between databases, therefore making it possible to increase differentiation/asymmetries between organizations and increase competitive information advantage. The invention contemplates a model of computer science oriented around differential changes typically represented by entities, so that information processing may be driven in response to the creation of new changes (typically the creation of new entities). In this way, the differential model of data contemplated herein may be viewed as the medium required to perform information management and processing, if a relationship (R) entity representing a discrete change to referenced entities is viewed as a unit of information to be processed. Those entities (ESet) referenced by such a relationship R are typically said to change when R is created. For a given member of ESet (E1), E1 is typically referenced by relationship R using an entity reference, which includes the referenced variant relation (VR1) belonging to the form (F1) defining E1. When the relationship R is created which contains a reference to E1 and its VR1, the entity E1 is said to change with respect to the variant relation VR1. Consumers or algorithms interested in changes to the entity E1 may request an automatically generated information stream including changes made to E1 with respect to a certain variant relation (VR1). This stream may be called a delta stream since it describes changes made to E1 under one or more variant relations (including VR1). In certain implementations, rows may not be mutated, however rows may be deleted for purposes such as garbage collection, erasing entities, and the like.

In one example of inserting rows to evolve the state of the database configured according to the principles of the disclosure, a new row representing a substitution relationship may be added. This row may set a previous version of an entity as a previous relation, and to substitute a current followed by the addition of another row specifying the new Relationship. Through the use of these methods and relationships, the data medium in an implementation of a database configured according to the principles of the disclosure may be immutable; rather than changing a specific Entity (row), the Relationships between Entities (rows) may be changed. This may be accomplished by adding new Entities ("changes") that are Relationships that may signify changes between referenced entities. The process of capturing changes primarily as Relationships may be referred to a differential computing. The process of combining all Relationships referencing a specific entity to determine its current state may be referred to as integration of the differentials.

The Containment Relationship or Property Relationship linking Forms and Entities joined by a variant relation may both include a Next Relation and a Previous Relations, which are also variant relations. These relations may not be specified when the initial link between two Entities joined through the appropriate Relationship is created. At a later time, it may be desirable to update a Containment Relationship or Property Relationship joining two entities. This update may be completing using a Substitution Relationship. FIG. 49A and FIG. 49B are an exemplary flowchart of a Substitution Process Flow, performed according to the principles of the disclosure, generally designated by reference numerals 4900A and 4900B. The Exemplary Substitution Process Flow in 4900A and 4900B provide an example of one implementation and assumes String Primitive Form and Substitution Relationship Form and Property Relationship Forms already exist. In other implementations, certain steps may be completed in different order, concurrently, or may contain fewer or additional steps.

The Exemplary Substitution Process Flow in 4900A and 4900B may include the following steps:
  Create and Link Forms
  Step 4905: Create Person Form.
  Step 4910: Add a Name Relation to the Person Form.
  Step 4915: Create a Name Property Relationship Form.
  Step 4920: Point the Name Relation on the Person Form to the Parent Relation on the Name Property Relationship Form.
  Step 4925: Point the Name Property Relationship Form Child Relation to the Name Relation and the String Primitive Form.
  Instantiate the Person Entity "Joe"
  Step 4930: Instantiate the Person Form as Person Entity 1.
  Step 4935: Instantiate the Name Property Relationship Form as a Name Property Relationship Entity 1.
  Step 4940: Point the Person Entity 1 Name Relation to the Name Property Relationship Entity 1.
  Step 4945: Instantiate the String Primitive Form as String Primitive Entity 1.
  Step 4950: Set the String Relation in the String Primitive Entity 1 to "Joe".
  Substitute Name Relation with new Primitive Entity with the Value "Joseph"
  Step 4955: Instantiate Name Property Relationship Entity 2.
  Step 4960: Instantiate a String Primitive Form as String Primitive Entity 2.
  Step 4965: Set the String Relation in the String Primitive Entity 2 to "Joseph".
  Step 4970: Point the Name Property Relationship Entity 2 Child Relation to String Primitive Entity 2.
  Step 4975: Point the Person Entity 1 Name Relation to the Name Property Relationship Entity 2. Note: Person Entity 1 is now has to two Name Relations.
  Step 4980: Instantiate a Substitution Relationship Form as Substitution Relationship Entity 1.
  Step 4985: Link the Previous Version Relationship in the Substitution Relationship Entity 1 to the Next Version Relation on Name Property Relationship Entity 1.
  Step 4990: Link the Next Version Relationship in the Substitution Relationship Entity 1 to the Previous Version Relation on Name Property Relationship Entity 2.

One purpose of an immutable data medium is to prevent inconsistency among Entities when those Entities are duplicated widely across a distributed network of databases. Problems keeping Entities synchronized across a distributed network may be a significant barrier to the development and proper functioning of a distributed database. Implementing immutability according to the principles of the disclosure prevents changes to key components of existing Entities, as is typically done is systems today prior to the disclosure, and addresses these problems. The immutability characteristics of entities in a system configured according to the principles of the disclosure provides for entities to be shared across a distributed network in a consistent manner. Entities may diverge after distribution through the addition of new entities and new relationships in any of the nodes to which the entity was distributed. These divergent changes may allow for competitive advantage to consumers of the entities through the development and inclusion of new information that is not shared with other nodes. For example, competitive advantage may be desired by two companies working to develop a product to meet the same market needs. The changes may also be selectively distributed to other nodes that contain the entity to achieve cooperative advantage through the convergence of the entity sets on the nodes. The new information may then be available to consumers of the node on which it was converged. Cooperative advantage may likely be desired by two companies collaborating to develop a joint product to meet a market need.

The conservation of data supports synchronization in a distributed setting as the Entity cannot be changed; rather layers of new relationships are created by adding new tuples. These information sets, from different databases distributed across nodes in a system configured according to the principles of the disclosure, may be combined without risk of a synchronization conflict. The total information set within a database therefore accumulates over time non-destructively and consistently, even as new information sets flow into one database configured according to the principles of the disclosure from other databases configured according to the principles of the disclosure.

The immutability characteristic of the database configured according to the principles of the disclosure has many applications. Substituting and versioning relationships rather than deleting relationships, coupled with methods to step through relationships, immutability is used in the database to:

View the evolution of an entity over time. For example, a user can view the evolution of membership to a network over time, the members that were added, when, and by whom; the members that were deleted, when, and by whom;

Share different versions of an entity over time. For example, by not deleting previous versions of an entity, a version prepared at one point in time can be shared separately than a version prepared at a different point in time. This can be extremely useful for document-based collaborations with multiple levels of management reviews. Drafts of documents can be prepared and stored in a central collaboration environment. "Completed" drafts can be forwarded on for review while revised drafts can be prepared;

Trace entity access: The listing of all users that have been granted access to a file, as well as who granted the access, the type of access, and the date/timestamp of access can be viewed. This is extremely useful for tracking access to sensitive information, as well as the identification of possible sources of information compromise.

Distribute functions across databases: Each component of a function is uniquely and immutably identified, therefore the components of a function, such as member functions, are distributable and evolvable without concern for resolving to an inconsistent state. Any changes made to a distributed member function can be readily merged into the database anywhere it has been distributed to synchronize the state of the function.

Any change to a system configured according to the principles of the disclosure may be considered a change to the state of a system configured according to the principles of the disclosure. A change, and there for a change in state, may include but is not limited to the addition of a new entity to a system, stream, database, or the like configured according to the principles of the disclosure. Additional examples of state changes include but are not limited to:

Instantiation of an entity and/or the relationships that link the instantiated entity to its properties may be considered state changes.

Changes to a system, stream, database, or the like configured according to the principles of the disclosure may be signified by the creation of new relationships and may also be state changes.

Creation of a relationship substituting one entity for another entity may also be a state change.

Forms and non-relationships may also be entities for which additions or changing relationships may also be state changes.

Retrieving the Current State of an Entity

Changes through the addition of relationships may be referred to as the addition of differential data. These differential data may be integrated to determine the current or any state of an entity.

For example, a system may include the following as shown in Exemplary Substitution Process Flow in 4900A and 4900B:

a Person Entity, a String Entity with the value of "Joe", a String Entity with the value of "Joseph", a Name Relationship Entity 1 that points to the "Joe" String Entity through Containment Relationship Entity 1, a Substitution Relationship Entity, and a Name Relationship that points to the "Joseph" String Entity through Containment Relationship Entity 2.

An example Process Flow for Retrieving Entity State is provided in FIG. 50, generally denoted as 5000. This process, performed according to the principles of the disclosure, in one application may be used to retrieve the current state of the Name Relation on the Person Entity as shown in the Exemplary Substitution Process Flow in 5000, and may include:

Step 5005: Provide the system with entity GUID, FormGUID, and the name of the relation that is being looked up. In this example, provide the GUID for the Person Entity.

Step 5010: The system may use the Entity GUID to determine the FormGUID. In this example, the FormGUID is for the Person Form.

Step 5015: The System may return the shape of the Form associated with the FormGUID, including all Relations.

Step 5015: Branch the retrieval process according to the type of relation being retrieved.

Step 5020—Branch 1 Invariant Primitive Relation: Invariant primitive values may be stored directly in the table for the Form under consideration with a value in a single column with the same name as the relation, and may be retrieved directly from the table by the system. For example, GUID and timestamp may be invariant primitive relations and may be stored in the Person From table in columns GUID and Time.

Step 5025—Branch 2 Invariant Complex Relation: Invariant Complex Relations may be stored directly in the table for the form under consideration as the following three columns that may point to the value—assigned entity, assigned entity Form, assigned entity relation name. For example, the Model relation information for a Car Entity with an invariant complex Model Relation may be found in a table that includes a model$entity column, model$form column, and a model$relation column.

Step 5030—Branch 3 Variant Primitive Relation: Variant Primitive Relations may be found in a Relationship table. The value associated with the relation may be stored directly in the relationship table as a value in the column with the name of the relation for that relationship.

Step 5035—Branch 4 Variant Complex Relations: Variant Complex Relations: Relations may be found in a Relationship table with a reference to the table that includes a pointer to the complex entity: assigned entity, assigned value, assigned relation name. The system may retrieve the complex entity Form and GUID, which provides the complex variant's Form and GUID. The above steps may be repeated to locate specific information of interest.

In one aspect of the invention the tables for each Form are created only when the first entity of that Form type is instantiated. One of ordinary skill in the art may also recognize that the tables may be created at the time that the Form is first created regardless of the existence of any entities of that form type.

Distributing Functions Across Systems Configured According to the Principles of the Disclosure A Function and its associated entities including inputs, outputs, member functions, and member variables, or any subset of function and its associated entities, may be distributed from one system configured according to the principles of the disclosure on one server to another system configured according to the principles of the disclosure on another server. The function and its associated entities may be stored in a database, a stream, a network, a text file, a BLOB, and the like. A single function or an entire collection of tasks that make up a workflow may be distributed.

In addition to distributing functions, the input to a function on one database stored on a server may be wired to output of another function on a different database stored on a server. The databases may be one the same server or on different servers. In this way function execution, and resolution of the functional dependency graph that may be expressed based on the function structure, may be driven based on the flow of inputs from one or a multiplicity of functions on the same or a multiplicity of databases.

FIG. 51 shows an example of a distributed workflow for the task: "Create the 2010 US Corn, Soy, and Wheat Market Analysis Report", generally denoted as 5100. This example includes four graph database networks operated by four different groups:

The US Agricultural Journal Network (5110)
The Corn Growers Association Network (5120)
The Soy Growers Association Network (5130)
The Wheat Growers Association Network (5140)
The steps of the workflow are as follows:
Step 5101: Prepare Report Outline
Step 5102: Production Summary
Step 5102A: Corn Production
Step 5102B: Soy Production
Step 5102C: Wheat Production Summary
Step 5103: Estimate Market Value
Step 5104: Draft the Report
Step 5105: Internal Report review
Step 5106: Finalize the Report
Step 5107: Publish the Report In the example shown in regards to FIG. 51, Step 5102A: Summarize the 2010 Corn Harvest Data may be assigned to the Corn Growers Association Network (5120). A file with the required format for the Harvest Data Format, the harvest data temple input (5160) may have been developed as part of Step 5102. In assigning this task to another network, a form view may be used to select the task and any inputs, and the system sends the form view to the Corn Growers Association Network (5120). After accepting the task, the Corn Growers Association Network (5120) may subdivide the task into zero or more additional subtasks. After completing the task, the Corn Growers Association Network (5120) sends the file summarizing the corn harvest data back the Production Summary Task on the US Agricultural Journal Network.

A similar set of processes may be followed to distribute the 2010 Soy Harvest Data task in Step 2B to the Soy Growers Association Network (5130), as well as to distribute the 2010 Wheat Harvest Data task in Step 2C to Wheat Growers Association Network (5130), with the Harvest Data Template forwarded to each network as an input to the task (5170 and 5180, respectively).

Within a single system configured according to the principles of the invention, functions such as member functions, personas, tasks, interpreted function, groups, and the like may be invited to join other functions in the system. Membership in another function may result in the creation of new or the relicensing of an existing and possibly derived persona, thus distributing the identity of a function across the personas and creating a function identity graph. The derived, or child, personas may be traversed through the Access Recipient entries to discover the parent persona.

Similarly to the single system architecture, multiple systems configured according to the principles of the invention may run and with other systems directly or may interact through one or more central hubs. In multi-system exemplary environment for implementing principles of the disclosure, functions may be invited to join functions on any one or more of the member systems. In one example, a function may be invited to join a membership target or otherwise shared with another system. In this embodiment, a function on one system may have a membership with another function on a separate system and no additional information about additional memberships that may have been created on the other system may be available to the function on the initial system. In another implementation, a central hub may track all memberships and act as a repository for the function distribution graph of identity. In these and other embodiments of the invention, a function may participate in an indefinite number of memberships, generating a plurality of corresponding derived functions and potentially a plurality of persona licensing the membership target persona within and across systems that can communicate, without requiring any one persona in an identity graph to track all other derived personas for the actor in the graph, with the exception of the persona from which it derives and the zero or more child personas that derive directly from it. Access rights may also be distributed as they may typically be assigned to each personas as desired by another persona.

Merging Functions and Function Components

In one aspect, a system configured according to the principles of the disclosure includes processes accessible to each database to merge a subset of a database, including functions and associated entities such as member functions, inputs, outputs, and variables, or other properties of a function, sent from one to one or databases. Additionally, these processes may be used to merge an entire database sent from one to one or more databases. When sharing a subset of a database or the full database, the processes managing the sharing may package the database contents (data nodes) and its shape (edges), and may send the information as a structure that may be interpreted as a database by another database. Because the receiving databases also comprises entities that may be referred to as data nodes and edges, both with immutable data, the merge process may add the new data nodes and edges directly through a union operation. Note that a database is an example of a data structure that may be used to store entities in a system configured according to the principles of the disclosure.

In one implementation configured according to the principles of the disclosure, the entities, including functions and associated entities such as member functions, inputs, outputs, and variables, or other properties of a function, may be configured as a database. In other or the same implementation, the entities may be configured as a stream. In other or the same implementations, a database configuration may be expressed as a graph database. In yet other or the same implementations, a stream configuration may be expressed as a graph database. In a system configured according to the principles of the disclosure, sharing and merging entities configured according across a distributed database, a set of distributed streams, a set of distributed graph database nodes, or any combination of the preceding may follow the processes described as follows. Configuring entities across any combination of a set of databases, set of streams, or set of graph database nodes provides for maximum flexibility to the implementer.

Most of today's database to database information sharing or information exchange is typically based on XML. The operators of the source and recipient databases typically negotiate an acceptable schema, prepare the processes to extract and/or convert the information to be shared to XML, and user web services to transfer the XML payload. The recipient database then parses the XML, transforms it as needed, and loads it into the recipient database. However, in contrast, in a system configured according to the principles of the disclosure, predefining the shape of the data to be shared may typically not be required. Both the source database and recipient database may comprise entities, both of which contain immutable data, the shared entities may be directly merged with the recipient database node through a union operation, and the linkages may be maintained.

A database configured according the principles of the disclosure may include a collection entities that may be linked to one another through relationships that are also entities. Each entity in a database configured according the principles of the disclosure has an identifier that is typically unique. Additionally, an entity is also immutable in that evolution is completed through the addition of new relationships joining the entity to existing entities, or new entities and new relationships joining the new entities to the evolving entity. The identifier and immutability aspects of an entity node maintain the integrity of the entity as it is distributed among a set of databases. Any entity is distributable, including but not limited to a functions member function, input, output, and variable, or other properties of a function.

With these linkage, identifier, and immutability aspects, any subset of entities in a database is shareable and mergeable through a union operation with any other database that is also configured according to the principles of the disclosure. The subset may be transferred as a packet, in binary format, as a stream, or in another data format using a messaging process, a service oriented process, an information exchange process, and the like. As the receiving database configured according to the principles of the disclosure may include entities and relationship entities, and any subset of a database being shared may also include entities and relationships entities, the subset may be readily merged with the receiving database by adding the entities in the subset being shared to the set of entities nodes in the receiving database. In some sharing operations, at least one new relationship that specifically join one or more entities in the shared subset with one or more entities in the receiving database is created.

The steps shown in FIG. 52 starting at 5200 describe one exemplary implementation of a process that may be used for sharing a subset of a source database that includes functions or components of functions with a recipient database:

Step 5205: Select a subset of entities to be shared from a source database.

Step 5210: Select at least one recipient database. The recipient database may be selected:

Directly using for example, its routing name, a name, or some other identifier or Indirectly by selecting, for example, a specific recipient entity on the recipient database.

The recipient database may be the same as the source database.

Step 5215: Serialize the selected subset for transfer. The serialization format may take on any variety of serialization formats, including but not limited to: binary, binary XML, stream, XML, JSON, BLOB, document format, text format, and the like.

Step 5220: Transfer to the recipient database the selected subset via a communications protocol. The transfer process may include authentication processes, may be completed through an intermediary database that is neither the sender nor recipient, may use peering mechanisms, and the like. Thus, the databases may be communicative with one another via an electronic communication protocol.

Step 5225: Deserialize the selected subset.

Step 5230: Merge each entity in the selected subset, typically using a union operation. Because each entity node in the shared subset, the sending database, and the recipient database all contain immutable data, the shared subset may be merged using a union operation. This operation may compare each entity from the shared subset with the entities nodes in the recipient graph database node. If the entity from the shared subset already exists in the recipient database, the entity may be skipped and may not be inserted into the recipient database. If the entity from the shared subset does not already exist in the recipient database, the entity may be inserted into the recipient database. This process may expand the information content of the recipient database, and may maintain the integrity of all entities in the shared subset, the sending database, and the recipient database.

This process may be repeated multiple times to share the selected subset of a source database or entire source database with a multiplicity of databases.

One example of a computer-based network system configured according to the principles of the disclosure may comprise a plurality of databases so that any subset of information contained in any of the plurality of databases is shareable with any other database in the network system using a merge operation. In this example, the plurality of databases may comprise at least two entities and at least one edge linking the at least two entities; the subset of information may also comprises at least one entity; and the at least one entity may contain immutable data so that the at least one entity may be evolvable through the addition of at least one new edge that is also a entity, and the at least one new edge may link at least one entity to at least one other entity so that the integrity of the at least one entity, the at least one other entity, and the at least one edge may be maintainable during sharing and merging of the subset of information throughout the plurality of databases so that the any of the plurality of databases entities and the any other database may be least partially synchronized.

Additionally, the merge operation may be accomplished through a union operation that expands the information of the any other database. The databases may then evolve separately and may be selectively synchronizable. The immutable data of an entity may include an identifier such as a GUID and a date/timestamp and may provide a basis for knowing the state of the computer-based network system at any point in time.

Note that the any databases and the distributed functions and associated entities may be partially of fully synchronizable with any other database through sharing through a merge operation subsets of the entities so that distributed collaboration on the subset of information may occur through the addition of any of: a new edge joining at least one entity from the subset of information with at least one entity from the any other database, the addition of a new entity from the subset of information and a new edge joining that new entity with a entity from the any other database, and the addition of a new edge from the subset of information joining two entities already contained in the any other database, thereby expanding the amount of information linked to the any other database. The subset that is shared through a merge operation with any of the plurality of databases may also include the full information set.

These characteristics of systems configured according to the principles of the disclosure may be beneficial to large organizations with multiple divisions and many offices that use portions of information sets for many different business purposes. For example, suppose Company X has 5 divisions and 100 offices. Each of the divisions and offices uses a specific data set for a slightly different purpose, and the initial data set evolves on divergent paths. In some circumstances there may be a desire to share a portion of the divergent data set. In systems of today before this disclosure, the data set may be replicated across the separate data systems used by the many offices or divisions. Changes may be shared but require a tedious process of agreeing on data structure and format, writing web services to share the information, parsing XML, and related activities. Sharing different data, changing the shared data, or sharing with a new group repeats the tedious process.

However, in contrast, in a system configured according to the principles of the present disclosure, a company may be running a system that may include a network of distributed databases configured according to the principles of the disclosure. The initial data set, organized as a graph database, may be merged into one of the databases to the company graph network. Subsets of the database that include the initial data set may be shared and may be distributed to create databases for each division, each office, or some combination of divisions and offices. New information may be added to each database through the creation of new edges, new nodes, or both. An expanded information set linked to a entity from the initial data set may be selected as a subset of the database that contains it, and may be shared with any other database in the network. The receiving databases may readily merge the shared subset, and the information is made available essentially immediately, i.e., essentially real time, which may be dependent on system processing capacity and/or throughput.

Continuing the example, these aspects may become even more important in a scenario in which an error in an entity that was part of the initial data set may have been identified. In systems of today before the invention, attempting to quickly identify and rectify all systems that may use the erroneous entity may be a lengthy and onerous process. In a system configured according to the principles of the present disclosure, the error may be rectified through the addition of new edges, new nodes, or both that may result in an evolution of the entity to be linked to the correct information. The entity linked to the corrected information via an edge and an entity may be selected as a subset of the graph and shared with all other databases in the network, and immediately merged.

Functions Generating Functions

In one aspect of a system configured according to the principles of the disclosure, functions may generate other functions. For example:

Personas may be created to reflect each user's membership in another entity. The Persona Form may extend the Function Form, therefore a Persona may be of type Function. All actions performed by a user when operating within the context of a specific membership may be associated with the persona that reflects that membership. For example, "user Ted's" membership in the "ABC Network" may result in a creation of the "Ted-ABC Network Persona", which may be a Function. A specific example of a function creating another function may be when the "Ted-ABC Network Persona" Persona creates the "Write Report" task, which may also be a Function.

In another example of functions generating function, when one Persona invites another persona to join a task, a new persona may be created for the invited user. Because each persona may be a function, the function inviting the user to join a task may generate another function, the new persona for the invited user.

An exemplary flow diagram of a process that may be used to generate functions from functions is shown in FIG. 53, generally denoted as 5300. The steps of the process may be as follows:

Step 5301: Model a person as a function
   Step 5301A: Reflect the function state and function structure in a database.
   Step 5301B: Map the function to a functional dependency graph.
Step 5302: Create a function
   Step 5302A: Reflect the function state and function structure in a database.
   Step 5302B: Map the function to a functional dependency graph.
Step 5303: Differentiate the function by creating member functions, some of which are related to the actions of a person.
   Step 5303A: Reflect the function state and function structure in a database.
   Step 5303B: Map the function to a functional dependency graph.
Step 5304: Integrate the functions as part of the parent function.
   Step 5304A: Reflect the function state and function structure in a database.
   Step 5304B: Map the function to a functional dependency graph.
Step 5305: Continue differentiation by producing additional logic based on the functions related to the actions of the person.
   Step 5305A: Reflect the function state and function structure in a database.
   Step 5305B: Map the function to a functional dependency graph.
Step 5306: Integrate so that the functions and/or additional logic become part of the system programming; increasing or decreasing logic.
   Step 5306A: Reflect the function state and function structure in a database.
   Step 5306B: Map the function to a functional dependency graph.

Stream Computing

Stream computing may be used to move entities such as a function and its associated entities within and between databases, streams, and graph databases, configured according to principles of the disclosure. The stream computing engine may control the flow of state changes, and the flow of entities in response to those state changes, much like valves control the flow of water in a system of pipes. Several components of stream computing in the invention may include, but are not limited to, the following:

Information stream: a collection of entities appended end-to-end, each with a specific start location and an offset.

Information sequence: a portion of the stream that may comprise a specific entity.

Information set: a collection of information sequences.

In one implementation of a system configured according to the principles of the disclosure, an information stream may be a single entity or any collection of entities appended together. These entities may include functions and associated entities, Forms, Relations, Relationships, as well as any subclasses of any Forms, Relations, Entities, and Relationships. A conceptual overview of a stream is provided in FIG. 54, generally denoted as 5400. In this example illustration, the information stream (5405) includes appended Entity 1 through Entity N. Information streams may expand to a substantially unlimited length as new entities are appended.

The information stream may typically include at least one entity and at least one relationship entity that may signify a change with respect to at least one other entity or at least one other relationship entity. Every entity in the stream may include immutable data so that a change in the state of the stream may be reflected by the addition of a new entity to an information stream. These relationship entities may signify changes in the state of an entity so that the information content associated with the referenced entity may be logically changed while preserving the immutability of the referenced entity. The invariant portion of the information state of the an entity referenced by a relationship prior to the creation of the relationship entity may be preserved in at least one of the information streams and the invariant portion of the information state of the referenced entity after the creation of the relationship entity may also be preserved an information stream. Additionally, the information content associated with an entity referenced by a relationship may include immutable data associated with invariant relation, and the information content associated with the referenced entity may include variable data associated with variant relations, if variant relations are present.

Integrating the entities and relationship entities comprises a snapshot at a point in time of the immutable fields belonging to one or more entities. The state of an entity may be computed by logical integration over any particular time period.

An information stream containing entities such as a function and its associated entities configured according to the principles of the disclosure, or a subset of an information stream containing entities such as a function and its associated entities configured according to the principles of the disclosure, may be:

Streamable: an information stream containing entities that may be moved from one location to another through a communications protocol and may be merged, appended to, other otherwise combined with another stream.

Appendable: one information stream may be added another information stream

Copyable: a subset of the collection of entities in one stream may be replicated to a second stream.

Mergeable: one information stream may be combined with another information stream. A merge may include set logic where the result of the merger is the union, intersection, or difference of the two streams. It is through the merge process that functions that have been distributed and differentiated may be later synchronized.

Truncateable: the immutable elements of an information stream may be removed from the stream as a "reader" reads the stream forward and has no further need for the elements that have been read.

Distributable: an information stream or database graph configured according to the principles of the disclosure that may be spread across more than one of any type of electronic infrastructure and inter-connected via a communications channel. The electronic infrastructure may include, but is not limited to: virtual machines, physical servers, other computer servers, electronic devices (e.g., smart phones, tablet computers, desktop computers, laptop computers, netbooks, and the like), nodes, networks, or other computing environments or computing devices. Distributing streams may also be referred to as propagating streams.

Thus any of the entities contained in the information stream, such as a functions and their associated entities, are also streamable, appendable, copyable, mergeable, truncatable, and distributable so that the entities are portable and propagatable across more than one of any type of electronic infrastructure and inter-connected via a communications channel and configured according to the principles of the disclosure.

A subset of one information stream may be copied into a second information stream. That second information stream or the first stream from which it was copied may be merged with, appended to, or otherwise combined with a third stream configured according to the principles of the disclosure. Any information stream embodied according to the principles of the disclosure may be merged with, appended to, or otherwise combined any other information stream embodied according to the principles of the disclosure. In addition, a subset of any information stream embodied according to the principles of the disclosure may be copied to create a new information stream.

An information stream may be stored on a variety of media, including but not limited to a text file, the in memory storage space of a computer processor, a traditional SQL database, a non-traditional database, a graph database, a key-value database, a document database, one or more text files, a message, an XML file, and the like.

When configured according to the principles of the disclosure, streams may be used to may be ordered in a specific way to store a sequence of entities inside a file, such as in a network stream. An information stream may be used to transfer a sequence of entities from one node to another where the streams may then be appended; and streams may be stored in memory so that all entities composing the stream are an in-memory representation such as with java.

Information flow occurs in a system configured according to the principles of the disclosure when one or more entities are appended to an information stream, or one or more information streams are appended, copied, merged, or otherwise combining with other information streams configured according to the principles of the disclosure.

Writing an Entity Such as a Function Entity to an Information Stream

In one implementation of a database configured according to the principles of the disclosure, an entity may be stored in a stream. New entities may be appended to the stream and operations such as create and read may be possible without locating or writing near the location of the original entity in the stream. FIG. 55 is a simplified conceptual view of writing of writing a function entity to an information stream, generally denoted by 5500A. In this example, the changeOwed( ) Function Entity (5505), Membership Relationship Entity 1 (5520), input Relationship Entity 1 (5530), a calcuateChange( ) Function Entity 1 (5525), and an item1Price Entity (5535) are appended to an Information Stream (5540).

Note that to simplify the example and discussion of FIG. 55 (5500), multiple entities may be referenced as a group rather than individually. In addition, the Relations shown for each Form or each Entity may only be a subset of the full set of Relations.

When configured according to the principles of the disclosure, entities in an information stream may be immutable and may not be changed. Instead, entities in an information stream may evolve through the addition of new Relationship Entities. A Relationship Entity may be used to substitute information associated with an entity at one point in time with different information at another point in time. Relationship Entities may be added to an Information Stream to associate new information with an Entity. The set of information, or state of an entity, may be determined by integrating an Entity and any Relationship entities signifying changes to that Entity up to a particular point in time.

FIG. 56A is simplified conceptual overview of writing changes to a person entity and related entities to an information stream, generally denoted by 5600A. In this example, the Person Entity shown in FIG. 55 has been updated to reflect a change in the Name Relation (5610). This update was made by the creation of Substitution Relationship Entity 1 (5645), Name Property Relationship Entity 2 (5650), and String Primitive Entity 2 (5656). As shown in the Figure, these entities are appended to the end of information stream (5640).

FIG. 56B is an example process flow for Creating Information Streams and Reflecting Change in State by the Addition of New Entities, generally denoted by 5600B. The Creating Information Streams and Reflecting Change in State by the Addition of New Entities Process Flow 5600B may include:

Step 5660: Creating an information stream, the stream including at least one entity and at least one relationship entity wherein the relationship entity signifies a change with respect to at least one other entity or signifies a change to at least one other relationship entity, wherein a relationship entity is also a type of entity Step 5670: Reflecting a change in a state of the information stream by addition of a new entity to the information stream, wherein every entity includes immutable data.

Writing an Information Stream to a Database

In systems of today prior to the invention, changes are typically stored outside the database, such as in a log file, and are not typically part of the database. In a database configured according to the principles of the disclosure, changes may be accomplished through the addition of new relationship entities, which themselves signify change and may be stored in the an information stream. An information stream may be stored in a database. Anytime a relationship is created or a new entity instantiated, there may be a state transition in the database configured according to the principles of the disclosure. These relationship entities may reference entities that exist anywhere in the stream, or anywhere in a different stream.

An information stream may be written to a database using the same method as when writing an entity to a database. The Relation Entities on a Form may be variant or invariant. The data associated with the variant Relation Entities of invariant Relation Entities may be primitive or complex. The process for writing Entities is shown in FIG. 42A (4200A) and 42B (4200B).

Complex Entity Stream and Relation Join Stream

In one implementation of a database configured according to the principles of the disclosure, Complex Entity Stream and Relation Join Stream may also be structures that may be used to store entities in a database structure. Complex Entity Streams may store the database content and Relation Join Streams may store the associations, or links, between content in the database.

At least two types of entities may be stored in an example database configured according to the principles of the disclosure to use Complex Entity Streams and Relation Join Streams:

Complex Entities and Primitive Entities. Complex entities may derive from the complex entity Form and may contain the following relations: GUID, date/timestamp, and one or more relations to complex content. Examples of complex entities may include: Form, document, image, or anything that is not a primitive entity.

Primitive entities may derive from the primitive entity Form and may include the following relations: GUID, date/timestamp, and value. A primitive may be a built-in data type in the database. Primitive entities may include but are not limited to: Boolean, number, string, time, and unique. Primitive entities may be of fixed length or variable length. Primitive entity streams may supported by a specific content model.

Complex and Primitive Entity Streams may be written to the an example database configured according to the principles of the disclosure, Complex Entity Streams and Relation Join Streams using a process that may record the entities themselves and all relations of the entity being stored with other entities. This stream writing process may alternate between streams of complex entity content and streams of relational joins that may link the content together. Each stream may be a complex entity itself. For example, FIG. 57 (5700) illustratively shows a Folder that may related to another Folder through a parent to child relation, configured according to principles of the disclosure.

When writing the relationships between a Parent Folder A (5705) (a complex entity) and a Child Folder B (5715), another complex entity) to the Complex Entity Stream and Relational Join Stream, the Folder entity may be written to the streams shown in Table 2:

TABLE 2

Example Parent Folder to Child Folder Relationship Writing to Complex Entity Stream and Relational Join Stream

| Write Stream | Stream Type | Stream Content |
|---|---|---|
| Stream 1 | Complex Entity Stream | Parent Folder A entity (5705) |
| Stream 2 | Relation Join Stream | Parent Folder A Child Relation Entity (5720) |
| Stream 3 | Complex Entity Stream | Containment Relationship Entity (5710) |
| Stream 4 | Relation Join Stream | Containment Relationship Entity Parent Relation entity (5725) |
| Stream 5 | Complex Entity Stream | Child Folder B (5715) |
| Stream 6 | Relation Join Stream | GUID relation for child folder |
| Stream 7 | Primitive Entity Stream | GUID value relation |
| Stream 8 | Primitive Value | GUID value |

The alternating streams may continue until the complex entity may be related to a primitive entity. The primitive entity may be the lowest stream of the entity write process, and may terminate the complex entity stream. Because primitive entities may be supported by a specific content model, the stream writer may parse primitive entities, may convert the entities into bytes, and may write those bytes of content to the database as variable length binary strings in byte chunks of a specific or varied size.

The above example demonstrates writing one Folder relationship and the GUID of a related child into complex and primitive entity stream streams. Each complex entity may include more than one relationship. For example, as shown in the example of writing streams for multiple containment relationships as shown in FIG. 58, generally denoted as 5800, if the Parent Folder A entity (5805) is related to three subfolders (5825, 5830*l*, 5835), Stream 4 through Stream 8 may include the entries shown in Table 3.

TABLE 3

Writing Multiple Parent Folder - Child Folder Relationships

| Write Stream | Stream Type | Stream Content | | |
|---|---|---|---|---|
| Stream 1 | Complex Entity | Parent Folder A Entity (5805) | | |
| Stream 2 | Relation Join Stream | Parent Folder A Child Relation | | |
| Stream 3 | Complex Entity Stream | Containment Relationship Entity 1 (5810) | Containment Relationship Entity 2 (5815) | Containment Relationship Entity 3 (5820) |
| Stream 4 | Relation Join Stream | Parent Relation | Parent Relation | Parent Relation 3 |
| Stream 5 | Complex Entity Stream | Child Folder B (5825) | Child Folder C (5830) | Child Folder D (5835) |
| Stream 6 | Relation Join Stream | GUID Relation for Child Folder B | GUID Relation for Child Folder C | GUID Relation for Child Folder D |
| Stream 7 | Primitive entity Stream | GUID Value Relation for Child Folder B | GUID Value Relation for Child Folder C | GUID Value Relation for Child Folder D |
| Stream 8 | Primitive Value | GUID Value for Child Folder B | GUID Value for Child Folder C | GUID Value for Child Folder D |

The Complex Entity Stream writer and Relational Join Stream writer may complete the full set of writes for the relationships that terminate in a primitive entity stream before moving on to the next relation. FIG. 59 provides an example view of entities that may be required when writing Streams for Multiple Containment and Other Relationships, and is generally denoted as 5900. The example view of a Table 4 as shown in FIG. 59, generally denoted as 5900, illustrates a more detailed display of the process of writing a Folder Form with a multiple relations to Complex Entity Streams and Relational Join Streams in a database configured to principles of the disclosure.

Self-Describing Nature of Databases and Information Streams

In one implementation a system configured according to the principles of the disclosure, the databases may be self-describing and self-contained. Several characteristics that may provide for creation of self-describing and self-contained databases:

The shape of every Form, as well as the data for every Entity may be included as rows of information in a database. The database may then be queried to determine the shape of any Form.

The same database and same tables may also be queried to determine the current values for the properties an Entity of that Form Type.

The data stored in the tables for the entities may be immutable.

Changes to the data stored in the tables may only be accomplished through the addition of new rows corresponding to relationship entities; existing rows may not be modified.

Given these characteristics, new Form types may be added to the database by inserting rows describing that new Form type into the tables. The newly defined Form type may then be instantiated and values may be assigned to its properties. The instantiation and property assignments may be accomplished through the insertion of new rows (records) into the database. The insertion of records for both the shape of the Form and values for the Entity's properties may be accomplished through appending the records onto the appropriate tables in the system.

Table 5 through Table 11 show a simplified implementation using the principles of the disclosure to implement a self-describing, self-contained database.

Table 5. Form Table: may include a listing of the each Form and a corresponding Form GUID (globally unique identifier), timestamp indicating when the record was created, and the name of the Form.

Table 6. Property Table: may include a listing of the properties that may be used for defining Forms and their corresponding GUID, creation timestamp, and name.

Table 7. Primitive Boolean Table: a table that may define the value properties of the Boolean Form type including GUID, creation timestamp, and Boolean value.

Table 8. Primitive String Table: a table that may define the properties of primitive strings, including GUID, timestamp, and String value Table 9. Document Table: a table that may define the properties of a Document, including columns for the invariant relations such as GUID and creation timestamp.

Table 10. Folder Table: a table that may define the properties of a Folder, including columns for the invariant relations such as GUID and creation timestamp.

Table 11. Containment Relationship: a table that may define the properties of a Containment Relationship including columns for the invariant relations such as GUID and creation timestamp, 3-column pointer to an Entity marked as the Parent, and 3-column pointer to an Entity marked as Child.

Multiple tables in the system may be queried to determine additional information about each Form or each Property. For example, in Table 11 Containment Relationship, includes a record with GUID 202. This record shows that the GUID property on the Property Form has its "Is Variant" property set to the Boolean with a value of False. This may indicate that the GUID Property of the Property Form is an invariant relation. The usage of a Property to describe a Property of the Property Form is an example of the self-describing nature of this system.

In two additional examples, Table 9 describes the Document Form and includes one document Entity, and Table 10 describes the Folder Form and includes one folder Entity. Table 6 Form Table may be used to determine that the GUID for the Document Form is 12 and the GUID for the Folder Form is 11. Table 11, Containment Relationship may then be examined for all records where the Parent$Entity column equals 11 to discover all of the properties associated with the Document Form, currently Contents property. Table 11, Containment Relationship may also be examined for all records where the Parent$Entity column equals 13 to discover all the properties of the Folder Form, currently Child Property and Parent Property.

In another example, given a Form GUID of 11 and Entity GUID of 31, the tables may be examined to discover the corresponding Form type, the properties of the Form, and the values that have been assigned to this particular instantiation of the Form. In this example, Table 6 Form Table indicated that a FormGUID of 11 corresponds to a Form Type Folder, EntityGUID of 31 in Table 9 Containment Relationship corresponds to the Parent$Entity Column, and the folder has a Name property with the current value of Folder1.

TABLE 5

Form Table

| GUID Property | Time Property | Form Name |
|---|---|---|
| 11 | (tacor) | "Folder" |
| 12 | (tacor) | "Document" |
| 13 | (tacor) | "Containment Relationship" |
| 14 | (tacor) | "Property" |
| 15 | (tacor) | "Form Form" |
| 16 | (tacor) | "Object" |
| 17 | (tacor) | "String" |
| 18 | (tacor) | "Relationship Object" |
| 19 | (tacor) | "Standard Object" |
| 20 | (tacor) | "Boolean" |

*tacor = Date/Timestamp At Creation Of Record

TABLE 6

Property Table

| GUID Property | Time Property | Property Name |
|---|---|---|
| 21 | (tacor) | "Parent" |
| 22 | (tacor) | "Child" |

TABLE 6-continued

Property Table

| GUID Property | Time Property | Property Name |
|---|---|---|
| 23 | (tacor) | "GUID" |
| 24 | (tacor) | "Time" |
| 25 | (tacor) | "Contents" |
| 26 | (tacor) | "Containers" |
| 27 | (tacor) | "Name" |
| 28 | (tacor) | "Is Variant" |

*tacor = Date/Timestamp At Creation Of Record

TABLE 7

Primitive Boolean Table

| GUID Property | Time Property | Value Property |
|---|---|---|
| 101 | (tacor) | "true" |
| 102 | (tacor) | "false" |

*tacor = Date/Timestamp At Creation Of Record

TABLE 8

Primitive String Table

| GUID Property | Time Property | Value Property |
|---|---|---|
| 73 | (tacor) | "Folder1" |
| 74 | (tacor) | "Document1" |

*tacor = Date/Timestamp At Creation Of Record

TABLE 9

Document Table

| GUID Property | Time Property | | |
|---|---|---|---|
| 51 | (tacor) | ← | document1 object |

*Date/tacor = Date/Timestamp At Creation Of Record

TABLE 10

Folder Table

| GUID Property | Time Property | | |
|---|---|---|---|
| 31 | (tacor) | ← | folder1 object |

*tacor = Date/Timestamp At Creation Of Record

TABLE 11

Containment Relationship

| GUID Property | Time Property | Parent Property | | | Child Property | | | Purpose |
|---|---|---|---|---|---|---|---|---|
| | | Parent$ Form | Parent$ Entity | Parent$ Property | Child$ Form | Child$ Entity | Child$ Property | |
| 1 | tacor | 15 (form Form) | 13 (containment Form) | — | 14 (property Form) | 22 (child property) | — | Adds child property to containment Form |
| 2 | tacor | 15 (form Form) | 13 (containment Form) | — | 14 (property Form) | 21 (parent property) | — | Adds parent property to containment Form |
| 3 | tacor | 15 (form Form) | 16 (object Form) | — | 14 (property Form) | 23 (GUID property) | — | Adds GUID property to object Form |

TABLE 11-continued

Containment Relationship

| GUID Property | Time Property | Parent Property ||| Child Property ||| Purpose |
|---|---|---|---|---|---|---|---|---|
| | | Parent$ Form | Parent$ Entity | Parent$ Property | Child$ Form | Child$ Entity | Child$ Property | |
| 4 | tacor) | 15 (form Form) | 16 (object Form) | — | 14 (property Form) | 24 (time property) | — | Adds time property to object Form |
| 5 | tacor) | 15 (form Form) | 11 (folder Form) | — | 14 (property Form) | 25 (contents property) | — | Adds content property to folder Form |
| 6 | tacor) | 15 (form Form) | 12 (document Form) | — | 14 (property Form) | 26 (containers property) | — | Adds containers property to document Form |
| 7 | tacor) | 11 (folder Form) | 31 (folder object) | 25 (contents property) | 12 (document Form) | 51 (document object) | 26 (containers property) | Adds document1 to folder1 |
| 8 | tacor) | 11 (folder Form) | 31 (folder object) | 27 (name property) | 17 (string Form) | 73 ("folder1" string) | — | adds name to folder1 |
| 9 | tacor) | 12 (document Form) | 51 (document object) | 27 (name property) | 17 (string Form) | 74 ("document1" string) | — | adds name to document1 |
| 01 | tacor) | 15 (form Form) | 16 (object Form) | — | 14 (property Form) | 27 (name property) | — | adds name property to object Form |
| 02 | tacor) | 14 (property Form) | 23 (GUID property) | 28 (isvariant property) | 20 (boolean Form) | 102 ("false" boolean object) | — | Makes GUID an invariant property |

In a system configured according to the principles of the disclosure, entities may be written to a database, a graph database, a database web, a stream, or to other data structures. Each of those data structures may also be self-contained and self-describing. For example, a stream that contains the following may also be self-describing and self-contained: the set of entities that correspond to the rows described above as required for the database to be self-describing; the Form entities that describe a total set of all entities in the stream; and all relationship entities signifying change in the stream.

Distributing, Converging, and Diverging Information Streams

An information stream configured according to the principles of the disclosure may be a collection of entities. These entities may be comprised of variant and invariant relations. The data associated with invariant relations may be written immutably to an information streams as part of the entity with which it is associated. Variant data may also be written immutably to streams, however the variant data associated with the entities may be substituted with new information in Relationship Entities written to an information stream.

Information streams may be created on any system configured according to the principles of the disclosure and implemented on a system of nodes using architecture or on an infrastructure such as that described in relation to FIG. 1, FIG. 2, FIG. 3, and/or FIG. 4. Entities may be added to an information stream through appending, merging, or otherwise combining information streams. A subset of an information stream may be created by copying entities from the information stream into a new information stream. This new information stream is transferred through a communications protocol to any other node, and appended or otherwise merged with any other information stream configured according to the principles of the disclosure and implemented using an architecture or on an infrastructure such as that described in FIG. 1, FIG. 2, FIG. 3, or FIG. 4. Information streams are mutually appendable.

Relationships and other entities that may be added to an information stream may create information differentials that may cause one information stream to diverge from other information streams. Information streams may converge as the number of entities in common between the streams increases as a result of streaming and appending sets of entities.

Information streams are propagatable across of distributed set of data structures such as a database, a graph, or a network of nodes through a variety of communications protocols. FIG. 59 is an example process flow for Converging and Diverging Streams in a distributed network of nodes, generally denoted by 6000. The Converging and Diverging Streams Process Flow 6000 may include:

Step 6010: Creating a first stream at a first node of a plurality of nodes, the first stream comprising a first set of entities including a first relationship entity;

Step 6020: Creating a second stream at a second node of the plurality of nodes, the second stream comprising a second set of entities including a second relationship entity;

Step 6030: Diverging the first stream in relation to the second stream by appending a third set of additional entities to the first stream;

Step 6040: Diverging the second stream in relation to the first stream by appending a fourth set of additional entities to the second stream, whereby the expanding first stream includes information causing asymmetry in relation to the information in the second stream and the second stream includes information causing asymmetry in relation to the information in the first stream;

Step 6050: Converging the first stream and the second stream by appending a subset of one of the streams to the other stream producing a converged stream at a point in time, while the first stream and second stream each continue to simultaneously diverge after the point in time through appending the first set of additional new entities to the first stream and the second set of additional new entities to the second stream.

One of ordinary skill in the art may recognize that a variety of processes may be used to diverge and converge streams.

The divergence and convergence of information streams is critical to achieving cooperative advantage and competitive advantage. The more streams tend toward convergence, the more entities the streams have in common, and the higher the degree of cooperative advantage. Businesses today often seek cooperative advantage when collaborating on activities, such as joint development of a product or other mutually beneficial teaming activities. The more information streams tend towards divergence, the higher the degree of competitive advantage. Businesses competing in the same market have more opportunity to increase their market share by having more information about their customer of client needs.

Consumers of entities and information streams, as may be recognized by one of ordinary skill in the art, may include: a user, device, computing device, process, application, another entity, an information stream that accepts one or more information objects and/or makes use of the one or more accepted information objects. Consumer of entities in an information streams may register interest in an entity and be notified through a variety of processes that a relationship entity referencing the entity of interest has been created, signifying a change in the entity. The entities representing information in a stream may be selectively controlled and disseminated to at least one consumer of the plurality of entities referenced by relationship entities at one or more of the computer-based nodes.

Producers of entities and information streams, as may be recognized by one of ordinary skill in the art, may include: a user, device, computing process, application, another entity, an information stream that creates or causes the creation of one or more information objects.

Information Streams to Graph Database/Database Web

When configured according to the principles of the disclosure, entities, including but not limited to Functions, may be written to information streams, entities may be written to a database, information streams may be written to a database, streams may be distributed across a set of nodes, and entities in databases may be distributed across a collection of nodes. Information in a system configured according to the principles of the disclosure is characterized by the immutability of the data, the innumerable connections between data, the signification of change in a first class object called a relationship. Changes are made by adding new connections or nulling existing connections, typically through the addition of substitution relationships. The rich set of connections between data, the immutability of the data, the capturing of change in relationship entities provide for creation of a distributed graph database, or database web. The graph may expand continuously by adding new entities and the linkages intrinsic to the new entities.

State Changes

An alteration to an entity in the system may modify the entity state. Adding a relation, populating a function output, creating a membership relationship, and populating a variable may all be examples of state changes in the system. One of ordinary skill in the art may recognize that many other system processes would result in state changes.

Stream Convergence and Divergence

FIG. 61 provides an exemplary process flow diagram of the steps for covnergening and diverging streams containing immutable data, generally denoted as 6100. The steps shown in FIG. 61 include:

Step 6110: Creating a first stream at a first node of a plurality of nodes, the first stream comprising a first set of entities including a first relationship entity;

Step 6120: Creating a second stream at a second node of the plurality of nodes, the second stream comprising a second set of entities including a second relationship entity;

Step 6130: Diverging the first stream in relation to the second stream by appending a third set of additional entities to the first stream;

Step 6140: Diverging the second stream in relation to the first stream by appending a fourth set of additional entities to the second stream, whereby the expanding first stream includes information causing asymmetry in relation to the information in the second stream and the second stream includes information causing asymmetry in relation to the information in the first stream Step 6150: Converging the first stream and the second stream by appending a subset of one of the streams to the other stream producing a converged stream at a point in time, while the first stream and second stream each continue to simultaneously diverge after the point in time through appending the first set of additional new entities to the first stream and the second set of additional new entities to the second stream.

Representing Functions as Streams

FIG. 62 provides an exemplary process flow diagram of the steps for representing functions as streams containing immutable data, generally denoted as 6200. The steps shown in FIG. 62 include:

Step 6201: Define a uniform schema for a plurality of functions and data, wherein the plurality of functions and the data each have a state and a structure.

Step 6202: Define the plurality of functions and the data uniformly according to the schema.

Step 6203: Transform the schema, the plurality of functions, and the plurality of data into at least one first stream of entities, each entity containing immutable data.

Step 6204: Store the at least one first stream in a tangible storage medium; wherein the combination of the schema, the plurality of functions, the data, and state, and any structure is portable and any change to the combination is synchronizable within one computer system or across a plurality of computer systems, and wherein the state and the structure of the plurality of the functions and the state and the structure of the data are maintainable according to the schema as they occur through time within one computer system or across a plurality of computer systems.

Step 6205: Produce output by at least one of the plurality of functions, wherein the output comprises data that according to the schema comprise one or more functions.

Step 6206: Produce output by at least one of the plurality of functions, wherein the output comprises data that according to the schema represent at least one change that modifies the structure, the state or operability of at least one of the plurality of functions.

Step 6207: Propagate the at least one first stream within one computer system or across a plurality of computer systems.

Stream Computing Engine

When the system is executing a function, the stream computing engine may control the flow of information based on change events that reflect state changes. An illustrative overview of one implementation of the stream computing engine is shown in FIG. 63, generally denoted as 6300.

In this example implementation, the stream computing engine (6335) may control the flow of function outputs and inputs based on state changes that are captured as change events (6315). When a variable state is changed, such as an update to a function output variable and a new relationship added (6305) or a new entity added (6310), a change event (6315) may be triggered and the stream computing engine (6335) may dispatch actors (6330) to append the changed entity to a stream (6330). The stream may be considered a queue and the queue may be consumed (6315). After consumption, the entity consumed from the stream may be made available to other system functions or it may be discarded.

One or more queues may control the flow of changed entities from one function to another. In another implementation of a system configured according to the principles of the disclosure, two queues may be used as shown in exemplary FIG. 64, generally denoted as 6400. FIG. 64 includes:

Potential Queue (6405)
Runnable Queue (6410)

When a function is running and a variable, such as but not limited to an input or output, is updated, a change event may be initiated for that variable. The stream computing engine may "listen" for those change events. When a change event occurs for a variable, the stream computing engine may retrieve the list of functions that may be consumers of the variable, and add the function reference to the potential queue. A process in the system may consume the potential queue and determine whether the functions referenced in the queue may be executed (based on requirements specified in the function or other system requirements). If the function may be executed, a reference to the function may be added to the Runnable Queue, and the function reference may be cleared from the Potential Queue. If the function cannot be executed, the function reference may clear from the Potential Queue. The Runnable Queue may then be consumed and the runnable functions executed.

One of ordinary skill in the art may recognize that a variety of names other than or in addition to "potential queue" and "runnable queue" may be used for the queues. In addition, more or fewer queues may be used to optimize the processing of functions.

Access Control in an Organic Computer Program

In one implementation of a system configured according to the principles of the disclosure, actors may require a Persona before access to any system object(s) or resource(s) can be granted. The Persona may then provide for access to be granted through the Access Collection.

Using the Access Collection component of a system configured according to the principles of the invention, a persona may be granted access to the one or more objects and to the properties associated with the object that is the membership target as well as its information set, any other objects shared with it, and any of the properties of either the information set of other object. These possible access targets may also be referred to as Access Points. Access specified using the Access Collection component of a system configured according to the principles of the invention may be fine-grained.

Below is a sample listing of access rights, sometimes referred to as permissions, that may be specified as part of the access collection for a persona. One skilled in the art may recognize that some implementations may apply alternate, additional, or fewer access rights:

Read: the ability to view an object
Write: the ability to edit an object
Delete: the ability to delete or negate an object
Create: the ability to generate an object Each access specification may also include the following two additional characteristics, or properties, that may be independently activated or deactivated:

Extend or Share: the ability to share a subset of the access rights an access provider has on the object with an access recipient. For example, if an access provider has the read access and the extend property is active, that access provider may grant read access to another access recipient.

Evolve: the ability to automatically share with an access recipient a snapshot, subset, or full collection of previous, current, and future versions of an object. For example, if an access provider grants read access for a document to an access recipient, the access provider may specify using the evolve property whether the recipient may be granted access to the current version of the document only, or whether the access recipient may be automatically granted access to all future versions of the document.

Any persona may be designated as an access recipient in a system configured according to the principles of the invention, including but not limited to personas created for groups, users, functions, tasks, derived personas, and the like.

After a persona is created, the access recipient may be granted access to the information set associated with one or more personas and/or functions associated with the membership target, as well as other objects and information shared with the membership target. A persona may share information directly with any other persona or function. After sharing information with a persona or function that has a plurality of members, such as a group, a system configured according to the principles of the invention may create and grants access to the shared information with all members of the membership target.

The Access Provider need not be aware of the rights the access recipient may or may not already have to an object. Multiple Access Providers may designate different access rights for the same object for the same access recipient. When determining access rights in a system configured according to the principles of the invention, all applicable access rights may be reviewed and either the broadest, the strictest, or some combination may be applied. Additionally, an access provider hierarchy may also be applied and allow the access rights to be expanded or limited based on grants higher in the authority hierarchy. For example, suppose a Project Manager for TaskA constraints access to Report1 to MemberA such that MemberA may not access, read, or write Report1. Suppose also that a member of TaskA provides read and write access to Report1 to MemberA. A system configured according to the principles of the invention may selectively apply the access restrictions of the project manager and override the access granted by the Task member. This may be useful when creating a Task in a system where a range of confidential and non-confidential information may be required to complete the task, but only certain users may need access to the confidential information. For example, if a task requires creation of a company annual report, it may only be appropriate for a subset of members of the task to have access to revenue and profitability information by client.

An access recipient may have multiple access rights to an object from multiple access providers. If one access provider revokes some or all of the granted access rights, but the same access rights were granted by another access provider, the access recipient may retain those access rights. The access rights may not be fully revoked until all access providers providing the same access right revoke the specified access right. One of ordinary skill in the art may recognize that in some implementations, it may be beneficial to revoke rights provided by multiple access providers if any one, a specified number, or a specified percentage of the access providers revokes the right. Other implementations may rely on an access provider hierarchy to determine when revocation of access rights supersedes other grants of access rights.

In an exemplary environment for implementing principles of the disclosure, when a persona is created to reflect membership in a Group, the access recipient of the persona may, through a series of functions, be granted access to all of the resources that the Group persona has as part of its Access Collection.

Fine-Grained Access Control

Systems configured according to the principles of the invention may also be used to assign fine-grained access controls. The controls may be applied to any object in the system, as well as any property of any object, including but not limited to the information set, personas, properties of information and personas, and the like Extension and Access Derivation When an Access Recipient is granted rights to access an object in a system configured according to the principles of the invention, the ACL may designate whether the Access Recipient may share access with other Access Recipients by extending all or part of its access rights to other Access Recipients. For example, suppose Persona X is given Read and Write access to a file. If Persona X has an extension access right for the file, it may then grant Read access to the same file to Persona Y. This ability for a user to give some or all of their permissions to another persona may be referred to as Extension.

Access derivation in a system configured according to the principles of the invention may be accomplished using extension. When a persona extends a subset of its access rights, the access rights of the Access Recipient Persona derive from the access rights of the Access Provider Persona. In one implementation of a system configured according to the principles of the invention, the access granted to a recipient may be derived from (i.e., be a subset of) the access rights of the Access Provider. For example, a persona with read only permissions to a document may typically not be able to grant another persona write access to that document.

Access Graph

The process of granting access rights that are a subset of the access rights of the access provider may result in the creation of a graph of derived access. In some implementations, this graph may be referred to as a tree or hierarchy of derived access. This access control graph may be distributed within a single system or across a plurality of systems, including but not limited to those shown in FIG. 1 (100), FIG. 2 (200), and FIG. 3 (300). One of ordinary skill in the art may recognize that the distribution of access control across multiple systems configured according to the principles of the invention may take on many different architectures.

In one implementation of the architecture shown in FIG. 2 (200), the system may include a series of virtual networks distributed across a collection of virtual machines owned or used by different companies and organizations, all connected through a central hub. In this example, access control graph is layered along with the identity graph. As identity is derived and distributed across systems and nodes, the distributed identity can then share its access with other identities on the distributed system.

For example, suppose persona1 on network1 was invited to join a group on network2, and child persona2 derived from persona1 as a result of membership. Child persona2 may then share access granted to it by other personas on network2 with zero or a plurality of access recipients on network2.

This access control graph may then continue to be derived in the distributed systems configured according to the principles of the invention. The invention may also be used to preclude further derivation of access control at any node in the access graph.

These intersections of the access graph and identity graph may meet auditability requirements not possible with today's systems. Because access to one or more access points is provided by deriving a subset of the access of the access provider persona, determining which persona provided access to another persona, when the access right was created, and the specific access granted is possible for every object in a system configured according to the principles of the invention. For example, suppose persona Sam.Acme.BizDev and Ted.Acme.BizDev were granted read and share access to sensitive documents containing a summary of partner negotiations on a $1 billion contract by persona Susan.Acme.BizDev. Suppose further that the document was leaked to a competitor. The company can easily review the graphs of derived identity and the graphs of derived access to see if one of the three personas with access to the documents granted access to any other users. The company can determine the listing of users with access to the documents and more efficiently conduct activities to identify which user may have inadvertently or purposefully leaked the document.

Application of the ACIM to Classification and Role-Based Access Control

A system configured according to the principles of the invention may also support access control based on "classifications." The classification approach may begin with a pre-defined grouping of access rights that reflect the desired management and handling and/or allowable interactions with of a specific set of access points. In a classification-oriented implementation of the invention, the Access Recipients and the Access Points may be classified on the same scale, or the Access Recipient scale may be mapped to the Access Point scale. For example, a group of files classified as '2' could only be accessed by Access Recipients with a classification of '2' or higher, or a group of files classified as '6' can only be accessed by Access Recipients with a classification of '6' or higher.

An implementation of a system configured according to the principles of the invention that supports role-based access control may include groupings of access rights based on specifications for a group of personas expected to operate in a similar manner or perform similar functions. For example, an Administrator role may be assigned to a group of personas who can assign read and write access to objects for other personas. In this example, a group of Access Rights may be automatically assigned to personas who become members of the Administrator Group. The access extension and derivation functionality may also support role-based security in that personas with an Administrator Role may grant a subset of their access rights to other personas.

WORKING EXAMPLES

Reduction to Practice

This system and method for structuring and interpreting organic computer programs may be used as a platform on which a variety of software applications may be built and connected, delivered with or without a graphical user interface, using tools such as Java, Flash, HTML, and the like. Exemplary implementations of a software application delivered through a web interface and internet communications protocol that creates, stores, manages, and retrieves functions in a workflow using forms, entities, relations, and relationships as information streams and in databases expressed as functional dependency graphs configured according to the principles of the disclosure are described in this section. The primary exemplary interfaces described include:

Interfaces and processes to add functions and member functions to create a workflow Interfaces to add inputs and outputs to functions Interfaces to wire outputs of one function to inputs of another function Interface to assign personas that are functions associated with the actions of a user as member functions Interface to modify functions after processing has initiated, Interface to distribute tasks across multiple databases The listing above describes a number of examples of using an interface to create new function entities and other entities associated with functions, including but not limited to: inputs, outputs, member functions, member variables, and the like that may result from user interaction with a graphical user interface (GUI). The system that underlies the GUI that is configured according to the principles of the disclosure may write each of those entities to an information stream according to the process flow for creating Information Streams and Reflecting Change in State by the Addition of New Entities in 2900, which may include writing the entities in the information stream to a database according to the process flow for writing entities to a database.

One of ordinary skill in the art may recognize that any number of functions and workflows may be developed using a system configured according to the principles of the disclosure, any number of software applications may be developed to power a web interface; user interface for a mobile device such as a cell phone, netbook, or tablet computer; an interface to a computer desktop application; and the like.

One of ordinary skill in the art may also recognize that the Figures illustrating the interface features, organization of elements on an interface screen or page, inclusion of specific elements, use of a specific language, and naming of elements are exemplary; many variations of the provided examples are possible. These figures are designed to demonstrate how a system configured according to the principles of the invention may enable the functionality required for the interface to function. Any number of additions, substitutions, deletions, reordering, and renaming may be possible and the interface may still be enabled by the invention.

FIG. 65 through FIG. 100 are exemplary illustrations of graphical user interfaces (GUI) configured according to the principles of the disclosure. The GUIs may represent functionality (i.e., software components executed by appropriate hardware) that requests user input, translates the input into functions and other entities that may instantiate from Forms created using the Forms Language described herein, may instantiate required relation entities and relationship entities, and may provide appropriate outputs. One of ordinary skill in the art may recognize that many other implementations of function and workflow creation interface are possible. The Figures showing graphical user interfaces (including FIGS. 65-100) may also represent block diagrams of software components embodied in a storage medium that when executed by an appropriate computing device produce the respective graphical user interface and may display updates thereto and receive inputs from a user. The Figures showing graphical user interfaces (including FIGS. 65-102) may also represent steps for constructing the various constructs described by the respective Figures and associate description, including but not limited to: entities including Functions, Member Functions, input, outputs, member variables, personas, relationship entities, Forms, streams, and other constructs described herein.

One of ordinary skill in the art may recognize that this implementation is exemplary and many alternate implementations are possible. For illustrative purposes, the figures included in this section provide one example of the use of a GUI to create a workflow that reflects the tasks that may be associated with a patient visit to a doctor. Below is a summary of the tasks, inputs, outputs, and interpreters:

Workflow Name: Doctor Visit
Workflow Inputs: Appointment
Workflow Outputs: Specialist Referral or Diagnosis
Task: Nurse Exam
Task Inputs: Appointment
Task Outputs: Patient Vitals
Task: Doctor Exam
Task Inputs: Patient Vitals
Task Outputs: Referral or Diagnosis A view of an exemplary interface displaying the Doctor Visit workflow after completion of the above activities is provided in FIG. 65, generally denoted as 6500. The steps performed according to principles of the invention and used to create and modify the workflow are described in the sections that follow and in regards to exemplary FIGS. 66 through 101.

In describing user interactions with the interface, typical computer mouse actions are specified, such as:

Click: press a key on a computer mouse, tap a touch pad, or other similar action to select the item the pointer is hovering over, Drag-and-drop: press a key on a computer mouse, tap a touch pad, or other similar action while hovering the mouse pointer over an item in the interface to select it, with the mouse key still depressed or without lifting finger from touchpad, move the mouse or finger to move the item in a proportional manner on the screen, release the mouse key or lift finger from touchpad to fix the item being moved to the same location on the screen as the pointer.

One of ordinary skill in the art may recognize that numerous other equivalent actions such as mouse, touchpad, tablet gestures, or mobile interface gestures may be performed to select, drag and drop, or move items in a user interface.

Accessing the System

In an example web interface configured according to the principles of the invention, a user may access and login to the system. FIG. 66 is an illustrative graphical user interface showing an exemplary Login page for a web application built on a system configured according the principles of the disclosure, generally denoted by reference numeral 6600. A user may access the login page similar to the one shown in FIG. 66 using an internet or mobile device browser such as Microsoft Internet Explorer, Mozilla Firefox, Google Chrome, and the like. The Login page (6600) may include:

A header section (6605): a header section typically exists across all pages in a web site, may display a logo or other identifier, list the Company or Organization Name and a Tag Line, provide links to general pages such as about, contacts, help, for more information, and the like.

A menu/navigation bar (6610): a menu/navigation bar typically includes elements to navigate throughout a web application.

A body section (6615): a body section of a web page typically includes the content, controls, elements, and other features that provide the primary functionality for a page.

A footer section (6625): a footer section on a web typically includes other general content and links that are less important, such as copyright information, link to a privacy statement, user information, and the like.

After accessing the login page (6605), the body section (6615) of this page may include another section (6620) with controls that may allow entry of user name and password to login to the system.

Example Application Home Page

After entering a valid username and password in the area shown in FIG. 66, a user may access a main page for an application built on a system configured according to the principles of the disclosure. FIG. 67 is an illustrative graphical user interface showing an exemplary interface for a web application built on a system configured according the principles of the disclosure, generally denoted by reference numeral 6700. This Application Home Page 6700, and any pages accessed after logging in to the web application, including those shown in FIG. 68 through FIG. 102, may include the following sections:

- A header section (6705): a header section typically consistent across all pages in a web site, may display a logo or other identifier, list the Company or Organization Name and a Tag Line, provide links to general pages such as about, contacts, help, for more information, the name of the network or node with which the page the user is viewing is associated, link or button to logout of the application, and the like.
- A menu/navigation bar (6710): a menu or navigation bar may include additional links that when clicked, may display to the user other pages of the application.
- A secondary menu/navigation bar (6725): a secondary menu or navigation bar may include additional links specific to the page being accessed that when clicked, may open popups or display to the user other pages of the application.
- A body section (6715): a body section of a web page typically includes the content, controls, elements, and other features that provide the primary functionality for a page.
- A footer section (6720): a footer section on a web typically includes other general content and links that are less important, such as the copyright information, link to a privacy statement, the name of the user logged in and accessing the page, and the like.
- A Personal Folders section (6730): A section of the page that may display a file explorer view of the user's documents organized into folders and subfolders, inbox containing messages sent to the user, an outbox containing message sent by the user, user blogs, user contacts, user photos organized into folders and subfolders, and user conversations are displayed. The user may click on the triangle to the left of any of the elements in the Personal Folders section (6730) to show an expanded view of the contents. For example:

Clicking on a triangle or other icon to the left of My Documents or clicking on My Documents directly in the Personal Folders Section (6730) may:

- Show an indented list of subfolders related to the My Documents Folder in the Personal Folders section (6730). These subfolders, as well as the My Documents Folder, may be entities instantiated from the Folder Form (2300) and associated with the My Documents Folder through Containment Relationship Entities instantiated from the Containment Relationship Form (2400).
- Show a list of documents related to the My Documents Folder in the List Pane (6740). The documents may be related to folders through Containment Relationship Entities instantiated from the Containment Relationship Form
- Show a set of action buttons that may be used to perform activities specific to folders or files in the Action and Details Pane (6745). This pane may also show information related to a document entity or folder entity folder, such as name, description, date created, and the like.

Clicking on a triangle or other icon to the left of My Inbox or clicking on My Inbox directly in the Personal Folders Section (6730) may:

- Show an indented list of Inbox relations in the Personal Folders section (6730). These inbox relations may point to Folders through Containment Relationship Entities instantiated from the Containment Relationship Form.
- Show in the List Pane (6740) a list of message entities related to a folder related to a selected Inbox relation. The message entities may be instantiated from the Message Form (3300) and related to the folders through additional Containment Relationship Entities instantiated from the Containment Relationship Form.
- Show a set of action buttons that may be used to perform activities specific to messages in the Action and Details Pane (6745). This pane may also show information related to a message, such as sender, recipient, text of the message, and the like.

Clicking on the triangle to the left of My Outbox in the Personal Folders Section (6730) may:

- Show an indented list of Outbox relations in the Personal Folders section (6730). These outbox relations may point to Folders through Containment Relationship Entities instantiated from the Containment Relationship Form (2400).
- Show in the List Pane (6740) a list of message entities related to a folder related to a selected outbox relation. The message entities may be instantiated from the Message Form (3300) and related to the folders through additional Containment Relationship Entities instantiated from the Containment Relationship Form (2400).
- Show a set of action buttons that may be used to perform activities specific to messages in the Action and Details Pane (6745). This pane may also show information related to a message, such as sender, recipient, text of the message, and the like.

- A Group Folders section (6735): A section of the page that may display a file explorer view of the content related to Functions, Tasks, Workflows, and Group entities available the user. The Function, Task, Workflow, and Group entities are instantiated from either the Function form or a form that derives from the Function Forms. Those Forms may include relations that link other entities, such a member functions, inputs, outputs, document(s), folder(s), inbox(es), and outbox(es) using Relationship Entities.

A user may click on a triangle or other icon to the left of any Function, Task, Workflow, or Group name or click on any name directly in the Group Folders Section (6735) to expand the file explorer display to include the following:

- For a Single Task or Function: Documents, Inputs, Outputs, Inbox, and Outbox.
- For a Function with member functions or a Workflow: Member Functions, Documents, Inputs, Outputs, Inbox, and Outbox
- For a Group: Documents, Inbox, and Outbox Clicking on a triangle or other icon to the left of any of the Documents, Inputs, Outputs, Inbox, and Outbox, or clicking on the item directly in the Group Folders Section (6735) may display an indented list of items related to the icon or name that was clicked.

Additionally, the List Pane (6740) will display a list of related items. For example, accessing Documents will display a list of documents related to the clicked item through Containment Relationship Entities. Accessing the Inbox or Outbox will display a list of messages related to the clicked item through Containment Relationship Entities. Accessing Inputs will display any items associated with inputs specified for the selected task, function, or workflow.

Also, a set of action buttons that may be used to perform activities specific to the item selected in the List Pane (6740) will be displayed on the Action and Details Pane (6745). This pane may also show information related to Function, Task, Workflow, or Group, Inputs, Outputs, Documents, Inbox, Outbox selected in the Group Folders Section (6735), such as name, description, date created, message content, task details, and the like.

Accessing Create Workflow Functionality

From the Example Application Home Page 6700, a user may click Create Workflow (6750) in the secondary navigation bar (6725) to create a function, task or a workflow. Note that the name of the user performing the actions described in these sections is typically shown in the footer section (6720) next to "Logged in as:" In this exemplary implementation, user "areese" is logged into the system and creating a workflow. After clicking Create Workflow (6750), the system may display the exemplary workflow creation interface shown in FIG. 68, generally denoted as 6800. Similar to that described for FIG. 67, this page includes the Header (6805), Menu (6810), and Footer (6820) sections. The Body section (6815) contains the Create Workflow Interface, which is divided into two sections: the workflow design pane (6825) on the left and the asset tray pane (6840) on the right. These sections provide an area to construct the workflow, add tasks, specify task parameters such as inputs and outputs, wire tasks together, save the workflow, and other activities. The asset tray (6840) may include resources available to the workflow that can be selected, dragged, and dropped into the workflow design section. The asset tray in FIG. 68 shows only tasks (6845), however one of ordinary skill in the art may recognize that users, personas, files, interpreted functions, and many other assets may be made available in this section.

Create Workflow Task

After clicking the Edit Main Task button shown in FIG. 68, the system may display the Task Actions popup shown in FIG. 69, generally denoted as 6900. Similar to that described for FIG. 67, this page includes the Header (6905) and Menu (6910) sections. The Body section (6915) contains the interface to populate some of the properties of the Task as included in the Task Form, such as descriptive information for the workflow, task status, a start date, an end date, task inputs, task outputs, and task description. One of ordinary skill in the art may recognize that many other task relations could be included or removed from this popup. The Task Action popup shown in FIG. 70, generally denoted as 7000 illustrates the creation of an example Doctor Visit Task, with information provided in the body (7015). In this example, a Doctor Visit Task is initiated.

Add Inputs and Outputs to a Task/Workflow

To specify an input to be associated with the input relation of the Doctor Visit workflow, the user may click the Add Input on the menu bar (7010) in the Task Action popup shown in FIG. 70. The system may display the Relation Actions popup for Inputs as shown in FIG. 71, generally denoted as 7100. The user may enter a name and other information for the Input in the body section (7115). FIG. 72, generally denoted as 7200, provides an example of an Appointment input for the Doctor Visit task. This Input is a Relation on the Doctor Visit Task. The user clicks Save in the menu bar (7210) to save the specified input. A user splits the Input relation of a task by adding more than one input.

To specify an output to be associated with the output relation of the Doctor Visit task, the user may click the Add Output on the menu bar (7010) in the Task Action popup shown in FIG. 70. The system may display the Relation Actions popup for Outputs as shown in FIG. 73, generally denoted as 7300. The user may enter a name and other information for the Output in the body section (7315). FIG. 74, generally denoted as 7400, provides an example of a Diagnosis output for the Doctor Visit task. This Output is a Relation on the Doctor Visit Task. The user clicks Save in the menu bar (7410) to save the specified input. A user splits the Output relation of a task by adding more than one input.

Add Member Functions to the Doctor Visit Task

An exemplary illustration of an interface to add a member function to a task is provided in FIG. 75, generally denoted as 7500. A user may add a member function to the Doctor Visit Task clicking the New Task element (7545) in the Asset Tray (7540), dragging the New Task element (7545), and dropping it (7575) onto the Workflow Design pane (7525).

After dropping the New Task element (7575) into the Workflow Designer pane (7525), the Task Actions popup as shown in FIG. 69 is displayed, generally denoted as 6900. Note that this pop up interface is the same as that used to specify descriptive information, inputs, and outputs for the main task/workflow. Information for an example Nurse Exam member function is shown in FIG. 76, generally denoted as 7600. Inputs and outputs to the member function would be added using a process similar to that shown in FIG. 73 and FIG. 74 and described in the corresponding text. An example of the updated Doctor Exam workflow design after adding the Nurse Exam member function is shown in FIG. 77, generally denoted as 7700. FIG. 77 shows a visual representation of the Nurse Exam member function added (7740) to the Doctor Visit task.

A user can add a Doctor Exam member function to the Doctor Visit Task using the same process as described for adding the Nurse Exam member function and shown in FIGS. 75, 76, and 77. As shown in FIG. 7500, the user would click the New Task element (7545) in the Asset Tray (7540), drag the New Task element (7545), and drop it (7575) onto the Workflow Design pane (7525). After dropping the New Task Element, the Task Actions popup as shown in FIG. 69 is displayed, generally denoted as 6900. Note that this pop up interface is the same as that used to specify descriptive information, inputs, and outputs for the main task/workflow. Information for an example Doctor Exam member function is shown in FIG. 78, generally denoted as 7800. Inputs and outputs to the member function would be added using a process similar to that shown in FIG. 73 and FIG. 74 and described in the corresponding text. An example of the updated Doctor Visit workflow design after adding the Doctor Exam member function is shown in FIG. 79, generally denoted as 7900. FIG. 79 shows a visual representation of the Doctor Exam member function added (7945) to the Doctor Visit task.

Wiring Parent Task Inputs to Member Function Inputs

After defining inputs and outputs to the Doctor Visit Task and any member functions, users may wire the inputs to or outputs from one task or member function to the inputs or outputs of another task or member function. In addition to wiring member task outputs to member task inputs, the inputs to a parent task may be wired as inputs of member tasks, and the outputs of a member task may be wired to the outputs of the parent task.

The process of wiring the input of the Doctor Visit Task (the parent task) to the input of the Nurse Exam member function is initiated by the user clicking the Main Task Inputs (7930) arrow as shown in FIG. 79 and dragging it on top of the Nurse Exam member function (7940). The user may then release the click to drop the Main Task Inputs (7930) onto the Nurse Exam (7940). After dropping, the system may display the Task Actions popup shown in FIG. 80, generally denoted as 8000. In FIG. 80, the Task Action Popup (8005) is divided into two sections, the section on the left displays the possible sources of the input or output, in this case the Appointment input (8020) from the Main Task inputs (8010), the section on the right displays the possible destinations for the input or output, in this case the Nurse Exam member function (8015) Input Appt-info (8025). The user may click "appointment" (8020) under "Flows From" (8010) and may click "Appt-info" (8025) under "Flows to" (8015) to wire the main task inputs from the Doctor Visit Task to the Nurse Exam member function Input. The user may click the Save button in the menu bar (8010) to save the wiring. Note that throughout a workflow, the names of output variables are not typically required to be the same as the names of the input variables to which each are wired. This example shows only a single source and a single destination, but other examples may include multiple inputs and outputs. The user specifies that the Appointment Input (8020) is wired to the Appt-info input (8025) by clicking the circle to the left of each. After clicking Save in the menu bar (8010), the system creates a relationship linking the main task input to the nurse exam task input.

In the example shown in FIG. 80, the "Appointment" variable under "Flows From" could be renamed "new appointment" and still be wired to "Appointment" under "Flows To." In addition, this "Appointment" input (8020) may be wired to multiple input variables for multiple functions.

After saving the wiring, the system may close the Task action popup and may update the visual display of the workflow as shown in FIG. 81, generally denoted as 8100. In FIG. 81, a line (8165) between the Nurse Exam Task (8140) and Main Task Inputs (8130), provides a visual representation of the wiring.

Wiring Member Function Outputs to Member Task Inputs

Similar to the process used to wire the Doctor visit input to the Nurse Exam Input, a user can wire the output of the Nurse Exam member function to an input of the Doctor Exam member function.

The process of wiring the output of the Nurse Exam member function to the input of the Doctor Exam member function is initiated by the user clicking the Nurse Exam member function (8140) as shown in FIG. 81 and dragging it on top of the Doctor Exam member function (8145). The user may then release the click to drop the Nurse Exam member function (8140) onto the Doctor Exam (8145). After dropping, the system may display the Task Actions popup shown in FIG. 82, generally denoted as 8200. In FIG. 82, the Task Action Popup (8205) is divided into two sections, the section on the left displays the possible sources of the input or output, in this case the Vitals input (8222) from the Nurse Exam member function (8215), the section on the right displays the possible destinations for the input or output, in this case the Doctor Exam member function (8220) Patient Vitals (8230). The user may click "Vitals" (8225) under "Flows From" and may click "Patient Vitals" (8230) under "Flows to" to wire the main task inputs from the Nurse Exam member function Output to the Doctor Exam member function Input. The user may click the Save button in the menu bar (8210) to save the wiring. Note that throughout a workflow, the names of output variables are not typically required to be the same as the names of the input variables to which each are wired. This example shows only a single source and a single destination, but other examples may include multiple inputs and outputs. The user specifies that the Vitals output (8225) is wired to the Patient Vitals input (8230) by clicking the circle to the left of each. After clicking Save in the menu bar (8210), the system creates a relationship linking the Nurse Exam member function output to the Doctor Exam member function input.

After saving the wiring, the system may close the Task action popup and may update the visual display of the workflow as shown in FIG. 83, generally denoted as 8300. In FIG. 83, a line (8370) between the Nurse Exam member function (8340) and Doctor Exam member function (8345), provides a visual representation of the wiring.

Wiring Member Function Outputs to Parent Task Outputs

Similar to the process used to wire the Doctor Visit Input to the Nurse Exam Input and the process used to wire Nurse Exam Output to Doctor Exam Input, a user can wire the output of the Doctor Exam member function to the output of the Doctor Visit parent task.

The process of wiring the output of the Doctor Exam member function to the output of the Doctor Visit parent task is initiated by the user clicking the Doctor Exam member function (8345) as shown in FIG. 83 and dragging it on top of the Main Task Outputs (8335). The user may then release the click to drop the Doctor Exam member function (8345) onto the Main Task Outputs (8335). After dropping, the system may display the Task Actions popup shown in FIG. 84, generally denoted as 8400. In FIG. 84, the Task Action Popup (8405) is divided into two sections, the section on the left displays the possible sources of the input or output, in this case the outputs Diagnosis (8425) or Refer to Specialist (8430) from the Doctor Exam member function (8415), and the section on the right displays the possible destinations for the input or output, in this case the Main Task Outputs (8420) Diagnosis (8435) or Referral (8440). The user may click Diagnosis (8425) under "Flows From" and may click "Diagnosis" (8435) under "Flows to" to wire the outputs from the Doctor Exam member function to the outputs of the Doctor Visit main task. The user may click the Save button in the menu bar (8410) to save the wiring. Note that throughout a workflow, the names of output variables are not typically required to be the same as the names of the input variables to which each are wired. This example shows only a single source and a single destination, but other examples may include multiple inputs and outputs. The user specifies that the Diagnosis output (8425) is wired to the Diagnosis input (8435) by clicking the circle to the left of each. After clicking Save in the menu bar (8410), the system creates a relationship linking the doctor Exam member function output to the Main Task function output.

After saving the wiring, the system may close the Task action popup and may update the visual display of the workflow as shown in FIG. 85, generally denoted as 8500. In FIG. 85, a line (8575) between the Doctor Exam member function (8545) and Main Task Outputs 8535, provides a visual representation of the wiring.

Constructing the Parent Task, Member Functions, and Entities

The user may save the parent task, member functions, inputs, outputs, and wiring at any time by clicking the Save button in the menu bar (8510) as shown in the Workflow Designer Interface shown in FIG. 85. The system implementing principles of the disclosure may then build the functions forms, function definitions, variable forms, variable definitions, variable applications, and relationships and instantiate any associated entities. One of ordinary skill in the art may recognize that the system may build a function definition as soon as the definition is completed, and build the corresponding function application immediately after the definition is built, followed by immediate instantiation of the built function application.

After the system completes construction of the required Forms and Entities, the user may be returned to the File Management Interface as shown in FIG. 86, generally denoted as 8600. The Doctor Visit Work Flow (8640) added to the Group Folders pane (8635) in the lower left side of the page.

Accessing and Assigning Users to Member Functions

After a user designs a workflow, the user can access the workflow. The workflow is not typically (but not necessarily) available to other users in the system unless the designing user has invited those other users to join the workflow or assigned another user a task in the workflow.

Continuing the Doctor Visit example constructed by user, "areese", suppose she wants to assign the Nurse Exam Task to user "smiller" and the Doctor Exam task to user "bsmith".

FIG. 87 shows a File Manager interface view of the user "smiller" if she accesses the system prior to being assigned the Nurse Exam Task, generally denoted as 8700. The footer section (8720) displays that the user logged in is "smiller". Until she is assigned a task, user "smiller" does not see the Doctor Visit Workflow or the Nurse Exam Task folder under Group Folders (8735).

The File Manager interface view for user "bsmith" if he accesses the system before being assigned the Doctor Exam Task would look similar to that shown in FIG. 88. The footer section would display that the user logged in is "bsmith". Until he is assigned a task, user "bsmith" would not see the Doctor Visit Workflow or the Doctor Exam Task folder under Group Folders.

If user "areese" wants to assign "smiller" the Nurse Exam Task and "bsmith" the Doctor Exam ask, she would access the system and access a page similar to that shown in FIG. 88, generally denoted as 8800. User "areese" may complete the following steps:

Step 1: Click to highlight the Nurse Exam task (8850) in the Group Folders section of the page (8835). As shown in the center pane labeled Members (8840), user "Amanda Reese" is initially the only member of the task. The Task Action and Details Pane on the right (8845) may show the general information entered when the task was created.

To invite another user to the Nurse Exam task, user "areese" may then:

Step 2: Click on the Invite Members button at the top of the Task Actions pane (8845) on the right; the Address Book popup shown in FIG. 89, generally denoted by 8900 may be displayed. This popup shows the address book (8905) for user "areese". One skilled in the art may recognize that any number of address books or contact list display and selection formats could be used, as well as manual entry of an access identifier for a user could be implemented.

Step 3: Click on "Sue Miller" in the box labeled "Available" (8920). Username "Sue Miller" is displayed in the box labeled "Selected" (8925).

Step 4: Click the Send Invitations button (8910) to complete the assignment.

The system then creates a membership relationship joining: a persona for user "smiller" as a membership recipient, "areese" as a membership provider, and the Nurse Exam member function as a membership target. Additionally, the system creates a new persona for user "smiller" that reflects the new membership in the Nurse Exam task.

FIG. 90, generally denoted by 9000, shows the updated view of the Nurse Exam task with both Amanda Reese (user "areese") and Sue Miller (user "smiller") assigned to the task in the center Members pane (9040).

Users "areese" would follow similar steps to invite user "bsmith" to join the Doctor Exam task.

Populating Member Function Inputs

After being invited to join the Nurse Exam task, user "smiller" may receive a message in her Inbox requesting acceptance of the invitation, or user "smiller" may be automatically assigned to the task. After being assigned to the Nurse Exam Task, user "smiller"'s Group Folders view may be updated as shown in FIG. 91, generally denoted as 9100. The updated view in FIG. 91 includes the Nurse Exam Task (9140). Note that only the Nurse Exam task is propagated to user "smiller", the entire DoctorVisit parent function is not accessible. This example view also shows the appointment input (9145) to the Nurse Exam task, which is accessible to user "smiller". Note that the content of the appointment input is blank as shown in the center pane (9140).

Streaming Member Function Outputs to Member Function Inputs

After users are assigned to tasks and begin their work, the following may be completed using the stream computing engine as appropriate:

Stream function and member function inputs to the inputs of function and member functions to which each are wired.

Stream function and member functions outputs to the function and member function inputs to which each are wired.

Stream function and member function outputs to the function and member function outputs which each are wired.

Streaming a File as an Input to the Example Doctor Visit Workflow and Nurse Exam Member Function As shown in FIG. 80, the workflow input "Appointment" (8020) of type "file" was wired to the Nurse Exam "Appt-info" member function Input (8025) in the example Doctor Visit Workflow. As shown in FIG. 91, when user "smiller" accessed the Appointment input (9145) in the Nurse Exam member function, a file (9140) for this input was not yet populated.

In this example, suppose user "areese" would like to populate the "Appointment" input for the Doctor Visit parent task. User "areese" could complete this activity as follows:

Step 1: As shown in FIG. 92, generally denoted as 9200, under the Doctor Visit Workflow in the Group Folders pane (9235) on the lower left, click Appointment (9250) under Inputs, the center Contents pane (9240) shows the Appointment Input as not associated with any files.

Step 2: In the Details pane (9245) on the right, User "areese" may click the Assign Value button (9255) under Relation Actions for the Appointment Input. The Resource Selector popup shown in FIG. 93, generally denoted as 9300, may then be displayed.

Step 3: In the Group Folders pane (9325), user "areese" navigates to and clicks the Appt Docs subfolder (9345). The Available Files pane (9330) may display the list of files in the folder. User "areese" may click to select the appointment document (9350), and may click the Accept button (9355) at the top of the Resources Selector popup to save the selection. The system may then instantiate the appointment input variable to contain the appointment file as an input to the Doctor Visit Workflow.

Step 4: Because the Appointment input to the Doctor Visit Workflow was wired as an input to the Nurse Exam task, the system may stream the appointment.docx file to the Nurse Exam task. The next time user "smiller" logs in, the system may display the appointment.docx file as an available input to the Nurse Exam Task as shown in FIG. 94, generally denoted as 9400. The appointment file (9450) is shown as available in the Contents pane (9440).

Adding a File as an Output of the Nurse Exam Task in the Example Doctor Visit Workflow and Streaming it to the Doctor Exam Task In the Doctor Visit Workflow, the Nurse Exam Task output "Vitals" was wired to the Doctor Exam Task Input labeled "Patient vitals". A process similar to that described for populating the Doctor Visit appointment input would be followed to populate the output for the Nurse Exam, which would then flow as input to the Doctor Exam member function based on the wiring of output to input. The input for the Doctor Exam Task was not available immediately after user "bsmith" was assigned to the task and logged in because the Nurse Exam Task was not yet completed. The "Patient Vitals" input to the Doctor Exam Task may be populated after the user assigned to the Nurse Exam Task, "smiller", completes the task by measuring and recording the patient vital information, and uploading a file with the patient information to populate the Nurse Exam Task output "Vitals". After populating the Nurse Exam Task output "Vitals", it may be streamed to the Doctor Exam Task Input "Patient Vitals". This illustrative process may be performed as follows:

Step 1: As shown in FIG. 95, generally denoted as 9500, user "smiller" has not yet populated the patient vital output (9540). User "smiller" first completes the Nurse Exam and records and saves a file with the patient vitals.

Step 2: After recording the patient vitals, user "smiller" may click the Nurse Exam Task in Group Folders, and may click "Vitals" under Outputs (9550). The center Contents pane of the "Vitals" Output is blank (9540).

Step 3: In the Details pane on the right, user "smiller" may click the Assign Value button (9555) under Relation Actions for the Vital Output. A Select File or Folder popup similar to that shown in FIG. 93 may be displayed. User "smiller" would use an interface similar to this to select and add the file with patient vitals information from the location to which she saved it. One of ordinary skill in the art may recognize that the user may save the file to any location on the network, on removable storage, or on a local machine.

Step 4: After selecting and adding the vitals file to the output for the Nurse Exam member function, the system may then instantiate the Vital output variable to contain the vitals.docx file as an output for the Nurse Exam member function. Because the Vital output from the Nurse Exam member function Flow was wired as an input to the Doctor Exam task, the system may stream the vitals.docx file to the linked input on the Doctor Exam task. The next time user "bsmith" logs in, the system may display the vitals.docx file as an available input to the Doctor Exam Task as shown in FIG. 96, generally denoted as 9600. The Vitals file (9650) is shown a available in the Contents pane (9640).

Modifying a Parent Task or Member Function that is part of a Workflow During Run Time by Adding a New Task After a workflow is created and commences, the workflow may be modified by users or the system as it runs. The modification may include population of inputs and outputs, addition of new member functions, inviting new users as member functions, and the like. These modifications change the program and functions during execution.

Continuing the Doctor Visit example, suppose that user "bsmith" decided during the Doctor Exam Task that he needed information about certain elements of the patient's blood before he could complete a diagnosis. User "bsmith" can modify the Doctor Exam member function of the Doctor Visit Workflow to add a "Lab Analysis" task by following/performing the exemplary steps below:

Step 1: In the workflow designer interface shown in FIG. 97, generally denoted as 9700, click to drag a new task (9760) onto the Doctor Visit workflow (9725).

Step 2: Drop the new task (9750) and the Task Details popup shown in FIG. 98, generally denoted as 9800 is displayed. User "bsmith" can provide the task information, specify inputs and outputs as shown in FIG. 98, and click the Save button in the menu bar 9810).

Step 3: To wire the Doctor Exam Task to the Lab Analysis task, user "bsmith" drags the Doctor Exam Task on top of the Lab Analysis Task and drops the Doctor Exam task. After "bsmith" drops the task, the Task Actions popup shown in FIG. 99, generally denoted as 9900, is displayed.

Step 5: To wire the Doctor Exam Task "Refer to Lab" output to the Lab Analysis Task "Lab Referral" input, user "bsmith" may click "Refer to Lab" (9920) under "Flows From" and clicks "lab referral" (9925) under "Flows To". User "bsmith" may then click the Save button in the menu bar (9910) to save the wiring. After clicking Save, the Doctor Exam Task is shown as linked to the Lab Analysis Task as shown in FIG. 100, generally denoted as 10000. The wiring between Doctor Exam output (10045) and Lab Analysis Input (10050) is shown visually through a line (10060).

Step 6: To wire the Lab Analysis Task outputs to the Doctor Exam Task inputs, user "bsmith" would drag Lab Analysis Task onto the Doctor Exam Task and drop the Lab Analysis task. A Task Actions popup similar to that shown in FIG. 99 would be displayed. User "bsmith" would follow a process similar to that described for wiring the 'Refer to Lab" output of the Doctor Exam Task to the "Lab Referral" input as described in Step 5.

Step 7: To wire the Lab Analysis Task lab results output to the Doctor Exam Task lab results input, user "bsmith" may click "lab results" under "Flows From" and click "lab results" under "Flows to". User "bsmith" may then click the Save button to save the wiring. After clicking Save, the Lab Analysis task is linked to the Doctor Exam Task (with a two sided arrow).

Interpreted Functions—Hypotenuse Calculator

The Hypotenuse Calculator example provided in this section illustratively demonstrates the use of an integrated development environment to define, apply, and instantiate interpreted functions, interpreted member functions, variables, and member variables. One of ordinary skill in the art may recognize that any number of interfaces could be used, including but not limited to the following:

A rich internet application interface similar to that shown in regards to FIGS. 65 through FIG. 100, A graphical user interface available on the internet or a computer network. The interface could be prepared using any interface development language, such as but not limited to java, Flash, C#, PHP, and the like.

A custom interface.

A web service or similar type interface.

A text editor.

In this example, the user is using principles of the invention to create the functions to calculate the hypotenuse of a right triangle using the Pythagorean theorem. FIG. 101 provides an Illustration of Pythagorean Theorem to Calculate the Length of the Hypotenuse of a Right Triangle, and is generally denoted as 10100. In this example, the length of the hypotenuse (10105) is calculable based on two functions: the sum of the squares of the side (10010), and a square root function (10115). The steps outlined below provide exemplary pseudocode for one implementation of a system configured according to the principles of the disclosure using functions, member functions, inputs, outputs, and member variables to define, apply, instantiate, and run a hypotenuse function.

Step 1: Create the Form for the Calculate Hypotenuse Function Definition
    private Form buildCalculateHypotenuseFunctionDefinition( ) {

Step 2: Define the basic variables needed for the functions:

```
Form aNumber = VariableDefinition.define("anyNumber",
    Number.getClassForm( )).build( );
```

Step 3: Define the function which executes Groovy code to calculate the square of a number:

```
Form squareFunctionDef = InterpretedFunction.Builder
    .builder("square")
    .inputAsVariable("sqin", aNumber)
    .outputAsVariable("sqresult", aNumber)
    .implementation(Language.GROOVY,
        "outputs.put(\"sqresult\", sqin*sqin)").build( );
```

Step 4: Define a function which executes Groovy code to add two numbers together

```
Form addFunctionDef = InterpretedFunction.Builder
    .builder("add")
    .inputAsVariable("addend1", aNumber)
    .inputAsVariable("addend2", aNumber)
    .outputAsVariable("sum", aNumber)
    .implementation(Language.GROOVY,
        "outputs.put(\"sum\", addend1 + addend2)").build( );
```

Step 5: Define a function which executes Groovy code to calculate the square root of a number:

```
Form squareRootFunctionDef = InterpretedFunction.Builder
    .builder("sqrt")
    .inputAsVariable("sqrtin", aNumber)
    .outputAsVariable("sqrresult", aNumber)
    .implementation(Language.GROOVY,
        "outputs.put(\"sqrresult\", Math.sqrt(sqrtin))")
    .build( );
```

Step 6: Define the function to calculate the hypotenuse:

```
FunctionBuilder.DefinitionBuilder builder = FunctionBuilder
    .define("calcHypotenuse");
    Builder.inputAsVariable("a", aNumber)
    .inputAsVariable("b", aNumber)
    .outputAsVariable("c", aNumber);
```

Step 7: Declare member variables for the output of the two square functions:

```
builder.memberVariableAsVariable("aSquared", aNumber);
builder.memberVariableAsVariable("bSquared", aNumber);
```

Step 8: Declare the member function for squaring side A:

```
builder.memberFunction(FunctionBuilder.apply("squareA",
    squareFunctionDef)
    .input("sqin", "a")
    .output("sqresult", "aSquared")
    .build( ));
```

Step 9: Declare the member function for squaring side B:

```
builder.memberFunction(FunctionBuilder.apply("squareB",
    squareFunctionDef)
    .input("sqin", "b")
    .output("sqresult", "bSquared")
    .build( ));
```

Step 10: Define the member variables for the functions for squaring side A and side B:
    builder.memberVariableAsVariable("cSquared", aNumber);

Step 11: Apply the member function to add the two squared legs together and map its output to the member variable:

```
builder.memberFunction(FunctionBuilder.apply("addAB",
    addFunctionDef)
    .input("addend1", "aSquared")
    .input("addend2", "bSquared")
    .output("sum", "cSquared").build( ));
```

Step 12: Define a member function to get the square root and map its output to the output of the containing function:

```
builder.memberFunction(FunctionBuilder
    .apply("squareRootOfC", squareRootFunctionDef)
    .input("sqrtin", "cSquared")
    .output("sqrresult", "c").build( ));
```

Step 13: Complete defining the calculate hypotenuse function:

```
Form calculateHypotenuseDef = builder.build( );
return calculateHypotenuseDef;
}
```

After defining the function, member functions, and variables to calculate the length of the hypotenuse of a right triangle given the length of the shorter two sides, the function can be applied and instantiated. One example method of instantiating and running the function is provided in the steps below. One of ordinary skill in the art may recognize that there are many options for creating concrete values for the inputs, including but not limited to: requesting a user provide the inputs through a web interface and passing those inputs to the function as parameters, requesting a user provide the inputs through a command line and passing those inputs to the function as parameters, the inputs could be wired from outputs of other functions, etc.

Step 1: Create a method to run the calculate hypotenuse function and build the function definition form:

```
public Number runHypotenuseFunction(int aInput, int bInput) {
    Form calcHypotenuseDefinition =
        buildCalculateHypotenuseFunctionDefinition( );
```

Step 2: Create an application of the Hypotenuse calculation function and its inputs and outputs:

```
Form calcHyp1Application = FunctionBuilder
    .apply("calcHyp1", calcHypotenuseDefinition)
    .input("a", "a1")
    .input("b", "b1")
    .output("c", "c1")
    .build( );
```

Step 3: Instantiate the Hypotenuse calculation function

```
Function calcHyp1 = FunctionBuilder.instantiate(calcHyp1Application)
    .build( );
VariableDefinition a = calcHyp1.getVariable("a");
VariableDefinition b = calcHyp1.getVariable("b");
VariableDefinition c = calcHyp1.getVariable("c");
```

Step 4: Use the passed-in function parameters to set the values of the variables a and b:

```
a.updateCurrentValue(Number.New(aInput));
b.updateCurrentValue(Number.New(bInput));
```

Step 5: Calculate and return the length of the hypotenuse

```
    return (Number) c.getCurrentValue( );
}
```

Integrating Functions with External Services

In one aspect, functions created in accordance with principles of the invention can also interact with data or functions external (i.e., traditionally implemented, prior to this disclosure) to a system utilizing principles of the invention. For example, an application programming interface, a SOAP or REST service, or an RSS feed. One of ordinary skill in the art may recognize that a system constructed to utilize principles of the invention may interact with many other external or third-party services constructed by traditional techniques (i.e., prior to this disclosure). The "Translate" function shown below is an example use of an integrated development environment to define, apply, and instantiate a function, member functions, variables, and member variables that interact with a REST web service (for example) to pass in a phrase in English and receive the phrase translated into Spanish. One of ordinary skill in the art may recognize that any number of interfaces could be used, including but not limited to the following

- A rich internet application interface similar to that shown in FIGS. 20 through FIG. 73,
- A graphical user interface available on the internet or a computer network. The interface could be prepared using any interface development language, such as but not limited to java, Flash, C#, PHP, and the like.
- A custom interface.
- A web service or similar type interface.
- A text editor.

Step 1: Create a Java method to demonstrate the function
```
public void testGoogleTranslate( ) {
```

Step 2: Create a new function form definition which uses REST web services to call the Google translate service.

Form translateDef=InterpretedFunction.Builder.builder("translate")

Step 3: Define variables needed by the Function:

```
.inputAsType("toTranslate", Identifier.getClassForm( ))
.outputAsType("translated", Identifier.getClassForm( ))
```

Step 4: Write the script which executes Groovy code to interact with the REST service:

```
.implementation(
    Language.GROOVY,
        "import groovyx.net.http.RESTClient \n"
        + "import groovy.util.slurpersupport.GPathResult \n"
        + "import static groovyx.net.http.ContentType.URLENC \n"
        + "\n"
        + "apiKey='"+apikey+"' \n"
        + "gTranslate = new RESTClient('https://www.googleapis.com/') \n"
        + "\n"
        + "def resp = gTranslate.get( path : 'language/translate/v2',
        query : [key:apiKey, q:toTranslate, source:'en' , target:'es']) \n"
        + "\n"
        + "outputs.put(\"translated\", "
        + "com.coralnetworks.coraldb.fl.model.primitive.String.Character
        .Identifier.New(resp.data.data.translations.translatedText[0]))")
            .build( );
```

Step 5: Create an application of the Translate Function Definition:

Form translateApp=FunctionBuilder.apply("translate", translateDef)

Step 6: Apply the variable definitions:

```
.input("toTranslate", "testTextEnglish")
.output("translated", "testTextSpanish").build( );
```

Step 7: Create an instance of the function:
Function translate=FunctionBuilder.instantiate(translateApp).build( )

Step 8: Set up the function and pass in the phrase to be translated:

```
translateMe(translate, "Let it snow, let it snow, let it snow");
    return;
}
```

After defining the function, member functions, and variables to call the external service to translate a phrase from English to Spanish, the function can be applied and instantiated. One example method of instantiating and running the function is provided in the steps below. One of ordinary skill in the art may recognize that there are many options for creating concrete values for the inputs and displaying the output, including but not limited to: requesting a user provide the inputs through a web interface and passing those inputs to the function as parameters, requesting a user provide the inputs through a command line and passing those inputs to the function as parameters, the inputs could be wired from outputs of another functions, etc.

Step 1: Create a method to instantiate the translate function:

private String translateMe(Function translate, String phraseToTranslate){

Step 2: Request command line input for the phrase to translate and set variable with result:

String phraseToTranslate=user provided input;

Step 3: Update the variable that stores the phrase to translate:

```
translate.getVariable("toTranslate")
    .updateCurrentValue(com.coralnetworks.coraldb.fl.model.primitive
    .String.Character
    .Identifier.New(phraseToTranslate));
```

Step 4: instantiate and run the Translate function:
translate execute( );

Step 5: Return the translated phrase and print it to the command line:

```
String newphrase = (String)
translate.getVariable("translated").getCurrentValue( ) ;
    System.out.println("== Translated phrase = "+newphrase.trim( ));
    return newphrase;
    }
}
```

Note that the output that is the translated phrase could be wired and propagated to any system configured according to the principles of the disclosure.

U.S. Pat. No. 7,698,346 is incorporated herein by reference in its entirety.

While the invention has been described in this disclosure by way of illustrative examples, those skilled in the art will recognize that the invention can be practiced with modifications and in the spirit and scope of the appended claims. If there are any conflicts between this disclosure and any priority application or document incorporated by reference, then this disclosure governs.

I claim:

1. A computer implemented method for uniformly representing computer program structure as forms so that one or more instances of a computer program are implementable as entity instances of the forms, the method comprising the steps of:
    creating a first function definition as a form and creating a first function application as a form;
    storing the first function definition as a form and the first function application as a form;
    creating a link between the first function application form and the first function definition form;
    transforming the first function application into a subclass of the first function definition, wherein the first function application substitutes a set of properties linked to the first function definition with a set of properties linked to the first function application, and wherein at least one first member of the set of properties of the first function application binds to a variable form that is a subclass of the variable form bound to by at least one first member of the set of properties bound to by the first function definition, so that the first function application invokes the first function definition by linking the first function application to the variable form, wherein any of the sets of properties includes at least one of an input property and an output property; and
    processing instances of the first function application form according to the first function definition by computing instances of variables bound to the first function application,
    wherein the creating steps, the storing steps, the transforming step, and the processing step are performed by a computer or an electronic circuit.

2. The computer-implemented method of claim 1, wherein the at least one first member of the set of properties of the first function application binds to a variable form that is a subtype of the variable form bound to by at least one first member of the set of properties bound to by the first function definition, so that the first function application invokes the first function definition by linking the first function application to the variable form, wherein any of the sets of properties includes at least one of an input property and an output property.

3. The computer-implemented method of claim 1, wherein any of the: creating steps, storing steps, transforming step, and processing step are performable on different computer systems.

4. The computer-implemented method of claim 1, wherein the transforming step is performed by a derivation relationship.

5. The computer-implemented method of claim 1, wherein the linking of a first set of properties to the first function definition is performed by a relationship.

6. The computer-implemented method of claim 1, wherein the linking of a first set of properties to the first function application is performed by a relationship.

7. The computer-implemented method of claim 1, further comprising propagating the first function definition and the first function application within one computer system or across a plurality of computer systems.

8. The computer-implemented method of claim 7, wherein the propagating step comprises a messaging protocol.

9. The computer-implemented method of claim 8, wherein the messaging protocol comprises email, Hypertext Transfer Protocol (HTTP), Transmission Control Protocol (TCP) sockets, language-specific message passing architectures, or software transactional memory.

10. The computer-implemented method of claim 1, further comprising the steps of:
    defining a second function definition form; and
    creating at least one first relation on the second function definition form which links to the first function application form, so that the first function application form defines in part or in whole the implementation of the second function definition form, wherein the one first relation is a subclass of a Member Function relation belonging to a Function Form, wherein the Function Form is the form from which all function forms derive.

11. The computer-implemented method of claim 10, further comprising the steps of:
    inviting a first function form to interpret a second function form by creating a new membership relationship form which links the first function form to the second function form, wherein the first function form is designated by the new membership relationship form as an interpreter of the second function form, wherein the membership relationship form links to the one first relation, wherein the first function form and the second function form are each a subclass of the Function Form, wherein by inviting the first function form to interpret the second function form the first function form becomes a first interpreter of the second function form, the interpreting comprising any of the steps of:

adding at least one input property to the first function application form; wherein the adding links the at least one input property of the first function application form to at least one input variable form, so that the first function application form receives at least one value assigned to at least one instance of the at least one input variable form;

adding at least one output property to the first function application form; wherein the adding at least one output property links the at least one output property of the first function application to at least one output variable form, so that the at least one output variable form varies as a result of the first function application;

adding at least one member function to the first function application form;

adding at least one member function to the second function definition form; and transforming the second function definition form such that its operational capability is expanded by the interpretation performed of the first function application form.

12. The computer-implemented method of claim 10, further comprising the steps of:

inviting a first function to interpret a second function by creating a new membership relationship entity which links the first function to the second function, wherein the first function is designated by the new membership relationship entity as an interpreter of the second function, wherein the membership relationship entity links to a Member Function relation belonging to a Function Form, wherein first function form and second function are each a subclass of the Function Form, wherein the Function Form is the form from which all function forms derive, wherein by inviting the first function to interpret the second function the first function becomes a first interpreter of the second function, the interpreting comprising any of the steps of:

adding at least one input property to the first function; wherein the adding links the at least one input property of the first function to at least one input variable, so that the first function receives at least one value assigned to at least one instance of the at least one input variable;

adding at least one output property to the first function; wherein the adding at least one output property links the at least one output property of the first function to at least one output variable, so that the at least one output variable varies as a result of the first function;

adding at least one member function to an instance of the first function;

adding at least one member function to an instance of the second function; and transforming the second function such that its operational capability is expanded by the interpretation performed by the first function.

13. The computer-implemented method of claim 11, wherein the inviting step includes creating a membership relationship entity form that assigns the first function application to be a member function of the second function definition form.

14. The computer-implemented method of claim 11, wherein the first function application comprises a human-interpreted computer function and wherein each of the interpretation steps result from the actions received from a human or a user.

15. The computer-implemented method of claim 11, further comprising the steps of:

adding an additional function as a second member function to the first function application to add a second interpreter to the first function application thereby creating organic computing in which the first interpreter and the second interpreter collaborate to create the computer program structure through multiple iterations of inviting and interpreting.

16. The computer-implemented method of claim 15, wherein the second interpreter or first interpreter invite additional functions to perform the interpreting steps thereby creating additional interpreters.

17. The computer-implemented method of claim 15, wherein the second member function comprises a human-interpreted computer function and wherein each of the interpretation steps result from the actions received from a human or a user.

18. The computer-implemented method of claim 11, further comprising the step of communicating to any interpreters of the first function application expected inputs of the first function application.

19. The computer-implemented method of claim 11, further comprising the step of communicating to interpreters of the first function application expected outputs of the first function application.

20. The computer-implemented method of claim 11, wherein each input property of the first function application is defined by a form and comprises a class.

21. The computer-implemented method of claim 11, wherein each output property of the first function application is defined by a form and comprises a class.

22. The computer-implemented method of claim 11, further comprising the steps of:

transforming the at least one first function application, the at least one first function definition, the at least one input property, the at least one output property, the at least one input variable, and the at least one output variable into at least one first stream of entities, each entity containing immutable data;

storing the at least one first stream in a tangible storage medium;

wherein any combination of the at least one first function application, the at least one first function definition, the at least one input property, the at least one output property, the at least one input variable, and the at least one output variable is portable and any change to the any combination is synchronizable within one computer system or across a plurality of computer systems.

23. The computer-implemented method of claim 22, wherein the at least one first function application, the at least one first function definition, the at least one input property, the at least one output property, the at least one input variable, and the at least one output variable and the at least one first stream comprise first-class objects.

24. The computer-implemented method of claim 22, further comprising propagating the at least one first stream within one computer system or across a plurality of computer systems.

25. The computer-implemented method of claim 24, wherein the propagating step includes a messaging protocol.

26. The computer-implemented method of claim 25, wherein the messaging protocol comprises email, Hypertext Transfer Protocol (HTTP), Transmission Control Protocol (TCP) sockets, language-specific message passing architectures, or software transactional memory.

27. The computer-implemented method of claim 11, further comprising the steps of:
- creating a second function application from the second function definition form;
- storing the second function application as a form;
- creating a link between the second function application form and the second function definition form;
- transforming the second function application into a subclass of the second function definition, wherein the second function application substitutes a set of properties linked to the second function definition with a set of properties linked to the second function application, and wherein at least one first member of the set of properties of the second function application binds to a variable form that is a subtype of the variable form bound to by at least one first member of the set of properties bound to by the second function definition, so that the second function application invokes the second function definition by linking the second function application to the variable form, wherein any of the sets of properties includes at least one of an input property and an output property;
- linking an output property of the first function application to a first variable; and
- linking an input property of the second function application to the first variable so that the output of the first function automatically flows into the second function.

28. The computer-implemented method of claim 27, wherein the link created between the second function application form and the second function definition form comprises a derivation relationship.

29. The computer-implemented method of claim 27, further comprising the steps of:
- transforming the at least one first function application, the at least one first function definition, the at least one second function definition, the at least one second function application, the at least one input property, the at least one output property, the at least one input variable, and the at least one output variable into at least one second stream of entities, each entity containing immutable data;
- storing the at least one second stream in a tangible storage medium;
- wherein the combination of the at least one first function application, the at least one first function definition, the at least one second function definition, the at least one second function application, the at least one input property, the at least one output property, the at least one input variable, and the at least one output variable is portable and any change to the combination is synchronizable within one computer system or across a plurality of computer systems.

30. The computer-implemented method of claim 29, wherein the at least one first function application, the at least one first function definition, the at least one second function definition, the at least one second function application, the at least one input property, the at least one output property, the at least one input variable, and the at least one output variable, and the at least one second stream comprise first-class objects.

31. The computer-implemented method of claim 29, further comprising propagating the at least one second stream within one computer system or across a plurality of computer systems.

32. The computer-implemented method of claim 31, wherein the propagating step includes a messaging protocol.

33. The computer-implemented method of claim 32, wherein the messaging protocol comprises email, Hypertext Transfer Protocol (HTTP), Transmission Control Protocol (TCP) sockets, language-specific message passing architectures, or software transactional memory.

34. The computer-implemented method of claim 11, further comprising the steps of: defining the description as properties of a function form, so that a user of the system may describe the function form using plain text, so that a user may communicate the intent of the function form to any other member function form or function entity acting as interpreters of the function form, so that the member function or member function form may interpret the first function entity or first function form according to a specification provided by the first description.

35. The computer-implemented method of claim 1, wherein the properties of the first function application override or substitute the properties of the first function definition.

36. The computer-implemented method of claim 11, wherein the interpreting step changes the first function application signature, by altering at least one of: an input, an output, and a form of the second function definition.

37. The computer-implemented method of claim 26, propagating the at least one first stream within one computer system or across a plurality of computer systems, the method further comprising:
- interpreting at least any propagated: first function application, first function definition, second function definition, and second function application to expand using relationships the operational capability of any of the propagated functions; and
- storing the relationships in a third stream to record the expanded operational capability.

38. The computer-implemented method of claim 37, propagating the third stream to synchronize at least one of the first stream and the second stream by appending the relationships from the third stream to at least one of the first stream and the second stream.

39. The computer-implemented method of claim 12, wherein the inviting step includes creating a membership relationship entity that assigns the first function to be a member function of the second function.

40. The computer-implemented method of claim 12, wherein the first function comprises a human-interpreted computer function and wherein each of the interpretation steps results from the actions received from a human or a user.

41. The computer-implemented method of claim 12, further comprising the steps of:
- adding an additional function as a second member function to the first function to add a second interpreter to the first function thereby creating organic computing in which the first interpreter and the second interpreter collaborate to create the computer program structure through multiple iterations of inviting and interpreting.

42. The computer-implemented method of claim 41, wherein the second interpreter or first interpreter invite additional functions to perform the interpreting steps thereby creating additional interpreters.

43. The computer-implemented method of claim 41, wherein the second member function comprises a human-interpreted computer function and wherein each of the interpretation steps results from the actions received from a human or a user.

44. The computer-implemented method of claim 12, further comprising the step of communicating to any interpreters of the first function expected inputs of the first function.

45. The computer-implemented method of claim 12, further comprising the step of communicating to interpreters of the first function expected outputs of the first function.

46. The computer-implemented method of claim 12, wherein each input property of the first function is defined by a form and comprises a class.

47. The computer-implemented method of claim 12, wherein each output property of the first function is defined by a form and comprises a class.

48. The computer-implemented method of claim 12, further comprising the steps of:
transforming the at least one first function, the at least one input property, the at least one output property, the at least one input variable, and the at least one output variable into at least one first stream of entities, each entity containing immutable data;
storing the at least one first stream in a tangible storage medium;
wherein any combination of the at least one first function, the at least one input property, the at least one output property, the at least one input variable, and the at least one output variable is portable and any change to the any combination is synchronizable within one computer system or across a plurality of computer systems.

49. The computer-implemented method of claim 48, wherein the at least one first function, the at least one input property, the at least one output property, the at least one input variable, and the at least one output variable and the at least one first stream comprise first-class objects.

50. The computer-implemented method of claim 48, further comprising propagating the at least one first stream within one computer system or across a plurality of computer systems.

51. The computer-implemented method of claim 50, wherein the propagating step comprises a messaging protocol.

52. The computer-implemented method of claim 51, wherein the messaging protocol comprises email, Hypertext Transfer Protocol (HTTP), Transmission Control Protocol (TCP) sockets, language-specific message passing architectures, or software transactional memory.

53. The computer-implemented method of claim 12, further comprising producing output by at least one of a plurality of functions, wherein the output comprises data that according to a schema represent at least one change that modifies a structure, the state or operability of at least one of the plurality of functions.

54. The computer-implemented method of claim 53, wherein the at least one change comprises a relationship.

55. The computer-implemented method of claim 12, further comprising the steps of: defining a description as properties of the second function, so that a user of the system may describe the second function using plain text, so that a user may communicate an intent of the second function to any other member functions or interpreters of the second function, so that the member functions may interpret the second function according to the specification provided by the description.

56. The computer-implemented method of claim 12, wherein the interpreting step changes the first function application signature, by altering at least one of: an input, an output, and a form of the second function definition.

57. The computer-implemented method of claim 52, propagating the at least one first stream within one computer system or across a plurality of computer systems, the method further comprising:
interpreting at least any propagated: first function application, first function definition, second function definition, and second function application to expand using relationships the operational capability of any of the propagated functions; and
storing the relationships in a third stream to record the expanded operational capability.

58. The computer-implemented method of claim 57, propagating the third stream to synchronize at least one of the first stream and the second stream by appending the relationships from the third stream to at least one of the first stream and the second stream.

59. A computer-implemented method for representing functions as streams containing immutable data, the method comprising the steps of:
defining a uniform schema for a plurality of functions and data, wherein the plurality of functions and the data each have a state and a structure;
defining the plurality of functions and the data uniformly according to the schema;
transforming the schema, the plurality of functions, and the plurality of data into at least one first stream of entities, each entity containing immutable data; and
storing the at least one first stream in a tangible storage medium; and
wherein the combination of the schema, the plurality of functions, the data, any state, and any structure is portable and any change to the combination is synchronizable within one computer system or across a plurality of computer systems,
wherein the state and the structure of the plurality of the functions and the state and the structure of the data are maintainable according to the schema as they occur through time within one computer system or across a plurality of computer systems.

60. The computer-implemented method of claim 59, wherein the uniform schema comprises at least one form, at least one relation, and at least one relationship.

61. The computer-implemented method of claim 60, wherein the at least one form, at least one relation, and at least one relationship comprise at least one of the entities in the at least one first stream.

62. The computer-implemented method of claim 61, wherein the plurality of functions, the data, the structures, a change to the states, the at least one first stream, the at least one form, the at least one relation, the at least one relationship and the at least one entity comprise first-class objects.

63. The computer-implemented method of claim 61, wherein the at least one of the entities in the stream are describable using the same uniform schema.

64. The computer-implemented method of claim 59, wherein each function and each stream are entities defined according to the uniform schema.

65. The computer-implemented method of claim 59, wherein the at least one first stream of entities containing immutable data induces a functional dependency graph.

66. The computer-implemented method of claim 59, wherein the immutable data contained by the entities include at least a globally unique identifier (GUID) and a timestamp recording the date and time of creation.

67. The computer-implemented method of claim 59, wherein any at least one new state and any at least one new structure is discoverable at any point of time of their history within the one computer system or across the plurality of computer systems.

68. The computer-implemented method of claim 59, wherein all new states and all new structures are discoverable at any point of time of their history within one computer system or across a plurality of computer systems.

69. The computer-implemented method of claim 59, wherein each function has at least one of a linked: input, output, member function, and member variable.

70. The computer-implemented method of claim 59, wherein the at least one first stream is appendable to at least one second stream.

71. The computer-implemented method of claim 59, further comprising producing output by at least one of the plurality of functions, wherein the output comprises data that according to the schema comprise one or more functions.

72. The computer-implemented method of claim 59, wherein input to and output from: a human being, groups of human beings, software programs, collections of software programs, dedicated hardware, combined units of hardware, business processes, workflows, member functions, or any combination thereof are implementable as functions according to the schema.

73. The computer-implemented method of claim 59, wherein software programs, collections of software programs, dedicated hardware, combined units of hardware, business processes, workflows, member functions, or any combination thereof are implementable as functions according to the schema.

74. The computer-implemented method of claim 59, further comprising producing output by at least one of the plurality of functions, wherein the output comprises data that according to the schema represent at least one change that modifies the structure, the state or operability of at least one of the plurality of functions.

75. The computer-implemented method of claim 74, wherein the at least one change comprises a relationship.

76. The computer-implemented method of claim 59, further comprising propagating the at least one first stream within one computer system or across a plurality of computer systems.

77. The computer-implemented method of claim 76, wherein the propagating step includes a messaging protocol.

78. The computer-implemented method of claim 77, wherein the messaging protocol comprises email, Hypertext Transfer Protocol (HTTP), Transmission Control Protocol (TCP) sockets, language-specific message passing architectures, or software transactional memory.

79. A computer-implemented method for differentiating and synchronizing functions as streams containing immutable data, the method comprising the steps of:
defining a uniform schema for a plurality of functions and data, wherein the plurality of functions and the data each have a state and a structure;
defining the plurality of functions and the data uniformly according to the schema;
transforming the schema, the plurality of functions, the plurality of data, the plurality of states, and the plurality of structures into at least one first stream of entities, each entity containing immutable data;
propagating the first stream of entities to a second computer system; and
interpreting at the second computer system any one of the propagated functions to expand the operational capability of the any one of the propagated functions,
wherein each of the steps are performed by a computer or an electronic circuit.

80. The computer-implemented method of claim 79, wherein the interpreting step includes modifying the state or structure of any one of the propagated functions.

81. The computer-implemented method of claim 79, wherein the plurality of functions includes any one of a first function definition, a first function application, a second function definition, a second function application, further comprising the steps of:
inviting the first function application to interpret the second function definition form thereby the first function application becomes a first interpreter, the interpreting comprising any of the steps of:
adding at least one input property to the first function application; wherein the adding links at least one input property of the first function application to at least one input variable, so that the first function application receives at least one value assigned to at least one instance of the at least one input variable;
adding at least one output property to the first function application; wherein the adding at least one output property links at least one output property of the first function application to at least one output variable, so that the at least one output variable varies as a result of the first function application;
adding at least one member function to the first function application;
adding at least one member function to the second function definition; and
transforming the second function definition form such that its operational capability is expanded by the interpretation of the first function application.

82. The computer-implemented method of claim 81, wherein the interpreting step changes the first function application signature by altering at least one of: an input, an output, and a form of the second function definition by addition of at least one entity containing immutable data.

83. The computer-implemented method of claim 82, storing the at least one entity containing immutable data in a third stream to record the expanded operational capability.

84. The computer-implemented method of claim 83, propagating the third stream to synchronize at least one of the first stream and the second stream by appending the entities containing immutable data from the third stream to at least one of the first stream and the second stream.

85. A computer program product embodied as software code stored on a computer readable non-transitory storage medium, the software code when read and executed by a processor performs a method for uniformly representing computer program structure as forms so that one or more instances of a computer program are implementable as entity instances of the forms, the method comprising the steps of:
creating a first function definition as a form and creating a first function application as a form;
storing the first function definition as a form and the first function application as a form;
creating a link between the first function application form and the first function definition form;
transforming the first function application into a subclass of the first function definition, wherein the first function application substitutes a set of properties linked to the first function definition with a set of properties linked to the first function application, and wherein at least one first member of the set of properties of the first function application binds to a variable form that is a subclass of the variable form bound to by at least one first member of the set of properties bound to by the first function definition, so that the first function application invokes the first function definition by linking the first function application to the variable form, wherein any of the sets of properties includes at least one of an input property and an output property; and processing instances of the first function application form according to the first function definition by computing instances of variables bound to the first function application.

86. The computer program product of claim 85, wherein the at least one first member of the set of properties of the first function application binds to a variable form that is a subtype of the variable form bound to by at least one first member of the set of properties bound to by the first function definition, so that the first function application invokes the first function definition by linking the first function application to the variable form, wherein any of the sets of properties includes at least one of an input property and an output property.

87. A computer program product embodied as software code stored on a computer readable non-transitory storage medium, the software code when read and executed by a processor performs a method for representing functions as streams containing immutable data, the method comprising the steps of:
  defining a uniform schema for a plurality of functions and data, wherein the plurality of functions and the data each have a state and a structure;
  defining the plurality of functions and the data uniformly according to the schema;
  transforming the schema, the plurality of functions, and the plurality of data into at least one first stream of entities, each entity containing immutable data;
  storing the at least one first stream in a tangible storage medium; and
  wherein the combination of the schema, the plurality of functions, the data, any state, and any structure is portable and any change to the combination is synchronizable within one computer system or across a plurality of computer systems,
  wherein the state and the structure of the plurality of the functions and the state and the structure of the data are maintainable according to the schema as they occur through time within one computer system or across a plurality of computer systems.

88. The computer program product of claim 87, wherein the uniform schema comprises at least one form, at least one relation, and at least one relationship.

89. The computer program product of claim 88, wherein the at least one form, at least one relation, and at least one relationship comprise at least one of the entities in the at least one first stream.

90. The computer program product of claim 87, wherein the plurality of functions, the data, the structures, a change to the states, the at least one first stream, the at least one form, the at least one relation, and the at least one relationship and the at least one entity comprise first-class objects.

91. A computer program product embodied as software code stored on a computer readable non-transitory storage medium, the software code when read and executed by a processor performs a method for differentiating and synchronizing functions as streams containing immutable data, the method comprising the steps of:
  defining a uniform schema for a plurality of functions and data, wherein the plurality of functions and the data each have a state and a structure;
  defining the plurality of functions and the data uniformly according to the schema;
  transforming the schema, the plurality of functions, the plurality of data, the plurality of states, and the plurality of structures into at least one first stream of entities, each entity containing immutable data;
  propagating the first stream of entities to a second computer system; and
  interpreting at the second computer system any one of the propagated functions to expand the operational capability of the any one of the propagated functions.

92. The computer program product of claim 91, wherein the interpreting step includes modifying the state or structure of any one of the propagated functions.

93. The computer program product of claim 91, wherein the plurality of functions includes any one of a first function definition, a first function application, a second function definition, a second function application, the method further comprising the steps of:
  inviting the first function application to interpret the second function definition form thereby the first function application becomes a first interpreter, the interpreting by the first interpreter comprising any of the steps of:
  adding at least one input property to the first function application; wherein the adding links at least one input property of the first function application to at least one input variable, so that the first function application receives at least one value assigned to at least one instance of the at least one input variable;
  adding at least one output property to the first function application; wherein the adding at least one output property links at least one output property of the first function application to at least one output variable, so that the at least one output variable varies as a result of the first function application;
  adding at least one member function to the first function application;
  adding at least one member function to the second function definition; and
  transforming the second function definition form such that its operational capability is expanded by the interpretation of the first function application.

94. The computer program product of claim 93, wherein the interpreting step changes the first function application signature by altering at least one of: an input, an output, and a form of the second function definition by addition of at least one entity containing immutable data.

95. The computer-implemented method of claim 37, wherein functions are represented in a data layer according to the uniform schema and addressed globally, so that a distributed message passing architecture may exist between a sending function and a receiving function, wherein the sending function is the access provider, the receiving function is the access recipient, and each of one or more entities in the first stream is an access point.

96. The computer-implemented method of claim 95, wherein the global addressing is performed by referencing a URL, a URI, a globally unique identifier, or a routing name.

* * * * *